(12) United States Patent
Barabell et al.

(10) Patent No.: US 10,057,916 B2
(45) Date of Patent: Aug. 21, 2018

(54) RADIO ACCESS NETWORKS IN WHICH MOBILE DEVICES IN THE SAME COMMUNICATION CELL CAN BE SCHEDULED TO USE THE SAME AIRLINK RESOURCE

(71) Applicant: CommScope Technologies LLC, Hickory, NC (US)

(72) Inventors: Arthur J. Barabell, Sudbury, MA (US); Vedat Eyuboglu, Concord, MA (US); Nagi Jayaraman Mahalingam, Cambridge (GB); Balaji Raghothaman, Hollis, NH (US); Stuart Sandberg, Acton, MA (US); Sassan Ahmadi, Cupertino, CA (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 14/734,311

(22) Filed: Jun. 9, 2015

(65) Prior Publication Data

US 2016/0037550 A1   Feb. 4, 2016

Related U.S. Application Data

(60) Provisional application No. 62/009,653, filed on Jun. 9, 2014, provisional application No. 62/051,212, filed on Sep. 16, 2014.

(51) Int. Cl.
*H04W 72/00* (2009.01)
*H04W 72/12* (2009.01)
(Continued)

(52) U.S. Cl.
CPC ...... *H04W 72/1263* (2013.01); *H04B 17/318* (2015.01); *H04W 72/046* (2013.01)

(58) Field of Classification Search
CPC .. G06F 9/45558; G06F 3/0665; G06F 3/0605; G06F 3/0647; G06F 2009/4557;
(Continued)

(56) References Cited

U.S. PATENT DOCUMENTS 6,711,144 B1   3/2004   Kim et al.
6,731,618 B1   5/2004   Chung et al.
(Continued)

FOREIGN PATENT DOCUMENTS

CN   102340823   2/2012
CN   106797641   5/2017
(Continued)

OTHER PUBLICATIONS

Non Final Office action from U.S. Appl. No. 13/762,284 dated Oct. 23, 2014 (14 pages).
(Continued)

*Primary Examiner* — Nimesh Patel
(74) *Attorney, Agent, or Firm* — Fogg & Powers LLC

(57) ABSTRACT

An example communication system in a cellular network comprises: a processing system comprising a controller and remote units, with the remote units being configured to communicate with the controller and to communicate with mobile devices within a communication cell of the cellular network. At least part of the processing system is configured to perform operations comprising: estimating signal strength experienced by all or some of the mobile devices; identifying, based at least on the signal strength, one or more of the mobile devices that can be scheduled for communication with one or more of the remote units in the communication cell on a same airlink resource; and scheduling the communication.

58 Claims, 33 Drawing Sheets

(51) Int. Cl.
*H04W 72/04* (2009.01)
*H04B 17/318* (2015.01)

(58) Field of Classification Search
CPC .............. G06F 11/203; G06F 11/2069; G06F 2009/45595; G06F 11/2033; H04L 47/70; H04L 5/0037; H04L 12/4641; H04L 63/0272; H04L 12/189; G01V 1/50; G01V 11/00; G01V 2210/67; G01V 1/28; G01V 1/288; G06T 9/005; G06T 3/4007; G06T 9/007; G11B 2020/00079; G11B 20/00007; G11B 20/10; H04B 17/318; H04W 72/046; H04W 72/1263
See application file for complete search history.

(56) References Cited

U.S. PATENT DOCUMENTS

| | | | |
|---|---|---|---|
| 6,741,862 B2 | 5/2004 | Chung et al. |
| 6,781,999 B2 | 8/2004 | Eyuboglu et al. |
| 6,985,451 B1 | 1/2006 | Nattiv et al. |
| 7,170,871 B2 | 1/2007 | Eyuboglu et al. |
| 7,200,391 B2 | 4/2007 | Chung et al. |
| 7,242,958 B2 | 7/2007 | Chung et al. |
| 7,277,446 B1 | 10/2007 | Abi-Nassif et al. |
| 7,299,278 B2 | 11/2007 | Ch'ng et al. |
| 7,415,242 B1 | 8/2008 | Ngan |
| 7,515,643 B2 | 4/2009 | Chung |
| 7,558,356 B2 | 7/2009 | Pollman et al. |
| 7,558,588 B2 | 7/2009 | To et al. |
| 7,603,127 B2 | 10/2009 | Chung et al. |
| 7,626,926 B2 | 12/2009 | Abi-Nassif et al. |
| 7,672,682 B2 | 3/2010 | Sharma et al. |
| 7,715,466 B1 | 5/2010 | Oh et al. |
| 7,729,243 B2 | 6/2010 | Ananthaiyer et al. |
| 7,730,189 B2 | 6/2010 | Harikumar et al. |
| 7,751,835 B2 | 7/2010 | Sharma et al. |
| 7,801,487 B2 | 9/2010 | Mehrabanzad et al. |
| 7,831,257 B2 | 11/2010 | Pollman et al. |
| 7,835,698 B2 | 11/2010 | Eyuboglu et al. |
| 7,843,892 B2 | 11/2010 | Mehrabanzad et al. |
| 7,860,513 B2 | 12/2010 | Chung et al. |
| 7,907,571 B2 | 3/2011 | Raghothaman et al. |
| 7,920,541 B2 | 4/2011 | To et al. |
| 7,926,098 B2 | 4/2011 | Chinitz et al. |
| 7,933,619 B2 | 4/2011 | Kim |
| 7,934,001 B2 | 4/2011 | Harikumar et al. |
| 7,953,040 B2 | 5/2011 | Harikumar et al. |
| 7,983,672 B2 | 7/2011 | Humblet et al. |
| 7,983,708 B2 | 7/2011 | Mehrabanzad et al. |
| 7,995,493 B2 | 8/2011 | Anderlind et al. |
| 8,023,439 B2 | 9/2011 | Rao |
| 8,060,058 B2 | 11/2011 | Ch'ng et al. |
| 8,078,165 B2 | 12/2011 | Mate et al. |
| 8,085,696 B2 | 12/2011 | Garg et al. |
| 8,094,630 B2 | 1/2012 | Garg et al. |
| 8,099,504 B2 | 1/2012 | Cherian et al. |
| 8,111,253 B2 | 2/2012 | Rao |
| 8,130,686 B2 | 3/2012 | Rao et al. |
| 8,140,091 B2 | 3/2012 | Chung et al. |
| 8,145,221 B2 | 3/2012 | Garg et al. |
| 8,160,020 B2 | 4/2012 | Eyuboglu et al. |
| 8,160,629 B2 | 4/2012 | Mate et al. |
| 8,160,631 B2 | 4/2012 | Raghothaman et al. |
| 8,160,829 B2 | 4/2012 | Kalenine |
| 8,165,528 B2 | 4/2012 | Raghothaman et al. |
| 8,170,598 B2 | 5/2012 | Raghothaman et al. |
| 8,176,327 B2 | 5/2012 | Xiong et al. |
| 8,194,597 B2 | 6/2012 | Feder et al. |
| 8,195,187 B2 | 6/2012 | Eyuboglu et al. |
| 8,229,397 B2 | 7/2012 | Hou et al. |
| 8,229,498 B2 | 7/2012 | Ch'ng et al. |
| 8,259,671 B2 | 9/2012 | Raghothaman et al. |
| 8,280,376 B2 | 10/2012 | Rajagopalan et al. |
| 8,290,527 B2 | 10/2012 | Richardson |
| 8,295,256 B2 | 10/2012 | Humblet et al. |
| 8,295,818 B2 | 10/2012 | Palnati et al. |
| 8,311,570 B2 | 11/2012 | Richardson |
| 8,326,342 B2 | 12/2012 | Raghothaman et al. |
| 8,340,636 B2 | 12/2012 | Yin et al. |
| 8,345,694 B2 | 1/2013 | Den et al. |
| 8,346,220 B2 | 1/2013 | Mate et al. |
| 8,355,727 B2 | 1/2013 | Hoang et al. |
| 8,358,623 B2 | 1/2013 | Samar et al. |
| 8,379,625 B2 | 2/2013 | Humblet |
| 8,385,291 B2 | 2/2013 | Richardson et al. |
| 8,400,989 B2 | 3/2013 | Ch'ng et al. |
| 8,402,143 B2 | 3/2013 | Ramaswamy et al. |
| 8,428,601 B2 | 4/2013 | Samar et al. |
| 8,452,299 B2 | 5/2013 | Raghothaman et al. |
| 8,457,084 B2 | 6/2013 | Valmikam et al. |
| 8,503,342 B2 | 8/2013 | Richardson |
| 8,520,659 B2 | 8/2013 | Humblet |
| 8,532,658 B2 | 9/2013 | Knisely |
| 8,542,707 B2 | 9/2013 | Hou et al. |
| 8,543,139 B2 | 9/2013 | Samar et al. |
| 8,554,231 B2 | 10/2013 | Jones |
| 8,594,663 B2 | 11/2013 | Ch'ng et al. |
| 8,615,238 B2 | 12/2013 | Eyuboglu et al. |
| 8,615,593 B2 | 12/2013 | Ch'ng et al. |
| 8,619,702 B2 | 12/2013 | Garg et al. |
| 8,639,247 B2 | 1/2014 | Ng et al. |
| 8,688,809 B2 | 4/2014 | Ch'ng et al. |
| 8,693,987 B2 | 4/2014 | Chiussi et al. |
| 8,705,483 B2 | 4/2014 | Liu |
| 8,718,697 B2 | 5/2014 | Srinivas et al. |
| 8,731,574 B2 | 5/2014 | Ch'ng et al. |
| 8,750,271 B2 | 6/2014 | Jones |
| 8,774,134 B2 | 7/2014 | Raghothaman et al. |
| 8,781,483 B2 | 7/2014 | Ch'ng et al. |
| 8,805,371 B2 | 8/2014 | Richardson et al. |
| 8,843,638 B2 | 9/2014 | Garg et al. |
| 8,873,512 B2 | 10/2014 | Richardson et al. |
| 8,886,249 B2 | 11/2014 | Richardson |
| 8,909,278 B2 | 12/2014 | Rao et al. |
| 8,942,136 B2 | 1/2015 | Humblet |
| 8,953,566 B2 | 2/2015 | Hegde et al. |
| 8,958,809 B2 | 2/2015 | Nama et al. |
| 8,982,841 B2 | 3/2015 | Srinivasan |
| 9,078,284 B2 | 7/2015 | Richardson |
| 9,380,466 B2* | 6/2016 | Eyuboglu ............. H04W 24/02 |
| 2002/0128009 A1 | 9/2002 | Boch et al. |
| 2002/0154055 A1 | 10/2002 | Davis et al. |
| 2002/0194605 A1 | 12/2002 | Cohen et al. |
| 2004/0136373 A1 | 7/2004 | Bareis |
| 2004/0143442 A1 | 7/2004 | Knight |
| 2004/0146072 A1 | 7/2004 | Farmwald |
| 2004/0224637 A1 | 11/2004 | Silva et al. |
| 2005/0025160 A1 | 2/2005 | Meier et al. |
| 2005/0073964 A1 | 4/2005 | Schmidt et al. |
| 2005/0157675 A1 | 7/2005 | Feder et al. |
| 2006/0056459 A1 | 3/2006 | Stratton et al. |
| 2006/0056559 A1 | 3/2006 | Pleasant et al. |
| 2006/0209752 A1 | 9/2006 | Wijngaarden et al. |
| 2007/0058683 A1 | 3/2007 | Futami et al. |
| 2007/0086487 A1 | 4/2007 | Yasuda et al. |
| 2007/0140218 A1 | 6/2007 | Nair et al. |
| 2007/0220573 A1 | 9/2007 | Chiussi et al. |
| 2007/0230419 A1 | 10/2007 | Raman et al. |
| 2007/0242648 A1 | 10/2007 | Garg et al. |
| 2008/0003988 A1 | 1/2008 | Richardson |
| 2008/0200202 A1 | 8/2008 | Montojo et al. |
| 2008/0233886 A1 | 9/2008 | Kaminski et al. |
| 2008/0240034 A1 | 10/2008 | Gollamudi |
| 2009/0097444 A1 | 4/2009 | Lohr et al. |
| 2009/0135718 A1 | 5/2009 | Yeo et al. |
| 2009/0180423 A1 | 7/2009 | Kroener |
| 2009/0180435 A1* | 7/2009 | Sarkar ...................... H04L 5/14 370/330 |
| 2009/0265599 A1 | 10/2009 | Chae et al. |
| 2009/0276542 A1 | 11/2009 | Aweya et al. |
| 2009/0287976 A1 | 11/2009 | Wang et al. |
| 2009/0300453 A1 | 12/2009 | Sahara |
| 2009/0316626 A1 | 12/2009 | Lee et al. |

(56) References Cited

U.S. PATENT DOCUMENTS

| | | |
|---|---|---|
| 2009/0327829 A1 | 12/2009 | Yang et al. |
| 2010/0011269 A1 | 1/2010 | Budianu et al. |
| 2010/0011271 A1 | 1/2010 | Giancola et al. |
| 2010/0034135 A1 | 2/2010 | Kim et al. |
| 2010/0037115 A1 | 2/2010 | Zheng |
| 2010/0062768 A1 | 3/2010 | Lindqvist et al. |
| 2010/0115367 A1 | 5/2010 | Hsu |
| 2010/0118777 A1 | 5/2010 | Yamada et al. |
| 2010/0142494 A1 | 6/2010 | Hsu |
| 2010/0167718 A1 | 7/2010 | Chiussi et al. |
| 2010/0169732 A1 | 7/2010 | Wu |
| 2010/0185911 A1 | 7/2010 | Cheng |
| 2010/0234035 A1 | 9/2010 | Fujishima et al. |
| 2010/0246513 A1 | 9/2010 | Lindskog et al. |
| 2010/0257419 A1 | 10/2010 | Sung et al. |
| 2011/0134862 A1 | 6/2011 | Huang et al. |
| 2011/0145672 A1 | 6/2011 | Jongren et al. |
| 2011/0170517 A1 | 7/2011 | Bakker et al. |
| 2011/0182255 A1 | 7/2011 | Kim et al. |
| 2011/0194548 A1 | 8/2011 | Feder et al. |
| 2011/0194630 A1 | 8/2011 | Yang et al. |
| 2011/0268007 A1 | 11/2011 | Barany et al. |
| 2011/0287791 A1 | 11/2011 | Fujishima et al. |
| 2011/0310802 A1 | 12/2011 | Song et al. |
| 2012/0057572 A1 | 3/2012 | Evans et al. |
| 2012/0127947 A1 | 5/2012 | Usui |
| 2012/0140660 A1 | 6/2012 | Kang et al. |
| 2012/0147815 A1 | 6/2012 | Meyer et al. |
| 2012/0176884 A1 | 7/2012 | Zhang et al. |
| 2012/0176966 A1 | 7/2012 | Ling |
| 2012/0176980 A1 | 7/2012 | Moon et al. |
| 2012/0176996 A1 | 7/2012 | Kim et al. |
| 2012/0189074 A1 | 7/2012 | Jin et al. |
| 2012/0195284 A1 | 8/2012 | Mann et al. |
| 2012/0207105 A1 | 8/2012 | Geirhofer et al. |
| 2012/0208581 A1 | 8/2012 | Ishida et al. |
| 2012/0213109 A1 | 8/2012 | Xu et al. |
| 2012/0250520 A1 | 10/2012 | Chen et al. |
| 2012/0250740 A1 | 10/2012 | Ling |
| 2012/0257570 A1 | 10/2012 | Jang et al. |
| 2012/0264470 A1 | 10/2012 | Bajj et al. |
| 2012/0300635 A1 | 11/2012 | Jersenius et al. |
| 2012/0300766 A1 | 11/2012 | Chen et al. |
| 2013/0016686 A1 | 1/2013 | Li et al. |
| 2013/0034197 A1 | 2/2013 | Aweya et al. |
| 2013/0100948 A1 | 4/2013 | Irvine |
| 2013/0136053 A1 | 5/2013 | Kim et al. |
| 2013/0136104 A1 | 5/2013 | Samar et al. |
| 2013/0194985 A1 | 8/2013 | Zetterman et al. |
| 2013/0223307 A1 | 8/2013 | Ohlsson et al. |
| 2013/0223365 A1 | 8/2013 | Choi et al. |
| 2013/0223391 A1 | 8/2013 | Koo et al. |
| 2013/0242837 A1 | 9/2013 | Yang et al. |
| 2013/0242919 A1 | 9/2013 | Koo et al. |
| 2013/0250869 A1 | 9/2013 | Eriksson |
| 2013/0279452 A1 | 10/2013 | Liu |
| 2013/0294403 A1 | 11/2013 | Srinivasan |
| 2014/0003389 A1 | 1/2014 | Wang et al. |
| 2014/0031036 A1 | 1/2014 | Koo et al. |
| 2014/0044057 A1 | 2/2014 | Gaal et al. |
| 2014/0071868 A1 | 3/2014 | Bergquist et al. |
| 2014/0086112 A1 | 3/2014 | Stern-Berkowitz et al. |
| 2014/0126438 A1 | 5/2014 | Zhu et al. |
| 2014/0161070 A1 | 6/2014 | Chang et al. |
| 2014/0162664 A1 | 6/2014 | Stapleton et al. |
| 2014/0177549 A1 | 6/2014 | Knisely et al. |
| 2014/0211690 A1 | 7/2014 | Nama et al. |
| 2014/0212269 A1 | 7/2014 | Kastner et al. |
| 2014/0219162 A1 | 8/2014 | Eyuboglu et al. |
| 2014/0219255 A1 | 8/2014 | Eyuboglu et al. |
| 2014/0219267 A1 | 8/2014 | Eyuboglu et al. |
| 2015/0011219 A1 | 1/2015 | Saily et al. |
| 2015/0085720 A1 | 3/2015 | Gaal et al. |
| 2015/0172023 A1 | 6/2015 | Yang et al. |
| 2015/0193282 A1 | 7/2015 | Blocksome |
| 2015/0256297 A1 | 9/2015 | Yang et al. |
| 2015/0304960 A1* | 10/2015 | Yang ............... H04B 15/00 370/252 |
| 2016/0044548 A1 | 2/2016 | Choi et al. |
| 2016/0302088 A1 | 10/2016 | Eyuboglu et al. |
| 2016/0345342 A1 | 11/2016 | Eyuboglu et al. |
| 2017/0135121 A1 | 5/2017 | Eyuboglu et al. |
| 2017/0163330 A1 | 6/2017 | Raleigh et al. |

FOREIGN PATENT DOCUMENTS

| | | |
|---|---|---|
| EP | 1134935 B1 | 11/2008 |
| EP | 2352264 | 8/2011 |
| EP | 2787646 | 10/2014 |
| WO | WO 2014/124160 | 8/2014 |
| WO | WO2015/191530 | 12/2015 |
| WO | 2017100096 | 6/2017 |

OTHER PUBLICATIONS

Response to Non Final Office action from U.S. Appl. No. 13/762,284 dated Apr. 23, 2015 (13 pages).

Notice of allowance from U.S. Appl. No. 13/762,284 dated May 8, 2015 (5 pages).

International Search Report and Written Opinion from PCT application No. PCT/US2014/015137 dated Sep. 22, 2014 (19 pages).

Zhu, Zhenbo, et al, "Virtual Base station pool: towards a wireless network cloud for radio access networks", Computing Frontiers, ACM, 2 Penn Plaza, Suite 701, New York, NY 10121-0701, USA, May 3, 2011, pp. 1-10, XP058006421, DOI: 10.1145/2016604. 2016646, ISBN: 978-1-4503-0698-0.

Non Final Office Action from U.S. Appl. No. 13/762,283 dated Nov. 21, 2014 (39 pages).

Response to Non Final Office Action from U.S. Appl. No. 13/762,283 dated Nov. 21, 2014 filed on May 21, 2015 (19 pages).

Invitation to pay additional fees issued in PCT application PCT/US2014/015137 dated Aug. 4, 2014 (8 pages).

Ma, Zhengziang, et al., "Radiostar: Providing Wireless Coverage Over Gigabit Ethernet", Alcatel-Lucent, Published online in Wiley InterScience (www.interscience.wiley.com) • DOI: 10.1002/bltj. 20351, Bell Labs Technical Journal 14(1), 7-24, 2009 (18 pages).

File history of U.S. Appl. No. 14/734,311, filed Jun. 9, 2015.
File history of U.S. Appl. No. 61/552,421, filed Oct. 27, 2011.
File history of U.S. Appl. No. 13/663,297, filed Oct. 29, 2012.
File history of U.S. Appl. No. 13/752,358, filed Jan. 28, 2013.
File history of U.S. Appl. No. 13/752,372, filed Jan. 28, 2013.
File history of U.S. Appl. No. 60/536,871, filed Jan. 16, 2004.
File history of U.S. Appl. No. 10/884,203, filed Jun. 30, 20014.
File history of U.S. Appl. No. 13/089,351, filed Apr. 19, 2011.
File history of U.S. Pat. No. 8,982,841 issued on Mar. 17, 2015.
File history of U.S. Pat. No. 8,958,809 issued on Feb. 17, 2015.

Tunisia 2010, "ITU/BDT Arab Regional Workshop on '4G Wireless Systems' LTE Technology: Session 3: LTE Overview—Design Targets and Multiple Access Technologies", Jan. 27-29, 2010 (82 pages).

3$^{rd}$ Generation Partnership Project; Technical Specification Group Radio Access Network; Evolved Universal Terrestrial Radio Access (E-UTRA); Base Station (BS) radio transmission and reception (Release 8), 3GPP TS 36.104 v8.0.0, Dec. 2007 (47 pages).

3rd Generation Partnership Project; Technical Specification Group Radio Access Network; Evolved Universal Terrestrial Radio Access (E-UTRA); Requirement for support of radio resource management (Release 8), 3GPP TS 36.133 v8.1.0, Mar. 2008 (25 pages).

Garner, Geoffrey M., "IEEE 1588 version 2", Sep. 24, 2008 (89 pages).

Haberland, Bernd, et al, "Base Stations in the Cloud", Alcatel-Lucent, www.alcatel-lucent.com, Sep. 28, 2012 (23 pages).

Zhu, Zhenbo, et al., "Virtual Base Station Pool: Towards a Wireless Network Cloud for Radio Access Networks", IBM Research, Yorktown Heights, US, May 3, 2011 (10 pages).

Invitation to Pay Additional Fees and, Where Applicable, Protest Fee issued in PCT application No. PCT/US2015/034829 dated Oct. 1, 2015 (8 pages).

(56) References Cited

OTHER PUBLICATIONS

Invitation to Pay Additional Fees dated Oct. 1, 2015 issued in PCT application No. PCT/US2015/034829 (6 pages).
International Search Report and Written Opinion dated Dec. 8, 2015 issued in PCT application No. PCT/US2015/034829 (16 pages).
International Preliminary Report on Patentability issued in PCT application No. PCT/US2014/015137 dated Aug. 20, 2015 (13 pages).
Notice of Publication issued in European Application No. 14707024.7 dated Nov. 18, 2015 (1 page).
U.S. Patent Office, "Final Office Action", "from U.S. Appl. No. 13/762,284", dated Oct. 23, 2014, pp. 1-14, Published in: US.
U.S. Patent Office, "Notice of Allowance", "from U.S. Appl. No. 13/762,284", dated May 8, 2015, pp. 1-5, Published in: US.
US Patent Office, "Notice of Allowance", "from U.S. Appl. No. 13/762,284", dated Aug. 26, 2015, pp. 1-12, Published in: US.
US Patent Office, "Notice of Allowance", "from U.S. Appl. No. 13/762,284", dated Dec. 18, 2015, pp. 1-7, Published in: US.
US Patent Office, "Notice of Allowance", "from U.S. Appl. No. 13/762,284", dated Feb. 25, 2016, pp. 1-6, Published in: US.
European Patent Office, "Office Action from EP Application No. 14707024.7", "from Foreign Counterpart to U.S. Appl. No. 13/762,283", dated Oct. 5, 2016, pp. 1-6, Published in: EP.
European Patent Office, "European Search Report for EP Application No. 16175955.0", "Foreign Counterpart from U.S. Application No. 16175955.0", dated Oct. 10, 2016, pp. 1-10, Published in: EP.
European Patent Office, "European Search Report for EP Application No. 16175956.8", "Foreign counterpart to U.S. Appl. No. 13/762,283", dated Oct. 10, 2016, pp. 1-10, Published in: EP.
US Patent Office, "Final Office Action", "from U.S. Appl. No. 13/762,283", dated Aug. 21, 2015, pp. 1-47, Published in: US.
US Patent Office, "Notice of Allowance", "from U.S. Appl. No. 13/762,283", dated Apr. 1, 2016, pp. 1-9, Published in: US.
US Patent Office, "Office Action", "from U.S. Appl. No. 13/762,283", dated Nov. 21, 2014, pp. 1-39, Published in: US.
US Patent Office, "Office Action", "from U.S. Appl. No. 15/230,936", dated Jan. 12, 2017, pp. 1-10, Published in: US.
United States Patent and Trademark Office, "Office Action", "From U.S. Appl. No. 15/230,936", dated Jun. 15, 2017, pp. 1-60, Published in: US.
International Search Authority, "International Search Report and Written Opinion for PCT Application No. PCT/US2014/015137", "from Foreign Counterpart to U.S. Appl. No. 13/762,283", dated Sep. 22, 2014, pp. 1-18, Published in: WO.
US Patent Office, "Advisory Action", "from U.S. Appl. No. 13/762,292", dated Feb. 6, 2017, pp. 1-4, Published in: US.
US Patent Office, "Final Office Action", "from U.S. Appl. No. 13/762,292", dated Sep. 27, 2016, pp. 1-18, Published in: US.
US Patent Office, "Office Action", "from U.S. Appl. No. 13/762,292", dated Dec. 30, 2015, pp. 1-25, Published in: US.
United States Patent and Trademark Office, "Notice of Pre-Appeal Brief Decision", "From U.S. Appl. No. 13/762,292", dated Apr. 12, 2017, pp. 1-2, Published in: US.
US Patent Office, "Restriction Requirement", "from U.S. Appl. No. 13/762,292", dated May 27, 2015, pp. 1-6, Published in: US.
International Search Authority, "International Search Report and Written Opinion for PCT Application No. PCT/US2015/034829", "from Foreign Counterpart to U.S. Appl. No. 14/734,311", dated Dec. 8, 2015, pp. 1-14, Published in: WO.
International Search Authority, "International Search Report and Written Opinion for PCT Application No. PCT/US2016/064750", "from Foreign Counterpart U.S. Appl. No. 14/961,448", dated Mar. 8, 2017, pp. 1-14, Published in: US.
Dotsch et al., "Quantitative Analysis of Split Base Station Processing and Determination of Advantageous Architectures for LTE", "Published online: Wiley Online Library (wileyonlinelibrary.com)", 2013, pp. 105-128, Publisher: Bell Labs Technical Journal 18(1).
"Small Cell Virtualization Functional Splits and Use Cases 159.05.1.01", "www.smallcellforum.org", Jun. 2015, p. 58, Publisher: Small Cell Forum.
U.S. Patent and Trademark Office, "Final Office Action", "From U.S. Appl. No. 15/230,936", dated Nov. 8, 2017, pp. 1-48, Published in: US.
U.S. Patent and Trademark Office, "Notice of Allowance", "From U.S. Appl. No. 13/762,292", dated Jul. 28, 2017, pp. 1-8, Published in: US.
United States Patent and Trademark Office, "Office Action", "From U.S. Appl. No. 14/961,448", dated Aug. 16, 2017, pp. 1-74, Published in: US.
United States Patent and Trademark Office, "Office Action", "From U.S. Appl. No. 15/191,005", dated Sep. 27, 2017, pp. 1-48.
U.S. Patent and Trademark Office, "Office Action", "from U.S. Appl. No. 15/189,473", dated Dec. 13, 2017, pp. 1-53, Published in: US.
U.S. Patent and Trademark Office, "Notice of Allowance", "from U.S. Appl. No. 15/230,936", dated Feb. 9, 2018, pp. 1-10, Published in: US.
U.S. Patent and Trademark Office, "Corrected Notice of Allowability", "from U.S. Appl. No. 13/762,292", dated Dec. 15, 2017, pp. 1-6, Published in: US.
U.S. Patent and Trademark Office, "Notice of Allowance and Fee(s) Due", "from U.S. Appl. No. 13/762,292", dated Nov. 30, 2017, pp. 1-31, Published in: US.
U.S. Patent and Trademark Office, "Final Office Action", "From U.S. Appl. No. 14/961,448", dated Mar. 13, 2018, pp. 1-47, Published in: US.
European Patent Office, "Communication Pursuant to Article 94(3) for EP Application No. 15731443.6", Foreign Counterpart to U.S. Appl. No. 14/734,311, dated Mar. 21, 2018, pp. 1-7, Published in: EP.

* cited by examiner

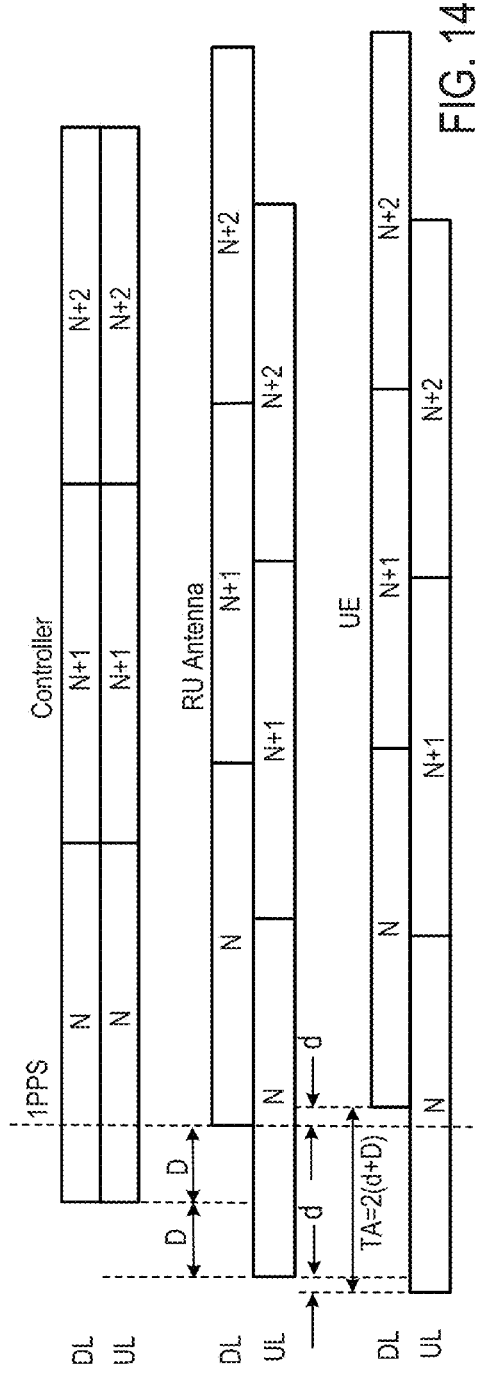
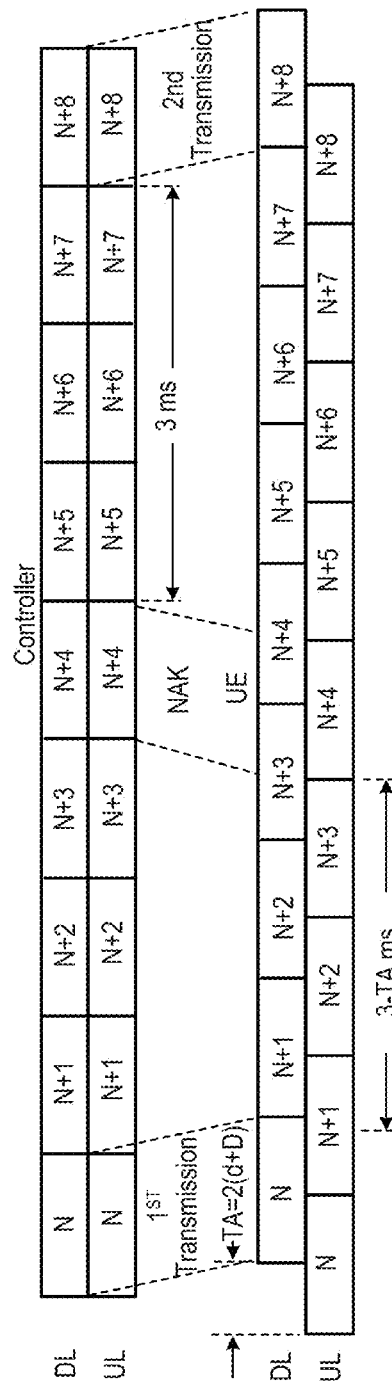

A and B refer to different carriers in a carrier aggregation system

RADIO ACCESS NETWORKS IN WHICH MOBILE DEVICES IN THE SAME COMMUNICATION CELL CAN BE SCHEDULED TO USE THE SAME AIRLINK RESOURCE

CROSS-REFERENCE TO RELATED APPLICATION

This application is related to, and claims the benefit of priority of, U.S. Provisional Application No. 62/009,653, filed on Jun. 9, 2014. The contents of U.S. Provisional Application No. 62/009,653 are incorporated herein by reference. This application is related to, and claims the benefit of priority of, U.S. Provisional Application No. 62/051,212, filed on Sep. 16, 2014. The contents of U.S. Provisional Application No. 62/051,212 are incorporated herein by reference.

TECHNICAL FIELD

This disclosure relates to radio access networks (RANs).

BACKGROUND

The widespread use of mobile devices, such as smartphones, has increased the demand for mobile data transmission capacity and for consistent and high-quality radio frequency (RF) coverage at in-building and other densely populated locations. Traditionally, inside buildings, mobile operators rely on a Distributed Antenna System (DAS) to allow users to connect to the operators' networks for voice and data transmission.

SUMMARY

An example communication system in a cellular network comprises: a processing system comprising a controller and remote units, with the remote units being configured to communicate with the controller and to communicate with mobile devices within a communication cell of the cellular network. At least part of the processing system is configured to perform operations comprising: estimating signal strength experienced by all or some of the mobile devices; identifying, based at least on the signal strength, one or more of the mobile devices that can be scheduled for communication with one or more of the remote units in the communication cell on a same airlink resource; and scheduling the communication between the one or more mobile devices and the one or more remote units. The example communication system may include one or more of the following features, either alone or in combination.

The airlink resource may include a frequency band. At least some communication among at least some of the controller, the remote units, and the mobile devices may occur using radio frequency (RF) signals, where at least some of the RF signals represent information destined for, or originating from, a mobile device. The remote units may be configured to communicate with the mobile devices using RF signals. The controller may be configured to estimate the signal strength experienced by a mobile device, and to represent the estimate numerically, with the estimate corresponding to transmission or reception needs of the mobile device for which the estimate was made. The controller may comprise a real-time scheduler or another type of scheduler configured to perform scheduling for the mobile device based on the estimate.

The transmission or reception needs of the mobile device may correspond to estimated signal loss between the mobile device and one or more of the remote units. The estimated signal loss may be based on an uplink transmission from the mobile device to one or more of the remote units. The uplink transmission may be based on an LTE Sounding Reference Signal (SRS) transmission. The uplink transmission may be based on an LTE PRACH transmission. The uplink transmission may be based on an LTE PUCCH transmission. The uplink transmission may be based on an LTE PUSCH transmission. The transmission or reception needs of the mobile device may be based on traffic load experienced by one or more of the remote units. The estimate may be represented using numerical values that are based on one or more measurements on an uplink from a mobile device to a remote unit. The estimate may be represented using numerical values that are 0 or 1. The estimate may be represented using numerical values that are values selected from a finite number of levels greater than two.

An estimate of signal strength for a mobile device may be represented using numerical values. For the mobile device, the numerical values may form a quantized signature vector. The controller may be configured to perform operations comprising: determining, based on quantized signature vectors for the mobile device and at least one other mobile device that the mobile device and the at least one other mobile device can be scheduled on the same airlink resource for communication. The quantized signature vector may be based on a threshold signal-to-interference-plus noise ratio (SINR). Two mobile devices can be scheduled on a same frequency band in response to a sum of quantized signature vectors for the two mobile devices having no component that exceeds a preset threshold. The numerical values may be based, at least in part, on a location of the mobile device within the communication cell.

At least two of the remote units may be configured so that, when two or more mobile devices are scheduled for communication on a same airlink resource, different ones of the remote units communicate with different mobile devices on the same airlink resource. At least one of the remote unit may be configured so that, when two or more mobile devices are scheduled for communication on a same airlink resource, the at least one of the remote units does not communicate with any mobile device. Alternatively, the at least one of the remote units may be capable of communicating with multiple mobile devices at simultaneously. The at least one remote unit may be configured to communicate using reduced transmit power.

The controller may be configured to cause communication with a mobile device to occur at a transmission power that is below a standard transmission power in a case where the mobile device is within a specified distance of a remote unit. The controller may be configured to determine if the mobile device is within the specified distance based on one or more measurements of uplink transmissions of the mobile device at one or more remote units. The uplink transmissions may comprise one or more of: LTE SRS, PUCCH, PRACH or PUSCH transmissions.

The operations performed by the processing system may comprise determining a bit rate at which data is to be transmitted to and from a mobile device. The operations performed by the processing system comprise determining a bit rate for communication between a mobile device and a remote unit. Operations for determining the bit rate may comprise: receiving, from the remote unit, information about one or more measurements on an uplink control channel between the mobile device and the remote units; and using the one or more measurements to determine the bit rate. The bit rate may be based on uncertainty due to small-scale fading.

The operations performed by the processing system may comprise determining a bit rate for communication between a mobile device and a remote unit. Operations for determining the bit rate may comprise: receiving, from the mobile device, feedback information about success or failure of past data transmissions; and using the feedback information to determine the bit rate. The feedback information may comprise Hybrid ARQ (HARQ) feedback. In a case that a dominant interferer of the mobile device has changed, past HARQ feedback need not be used when determining the bit rate.

The operations performed by the processing system may comprise determining a bit rate for communication between a mobile device and a remote unit. Operations for determining the bit rate may comprise: receiving, from mobile devices, channel state information (CSI) feedback; and using the CSI feedback to determine the bit rate.

The operations performed by the processing system may comprise determining a bit rate for communication between a mobile device and a remote unit. Operations for determining the bit rate may comprise: receiving, from mobile devices, channel state feedback including an interference measurement; and using channel state feedback including the interference measurement to determine the bit rate. The interference measurement may be based on an LTE Channel State Information Reference Signal (CSI-RS). The interference measurement may be reported by a mobile device that is configured to report interference measurements for different interference scenarios.

In the example communication system, a same airlink resource may be used for downlink transmission from one or more remote units to a mobile device. In the example communication system, a same airlink resource may be used for uplink transmission from a mobile device to one or more remote units. In the example communication system, a same airlink resource may be used uplink transmission from a mobile device and one or more other mobile devices to one or more remote units for which signals are jointly processed.

In the example communication system, an estimate of signal strength is represented using numerical values. For a mobile device, the numerical values may form a quantized signature vector. The controller may be configured to perform operations comprising: determining that the quantized signature vector is orthogonal to another quantized signature vector by performing a logical operation using the quantized signature vector and the other quantized signature vector The operations performed by the processing system may comprise determining which remote units are to communicate which mobile devices based, at least in part, on locations of mobile devices within the communication cell. The operations performed by the processing system may comprise dividing the communication cell into virtual cells such that different mobile devices in at least two different virtual cells are configured for communication on the same frequency; and for a mobile device at a border of first and second virtual cells, controlling a first remote unit in the first virtual cell to transmit to the mobile device at a non-maximum power level and controlling a second remote unit in the second virtual cell to transmit to the mobile device at a non-maximum power level.

The operations performed by the processing system may comprise determining bit rates at which communications are to be transmitted between the two or more mobile devices and the two or more remote units. Operations for determining a bit rate for communication between a mobile device and a remote unit may comprise: receiving, from all (or a subset of) remote units in the communication cell, information on an uplink control channel, where the information corresponds to a predicted signal strength for the mobile device in the communication cell, where the predicted strength deviates from an actual signal strength for the mobile device in the communication cell, and where the predicted signal strength is associated with a first bit rate; and reducing the first bit rate based on the actual signal strength to produce a second bit rate for communication between a mobile device and a remote unit.

The remote units may be configured to perform at least some baseband processing. The at least some baseband processing may include receiving and extracting the information on an uplink control channel. The operations performed by the processing system may comprise load-balancing communications to remote units on the uplink control channel. Operations to perform the load-balancing may comprise setting periods and phases for transmissions from some mobile devices so as not to overlap with transmissions of other mobile devices. Operations to perform the load-balancing may comprise setting periods for transmissions from some mobile devices based on a communication traffic load in the communication cell.

In the example communication system, communication may be on a downlink from the two or more remote units to two or more mobile devices. The communication may be on an uplink from the two or more remote units to two or more mobile devices.

The mobile devices may comprise a first mobile device and a second mobile device, and identifying one or more of the mobile devices that can be scheduled for communication may comprise identifying that the first and second mobile devices can be scheduled for communication on a same frequency on an uplink. The uplink may comprise at least one of LTE PUCCH or PUSCH channels.

The operations performed by the processing system may comprise dividing the communication cell into virtual cells such that different mobile devices in at least two different virtual cells are configured to communicate on a same frequency. The same frequency may comprise a part of a larger frequency band. The different mobile devices may be configured also to communicate over different frequencies within the larger frequency band.

The controller may comprise a first controller and the processing system may comprise one or more second controllers. The first controller may coordinate operation of the one or more second controllers. Each of the remote units may be configured to communicate with a corresponding second controller and to communicate wirelessly with mobile devices. The first controller may implement a central coordination function to control operations of the one or more second controllers.

The operations performed by the processing system may comprise determining locations of the mobile devices within the communication cell; and scheduling communication between two or more mobile devices and two or more remote units so as to selectively allocate resources in the two or more remote units.

The operations performed by the processing system may comprise load management of an uplink control channel processing load on the remote units. Operations to perform load management may comprise adjusting periods for transmissions from some mobile devices based on a communication traffic load in the communication cell. The communication traffic load may be based on the number of connected users.

An example communication system comprises: remote units to communicate with mobile devices using radio frequency (RF) signals, where the RF signals include information destined for, or originating from, a mobile device; and a controller comprising a real-time scheduler configured to assign airlink resources to mobile devices for communication. The remote units may be configured to perform at least some baseband processing, with the at least some baseband processing including receiving and extracting the information on an uplink control channel. The at least some baseband processing may be spread among multiple remote units, where the at least some baseband processing includes operations comprising setting periods and phases for transmissions from one or more mobile devices so that transmissions from the one or more mobile devices do not overlap with transmissions of one or more other mobile devices. The example communication system may include one or more of the following features, either alone or in combination.

The setting of periods and phases may be for uplink control channel transmissions of the one or more mobile devices and may be based on one or more remote units that process the uplink control channel transmissions. The setting of periods and phases may be for uplink control channel transmissions of the one or more mobile devices and may be based on a change in a remote unit processing of the uplink control channel transmissions. The uplink control channel transmissions may comprise Scheduling Request (SR) or Channel State Information (CSI) transmissions.

An example communication system comprises remote units to communicate with mobile devices using radio frequency (RF) signals, with at least some of the RF signals including information destined for, or originating from, a mobile device; and one or more processing devices to execute instructions to implement components comprising: two or more controllers, with the two or more controllers comprising real-time schedulers to assign airlink resources to one or more mobile devices for communication with one or more of the remote units; and a coordinator to coordinate assignments made by the real-time schedulers. The example communication system may include one or more of the following features, either alone or in combination.

The coordinator may be part of one of the controllers. Each mobile device may be managed by one of the controllers. At least one of the remote units may be configured to demodulate and to decode PRACH transmissions. One or more of the controllers may be configured to manage a mobile device determined by the at least one remote unit. One or more of the controllers may be configured to operate as a backhaul controller to manage connection to an external network and, upon receiving a page for a mobile device, to manage a mobile device. One or more of the controllers may be configured to operate as a timing source for one or more of the remote units.

Two or more remote units may be part of a cell. One or more of the controllers may be configured to serve mobile devices in the cell via one or more of the remote units. One or more of the controllers may be configured to provide data for downlink common channels for one or more of the remote units.

At least some mobile devices may be configured to receive data on two or more frequency carriers. Each controller may be configured to manage one of the frequency carriers, and each controller may be configured to serve a mobile user corresponding to a carrier of the controller. The coordinator may be configured to coordinate airlink resource assignments across multiple frequency carriers. A remote unit may be configured to receive data from more than one controller. The remote unit may be configured to transmit data to more than one controller.

An example communication cell in a cellular network comprises: a processing system comprising a controller and radio units, with the radio units being configured to communicate with the controller and to communicate wirelessly with mobile devices within the communication cell. The processing system may be configured to perform operations comprising: estimating signal strength experienced by the mobile devices, with the signal strength being affected by interference experienced by the mobile devices, and with the interference being caused by transmissions of at least some of the radio units within ranges of the mobile devices; and identifying, based at least on the signal strength, two or more of the mobile devices that can be scheduled for communication, on a same frequency, with two or more of the radio units in the communication cell.

An example method is used in a cellular network comprising a processing system comprising a controller and radio units, with the radio units being configured to communicate wirelessly with the controller and to communicate with mobile devices within a communication cell. The processing system performs operations comprising: estimating signal strength experienced by the mobile devices, with the signal strength being affected by interference experienced by the mobile devices, and with the interference being caused by transmissions of at least some of the radio units within ranges of the mobile devices; and identifying, based at least on the signal strength, two or more of the mobile devices that can be scheduled for communication, on a same frequency, with two or more of the radio units in the communication cell. The example method may be implemented using one or more non-transitory machine-readable storage devices storing instructions that are executable to perform the method.

An example communication system in incorporated into a cellular network. The communication system comprises a processing system comprising a controller and remote units, where the remote units are configured to communicate with the controller and to communicate with mobile devices within a communication cell of the cellular network. One or more non-transitory machine-readable storage media store instructions that are executable by the processing system to perform operations comprising: estimating signal strength experienced by all or some of the mobile devices; identifying, based at least on the signal strength, one or more of the mobile devices that can be scheduled for communication with one or more of the remote units in the communication cell on a same airlink resource; and scheduling the communication between the one or more mobile devices and the one or more remote units.

An example communication system is incorporated into a cellular network. The communication system comprises a processing system comprising a controller and remote units, where the remote units are configured to communicate with the controller and to communicate with mobile devices within a communication cell of the cellular network. A method performed by the processing system comprises: estimating signal strength experienced by all or some of the mobile devices; identifying, based at least on the signal strength, one or more of the mobile devices that can be scheduled for communication with one or more of the remote units in the communication cell on a same airlink resource; and scheduling the communication between the one or more mobile devices and the one or more remote units.

An example communication system comprises: remote units to exchange RF signals with mobile devices, with RF signals comprising information destined for, or originating from, a mobile device; and a controller comprising a real-time scheduler for assigning airlink resources to mobile device for the information. The controller may be configured to determine the remote unit transmission or reception needs of mobile devices by estimating signal levels and representing the needs by numerical values. The real-time scheduler may be configured to assign mobile devices to airlink resources, sometimes assigning two or more mobile devices to the same airlink resource according to RF isolation, based on the numerical values. The example communication system may include one or more of the following features, either alone or in combination.

The remote unit transmission or reception needs may be determined based on estimates of the signal loss between each of the remote units and the mobile device. The remote unit transmission or receptions needs may be determined based also on the traffic load seen on each of the remote units. The signal loss may be estimated based on an uplink transmission from the mobile device to the remote units. The uplink transmissions may correspond to Sounding Reference Signal (SRS) transmissions in the LTE standard. The uplink transmissions may correspond to PRACH transmissions in the LTE standard. The uplink transmissions may correspond to PUCCH transmissions in the LTE standard. The uplink transmissions may correspond to PUSCH transmissions in the LTE standard. The numerical values may be derived from uplink measurements. The numerical values may be binary taking the values 0 or 1. The numerical values may take on values from a finite number of levels greater than 2.

For each mobile device, the numerical values may be used to form a quantized signature vector. Operations for determining, based on the quantized signature vectors, that the two or more mobile devices can be scheduled on the same airlink resource for communication may comprise determining that the signature vectors are orthogonal. The quantized signature vector for a mobile device may be determined using a threshold signal-to-interference-plus noise ratio (SINR).

For each mobile device, the numerical values may be used to form a quantized signature vector and two users may be allowed to be scheduled on the same frequency resource when the sum of their quantized signature vectors have no component that exceeds a preset threshold.

The numerical values may be determined based, at least in part, on the locations of the mobile devices within the communication cell. The assignment of two or more mobile devices on the same airlink resource may result in different remote units in the cell transmitting to a different mobile devices on the same airlink resource. The assignment of two or more users on the same airlink resource may result in some remote units not transmitting to any of the users. The assignment of two or more users on the same airlink resource may result in some remote units transmitting simultaneously to multiple users. The remote units may transmit simultaneously to multiple users have a reduced transmit power.

The controller may further reduce the transmission power to certain mobile devices that it determines to be near a remote unit. The controller may make the determination based on measurements of uplink transmissions of the mobile devices at the remote units. The uplink transmissions may include LTE SRS, PUCCH, PRACH or PUSCH transmissions.

The operations may comprise determining bit rates at which data is to be transmitted to and from two or more mobile devices. Determining a bit rate for communication between a mobile device and a radio unit may comprise: receiving, from remote units, information on measurements on an uplink control channel, and using such measurements in determining the bit rate. Determining the bit rate may include uncertainty due to small-scale fading.

Determining a bit rate for a communication from a remote unit to a mobile device may comprise: receiving from the mobile device feedback on the success or failure of past data transmissions, and using such information in bit rate determination. The mobile device feedback may be an Hybrid ARQ (HARQ) feedback of LTE. The past HARQ feedback may be ignored when the UE's dominant interferer has changed.

Operations for determining a bit rate for a communication from a remote unit to a mobile device may comprise: receiving from mobile devices multiple channel state information (CSI) feedback, and using such information in bit rate determination. Operations for determining a bit rate for a communication from a remote unit to a mobile device comprises: receiving from mobile devices multiple channel state feedback including interference measurement, and using such information in bit rate determination. The interference measurement may be based on Channel State Information Reference Signal (CSI-RS) of LTE. The mobile device may report multiple interference measurements for different interference scenarios.

An example communication system comprises: remote units to exchange RF signals with mobile devices, with RF signals comprising information destined for, or originating from, a mobile device; and a controller comprising a real-time scheduler for assigning airlink resources to mobile devices for the information. The remote units are configured to perform at least some baseband processing, with the at least some baseband processing including receiving and extracting the information on the uplink control channel. Operations performed by the controller comprise balancing the processing load across the remote units when processing the uplink control channel, where load-balancing comprises setting periods and phases for transmissions from some mobile devices so as not to overlap with transmissions of other mobile devices. The example communication system may comprise one or more of the following features, either alone or in combination.

The setting of periods and phases for uplink control channel transmissions of a mobile device may also be based on the one or more remote units that are processing the uplink control channel transmissions. The setting of periods and phases for uplink control channel transmissions of a mobile device may be modified when a remote unit processing the uplink control channel transmissions changes (because of mobility).

The uplink control channel transmissions may include Scheduling Request (SR) or Channel State Information (CSI) transmissions. The operations may comprise management of uplink control channel processing load on the remote units, where load management comprises adjusting periods for transmissions from some mobile devices based on a communication traffic load in the communication cell. The communication traffic load may be measured based on the number of connected users.

The assigned same airlink resources may be for downlink transmissions from the different remote units to the two or more mobile devices. The assigned same airlink resources may be for uplink transmissions from two or more mobile devices to remote units without substantial interference. The assigned same airlink resources may be for uplink transmissions from two or more mobile devices to one or more remote units whose received signals are jointly processed for reliable detection.

An example communication system comprises: remote units to exchange RF signals with mobile devices, with RF signals comprising information destined for, or originating from, a mobile device; and two or more controllers comprising real-time schedulers for assigning airlink resources to mobile device for the information. A coordination function is coupled to the controllers to coordinate the assignments made by the real-time schedulers in the controllers. The example communication system may include one or more of the following features, either alone or in combination.

The coordination function may reside in one of the controllers. Each connected user may be managed by one of the controllers. PRACH transmissions may be demodulated and decoded by one remote unit, and the controller may be configured to manage a connected user is determined by the one remote unit.

One or more of the controllers may act as a backhaul controller managing the connection to the external network and upon receiving a page for a mobile user it selects the controller to manage the mobile user. One or more of the controllers may act as a timing source for the remote units. Two or more remote units may belong to the same cell and mobile devices in the cell may be served by any one of the controllers via one or more of the remote units. One or more of the controllers may provide the data for the downlink common channels for the remote units.

At least some mobile devices may receive on two or more frequency carriers, and each controller may handle one of the carriers, wherein a mobile user is served by the controller associated with its primary carrier.

The coordination function may be used to coordinate airlink resource assignments across multiple frequency carriers. A remote unit can receive data from more than one controller, and a remote unit can transmit data to more than one controller.

Any two or more of the features described in this specification, including in this summary section, can be combined to form implementations not specifically described herein.

The systems and techniques described herein, or portions thereof, can be implemented as/controlled by a computer program product that includes instructions that are stored on one or more non-transitory machine-readable storage media, and that are executable on one or more processing devices to control (e.g., coordinate) the operations described herein. The systems and techniques described herein, or portions thereof, can be implemented as an apparatus, method, or electronic system that can include one or more processing devices and memory to store executable instructions to implement various operations.

The details of one or more implementations are set forth in the accompanying drawings and the description below. Other features and advantages will be apparent from the description and drawings, and from the claims.

DESCRIPTION OF THE DRAWINGS

FIG. 14 is a diagram showing an example of subframe alignment.

FIGS. 15 and 16 are diagrams showing examples of HARQ timing for the downlink and the uplink, respectively.

DETAILED DESCRIPTION

The systems and techniques described below are example implementations of features that may be included in a radio access network. The claims made herein are not limited to the example implementations described below.

Figure 1:
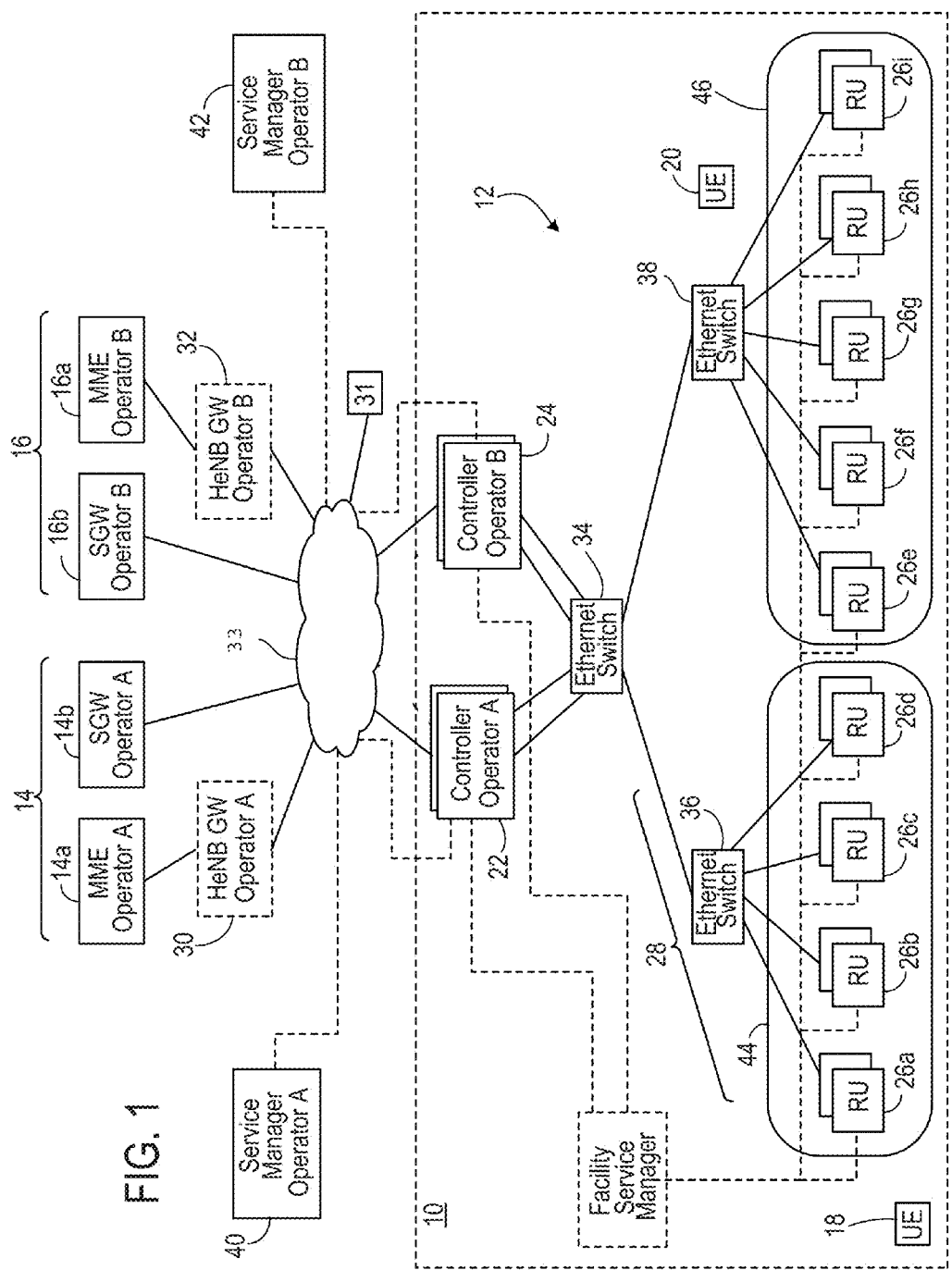
FIG. 1 is a block diagram of an example of a radio network.

Referring to FIG. 1, an example radio network 12 is deployed on a site 10 so that one or more mobile operators, such as operator A 14 or operator B 16, can provide mobile network access to one or more user equipment (UE(s)) 18, 20, such as smartphones, at site 10. The site may be an enterprise or corporate building, a public venue, such as a hotel, hospital, university campus, or even an outdoor area such as a ski area, a stadium, or a densely-populated downtown area or a city. The radio network 12 includes controllers (each of which can also be referred as a Controller Unit (CU)) 22, 24 and Remote Units (RU) 26a-26i connected by an Ethernet network 28. The CUs 22, 24 are connected (backhauled) to the operator's core network, which may include a security gateway (SeGW) and nodes defined in the Long Term Evolution (LTE) standard, such as mobility management entity (MME) 14a, 16a and Serving Gateways (SGW) 14b, 16b, optionally, through Home eNodeB gateways (HeNB GW) 30, 32.

The CUs may connect to the operator's core network via the Internet or other IP-based packet transport network 33 (for the purpose of discussion, we may only refer to the network 33 as the Internet, although other networks may be used or included). When multiple CUs are present, one CU may act as an eNodeB termination point and present a single network interface towards the core network; e.g., a SeGW, a MME, a HeNodeB GW or a SGW. CUs may be implemented using known principles of Network Function Virtualization (NFV) as a virtualized software application running on a virtual machine/hypervisor. The virtual machine/hypervisor may run on hardware that is shared with other virtualized applications. The hardware may be an off-the-shelf IT server. The CUs may also include certain MME functionality (not shown) and SGW functionality (not shown), thus allowing traffic to flow directly between the UE and a destination node 31 on the Internet or on local IP network 28 at site 10 without traversing the operator's core network.

In some implementations, each CU 22, 24 performs the functions of a base station, except for certain baseband modem and RF functions that may be performed by the RUs. Each CU also may manage one or more of the RUs. Each CU may be associated with a mobile operator such that the RUs they manage may operate on a spectrum that belongs to that mobile operator. It is also possible for a CU to be shared between multiple mobile operators. Among other things, the CUs may schedule traffic to/from the UEs. Each CU 22, 24 is also connected to a service manager 40, 42, which is typically located in the operator's core network. The service manager is responsible for the configuration, activation and monitoring of the radio network. There may also be a local facility service manager, which can allow local IT personnel to install and maintain the radio network. The RUs 26a-26i contain RF transceivers to transmit RF signals to and from the user equipment and to perform RF front-end functions, among other functions.

Generally, a traditional base station, such as a traditional small cell, includes a Radio Frequency (RF) unit, a digital baseband modem unit and a network processing unit. Such a traditional base station implements both RF functionality and baseband processing. In some implementations, one or more traditional base stations can be in communication with a centralized controller. The baseband functionalities can be split between the traditional base station and the centralized controller of the traditional base station(s) such that the centralized controller performs only the upper layer (e.g., Layer 3 or higher) processing functions of the baseband functionality.

Figure 28:
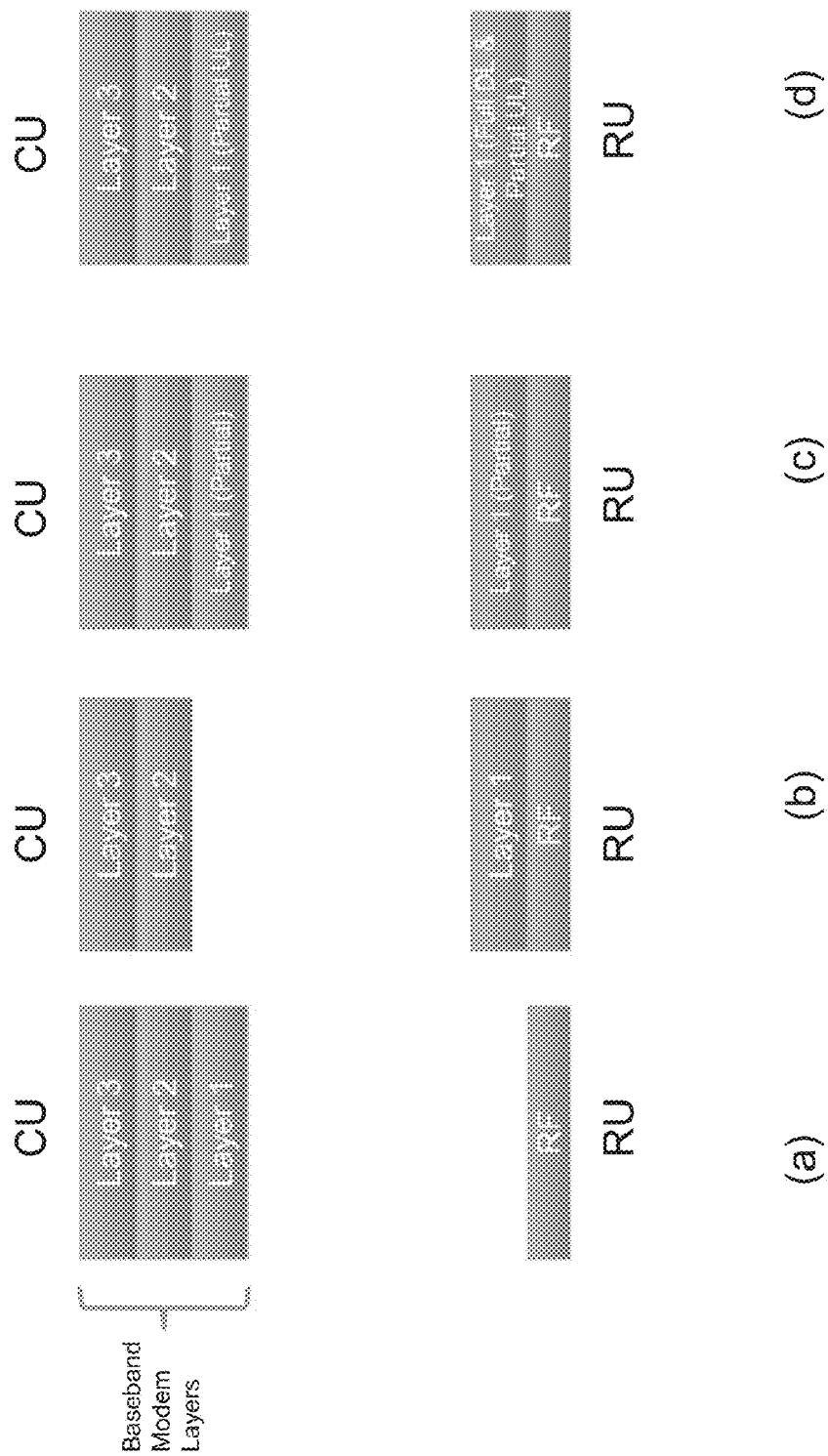
FIG. 28 is a block diagram showing examples of functionality splits between RUs and CUs.

In some implementations, the CUs do not perform any RF functions. Each CU can include one or more baseband modems, each for performing functions of all layers of baseband functionalities, including the Media Access Control (MAC) layer (Layer 2) processing, and upper layer (Layer 3 and above) processing, as shown in configuration (a) of FIG. 28. For example, real-time scheduling, which is part of the MAC layer (Layer 2), may be performed by a baseband modem of a CU. Baseband modems may also perform physical layer (Layer 1) processing. In addition, the baseband modems or the CUs may also perform other functions similar to the traditional base station, such as the function of the network processing unit, e.g., processing Internet Protocol (IP) data.

In some implementations, real-time scheduling refers to assigning user data to time and/or frequency resources based on CSI (Channel State Information). In downlink (DL) scheduling, CSI is supplied by the UE. In the LTE standard, the downlink CSI may include a Channel Quality Indicator (CQI), Precoding Matrix Indicator (PMI), or Rank Indicator (RI). In uplink (UL) scheduling, CSI is determined by the controller based on transmissions received from the UEs. The real-time scheduling is a Layer 2 function and is performed in the CU. In the LTE standard, uplink CSI may be determined based on the signals transmitted by the UE, for example, the Sounding Reference Signal (SRS). The baseband modem functions performed by the controller may also include Layer 1 functions such as downlink error control coding, uplink error control decoding, uplink multi-antenna diversity combining of signals received by different RUs, channel estimation, and other higher layer functions related to the wireless transmission or reception. In some implementations all Layer 1 functions are implemented in the RUs, and only the baseband functions of Layer 2 and above are implemented in the CUs, as shown in configuration (b) of FIG. 28. In some implementations, the Layer 1 functions ("Layer 1 ("Partial")") are split between the CUs and RUs, as shown in configuration (c) of FIG. 28. The uplink control channel receiver functions, such as PUCCH, PRACH, and SRS, may be substantially implemented in the RUs, whereas the uplink PUSCH receiver functions can be handled by the CUs. The functional split between the CU and the RU may be different on the downlink and on the uplink. In some implementations, substantially all downlink Layer 1 functions can be implemented in the RUs and a majority of uplink Layer 1 functions can be implemented in the CUs, as shown in configuration (d) of FIG. 28.

In some implementations, the CUs and the RUs of the network 12 perform distinctive functions in the radio network and are connected by Ethernet network 28, although other transport networks, such as Hybrid Fiber-Coax (HFC) cable networks, VDSL (Very-high-bit-rate Digital Subscriber Line) networks, or wireless networks can also be utilized to enable the various capabilities described in this specification. The CUs 22, 24 may determine the processing capacity of the data/signal transmission at site 10 for the functions implemented in the CUs, while the RUs 26a-26i may provide RF/signal coverage to site 10, as well as the processing capacity for the functions implemented in the RUs.

The CUs 22, 24 may contain one or more processors or other processing devices on which code is executed to instruct performance of certain network and baseband modem functions. The processors can be hardware formed by Integrated Circuits (ICs) and other electrical components. Each CU 22, 24 may contain one or more baseband modem processors (see, e.g., FIGS. 2A and 2B) or may be configured to perform the functions of one or more baseband modems. Each baseband modem may be implemented on one or multiple processors. When a baseband modem is implemented on multiple processors, each processor may be responsible for processing signals associated with selected groups of UEs. In some cases, the CUs may be configured to perform no RF functionality. The RUs may be controlled by the CUs and may be implemented by hardware blocks, such as radio transceivers (see, FIGS. 2A and 2B).

The RUs may have transmit antennas that are integral thereto or the antennas may be external, and connect to, the RUs via antenna cables. An RU is also referred to as a radio point (RP), or a radio point unit (RPU). In some examples, there may be less software functionality running on the RUs than on CUs 22, 24. In some implementations, the RUs are configured to perform no baseband modem functionality. In other implementations, the RUs may perform some baseband modem functionality. For example, in the LTE standard, the RUs may implement Fast Fourier Transform (FFT) and Inverse FFT (IFFT) functions. In some implementations, RUs may perform additional downlink baseband modem functions. For example, RUs may perform all, or the vast majority of, the Layer 1 functions. The baseband modems in the CUs and the RUs may be connected through a standard off-the-shelf switched Ethernet network 28 with one or more Ethernet switches 34, 36, 38, and possibly one or more additional switches in between switch 34 and switches 36, 38. In some implementations, all CUs and RUs at site 10 are connected to each other through the Ethernet network 28. Other networks may be used to connect the CUs to the RUs, including wireless links, CATV networks or dedicated fiber links.

In some implementations, one or more RUs, together with a baseband modem in a given CU, form a physical cell. In the example shown in FIG. 1, a cell 44 includes RUs 26a-26d controlled by one or more baseband modems (not shown) in the CU 22, and a cell 46 includes RUs 26e-26i controlled by one or more baseband modems (not shown) in the CU 24. The RUs 26a-26i can be deployed at different locations of site 10, e.g., different rooms, floors, buildings, etc., to provide an RF coverage across the site as uniformly as possible. Each CU may have one or more baseband modems and can control one or more cells. Nominally, each baseband modem may have the data transmission capacity of a single LTE sector, which can be quite large using frequency reuse techniques described in this specification. The number of baseband modems available at the site and the capacity of each LTE cell typically determines the data capacity that can be delivered to the site.

The radio network 12 of FIG. 1 can be implemented with various air interface technologies. For example, 4G LTE may be used. LTE is a standard developed by 3GPP, a standards organization. The first version of the LTE standard was made available in 3GPP Release (Rel.) 8. Subsequently, the LTE standard was refined in Releases 9, 10, 11 and 12. Several more releases of the standard will be developed in the future. 3GPP Releases 8 to 11 of the LTE standard are used in the example radio networks, systems, and methods described herein. However, the radio networks and other systems and methods described herein can be utilized with any appropriate release of the LTE standard, including Frequency-Division Duplex (FDD) and Time-Division Duplex (TDD) variants, or with a variety of other appropriate future (e.g., 5G) or existing air interface technologies, such as the IEEE 802.11, which is more popularly known as Wi-Fi, or IEEE 802.16, which is also known as Wi-Max, or 3G air interfaces such as Universal Mobile Telecommunications System (UMTS).

Commercial LTE networks may be synchronous such that timing phases of all transmissions from eNodeBs are aligned with GPS (global positioning system) time or UTC (coordinated universal time). In a standalone LTE eNodeB, the GPS/UTC time is provided by a GPS receiver, which is a physical component on the eNodeB hardware. In some implementations, the hardware of CUs 22, 24 include a physical GPS receiver to provide timing to the radio network 12. In deployments where CUs 22, 24 are distant from any satellite view, e.g., located deep inside a building, the physical GPS receiver (not shown) can be external to the CU hardware and can deliver the timing information to CUs 22, 24 through, e.g., the IEEE1588 PTP (precision time protocol). In some implementations, a source of timing for the radio network 12 is a timing server (not shown) located in the operator's network (e.g., the network 14, 16) that provides timing to CUs 22, 24 using, e.g., the IEEE1588 protocol. RUs 26a-26i do not necessarily contain any GPS receiver in some cases, and may receive timing information either from the CUs or directly from an external GPS receiver via IEEE1588 or other high-precision timing protocols. Timing synchronization is discussed below.

Figure 2A:
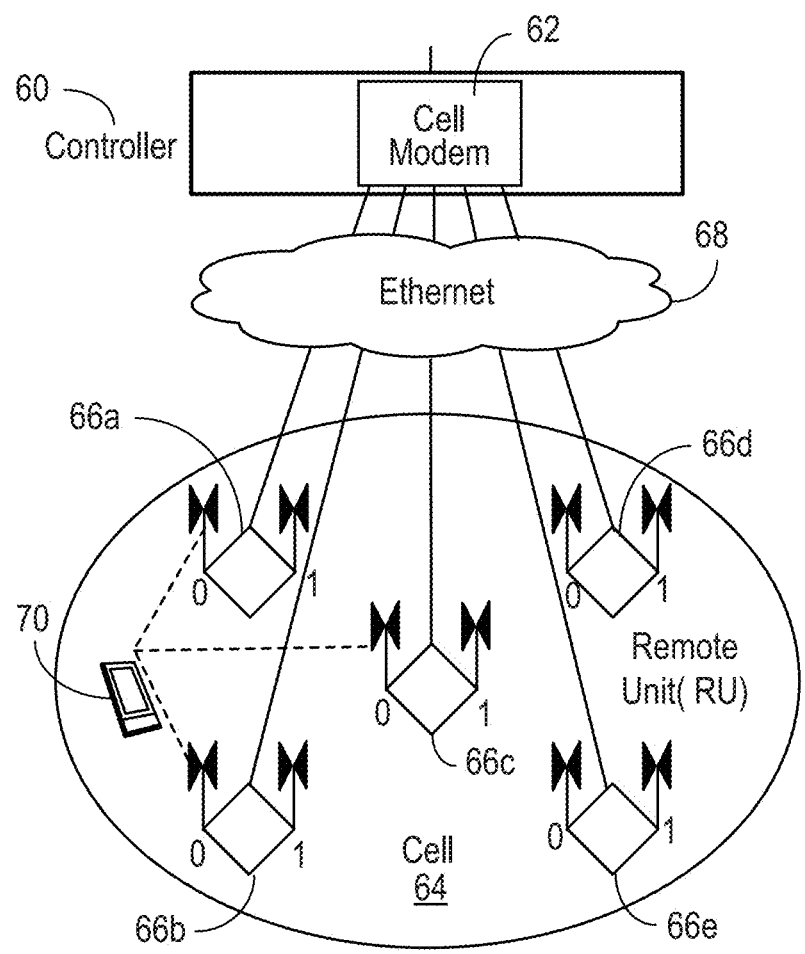
FIGS. 2A and 2B are block diagrams showing an example of one cell of a radio network connected to a controller/control unit (CU) and two cells connected to a CU.

Referring to FIG. 2A, in an example implementation, a CU 60 includes a baseband (cell) modem 62 connected to RUs 66a-66e through an Ethernet network 68. RUs 66a-66e belong to the same cell 64. The positions of the RUs are chosen to provide RF coverage, which depends primarily on the transmitter power of the RUs and the RF propagation environment at the site. The data capacity of a single baseband modem can be shared by all UEs that are in the coverage area of the RUs that belong to the corresponding cell. The number of RUs to be assigned to a single cell can be determined based on the number of UEs in the coverage area of the RUs, the data capacity needs of each UE, as well as the available data capacity of a single baseband modem, which in turn depends on the various capacity-enhancing features supported by the baseband modem.

In some implementations, in a radio network, the size and shape of the cells can be varied in a site according to the traffic demand. In high traffic areas, cells can be made smaller than in low traffic areas. When traffic demand distribution across the site varies according to time-of-day or other factors, the size and shape of cells can also be varied to adapt to those variations. For example, during the day, more capacity can be delivered to the lobby areas of a hotel than to the room areas, whereas at night more capacity can be delivered to the room areas than to the lobby areas.

Figure 2B:
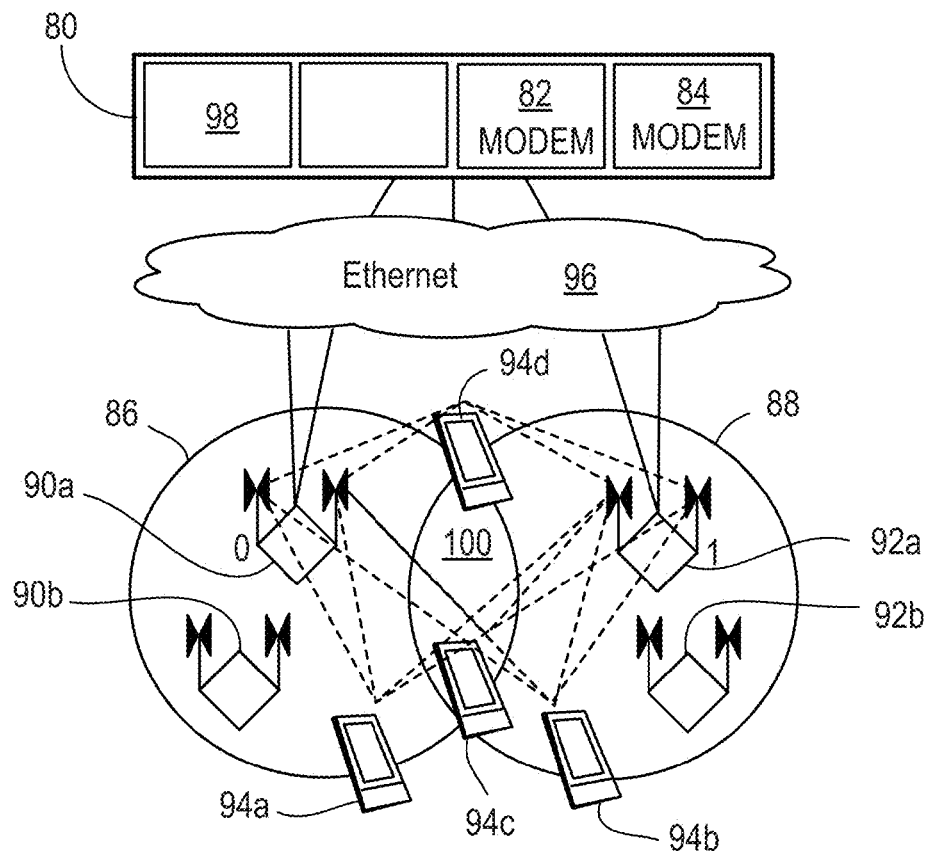

In some implementations, RUs 66a-66e can provide uniform signal strength throughout the cell 64 without introducing any cell boundaries. When the capacity of a single baseband modem 62 is insufficient to serve the area, additional modems can be added to the CU or unused modems can be enabled in the CU to split an existing cell into multiple cells. More capacity can be delivered with multiple cells. For example, as shown in FIG. 2B, a CU 80 includes modems 82, 84 controlling respective cells 86, 88 through an Ethernet network 96. Each cell 86, 88 includes one or more RUs 90a, 90b, 92a, 92b to provide RF coverage to UEs 94a-94d. Cells 86, 88 can be used by the subscribers of one mobile operator, or by different mobile operators. If needed, additional CUs with more baseband modems can also be added. Additional RUs may be added to expand or improve the RF coverage.

In addition to the modems or modem functionalities, in some implementations, CU 80 contains a coordination unit 98 that globally coordinates the scheduling of transmission and reception of the modems 82, 84 to reduce or eliminate possible interference between the cells 86, 88. For example, the centralized coordination allows devices 94c, 94d that are located within the overlapping boundary region 100 of the two cells 86, 88 to communicate without substantial inter-cell interference. The details of the centralized coordination are discussed below. In some implementations, the interference issues that are likely to take place in the boundary regions of multiple cells within the entire building or site may occur less frequently, because of the relatively few number of cells needed. In some implementations, the CU(s) can perform the centralized coordination for a relatively few number of cells and avoid inter-cell interference. In some implementations, coordination unit 98 may be used as an aggregation point for actual downlink data. This may be helpful for combining downlink traffic associated with different cells when multi-user MIMO is used between users served on different cells. The coordination unit may also be used as an aggregation point for traffic between different modem processors that belong to the same baseband modem.

Figure 2C:
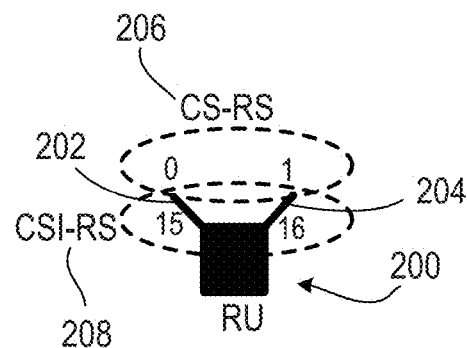
FIG. 2C is a schematic diagram of an example of a remote unit (RU).

Unless otherwise specified, the examples provided below are mostly directed to one cell. However, the features described herein can be readily extended to multiple cells. Referring to FIG. 2C, an example RU 200 for use in the radio network of FIGS. 1 and 2A-2B can have two antennas 202, 204 for transmitting RF signals. Each antenna 202, 204 may transmit RF signals on one or more LTE channels (or carriers). The cell to which the RU 200 and its antennas 202, 204 belong has an ID (Cell-ID). The CU and its RUs and antennas may support multiple LTE channels, each with a different Cell-ID. In addition, each antenna 202, 204 is assigned to a unique Release 8 Cell-Specific Reference Signal (CS-RS) logical antenna port (ports 0, 1, 2 or 3) and, possibly, a unique Release 10 Channel State Information Reference Signal (CSI-RS) logical antenna port (ports 15, 16, . . . , 22). In this example, antennas 202, 204 are also referred to as physical antennas, while the logical antenna ports are also referred to as virtual antenna ports. In the example shown in FIG. 2C, antenna 202 is assigned to the CS-RS logical antenna port 0 and the CSI-RS logical antenna port 15; and antenna 204 is assigned to the CS-RS logical antenna port 1 and the CSI-RS logical antenna port 16. The logical antenna ports, together with the Cell-ID and other parameters configured in the CU, determine the CS-RS (Cell-Specific Reference Signal) 206 the antennas transmit under Release 8, or the CSI-RS (Channel State Information-Reference Signal) 208 the antennas transmit under Release 10.

The RF signals transmitted by antennas 202, 204 carry LTE synchronization signals PSS/SSS (Primary Synchronization Signal/Secondary Synchronization Signal), which include a marker for the Cell-ID. In use, an idling UE monitors the reference signals associated with a Cell-ID, which represents one LTE channel in one cell. A connected UE may transmit and receive RF signals on multiple LTE channels based on channel aggregation, a feature of the LTE standard first defined in Release 10.

The RU 200 can also have more than two antennas, e.g., four, six, or eight antennas. In some implementations, all RUs in the radio network (e.g., the radio network 12 of FIG. 1) have the same number of transmit and receive antennas. In other implementations, the RUs have different numbers of transmit or receive antennas.

Figure 29:
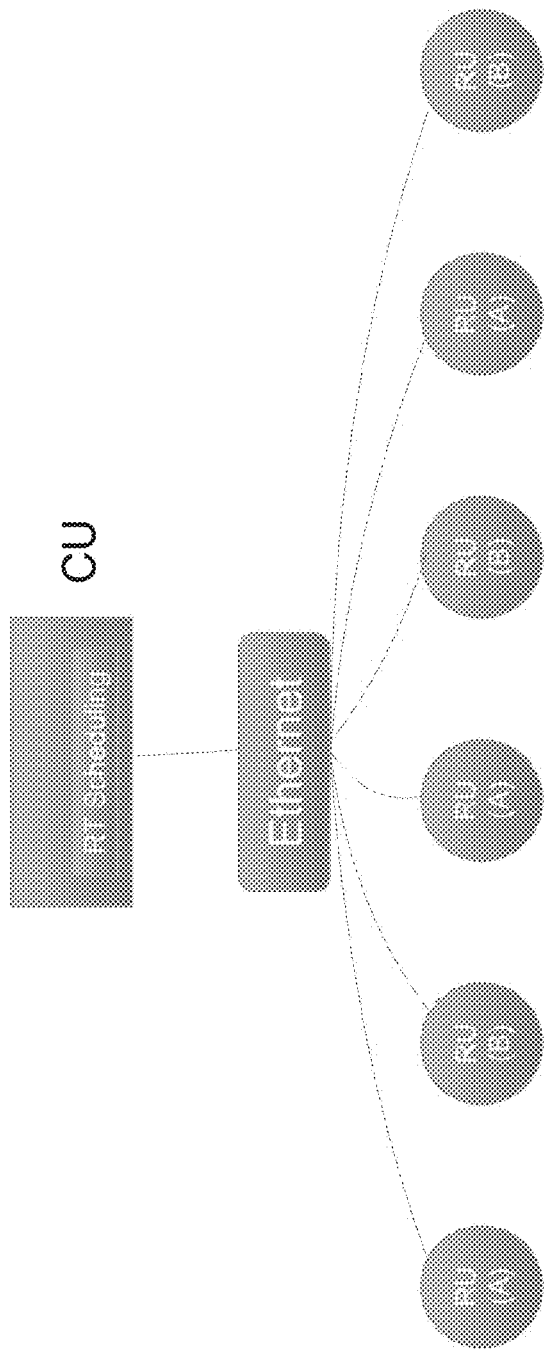
FIG. 29 is a block diagram showing an example topology for an example implementation for use with the processes described herein.

The radio networks described above can be upgraded in the CUs, e.g., to support future LTE or other standards, sometimes without making substantial changes, e.g., any changes, to the deployed RUs. In some implementations, when the RUs support multiple frequency channels simultaneously, an upgrade for carrier aggregation can be performed by enabling additional channels in the same RU. Carrier aggregation can also be implemented using RUs that operate on one selected carrier. In this regard, in some implementations, different single-carrier RUs can be configured to operate on different carriers. RUs that operate on different carriers need not be co-located. For example, in a simple linear topology shown in FIG. 29, RUs operating on one carrier (Carrier A) (RU(A)) may be spatially offset relative to RUs operating on another carrier (Carrier B) (RU(B)). In some cases, this approach uses two carriers to deliver a more consistent coverage by using one carrier to fill in the coverage edges for the other carrier. In more complex two-dimensional or three-dimensional topologies, similar spatially distributed deployments can be used to bring a more uniform coverage across two or more carriers and deliver a more consistent user experience in some cases. In some cases, UEs may use different Uplink Timing Advance when operating on different carriers as described in LTE Release 11. In carrier aggregation using a single RU or multiple RUs, the aggregated channels may be in the same or different frequency bands. Likewise, when the RUs support frequency bands for the TDD (time-division duplex) version of the LTE standard, Time-Division (TD)-LTE capability may be added at a later date by upgrading the CU's and possibly the RU's software/firmware, or by adding a new CU. If Wi-Fi support is required, Wi-Fi capability may be added to the RUs. Wi-Fi transceivers in the RUs can be managed by the same or a different controller and can be managed by the same service managers, both at the site and in the operator's network. Such upgrades can, in some cases, be performed in a cost effective manner, e.g., by making hardware changes (sometimes at most) in a relatively small number of CUs in a central location (as opposed to replacing a large number of RUs that are spread across the site).

Radio Network Deployment

Figure 3:
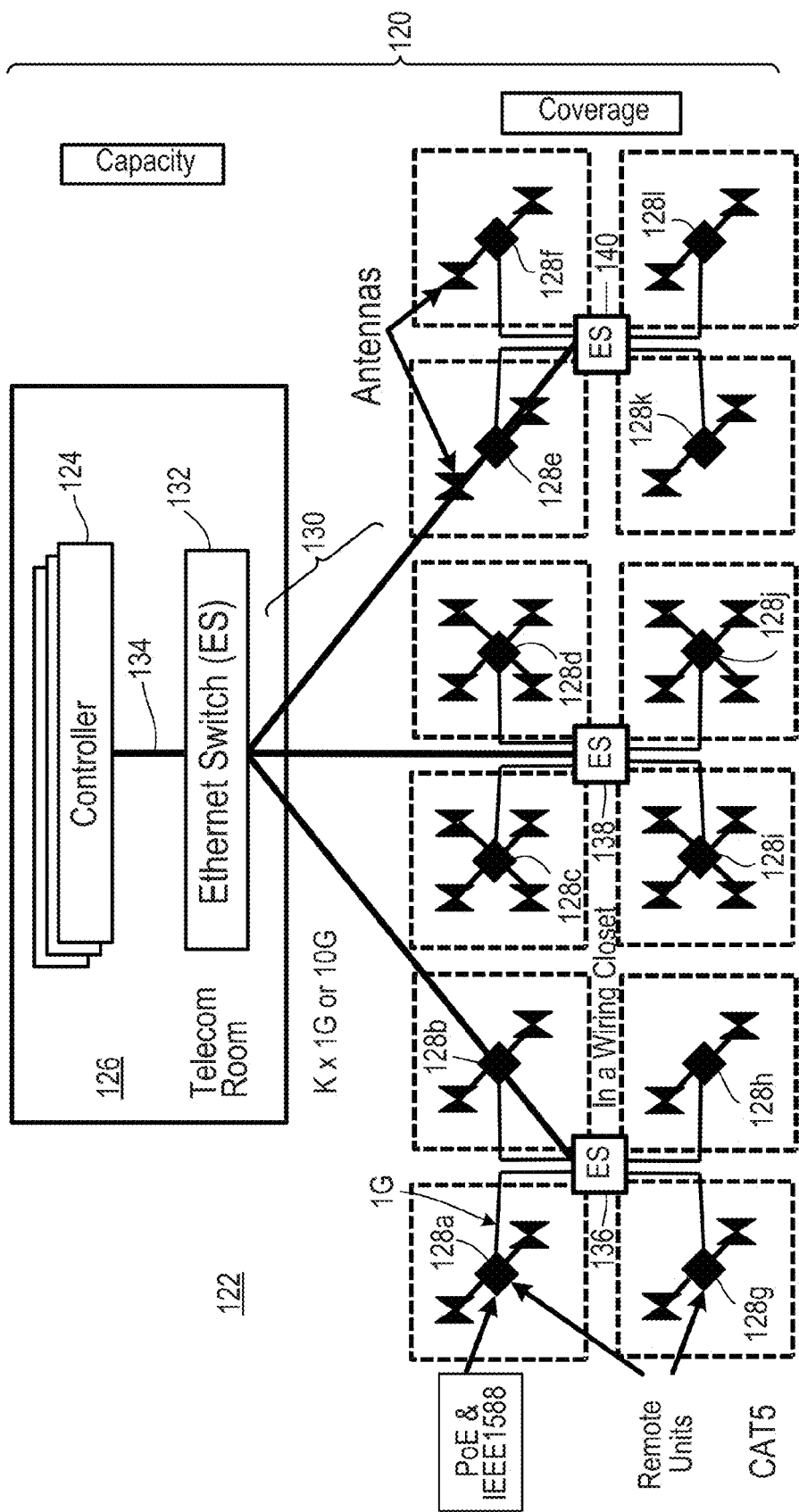
FIG. 3 is a block diagram showing the deployment of an example radio network on a site, such as a building or other area.

Referring to FIG. 3, an example radio network 120 is deployed at a site 122. One or more CUs 124 are installed in a room 126, e.g., a telecom room, locally at the site 122. The RUs 128a-128l are distributed around the site 122. In some implementations, some RUs are wall-mounted with integrated antennas, some RUs are hidden in one or more closets, and some RUs are installed above the ceiling tile and attach to a wall-mount antenna via an external antenna cable.

In some implementations, the RUs 128a-128l connect to the CUs 124 through a switched Ethernet network 130, which includes twisted pair and/or fiber optic cables, and one or more Ethernet switches 132. Components of the Ethernet network 130 may be standard off-the-shelf equipment available on the market. In some implementations, the Ethernet network 130 is dedicated to the radio network alone. In other implementations, radio network 120 shares Ethernet network 130 with other local area traffic at the site 122. For example, in an enterprise network such other traffic may include local traffic generated by various computers in the enterprise that may be connected to the same Ethernet switches. The radio network traffic can be segregated from other traffic by forming a separate Virtual Local Area Network (VLAN) and high-priority QoS (Quality of Service) can be assigned to the VLAN to control latency. In the example shown in FIG. 3, the CUs 124 are connected to a co-located Ethernet switch 132 (in the same room 126). In some implementations, the connection 134 uses a single 10 Gb/s Ethernet link running over fiber optic or Category 5/6 twisted pair cable, or multiple 1 Gb/s Ethernet links running over Category 5/6 twisted pair cables.

Those RUs (not shown in FIG. 3) that are near the telecom room 126 may directly connect to the Ethernet switch 132 in the telecom room 126. In some implementations, additional Ethernet switches 136, 138, 140 are placed between the Ethernet switch 132 and the RUs 128a-128l, e.g., in wiring closets near the RUs. Each wiring closet can contain more than one Ethernet switch (e.g., switch 136, 138, 140), and many Ethernet switches can be placed in several wiring closets or other rooms spread around the site. In some implementations, a single Category 5/6 twisted pair cable is used between a RU and its nearest Ethernet switch (e.g., between the RU 128a and the Ethernet switch 136). The Ethernet switches 136, 138, 140 may connect to the Ethernet switch 132 in the telecom room 126 via one or more 1 Gb/s or 10 Gb/s Ethernet links running over fiber optic or Category 6 twisted pair cables. In some implementations, multiple virtual RUs are integrated into a single physical device (not shown) to support multiple frequencies and possibly multiple mobile operators. For example, an RU may support multiple carriers for carrier aggregation, the carriers may belong to different frequency bands, and/or some frequency bands may be unlicensed, as in LTE-Unlicensed (LTE-U).

Downlink Transmit Antenna Mapping in a Cell

Figure 4A:
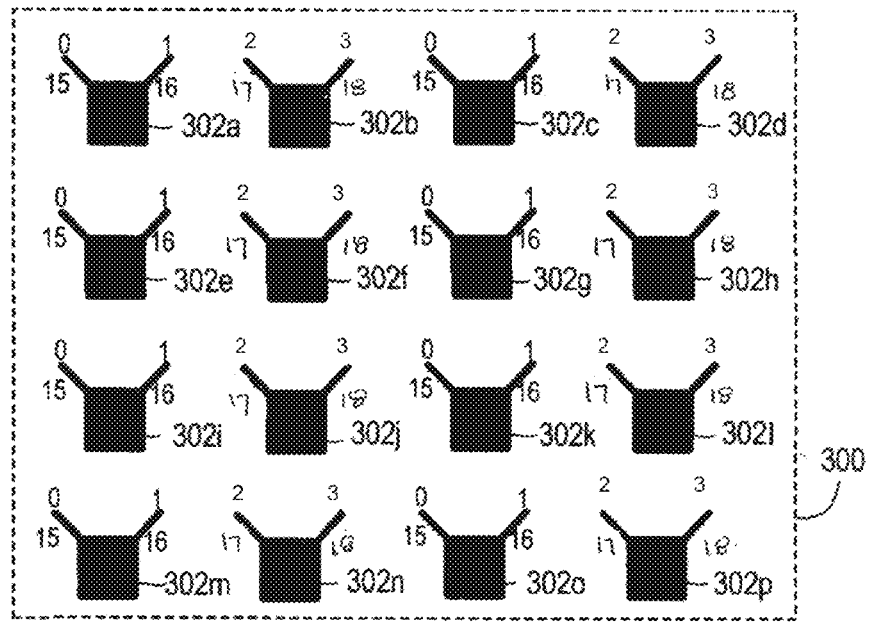
FIGS. 4A-4C are block diagrams of examples of antenna mapping schemes in a cell.

Referring to FIG. 4A, an example cell 300 (controlled by a single modem or a single CU) contains sixteen RUs 302a-302p. N (an integer, e.g., 1, 2, 4, etc.) physical antennas of each RU may be mapped to a same group of CS-RS or CSI-RS virtual antenna ports 0 . . . N-1, as defined in the LTE standard. In the example shown in FIG. 4A, N is two, and the mapping is done in the same manner as shown in FIG. 2C. In this example implementation, all RUs 302a-302p in the cell 300 transmit the same Cell-ID on the same LTE channel, and all antennas share the same Cell-ID and broadcast the same Cell-ID in the Primary and Secondary Synchronization Signals (PSS/SSS). When an RU serves multiple channels, different channels may be using the same or different Cell-IDs. When a UE is located in the cell 300, the UE receives the reference signals of the same logical antenna port, e.g., port 0, from different physical antennas of different RUs. To the UE, the RUs appear as part of a single cell on a single LTE channel.

Figure 4B:
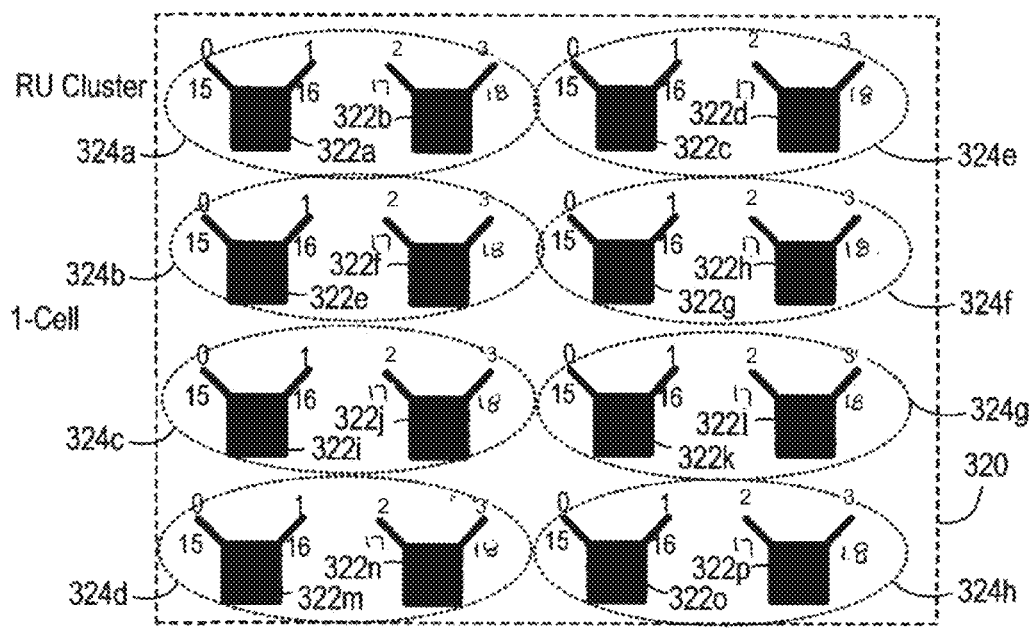

Alternatively, multiple RU clusters each containing one or more RUs may be formed within a single cell. The antennas in the cluster may be assigned to different CS-RS or CSI-RS virtual antenna ports, but may share the same Cell-ID. For example, as shown in FIG. 4B, a cell 320 contains 16 RUs 322a-322p each having two antennas and eight clusters 324a-324h each containing two RUs. Within each cluster 324a-324h, the four physical antennas of the two neighboring RUs are assigned to four different CS-RS virtual antenna ports 0, 1, 2 and 3 and/or to four different CSI-RS virtual antenna ports 15 through 18. As a result, a cluster having a total of N (N is four in FIG. 4B) physical antennas appears to the user equipment as a single cell with N transmit antenna ports.

Compared to the cell configuration shown in FIG. 4A, the number of antenna ports seen by the user equipment is doubled in FIG. 4B. The configuration of FIG. 4B can, in some cases, improve the performance of the UE, especially when the UE is near the coverage boundaries of two or more neighboring RUs. Assuming that the UE has two antennas for receiving signals, under Release 8, the UE can communicate with the radio network through 4×2 single-user MIMO (multiple-input multiple-output). In systems compatible with Releases 10-12 of the LTE standard, up to four RUs with two transmit antennas each can be used to form an eight-antenna cluster, and then the UE can implement 8×2 single-user MIMO. The same UE within a radio network having the configuration shown in FIG. 4A can communicate through 2×2 single-user MIMO. Even higher order MIMO communications, e.g., 4×4, 8×8, may be implemented in some cases for UEs with four or eight receive antennas.

Increasing the number of physical transmit antennas involved in MIMO communications, e.g., using the configuration of FIG. 4B, may not substantially increase processing complexity, except (in some examples) when the number of layers in spatial multiplexing increases, e.g., from 2 (FIG. 4A) to 4 (FIG. 4B). Although clusters of two RUs are shown and discussed, as explained above, a cluster can include other numbers of RUs, and cell 320 can include clusters having different sizes.

In some implementations, a wrap-around structure is used by the CU in assigning the physical antennas to logical (or virtual) antenna ports, such that anywhere within the coverage of the cell 320, a UE can receive from as many logical antenna ports as possible. This wrap-around structure can allow the single-user closed-loop MIMO to operate inside the cell 320 seamlessly over a large coverage area.

Described below are examples of how CSI-RS (Channel State Information Reference Signal) can be used in the example systems described herein. In LTE, CSI-RS is a "cell-specific" pseudo-random reference signal transmitted from 1, 2, 4 or 8 virtual antenna ports (or simply antenna ports) on specific REs (resource elements) and subframes. In some implementations, for 2, 4 or 8 antenna ports, a CSI-RS uses 2, 4 or 8 REs (resources) per RB (resource block), respectively, and is transmitted in every RB across the entire transmission band periodically once every P subframes. The CSI-RS period P can range from 5 to 80 subframes in some examples. The mapping between CSI-RS virtual antenna ports and physical antennas can be one-to-one or one-to-many.

In some examples, CSI-RS is used by the UE only for reporting CSI. Multiple CSI-RS may co-exist in a single cell or even the same RU. In some implementations, each CSI-RS is defined by a) CSI-RS identity, b) a number of antenna ports, c) a CSI-RS configuration index, which indicates the position of the CSI-RS resources on a resource grid, and d) a subframe period and a relative offset. Different CSI-RS in the same cell may use different numbers of antenna ports, different periods, different CSI-RS configuration indices, and different mappings between antenna ports and physical antennas. As in CS-RS, the UE will assume that all CSI-RS antenna ports are co-located. This means that in a CSI-RS system with more than two antenna ports or, more generally, when the CSI-RS antenna ports are not all mapped to physical antennas of the same RU, the UE will not take into account differences in average path loss or Doppler spread between antenna ports when reporting CSI.

In some implementations, CSI-RS (Channel State Information Reference Signal) is not typically (e.g., never) advertised by the eNodeB. Instead, in such implementations, active UEs are individually configured, during connection set-up, with one or more CSI-RS to monitor. In some implementations, different UEs may monitor the same or different CSI-RS. These different CSI-RS may have different number of antenna ports, different subframe periods, or offsets, etc. A single physical antenna may transmit multiple distinct CSI-RS, although such CSI-RS may need to be correctly configured to prevent interference in some cases.

In some implementations, simulcasting of CSI-RS, as implemented in the systems described herein, uses two antenna ports that are pairwise mapped to physical antennas on RUs, as shown in FIG. 4A. In such a two-antenna port CSI-RS, referred to herein as CSI_2, the two CSI-RS antenna ports 15 and 16 are mapped to physical antennas on RUs. In this example, each RU will be transmitting the exact same two-antenna port CSI-RS in a simulcast fashion. In another four-antenna port CSI-RS, referred to herein as CSI_4, the four antenna ports {15, 16} and {17, 18} are mapped to physical antennas on pairs of RPs in an alternating fashion, as shown in FIG. 4B. In this example, every pair of RUs will be transmitting the same CSI-RS from four physical antennas repeated across the site in a simulcast fashion, but the transmissions from different antenna ports are not all co-located. Differences in average path gain, Doppler spread, etc. between different antenna ports {15, 16} and {17, 18} will not be accounted for by the UE. In distributed SU-MIMO (Single User Multiple-Input and Multiple-Output), gain imbalance can be compensated in the CU and/or the UE receiver. Gain compensation in the CU in the example systems described herein can be based on average path loss measurements on the uplink. Similarly, a two-dimensional pattern can be created for an eight-antenna port resource, referred to herein as CSI_8.

Figure 30:
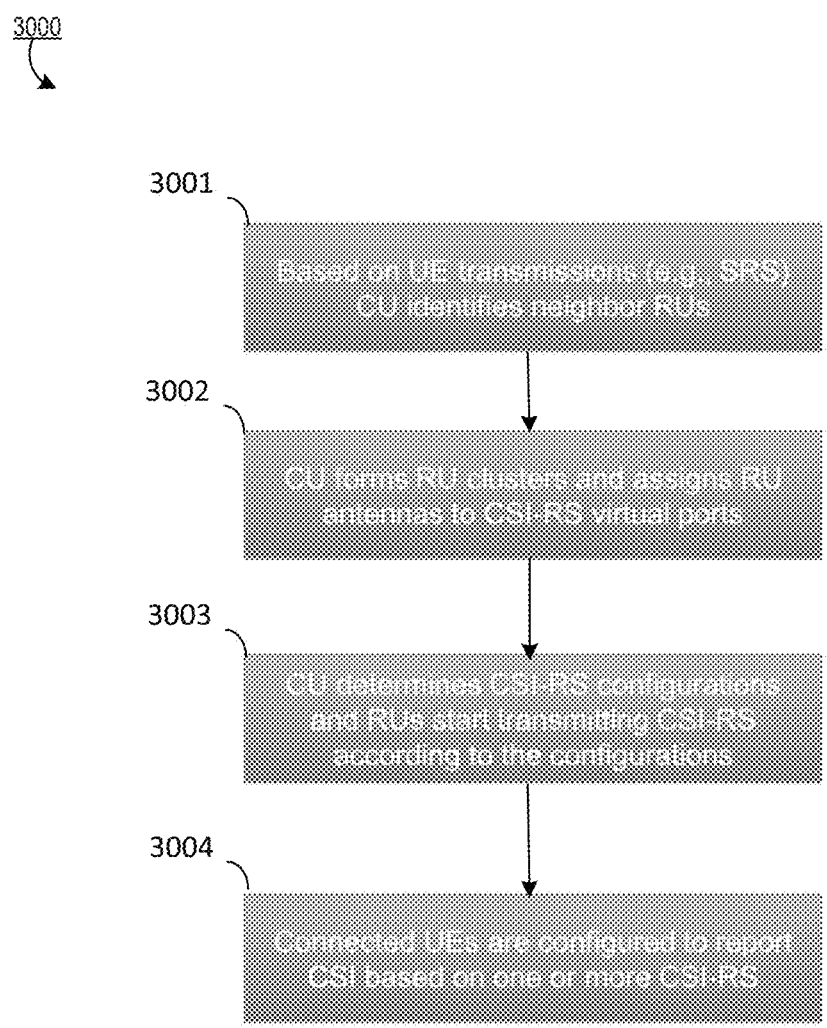
FIG. 30 is a flowchart showing an example process for implementing automatic CSI-RS configuration.

In multi-RP CSI-RS configurations where different RPs transmit different CSI-RS, example processes of assigning RUs or RU physical antennas to CSI-RS resources can be performed either manually or based on measurements of the uplink UE transmissions, for example SRS transmissions, at the RUs. The CU can use these UL measurements to determine which RUs are neighbor RUs (in the RU topology) and for example assign these RUs to the same CSI-RS cluster. Alternatively, in some examples, the assignment can be made based on radio environment monitoring provided by the RUs. REMs (Radio Access Maps or Radio Environment Maps) allow RUs to measure path gains between RUs, and the resulting information can be used in assigning RUs or RU physical antennas to CSI-RS virtual antenna ports. A flow chart showing an example process 3000 for automatic CSI-RS configuration is illustrated in FIG. 30. According to process 3000, a CU identifies (3001) one or more neighboring RUs based on user equipment (UE) transmissions, such as LTE SRS. The CU forms (3002) clusters of RUs, and assigns RU antennas in the clusters to CSI-RS virtual ports. The CU also determines (3003) CSI-RS configurations for all RUs taking into account UE transmissions on the uplinks, after which RUs begin transmitting according to the defined configurations. The UEs are configured (3004) to report CSI based on one or more of the CSI-RS.

In the examples above, there is a single CSI-RS, with 2, 4 or 8 antenna ports, which (in this example) correspond to physical antennas on 1, 2 or 4 RUs, reused across the entire site in a simulcast fashion. In some implementations, once a UE is configured for one of these CSI-RS, there should not be a need to reconfigure the UE as it roams across a site.

Figure 31:
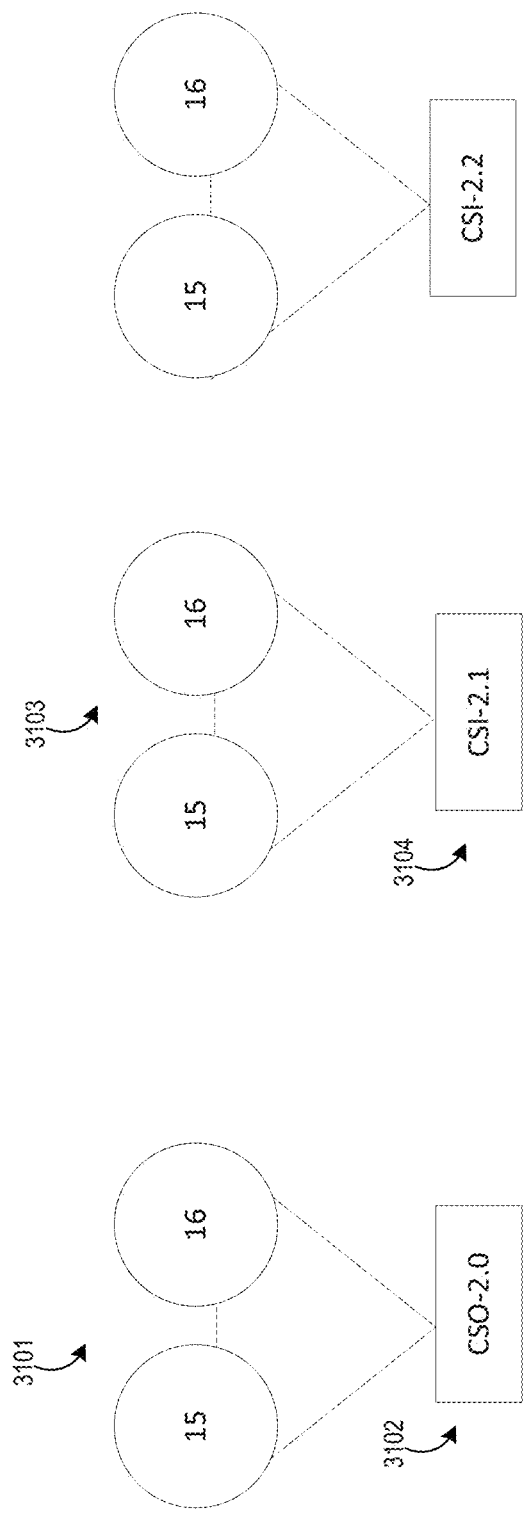
FIG. 31 is a block diagram showing an example of a clustered CSI-RS allocation.

In TM10 (Transmission Mode 10) of Release 11 of the LTE standard, a UE can report multiple CSI. In the example systems described herein, the CSI configurations described below are designed to take advantage of this capability. Consider a clustered CSI-RS allocation as illustrated in the example of FIG. 31. In this example, different RU clusters 15-16 are transmitting different CSI-RS. Specifically, the left-most 2 RUs 3101 are assigned to the 2-antenna CSI-RS, CSI-2.0 3102, the next (middle) 2 RUs 3103 are assigned to 2-antenna port CSI-RS 2.1, 3104, and so forth. In this example, all antenna ports in a given CSI-RS are co-located. In this CSI configuration, when the UE crosses a certain cluster boundary, a CSI reconfiguration becomes necessary.

In a clustered configurations, in some implementations, in order to avoid interference between CSI-RS and PDSCH, zero-power CSI-RS may be transmitted on REs that correspond to a neighbor cluster's CSI-RS. It also may be necessary, in some cases, to configure the UE with these zero-power CSI-RS. This informs the UEs of the positions of REs where they should not expect PDSCH. Such zero CSI configurations may not be needed for CSI configurations transmitted by distant CSI clusters.

Open Loop Power Control in a Single Cell with Multiple RUs

In the LTE standard, a UE estimates the UL path loss based on the DL path loss. This is known as Open Loop Power Control (OLPC) and is used to set the initial transmit power of the UE in random access for connection establishment. The DL path loss is estimated from the measured RSRP (Received Signal Reference Power) and the known CS-RS transmit power which is advertised by the eNodeB. In some examples, it is sometimes necessary to transmit CS-RS at different power levels from different RUs. Since eNodeB advertises only one value for CS-RS transmit power, and since the UE has no ability to distinguish CS-RS transmissions from different RUs, an alternate method may be used for more accurate open loop power control. In future versions of the LTE standard this can be achieved using a flexible signal such as CSI-RS, where different RUs or at least different clusters of RUs can transmit a uniquely distinguishable CSI-RS reference signal. In order to prevent interference between CSI-RS and PDSCH transmissions, zero-power CSI-RS transmissions may also be used in neighboring RUs or RU clusters. The transmit power level and configuration of each CSI-RS can then be advertised. Additional power offsets can be advertised to account for possible uplink combining. The UE will measure the received power level for all advertised CSI-RS resources, select the strongest CSI-RS or the strongest few CSI-RS and determine its own UL transmit power level for PRACH accordingly.

Downlink Simulcast and Coordinated Transmission

Referring again to FIGS. 4A and 4B, in this example, all antennas assigned to the same logical (or virtual) antenna port transmit the same reference signals (CS-RS or CSI-RS) in a time-synchronized manner. In some examples, the assignment can reduce the effects of shadow fading through macro diversity. The assignment can also present a multipath channel to each UE (not shown). A UE may report a single CSI feedback (including CQI (channel quality indicator) and PMI/RI (pre-coding matrix indicator/rank indicator)) based on the CS-RS or CSI-RS reference signals it receives from all transmitting antenna ports in the cell. When physical antennas of different RUs are transmitting the same reference signal, in some cases the UE may experience richer scattering and a more MIMO-friendly Rayleigh-like channel without significant interference from other transmit antennas in the same cell. Furthermore, the UE only sees one physical cell, and there is no need for any handoff when the UE is in the coverage area of multiple RUs that belong to the same physical cell.

A single broadcast channel PBCH (physical broadcast channel) is used in example cell 300 or example cell 320. The cells 300, 320 also implement a single downlink control region for transmitting signals on PDCCH (physical downlink control channel), PHICH (physical hybrid-ARQ (automatic repeat request) indicator channel) and PCFICH (physical control format indicator channel). Other common logical channels, such as the paging channel PCCH (paging control channel) that are transmitted over PDSCH (physical downlink shared channel) may also be shared.

As discussed previously, in an example, all physical antennas that are assigned to the same logical or virtual antenna ports, such as the Release 8 CS-RS logical antenna ports and the Release 10 CSI-RS logical antenna ports, transmit the same control signals and reference signals. In the example shown in FIG. 4B, all PDCCH/PHICH/PCFICH transmissions use 4-antenna TX (transmit) diversity and all transmissions from those antennas assigned to the same logical antenna port are identical. A UE within the cell 320 perceives transmissions from those antennas assigned to the same antenna port as if the transmissions are delivered from a single antenna through a multipath channel.

Figure 4C:
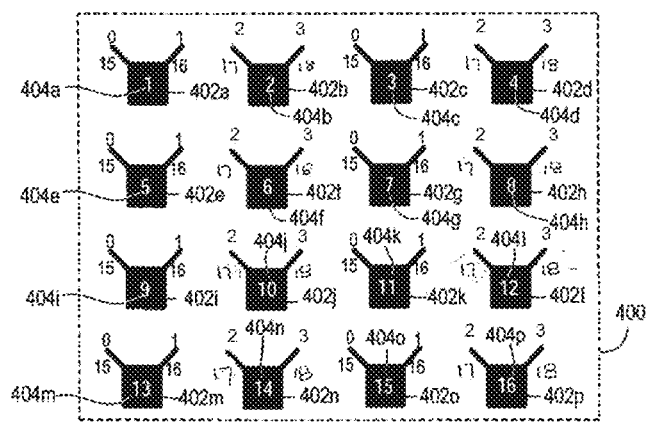

Furthermore, in some implementations, capabilities in Release 11 can be used to improve downlink MIMO operation inside a large cell, such as cells 300, 320, that has many RUs. In Release 11, multiple non-zero CSI-RS resources can be used inside a single cell. As an example, referring to FIG. 4C, each RU 402a-402p (or clusters of RUs) of a cell 400 is assigned to a different CSI-RS resource with a distinct CSI scrambling ID 404a-404p. Each RU (or RU cluster) with the distinct CSI scrambling ID operates as if it were a virtual cell, even though they share the same physical Cell-ID with other RUs in the same cell. The multiple CSI-RS resources (and scrambling IDs) in the cell 400 are monitored by the UE. In some implementations, the UE can be configured by the CU (not shown, e.g., the CU 22, 24 of FIG. 1) of the radio network to perform the monitoring of multiple CSI-RS resources.

A UE (not shown) in the cell 400 sends multiple CSI reports to the CU of the radio network for multiple RUs whose CSI-RS transmissions the UE monitors. From each CSI report, the CU obtains a CQI for the respective RU(s) and uses the CQI for determining signal strength from that RU. The CU can use these multiple CQI reports along with multiple PMI/RI (Pre-coding Matrix Indicator/Rank Indicator) reports received from the UE to determine precoder coefficients. Furthermore, Release 11 supports enhanced CQI reporting based on accurate interference measurements by the UE. Release 11 also includes an E-PDCCH (enhanced physical downlink control channel), which can be used to increase the control channel capacity in the cell 400. Features of Release 11, such as those described above, may be used to enhance the functionality of the systems described herein.

In some implementations where the radio network supports multiple cells, downlink transmissions in different cells can be coordinated to reduce interference. Coordination may be achieved using techniques such as Hard and Soft Frequency Reuse (HFR/SFR) or Release 11 Coordinated Multipoint (CoMP), which are described below LTE Unlicensed In some implementations, carrier aggregation across licensed and unlicensed frequency bands (or, simply, "bands") can be used. An example of such a system is LTE-Unlicensed (LTE-U). In LTE-U, there is a primary carrier that operates on an operator's licensed band and one or more secondary carriers that operate over unlicensed band, such as the 5 GHz ISM band. In some implementations, the primary carrier is used to handle the UEs mobility and all radio resource management for the UE. In some implementations, each RU simultaneously supports both licensed and unlicensed carriers. In some implementations, LTE-U is implemented only in the downlink. In some implementations, multiple RUs may transmit the same Physical Cell-ID on the same primary carrier and present a single cell to the UE on the primary carrier, thereby avoiding handovers. But, the same RUs may also operate on one or more additional secondary carriers on the unlicensed bands. RUs that operate on additional secondary carriers may transmit different Physical Cell-IDs on these secondary carriers. In this case, the UEs can be configured to send measurement reports based on RSRP and RSRQ (Reference Signal Received Quality) measurements on these secondary carriers. Such measurement reports can be used by the controller in coordinated scheduling. In some implementations, a single controller can manage both licensed and unlicensed carriers. Different functional splits can be used on the licensed and unlicensed carriers. For example, on the uplink, all Layer 1 processing can be performed in the RUs on the unlicensed band and/or at least some Layer 1 processing can be performed in the CU. On the downlink (DL), RUs may perform some or all of the Layer 1 processing.

Uplink Diversity Reception

The uplink transmissions by a UE that is being served by a cell with multiple remote units may be received by all the RX (receive) antennas in these RUs. When the UE is near the coverage boundaries of two or more RUs, its transmissions may be received by RX (receive) antennas of these RUs. In this situation, the uplink performance can be improved by performing diversity combining (e.g., Maximal Ratio Combining (MRC), Interference Rejection Combining (IRC) or Successive Interference Cancellation (SIC) in the controller) across signals received by multiple RUs. By having multiple RUs send received IQ data to the controller, multi-antenna/multi-RU combining can be achieved.

When there are two or more cells in the radio network, uplink transmissions of a UE that is being served by a first cell may be received by the RX antennas of one or more RUs that belong to other cells. In this situation, uplink performance can also be improved by performing diversity combining (e.g., MRC, IRC or SIC) across signals received by multiple RUs, including the RUs that belong to different cells.

There may be different options for implementing the uplink combining function described above. For example, the uplink combining can be performed entirely in the CU. In this example, the RUs forward, to the CU, at least some compressed IQ data, and the CU performs the combining operation(s) (e.g., executes instructions to perform the combining) Alternatively, the RUs may fully, or partially, decode the signals received via their own RX (receive) antennas, and send the decoded data and/or certain soft decision metrics (e.g., quality metrics) to the CU, where the final combining can be performed.

Virtual Cell Splitting

The capacity in the radio network can be increased by a cell splitting processes. In an example process, RUs in a single cell are split between two cells, increasing the capacity at the site. The two cells can deliver up to twice the capacity because two UEs can be served in two different cells on the same time-frequency resource.

Alternatively, the capacity of a single cell can be increased by using virtual cell splitting. The cells each containing multiple RUs as discussed above can be virtually split, by allowing multiple UEs to transmit simultaneously using the same time-frequency resources, using either multi-user MIMO, which is an extension of single-user MIMO to multiple UEs supported in the LTE standard, or RF isolation. In contrast to real cell splitting, in some implementations, virtual cell splitting does not impact the reference signals or common control channels. Virtual cell splitting may increase cell capacity by allowing multiple UEs to transmit or receive data using the same time frequency resources.

Downlink Virtual Cell Splitting

Multi-User MIMO

In some examples, virtual cell splitting is implemented with multi-user MIMO, which is used to send data to multiple UEs on the same PDSCH time-frequency resource. The multiple UEs can be served on the same time-frequency resource even when these UEs receive strong RF signals from the same antennas.

In multi-user MIMO, a unique set of precoder weights is applied to modulation symbols destined to each UE to prevent interference between co-scheduled UEs. For example, when each UE has a single antenna, individually generalized beams are formed for each UE. When each UE has multiple antennas, the CU and the RUs may provide spatial multiplexing (e.g., sending multiple layers of modulation symbols) to each UE, in addition to serving the multiple UEs on the same time-frequency resource.

Multi-user MIMO can be used with the antenna mapping schemes shown in FIGS. 4A and 4B. For example, in the antenna mapping scheme of FIG. 4A, two UEs can be served on the same time-frequency resource by one or more RUs. The CU for the cell 300 forms two beams in directions of the strongest RF paths for the two UEs, without causing significant interference between the two UEs.

In Release 8, multi-user MIMO is supported in downlink transmission mode 5. Each UE having a single antenna reports to the CU a 2×1 precoding vector selected from a 4-entry precoding codebook and an associated CQI, which is based on single-user beam forming using the selected precoding vector. When the precoding vectors selected by two UEs are orthogonal to each other, the CU may schedule the two UEs on the same time-frequency resource using half of the available transmit energy for each UE.

For two UEs that have no inter-user interference cancellation capabilities, the multi-user MIMO with the antenna mapping technique of FIG. 4A may not introduce substantial interference when each UE receives downlink signals from both antennas of a RU at about the same strength, and when the selected precoding vectors of the two UEs are orthogonal to each other.

Multi-user MIMO can also be implemented with advanced UEs that are capable of using knowledge about the modulation structure of interfering signals from co-scheduled UEs to reduce interference. In some implementations, a UE with two or more antennas can remove part of the interference using spatial filtering.

In Transmission Mode ("TM") 8 or 9 of Release 9 or 10, multi-user MIMO can be implemented using DM-RS (demodulation reference signal), which may allow the CU to use any appropriate precoder without being limited to those precoders that are defined in the standard in so-called codebooks. The UE reports the CSI to the CU implicitly by selecting a precoder from a predetermined codebook along with a Channel Quality Indication (CQI). In some implementations, the UE determines the CSI using the CSI-RS reference signal, which can support up to 8 antenna ports. In one example, the same CSI-RS signal is transmitted from all physical antennas of the RUs that are assigned to the same CSI-RS logical antenna port and the UE reports only one CSI (e.g., CQI/PMI/RI) for each (physical) cell. In Transmission Mode 9, the CU can schedule up to 4 UEs on the same time-frequency resource with up to 2 layers per UE and up to 4 layers per RB (Resource Block). The CU transmits DM-RS (Demodulation Reference Signal) on 12 REs (Resource Elements) per RB and the 12 REs are used for all UEs that are co-scheduled on the same resource. The transmission based on DM-RS can provide flexibility and simplification in scheduling.

In some implementations, when the CU knows the channel coefficients, the CU chooses the precoding vectors for the UEs to provide each UE with the maximum SINR (Signal-to-Interference and Noise Ratio) without the UE experiencing substantial interference. As discussed previously, interference suppression capabilities provided by the UEs can further facilitate reliable multi-user MIMO.

Release 11 supports using multiple CSI-RS signals inside a single physical cell and allows a UE to send more than one CQI/PMI/RI report per physical cell. This can improve the performance of the multi-user MIMO. For example, in Release 11, each RU (or each group of RUs) may be assigned to a CSI-RS reference signal that is different from those assigned to the other RUs in the cell, or at least in some part of the cell. Each UE is requested to report multiple CSI individually for multiple RUs in the cell. The CQI/PMI/RI information obtained from the multiple reports can be more accurate than information obtained from a single report. Based on the accurate information, the CU can determine with greater precision the precoding vectors in multi-user MIMO and reduce inter-user interference. In some implementations, the CU configures each UE with a selected set of CSI-RS, e.g., but not necessarily the entire set, of CSI-RS resources available in the cell so that the UE does not have to send CSI reports for all CSI-RS resources in the cell.

RF Isolation

Virtual cell splitting in a cell can also be achieved based on RF isolation among the UEs in the cell. Virtual cell splitting with RF isolation differs from multi-user MIMO based virtual cell splitting in that transmissions from an RU are not generated using a joint precoding operation on symbols representing data for multiple UEs. In some cases, the transmissions from an RU represent data of one UE. In some implementations, the transmission from an RU may represent data from multiple UEs, for example UE1, UE2 and UE3, but then such transmission is not generated using a joint precoding operation on symbols representing data from all the UEs, UE1, UE2 and UE3.

In some implementations, multiple UEs are served simultaneously on the same time-frequency resource via RUs or antennas whose coverage areas do not substantially overlap. For a first UE, instead of simulcasting the same PDSCH signal on all physical antennas that are assigned to the same virtual antenna port, only some RUs and physical antennas are allowed to transmit the signals to the first UE. Transmissions from other RUs and physical antennas to the first UE are purged. One or more of the RUs that are not transmitting to the first UE can instead transmit to a second UE on the same time-frequency resource. When the transmissions from the physical antennas of the RUs serving the first UE are received at a relatively (e.g., very) low level by the second UE, and likewise when the transmissions from the physical antennas of the RUs serving the second UE are received at a relatively (e.g., very) low level by the first UE, no significant interference occurs, even when the UEs do not have any interference suppression capabilities. This may be due to their spatial separation.

Figure 5A:
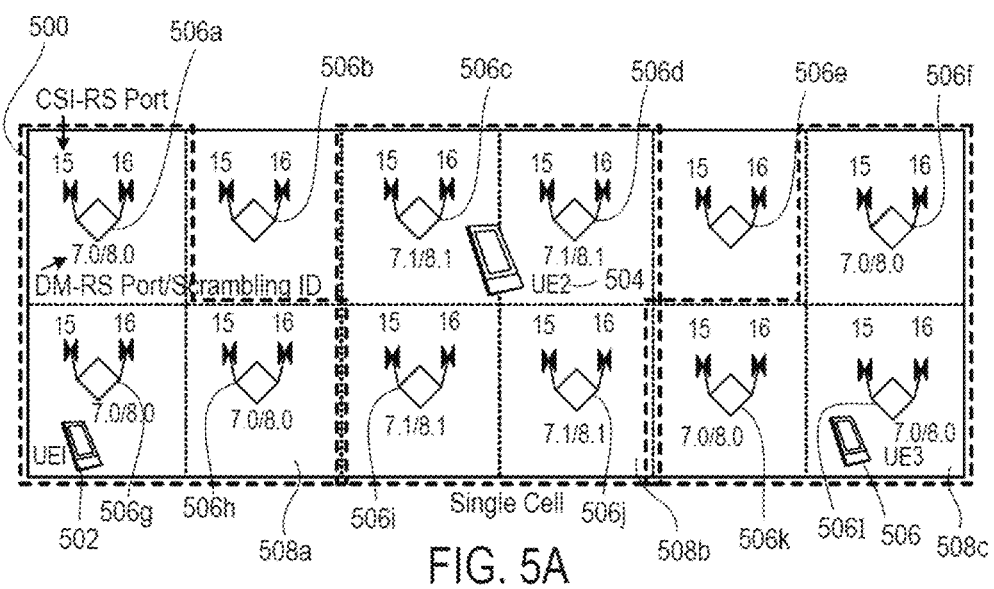
FIG. 5A is a block diagram showing an example of virtual splitting in a cell.

When UE is configured for a transmission mode that supports DM-RS reference signals, DM-RS are transmitted similarly to the PDSCH signals. For example, the DM-RS reference signals for the first UE may be transmitted only from the antennas of the RUs that are serving the first UE. In Release 10, multi-user MIMO can be used to send up to four layers to two or more UEs. In some implementations, additional operations may need to be implemented to reduce or avoid interference between UEs. In the example shown in FIG. 5A, two UEs 502, 506 at different locations in a single cell 500 are co-scheduled on the same time-frequency resource based on RF isolation with up to two layers per UE. The cell 500 includes 12 RUs 506a-506l, each having two physical antennas and transmitting CSI-RS on virtual antenna ports 15 and 16. To serve two UEs that are spatially far apart in a given subframe, the single cell 500 is virtually split to form three virtual cells 508a, 508b, 508c. The RUs 506a, 506b, 506g, 506h in the virtual cell 508a serve the user equipment 502. The RUs 506e, 506f, 506k, 506l in the virtual cell 508c serve the user equipment 506. The RUs 506c, 506d, 506i, 506j in the virtual cell 508b do not serve any UE in order to avoid causing interference to the UEs 502 and 506. The total number of layers co-scheduled in the single cell 500 is four. The virtual cells described above are not static like physical cells. The virtual cells can vary dynamically from one subframe to the next and across resource blocks. In some implementations, the dynamic variation applies only to the shared data channel PDSCH. For example, there may be no virtual cell splitting in one subframe, while in another subframe, two different virtual cell splitting may be applied in two different groups of resource blocks. In some implementations, a virtual cell may have a single RU without simulcasting. The virtual cells represent the ability of the system to serve multiple UEs in the same cell on the same time-frequency resource.

The RUs within the same virtual cell transmit the same DM-RS reference signal selected, e.g., from four available ports/scrambling index {7.0, 7.1, 8.0, 8.1}. The virtual cells that are located adjacent to each other (or close to each other without directly bordering each other), such as the virtual cells 508a, 508b and the virtual cells 508b, 508c, may use different DM-RS port numbers. Those virtual cells that are relatively far apart, e.g., the virtual cells 508a, 508c, can reuse the same DM-RS reference signal based on the RF isolation. In such implementations, signal transmissions between the UEs and the radio network are performed without significant interference between the virtual cells.

In some implementations, the CSI-RS configurations that take advantage of LTE Release 11 Transmission Mode 10 can be used. As described earlier, these CSI-RS configurations are designed to utilize multiple CSI reports from the UE.

In some implementations, the CU chooses a MCS (Modulation and Coding Scheme) for each co-scheduled UE based on the CQI values, determined by the UE from the CS-RS or CSI-RS signals, reported by the UE. The CS-RS or CSI-RS signals are transmitted continuously by all physical antennas in the physical cell, including some antennas that may, at times, not transmit on the shared data channel PDSCH. The same CS-RS or CSI-RS signals transmitted from the physical antennas that are near the UE, when received at sufficiently high strength, are seen by the UE as multiple transmission paths, or RF multipath. In some implementations, the UE can predict a higher (or lower) CQI based on the multipath than the actual CQI the UE will experience when receiving on PDSCH with less multipath. In such implementations, the HARQ (hybrid automatic repeat request) capability in the LTE standard can provide dynamic adaptability to reduce the effect caused by the mismatch between the predicted CQI and the actual CQI. In some implementations, when the actual channel conditions are worse than the conditions predicted by the CQI, the CU retransmits the data or signals with incremental redundancy to achieve the maximum data rate that the channel can support. In implementations that use Transmission Modes 9 or 10, the CSI-RS configurations can be chosen to facilitate UE measurement of interference, and in some modes, multiple CSI-RS configurations can be used for the UE to report CSI under different interference conditions. The real-time scheduler in the CU can use such reports in choosing a MCS taking into account other transmissions in other virtual cells on the same time-frequency resource.

Resource Block Reuse

Figure 21A:
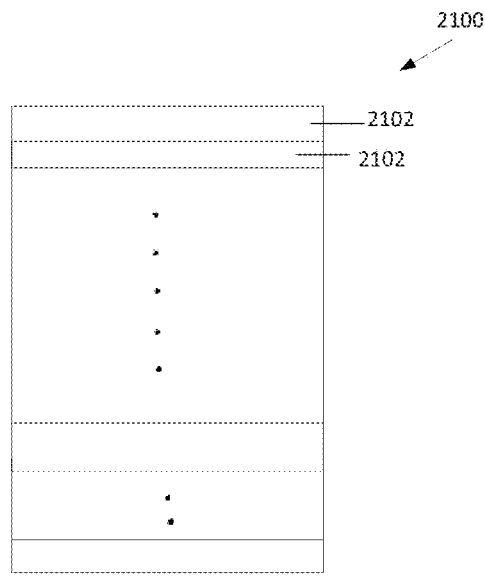
FIG. 21A is a schematic block diagram showing an example of a subframe.

In each cell, RUs transmit data, e.g., user data or control data, to different UEs at each transmission time interval (TTI), e.g., of 1 millisecond. An example time-frequency resource grid 2100 for LTE transmission is shown in FIG. 21A, where the vertical axis represents frequency and the horizontal axis represents time. A new resource grid is sent at each TTI of 1 millisecond. The discussion below uses 1 millisecond only as an example and can be generalized to any other TTIs. In some implementations, each resource block is transmitted, typically at a set of contiguous frequencies different from the frequencies of the other resource blocks. As a result, in some implementations, each resource block can serve one UE without interference from transmissions on the same resource block to other UEs. However, the capacity of the cell may be limited by the size of the resource grid 2100, which includes 50 resource blocks 2102 in 10 MHz LTE.

Figure 21B:
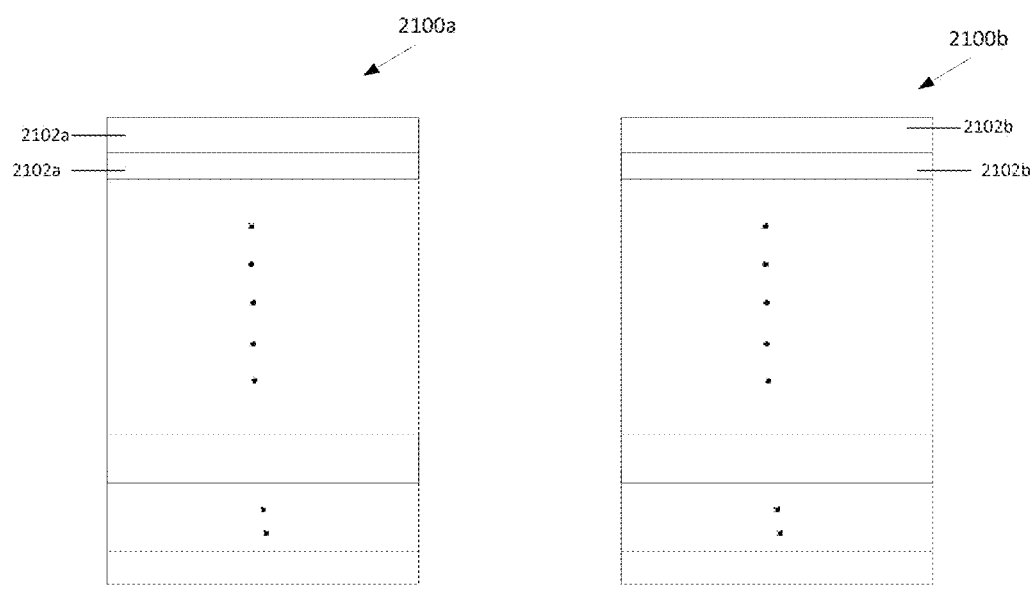
FIG. 21B is a schematic block diagram showing examples of subframes for two virtual cells.

As described above, the capacity of the cell can be increased by transmitting to multiple UEs on the same resource block. The different UEs served using the same resource block can be viewed as belonging to different virtual cells. As a result, at a given TTI, those UEs that need to receive data from the RUs of a cell on certain RBs are grouped into multiple virtual cells. In some implementations, the UEs in different virtual cells can be served on the same resource block, such as the resource block 2102 in resource grid 2100 of FIG. 21A, without significant interference between them. In the example shown in FIG. 21B, two UEs in different virtual cells use resource blocks 2102a and 2102b in two virtual replicas 2100a, 2100b of the same resource grid in the same TTI. In some implementations, each virtual cell at a resource block has one UE assigned to that resource block. The UEs in a physical cell can be grouped into more than two virtual cells in a resource block so that more than two UEs may share the same resource block. The use of the virtual cells, or equivalently reusing the same resource block for multiple UEs can increase a cell's capacity. The UEs in different virtual cells on the same resource block can be served with low interference between them and multiple UEs can be scheduled dynamically in different virtual cells on the same resource block in a scalable manner, e.g., two virtual cells, three virtual cells, and etc. Typically, in a cell, the number of UEs that need data transmission in a given TTI can be 50, 60, or more, e.g., 100 to 200.

In some implementations, for data transmission in each TTI, a scheduler (e.g., a real-time scheduler) in a controller of the cell is configured to (1) select UEs to be assigned to the same resource block. The selection and the assignment may be performed such that transmission of data to different UEs on the same frequency resource interferes with each other as little as possible. The scheduler is also configured to (2) select transmission strategies based on the assignment of the UEs. For example, the scheduler determines which RU(s) serve which UEs. Furthermore, the scheduler is configured to select the data rate for the data transmission to each scheduled UE. In other words, the scheduler determines the number of bits that can be sent to each UE in the resource blocks assigned to that UE. Generally in LTE, the data rate to a UE depends on the SINR the UE is experiencing.

A similar coordinated scheduling exists when a centralized scheduler (e.g., one or more computer programs running in one or more CUs) is scheduling users across multiple physical cells. The example processes described below can also be utilized when scheduling users across multiple physical cells in, at, or via a coordinated centralized scheduler.

UE Assignment

To perform task (1) above, at each TTI, the scheduler uses a signature vector for each active UE. In some implementations, all RUs in the cell are instructed to listen to the transmission of each active UE in the cell to determine uplink average path gains $p_{kj}$, where j represents the $j^{th}$ RU in the cell and k represents the k'th active UE. In the LTE standard, such uplink measurements can be based on SRS, PRACH or even other UL (uplink) transmissions such as PUCCH or PUSCH. In general, the path gain $p_{kj}$ between a UE and an RU on the uplink is substantially equal to the path gain between the same RU and the UE on the downlink. The signature vector of the k'th active UE can be expressed as $$p_k = (p_{k1}, p_{k2}, \ldots, p_{kJ})^T,$$

where J is the total number of RUs in the cell.

Given two UEs with signature vectors $p_k$ and $p_l$, the quality of pairwise reuse in which the two UEs are assigned to the same resource block, can be estimated based on total interference I seen by the two UEs:

$$I(p_k, p_l) = 1^T m(p_k, p_l),$$

where $1^T = (1, 1, \ldots, 1)$, and $m(p_k, p_l) = [\min(p_{k1}, p_{l1}), \min(p_{k2}, p_{l2}), \ldots, \min(p_{kJ}, p_{lJ})]$. As used herein, "reuse" includes, but is not limited to, two devices in a single cell utilizing the same resource (e.g., frequency) for communication within that cell. The "reusing" device may be the remote units (RUs), the user equipment (UEs) (e.g., a mobile device), or any other appropriate device.

Using the signature vectors of the active UEs, RF zones can be created within the cell. Each RF zone represents a physical zone in which UEs have similar signature vectors such that, if these UEs are served on the same resource block, the interference among these UEs will exceed a predetermined threshold. In some implementations, each active UE belongs to one and only one RF zone. UEs in different RF zones may be assigned to be served using the same resource block. The total number of RF zones to be created can be predetermined, e.g., based on predicted needs, or determined dynamically based on real-time needs. For example, there can be J times n RF zones for a cell, where n is a positive integer and J is the number of RUs. In some implementations, each RF zone has an area that is smaller than the total coverage provided by a single RU. For example, when a cell has 16 RUs, there can be 128 RF zones.

In some implementations, the RF zones of a cell are determined offline. The assignment of the active UEs to the predetermined RF zones can be performed in real time in a computationally efficient manner. For a predetermined number of RF zones, each zone is identified by a zone signature vector each identified by a single signature vector:

$$z_m = (z_{m1}, z_{m2}, \ldots, z_{mJ}),$$

where m represents the $m^{th}$ RF zone, and J is the total number of RUs in the cell. The signature vector of an RF zone can be mathematically represented as the centroid of all the signatures of all UEs that may belong to that RF zone. RF zones and their signature vectors depend on the number of RUs J in the cell. For a given value of J, the predetermined RF zones can be kept fixed (fixed RF zones). In some implementations, the RF zones can be modified (adaptive RF zones) during active use based on actual UE signature vectors encountered at a given deployment.

The active UEs are grouped into the different RF zones in real time based on one or more criteria. For example, a UE may be grouped into an RF zone that has the shortest Euclidean distance between the signature vector of the UE and the RF zone. In some implementations, a localization module in the controller keeps track of the RF zones for each RRC (Radio Resource Control)-connected UE. The UEs in the same RF zone have signature vectors that produce a relatively large interference metric (e.g., greater than a threshold) among the UEs and between each UE and the signature vector of the RF zone.

Figure 23:
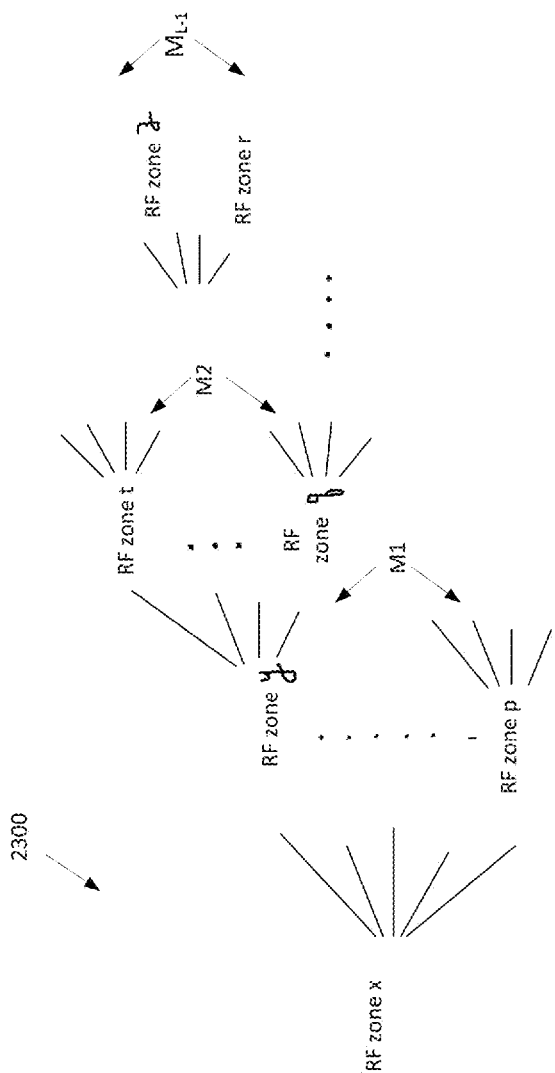
FIG. 23 shows an example of a map determined offline for RF zones.

The UEs in different RF zones may be assigned to the same resource block based on their respective RF zones' signature vectors. In other words, the UEs assigned to the same resource block are determined by grouping different RF zones. Each zone grouping may be associated with a corresponding reuse metric, such as the improvement in the transmission rate for example. In general, RF zones that are 'near' each other are not good candidates for reuse partnership. Based on the reuse metric, groups of RF zones that are good candidates for reuse can be determined offline. This zone grouping is performed for many levels of reuse. For example, for reuse level 2, an ordered list of all allowable pairings of zones is created, in descending order of reuse metric. Alternately, each pairing could also be tagged with a reuse metric in addition to the ordering. Similarly for reuse level 3, all allowable triplets of zones are computed and listed in descending order, with or without an associated reuse metric. Other methods of organizing the RF zone grouping table is also possible, such as hierarchical ordering. FIG. 23 shows an example of such zone grouping. The grouping table of FIG. 23 has a tree-like structure, which is traversed to identify UEs to communicate on the same frequency in a single cell without resulting in significant interference.

The decision to assign UEs to the same resource block can then be made based on the RF zone to which the UEs belong.

The location of the UE within the RF zone need not affect the UE's assignment to a resource block.

Figure 22:
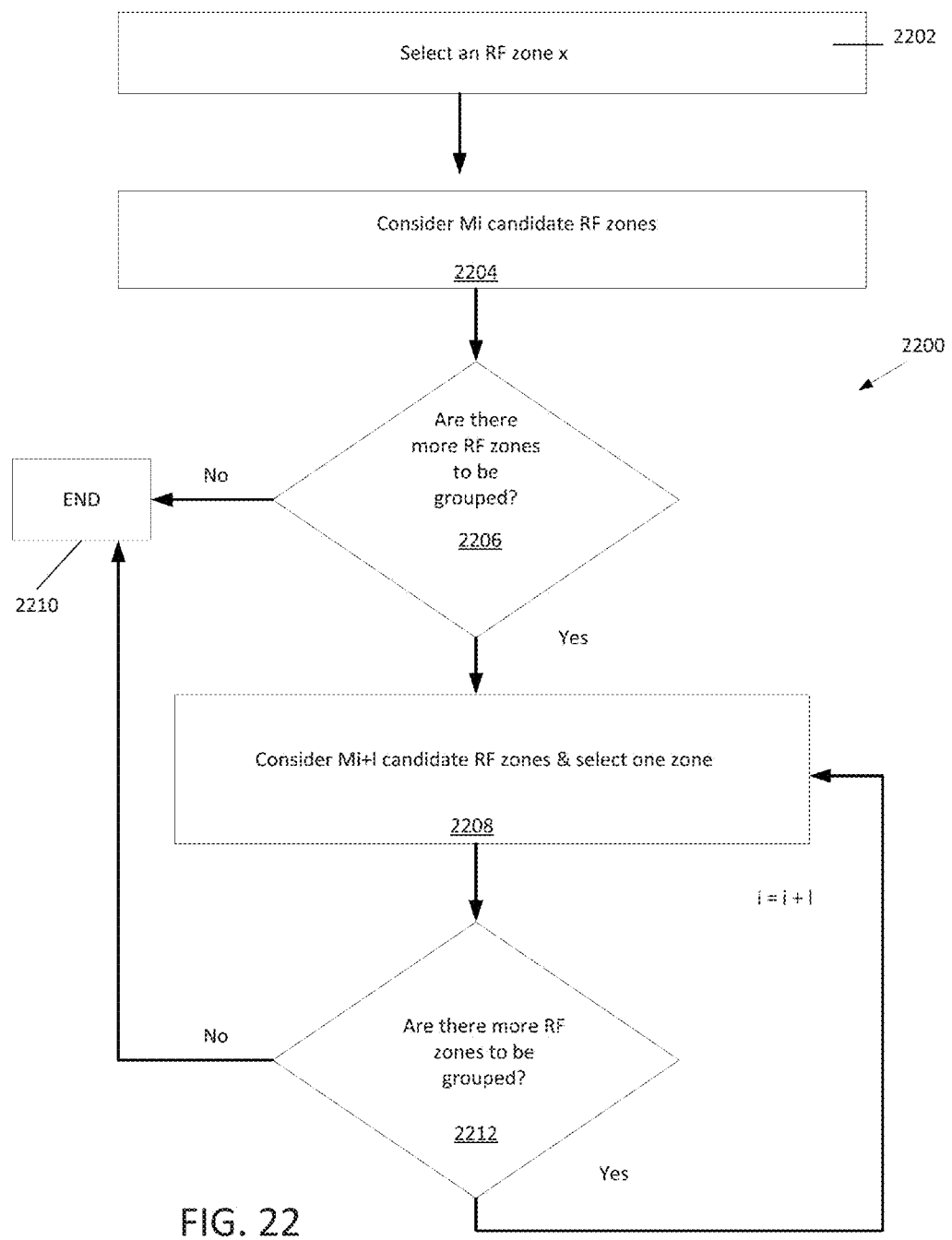
FIG. 22 is a flow diagram showing an example of a process for grouping predetermined RF zones offline.

An example process 2200 for grouping predetermined RF zones offline is shown in FIG. 22. Initially, an RF zone x is selected (2202). The RF zone x corresponds to a first RF zone. Next, $M_1$ number of candidate "pairable" RF zones are considered (2204) to be assigned to the same resource block. $M_1$ can be 1, 2, . . . , up to M−1, where M is the total number of RF zones. The best candidate RF zone with low (e.g., less than a specified) interference is first selected. Then additional RF zones with low interference to RF zone x are considered (2206). If no pairable RF zone is found, then the process 2200 ends (2210). If a pairable RF zone is found, additional $M_2$ candidate RF zones are considered for 3-way grouping (2208) and determination is made (2212) whether they can be grouped with all previously selected RF zones. If no, then the process 2200 ends (2210). If yes, then the process continues with the selection step 2208 for 4-way grouping, with the value of i increased by 1. In the above procedure, the process progresses one-step at a time, making final RF zone selections at each operation in the flowchart. Alternatively, the process may consider multiple hypotheses for RF zones at each operation, and make a final selection after examining all hypothesis over multiple operations.

In some implementations, the controller (or scheduler implemented by the controller or controllers) assigns UEs into different resource blocks in real time in each TTI. The UEs are assigned to resource blocks based on Quantized Signature Vectors (QSVs). For example, at the beginning of each TTI, the controller uses a quantized version of a signature vector $p_k=(p_{k1}, p_{k2}, \ldots, p_{kJ})^T$ for each connected UE k. The calculation of the signature vector is described above. In some implementations, the quantized signature vector $p_k$ can be determined based on a predetermined path gain threshold $p_{threshold}$, which is a positive number no greater than one.

For example, the controller quantizes the signature vector by setting all $p_{ki}$ that are less than $p_{threshold}$ times $p_{k\_max}$ to be zero and all $p_{ki}$ that are equal to or are greater than $p_{threshold}$ times $p_{k\_max}$ to be 1. In this example, $p_{k\_max}$ is the maximum path gain in the UE's path gain vector, typically the path gain to the closest RU.

In some implementations, a goal of assigning the UEs to resource blocks and serving certain UEs on the same resource blocks is to provide a good tradeoff between capacity and fairness and to improve uneven user experiences within the cell with a relatively low (e.g., minimal) reduction in capacity. Generally, a single one in the quantized signature vector with no other ones indicates a strong signal being received from the closest RU relative to the other RUs. A "1" indicates a preference for the UE or a UE need to receive its data (as opposed to another UE's interfering data) from the corresponding RU. Multiple ones in a signature vector may indicate that the UE receives relatively strong signals from corresponding multiple RUs and, therefore would prefer to receive its own data from these RUs rather than interfering data. Possibly, the UE is in between two RUs and prefers to receive signal from both RUs. A "0" in a signature vector indicates the UE receives a relatively weak signal from a corresponding RU, and therefore can tolerate receiving interfering data being sent to another UE from that RU.

In some implementations, two UEs can be assigned to the same resource block only if their quantized signature vectors are orthogonal to each other. Orthogonality may be determined by performing a logical "AND" operation between two signature vectors, with two vectors being orthogonal when each element of the result is a logical "0".

The choice of the threshold $p_{threshold}$ can determine what is considered to be a sufficiently strong signal to reserve a particular RU for a UE. If the threshold is chosen to be very high, quantized signature vectors will typically have only one "1" corresponding to the nearest RU. This means that two UEs' quantized signature vectors will be orthogonal except when the two UEs have the same RU as the RU with the highest path gain (e.g., same serving RU). This means that the scheduler will allow any two UEs to be scheduled on the same frequency as long as they have different serving RUs. This may lead to excess interference and low throughput for UEs located in between two RUs. If the threshold is chosen to be too low, then UEs will have many "1s" in their signature vectors and as a result very few UEs can be scheduled to transmit on the same resource block. This avoids interference between UEs, but results in a low capacity of the cell. A low threshold can be appropriate when the instantaneous demand is low. When the load is higher, a larger threshold may be preferred. In general, having a "1" in a quantized signature vector corresponding to an RU adds traffic load to that RU. Therefore, more quantized signature vectors are allowed to have 1s where the RUs are deemed to have low load, and fewer quantized signature vectors are allowed to have "1" where the RUs are deemed to have high load. The determination of "low" or "high" load at an RU can be based on resource block utilization at the RU in recent TTI. The threshold value used at each RP may then vary according to the recent load seen at a RP.

The controller can also determine demand based, e.g., on the amount of data waiting in buffers for transmission. The threshold can also be determined empirically based on other factors and other appropriate available channel information. For example, the UE may measure the downlink signal strength and quality based on receive CS-RS reference signal transmissions, and report the results of these measurements to the controller in a measurement report in the form of RSRP or RSRQ values. These RSRP and RSRQ values represent average signal strength seen by the UE from CS-RS transmissions in nearby physical cells. RSRP and RSRQ represents the aggregate signal strength and quality from all transmissions from RUs in the same physical cell. The controller can use this information in selecting the quantized signature vectors. UEs may also send instantaneous channel quality indication (CQI) to the controller, in some cases at a much faster rate. CQI measurements represent the instantaneous signal quality seen by the UE in CS-RS or CSI-RS transmissions received from the serving cell. In examples where multiple RUs belong to the same cell, the CQI report will correspond to the aggregate channel from all transmissions from RUs in the same cell.

In some implementations, the quantized signature vectors may be chosen based on some estimate of the average SINR of the UE. In some implementations, the quantized signature vectors may be determined based on an expected data rate of a user and how this rate changes as more "1s" are added to the quantized signature vector.

In some implementations, a quantized signature vector $p_{k-quan}$ only contains zeros and ones. As an example, assuming that one example cell contains 12 RUs and three active (or connected) UEs, three active UEs can have the following quantized signature vectors:

UE1: $p_1$=(110000000000);
UE2: $p_2$=(000011000100);
UE3: $p_3$=(011100000000).

In this example, $p_1$ and $p_2$ are orthogonal (since logically "AND" ing the two vectors results in all 0's). Accordingly, UE1 and UE2 can be assigned to the same resource block. $p_3$ is orthogonal to $p_2$ but not to $p_1$. Accordingly, UE2 and UE3 can be assigned to the same resource block. However, UE1 and UE3 are not orthogonal and therefore cannot be assigned to the same resource block in this example implementation. In some implementations, the threshold $p_{threshold}$ is determined based on the required SINR (signal-to-interference-plus-noise ratio) for transmitting data to the UE. Accordingly, in such implementations, all RUs that correspond to a one in the quantized signature vector have to transmit that UE's data in order for the UE to receive the data at the required SINR. In other implementations, $p_{threshold}$ may vary across RUs and may depend on the recent load of the RU.

This example with three UEs can be extended into any appropriate number of UEs in a cell. Following quantization of the signature vector for each active UE, the UEs are assigned to resource blocks based on the orthogonality of groups of active UEs. Effectively, an "AND" Boolean operator is applied to the group of active UEs. If the result of the operation is all zero, then the UEs can share the same resource block. If the result of the operation contains any ones, then the UEs are served on different resource blocks. In some implementations, the "AND" operator is applied pairwise among the signatures of all of the UEs. If each of the pairwise-ANDs is 0, then all UEs can share a resource block. If not, at least one UE must use a different resource block. In order to allow the same UE to be assigned to different resource blocks and grouped with a different set of UEs in each resource block, the controller can represent a UE in multiple instances depending on its data demand. Each instance corresponds to a single resource block or a resource block group. In some implementations, a resource block group includes an integer number of resource blocks. In some implementations, a resource block group will include three resource blocks. The same UE can be grouped with different sets of UEs on different resource blocks or resource block groups. In some implementations, the processes described herein only allow UEs with orthogonal quantized signature vectors to share the same resource block or resource block group.

In some examples, Quantized Signature Vectors (QSVs) can take-on non-binary values (values other than 0 and 1). Non-binary values can be used in QSVs to represent a blanking need of a UE from an RU. In some implementations, a blanking need is a need for a UE operating in a transmission mode based on user-specific reference signals to receive no signal from a UE. Non-binary values can also be used in QSVs to allow multi-user transmission to more than 1 UE from an RU. The scheduler in the controller may decide which users can be scheduled on the same resource based on processes (e.g., mathematical calculations) other than testing for orthogonality. For example, the scheduler can determine the eligibility of two UEs for sharing the same resource block by comparing the sum of the QSVs and testing whether any of the components of the sum QSV exceed a certain threshold.

In some implementations, the QSVs can be regarded as vectors having numerical values that represent the transmission (on the downlink) or reception (on the uplink) need of a UE from an RU. For example, a value of "1" may indicate UEs need to receive its own data from an RU. Alternatively, a value of "0" may indicate that the UE can receive interference from that RU and, therefore, that RU can transmit to another UE. Other values, for example, 0.001, may be chosen to indicate that the UE needs blanked transmission or multi-user transmission from the corresponding RU. In blanked transmission, the RU does not transmit any signal. In multi-user transmission, the RU transmits to two or more UEs at the same time, often at a lower power level, as described below. When a value such as 0.001 is used, the real-time scheduler can assign two users to the same resource block when the sum of their QSVs has no component greater than 1. Specifically, two UEs can be assigned to the same resource block when they both need blanked transmission from an RU.

RU Assignment

In addition to assigning active UEs to resource blocks for data transmission in each TTI, the controller (or the real-time scheduler) may also need to determine which RU of the cell transmits to which active UE on each resource block in the TTI. Without reuse, on each resource block, all RUs that belong to the same physical cell transmit to one UE and the effective channel the UE experiences is a sum of the individual channels from each of the RUs in the cell and the receiving antenna(s) of the UE. Accordingly, when the UE uses cell-specific reference signals transmitted by all RUs to estimate the transmission channel, the estimated channel is the same as the actual channel. However, when there is reuse and two or more UEs are being served on the same resource block, the effective channel the UE experiences can be slightly different from the channel the UE measures from the CS-RS reference signals. This mismatch between the actual channel and the estimated channel is sometimes called bias. The transmission between a UE and the RUs can be improved by taking into account both this bias and direct interference. Generally speaking, for a group of UEs sharing the same resource block, a given UE receives its own data from the RPs corresponding to "1" s in the UE's signature vector.

When the QSVs use numerical values other than 0 or 1, on a given resource block the RUs that correspond to positions in the sum QSV with values between 0 and 1 (e.g., 0.001) use either blanking (silent) or multi-user transmission as described further below.

The positions of the 1's in each UE's signature vector $p_k$ corresponds to the minimum set of RPs that will be transmitting to that UE. In addition, the transmission strategy for RPs which are 0's in both (or all) the UE's signature vectors in some resource block can be decided in a few different ways, as described below.

In some implementations, an RU may only transmit to the active UE that has the strongest path gain to that RU. For example, when one value $p_{kj}$ for the kth UE is relatively large compared to path gains to other UEs, then it may be most efficient for the $j^{th}$ RU to exclusively serve the $k^{th}$ UE. Sometimes two active UEs sharing the same resource block may have similar path gains to an RU. In such situations, overall interference can be reduced by having the RU transmit to two or more UEs on the same resource block and at the same time.

In general, the total interference seen by K UEs in reuse from an RU on a given resource block can be reduced (e.g., minimized) by scaling down the transmit power of the RU by a factor P_reduction and allocating power to each UE in proportion to their path gain. In an example, P_reduction can be written as:

$$P\_reduction = (1/K)(u_{j\_rms}/u_{j\_mean})^2,$$

where $u_{j\_mean}$ is the mean path gain and $u_{j\_rms}$ is the RMS path gain of the K UEs in reuse relative to that j'th RU. For example, when two UEs are in reuse (K=2) and they have the same path gain to an RU, P_reduction is equal to 0.5 (e.g., power cut in half). The RU divides the resulting 50% power equally between the two UEs. The total bias plus direct interference seen by the two UEs is then reduced by 50%, when compared to the case where the RU is transmitting full power to one UE.

Another way of reducing the interference seen by a UE from an RU is to blank transmissions from that RU. This may be helpful in avoiding interference to other macro cell or small cell networks or when using certain transmission modes in LTE that utilize DM-RS or user-specific reference signals, examples of which include, but are not limited to, TM8, TM9, and TM10.

Yet another way of reducing interference seen by a UE is to reduce the power of transmissions from an RU when the RU is serving a nearby UE. In some implementations, the controller can keep track of the position of the UEs and, when a UE is determined to be near an RU, the transmission power to that UE is reduced. Reducing the transmit power when serving nearby UEs can significantly reduce interference to other users receiving on the same resource block at the same time, especially for UEs that utilize DM-RS of the LTE standard for channel estimation. In some examples, to avoid any bias in the channel estimate of a UE that utilize CS-RS reference signal of the LTE standard for channel estimation during demodulation, the relative power of the PDSCH transmission relative to CS-RS transmissions to the UE is reduced after sending a radio resource control (RRC) reconfiguration message. When the same UE moves away from the RU, its power is increased again by sending a new RRC reconfiguration message.

When a UE receives data from two or more RUs, it is possible to serve that UE using distributed higher-order MIMO across such RUs. For example, when two RUs, each with two transmit antennas are transmitting to a UE, instead of simulcasting, one can use precoding across the four antennas. If the UE has two receive antennas, 4×2 distributed MIMO can be implemented, using a 4×2 precoding matrix. The 4×2 precoding operation can be implemented in the controller or the precoding operation can be brokendown into two separate 2×2 precoding operations and implemented in the RUs. The RUs may transmit suitable CSI-RS signals, as described herein, and the UE, upon configuration by the controller, will report CSI based on these CSI-RS signals. The controller will use the reported CSI to determine the precoder.

Likewise, it is also possible to use the methods described herein for distributed multi-user MIMO. Using a method similar to that described for multi-user transmission from an RU, it is possible to schedule multiple UEs on the same RB, when their CSI reports indicate that they are candidates for multi-user MIMO transmission. When testing for possible reuse, two UEs that can be in multi-user MIMO, one or more "1" positions in the UEs quantized signature vectors can be replaced by a value between 0 and 1. This will allow these UEs to be reuse using multi-user MIMO.

Link Adaptation

In addition to determining resource blocks, the RU(s), and precoding strategies for use in transmitting data to a UE, in some implementations, the controller (or the real-time scheduler) also determines the airlink transmission rate to the UE. In an example, suppose UE1 and UE2 are scheduled to reuse the same resource block, and the controller receives CQI (channel quality indicator) from both. However, the CQI reported by the UE does not consider possible interference that may be caused by the reuse. To successfully transmit data to a UE at the correct transmission rate, the interference level is estimated and the actual transmission rate is determined based on the CQI and the measured interference level. The inclusion of the estimated interference in obtaining the correct transmission rate is also sometimes called CQI backoff. Similarly in MIMO transmission modes, the rank or precoder of the transmission could be different from the rank that the UE requested, and this also may be determined based on a backoff mechanism that incorporates the estimated interference.

CQI backoff can be implemented based on path gain measurements on the uplink. On a TD-LTE system, downlink and uplink transmissions occur on the same frequency and therefore result in similar channel coefficients. This reciprocity can be used to accurately estimate the downlink interference conditions based on measurements of uplink transmissions from the UE. In an FDD system, downlink and uplink transmissions occur on different frequencies and, as a result, it is more difficult to estimate downlink interference condition based on uplink measurements. When estimates of downlink interference is limited to average path gain, then the rate estimate can take into account possible increase in interference due to small-scale fading. By applying additional back-off reliable transmission can be achieved even in the absence of precise information about the downlink interference.

In addition, the controller receives feedback from the UEs about the success or failure of previously scheduled PDSCH transmissions as part of the HARQ process. The controller can further use this feedback information for outer-loop link adaptation to adapt the transmission rate to make the transmissions more reliable in some cases. What may, in some cases, limit the effectiveness of outer-loop link adaptation is the rapidly varying interference conditions caused by independent scheduling in uncoordinated base stations. In the example systems described herein, outer-loop adaptation can operate in coordination with user scheduling and QSV selection modules, such that significant short-term changes in the interference environment can be avoided in some cases. A UEs outer-loop is said to be in active state when the UE has been allocated resources within the last N ms, where N is a configurable numerical parameter. Interference variation can be avoided, in some cases, by ensuring that the UE's dominant interferer is persistent while the UE remains in active state. When the UE's dominant interferer is allowed to change, e.g., due to uncertainty of the small-scale fading experienced by the new dominant interferer, there may be some uncertainty in the highest achievable rate of the UE and, therefore, a more conservative rate may be used. In some implementations, a stable dominant interference environment can be achieved using "dummy" transmissions from otherwise unused resource blocks in an RU that acts as a dominant interferer. Similarly, QSV adjustments based on load changes that result in a reduction of the simulcast zone of a UE may be deferred until the UE's outer loop transitions into the idle state. When a change in a UE's QSV that reduces its simulcast zone is needed to relieve load in a neighboring RU, the UE's outer loop can be re-initialized even when the UE's outer-loop is in active state. Further, an airlink scheduler can take advantage of variations in reuse between users to provide some frequency diversity against varying interference.

Using the Interference Measurement (IM) capabilities in LTE TM 10/11 described earlier in the clustered configuration of CSI-RS, link adaptation performance can be improved. For example, a UE can be configured to report CSI based on multiple interference scenarios, and the CQI and PMI can be determined based on such reports by the CU using precise knowledge about the user scheduling across the site. Multiple CSI reports by a UE can also be used to aid link adaptation.

PDSCH Reuse in Release 10/11 Transmission Modes 9/10

In Transmission Mode 9 of Release 10 and Transmission Mode 10 in Release 11, DM-RS is used for equalization and demodulation. For each RB (resource block), there are two reference sequences, each using a different one of two scrambler identities. Furthermore, two orthogonal DM-RS sequences are derived from mapping a single QPSK reference sequence to 12 REs per RB using a length-2 orthogonal cover. The selected DM-RS sequence is indicated on the PDCCH.

In some examples, different RUs may transmit to different UEs on the same RB as follows: one MIMO layer each can be transmitted to two UEs with DM-RS sent on twelve REs per RB using an orthogonal cover. The interference between the two transmissions to the two UEs is small or non-existing. One MIMO layer each can be transmitted to four UEs with DM-RS on twelve REs per RB, using a scrambling identity in addition to the orthogonal cover. In this case, there is no interference between DM-RS transmissions to a first pair of UEs, $UE_1$ and $UE_2$, or between DM-RS transmissions to a second pair of UEs, $UE_3$ and $UE_4$. However, there may be random interference between the two pairs. In some implementations, two MIMO layers each are transmitted to two UEs, with DM-RS on twelve REs per RB, with orthogonal transmission between layers of the same UE, and random interference between the UEs. When reuse needs more than four MIMO layers in total, the same DM-RS can be reused.

For example, to transmit two MIMO layers each to three UEs on the same RBs, the same two DM-RS sequences having the same orthogonal cover and scrambling identity can be used for two UEs that are furthest apart. For the third UE, a DM-RS sequence having the same orthogonal cover as the two DM-RS sequences, but a different scrambling identity, can be used.

Rel. 11, TM10 of the LTE standard includes the capability for a UE to report CSI for up to three CSI-RS. For example in the clustered configuration described herein, a UE may be configured to report CSI not only for its serving cluster, but also for the neighboring cluster.

Rel. 11, TM10 of the LTE standard includes the capability for the UE to measure interference coming from certain RUs and to include such measurement in CQI estimation. To trigger interference measurement, a UE can be configured with a CSI-IM (Channel-State Information-Interference Measurement) configuration. The resources (REs) that the UE uses to measure interference may be defined in the same manner as in a CSI-RS configuration; e.g., a CSI-IM resource configuration index and a CSI-IM subframe configuration index. In an example, one CSI-RS, together with one CSI-IM, forms a CSI process, which corresponds to one CSI report by the UE. In Rel. 11, a UE can be configured with at most four CSI processes (e.g., four CSI reports), three non-zero power CSI-RS, and three CSI-IM.

In the above example, a TM10 UE may be configured with up to three CSI-IM, with each CSI-IM corresponding to a different one of the RU clusters. By selecting RU clusters that a) are most likely to be used in reuse for that UE, and b) represent areas where the interference measurement is most useful for that UE, one can control the number of interference measurements the UE needs to perform and report. In some cases, interference measurement may be most useful when the interference is expected to be strong and cause significant CQI back-off, as described elsewhere herein. An RU cluster that is too close, or too far away from, the UE may not be a good candidate for interference measurement. In some examples, the UE is configured with one CSI-RS, three CSI-IM, and up to four CSI processes, where three processes are formed by pairing the UE's CSI-RS ("serving cluster") with each of the three CSI-IM, and a fourth process is formed by using the UE's CSI-RS without any CSI-IM.

In the example described above, cluster size can be varied from 1 to N (where N is a number greater than one) RUs. In some implementations, larger clusters may reduce the frequency of reconfiguration, but may also make it harder to match actual reuse conditions. It is also possible to form clusters with four or eight antenna ports. In some examples, such clusters support CSI for distributed multi-RU MIMO.

Figure 32:
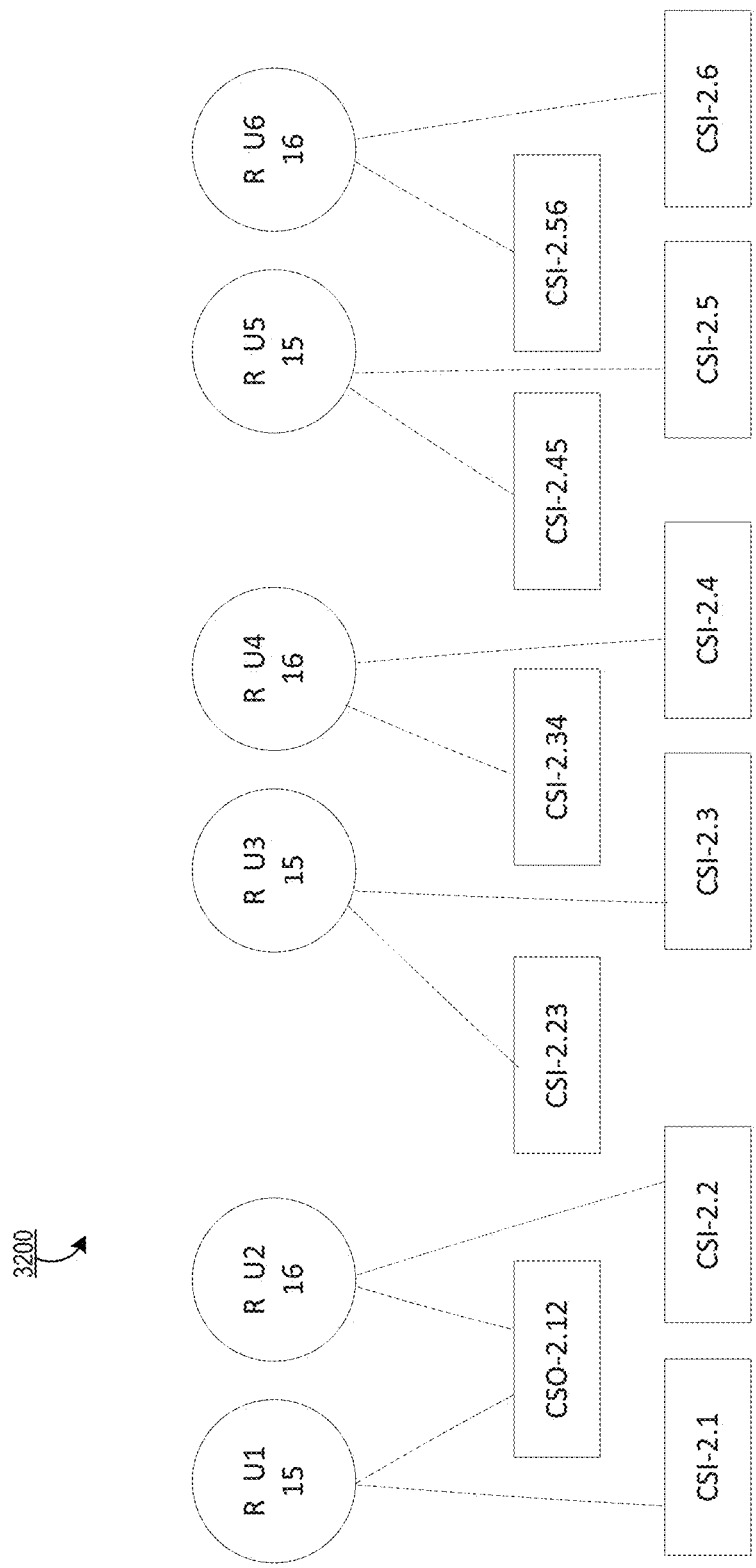
FIG. 32 is a block diagram showing an example of a clustered CSI-RS allocation.

Clusters can also be overlapping in some cases. For example, a sliding window of clusters can be defined, each of which may be represented by a different CSI-RS, as shown in the linear topology of RUs below. This overlapping configuration may avoid cluster boundaries and, in some examples, ensure that a UE is centrally positioned relative to its "serving" cluster. Overlapping clusters may, in some examples, increase overhead, since multiple CSI-RS may need to be transmitted from each RU. In the example of FIG. 32, RU2 through RU 5 are transmitting three different CSI-RS and RU1 and RU6 are transmitting two different CSI-RS. More specifically, in system 3200 of FIG. 32, RU1 is transmitting CSI-2.1 and CSI-2.12 and RU2 is transmitting CSI-2.12 and CSI-2.2 (where transmission in FIG. 32 is indicated by the dashed lines), and so forth for the other RUs shown. When a UE is located in between RU1 and RU2, the UE can be configured to report CSI based on CSI-2.12, or some combination of CSI-2.12, CSI-2.1 and CSI-2.2. The CU can use such reported CSI to determine whether to serve the UE from RU1, from RU2, or from both.

The systems described herein may also use additional CSI-IM configurations for interference measurement. In this example, a CSI-IM configuration represents a certain interference scenario, where some RUs are transmitting and others are silent. For example, a UE receiving data from RU3 and RU4 may receive interference from RU2 or RU5 or both. To facilitate proper interference measurement, the CU can configure RU2 and RU5 with Zero Power CSI-RS, ZP-CSI-2.2 and ZP-CSI-2.5. Three CSI-IM resources can then be defined as follows:

CSI-IM Resource A: CSI-2.2 ZP-CSI-2.5
CSI-IM Resource B: ZP-CSI-2.2 CSI-2.5
CSI-IM Resource C: ZP-CSI-2.2 ZP-CSI-2.5

The UE can be configured to report CSI on three CSI processes, which include CSI resource CSI-2.34 paired with three different CSI-IM resources (A, B and C). Equipped with three distinct CSI reports that correspond to these three CSI processes, A coordinated scheduler (running, e.g., in one or more CUs) can perform relatively accurate link adaptation to determine the data rate to apply to the UE.

PDSCH Reuse in Carrier Aggregation

The techniques described above can also be used in conjunction with carrier aggregation (CA). In CA, the real-time scheduler (e.g., in one or more of the CUs) can schedule two or more users on two or more carriers simultaneously. When the carriers are co-located, the same QSVs can be used to schedule on both carriers. In other words, UEs that can be assigned to the same airlink resource on one carrier can also be assigned on the same airlink resource on other carriers.

When the carriers are not co-located (in other words, some RUs in a cluster serve different carriers), then UE localization may be repeated for the two carriers and different QSVs may be needed on different carriers.

PDCCH Reuse

In a single-cell system with no re-use, PDCCH is simulcast and there is no interference. In some implementations, in a single-cell system with no inter-cell interference, fewer CCEs (control channel elements) can be used per DCI (downlink control information) than in a multi-cell system, thereby increasing capacity of the single cell. When a single-cell system is required to schedule transmission of many more UEs and no spare CCEs are available, in that same subframe PDCCH reuse can be implemented. The implementation can be similar to the PDSCH reuse described above. The set of CCEs allocated to one UE can also be reused for another UE. Such reuse can increase control channel capacity of the single-cell system. LTE Release 11 provides increased PDCCH capacity with a new E-PDCCH (enhanced PDCCH) channel. PDCCH reuse is linked with PUCCH reuse on the uplink, which is described below. The PUCCH resource for HARQ ACK/NACK from a given UE is identified by the CCE index that was assigned to that UE over the PDCCH. In PDCCH reuse, if the same set of CCEs were reused, two PDCCH transmissions start on the same CCE number and therefore, the corresponding PUCCH transmissions by the two UEs will use the same PUCCH resource for HARQ ACK/NAK. Resource reuse in PUCCH transmissions creates correlated inter-UE interference, because both UEs use the same DM-RS sequence. More complex blind decoders can be used to increase the PUCCH decoder reliability in such reuse scenarios.

The virtual cell splitting techniques described herein using multi-user MIMO or RF isolation can be utilized in systems that are compatible with all Releases of the LTE standard. Release 8 UEs use CS-RS, instead of DM-RS, for demodulation, which in some situations, may cause mismatch during demodulation. Still in many cases, virtual cell splitting in the manner described herein may be desirable, e.g., when there is a strong RF isolation between the transmitting and the non-transmitting antennas such that the UEs can achieve total throughput higher than when either UE is served on a dedicated time-frequency resource.

In Releases 9 and 10, in some implementations, the single CQI/PMI/RI feedback sent by the UEs may not be sufficient for the CU to determine reliably which RUs and physical antennas are most likely to provide the strongest signal to each UE (in the downlink direction). In such implementations, the CU can also use information about the strength of uplink signals, such as the Sounding Reference Signal (SRS) or PUCCH control signals or PUSCH uplink data, received by the RUs from the UEs to determine the antennas that are likely to provide the strongest signal to each UE on the downlink. After the CU determines the RUs or physical antennas for transmission to a given UE, the CU chooses the precoding vector weights as described earlier in the document so that signals to a UE are transmitted from antennas that the UE hears strongly.

In some cases, the virtual cell splitting using RF isolation can be implemented with higher accuracy in Release 11, where the UEs are capable of sending multiple CQI reports for different RUs. The CU uses these CQI reports to determine which RUs or physical antennas transmit signals that are likely to be received by co-scheduled UEs at a high strength.

Uplink Virtual Cell Splitting

Referring again to FIG. 5A, virtual cell splitting may also be implemented on the uplink. The CU may schedule multiple UEs on the same time-frequency resource and reduce or remove any interference between co-scheduled UEs in the CU using Interference Rejection Combining (IRC), Joint Detection (JD) or Successive Interference Cancellation (SIC). These techniques can rely upon spatial filtering as in multi-user MIMO or as in RF isolation. On the uplink, the UEs 502, 504, 506 share certain uplink resources that are available in the cell 500. The uplink resources can include the cyclic shift for DM-RS reference signals and the Orthogonal Cover Code (OCC) that are assigned to UEs for PUSCH (Physical Uplink Shared CHannel) transmissions and the resource indices assigned to UEs for PUCCH (Physical Uplink Control CHannel) transmissions. The CU can create virtual cells on the uplink by reusing the same resources among UEs in the same physical cell. The number of UEs that can simultaneously transmit on the same time-frequency resource may be limited at least partially by the availability of the uplink resources in the single cell. Reusing the same resources among UEs can increase the total capacity available on the uplink.

PUSCH Transmissions

The DM-RS reference signals used by a UE depend on the number of Resource Blocks (RBs) assigned to that UE. For PUSCH transmissions, the number of RBs can be as high as 108. A DM-RS reference signal having a length of 12×N is derived from a base sequence of the same length, where N is the number of RBs assigned to the UE. Up to 12 DM-RS reference sequences (or interchangeably, signals) can be derived from each base sequence using a cyclic shift in the time domain. These cyclically-shifted reference sequences are orthogonal to each other. When the channel for transmitting the reference sequences is sufficiently flat across one RB, two UEs can transmit their DM-RS reference signals with different cyclic shifts on the same RB. The CU can then estimate respective uplink channels for the transmissions from the two UEs without experiencing any substantial interference between them. When the channel is not sufficiently flat, in some cases, fewer than 12 orthogonal DM-RS reference sequences can be generated by cyclically shifting a base sequence.

In some implementations, the orthogonal DM-RS reference sequences are used for single-user spatial multiplexing (up to 4 layers) and multi-user MIMO. In Release 10, an orthogonal cover code can be applied to the two DM-RS sequences such that two layers can be transmitted using the same cyclic shift, while keeping the DM-RS reference signals orthogonal.

In some implementations, the UEs that are served by the same physical cell (e.g., cell 500 of FIG. 5A) use the same base sequence for PUSCH transmissions. When multiple UEs transmit on the same time-frequency resource, the CU coordinates the assignment of cyclic shifts and the orthogonal covers in uplink scheduling to keep the DM-RS reference signals transmitted on the same time-frequency resource orthogonal, when possible. In some cases, such orthogonality requires not only orthogonal DM-RS, but also perfectly aligned RB allocations. When UEs in reuse have orthogonal DM-RS, but their RB allocations are not perfectly aligned, there may be some random DM-RS interference between the UEs. However, the performance impact of such random interference is small.

In some implementations, a sufficient number of cyclic shifts remain available for assignment and for use in spatial multiplexing or multi-user MIMO in each cell. For example, when six cyclic shifts of the base sequence are available and the six cyclic shifts are coupled with a pairwise orthogonal cover code, the CU can serve as many as twelve layers on the same uplink time-frequency resource with orthogonal DM-RS reference signals.

In some implementations, a physical cell described previously (e.g., the single cell 500 of FIG. 5A) can be arbitrarily large. In a large cell, when there is extensive use of simultaneous uplink transmissions on the same time-frequency resource, the CU may be short of available cyclic shifts and orthogonal covers to maintain the orthogonality among the DM-RS reference signals. Similar to the RF isolation on the downlink, the uplink can reuse the one or more DM-RS reference signals on the same time-frequency resource when the uplink transmissions by the co-scheduled respective UEs do not substantially interfere with each other. In some implementations, when there is no substantial overlap between signals received from the co-scheduled UEs by certain groups of RUs or receive antennas, the same DM-RS reference signal can be used for those UEs. The CU can determine which groups of receive antennas or RUs are receiving significant signals from a UE based on PUCCH, SRS (Sounding Reference Signals) and prior PUSCH transmissions, and can assign cyclic shifts and OCCs (Orthogonal Cover Codes) accordingly.

In some implementations, when there are multiple cells served by one or more controllers, it is also possible to assign the same base sequence to all cells. This allows the controller to assign all UEs to cyclic shifts of the same base sequence and to ensure orthogonality between UEs, including those UEs that are served by different cells. Based on the RF isolation, the controller can also reuse the same cyclic shifts in different parts of the site and increase the number of UEs that can be supported.

In a radio network compatible with the Release 11 standards, different RUs in a cell (such as cell 500 of FIG. 5A) may be assigned to different DM-RS base sequences. In some implementations, orthogonality between different cyclic shifts of different base sequences is not guaranteed, but the number of available DM-RS sequences is increased. Accordingly, the size of the cell can be increased and more UEs can be served on the same time-frequency resource.

PUCCH & PRACH Transmissions

For PUCCH transmissions, for example for transmitting HARQ ACK/NAKs or Channel State Information (CSI), different UE transmissions in different cells use different base sequences to avoid collisions among UE transmissions in the different physical cells. This can be achieved by ensuring that the Cell-IDs used by neighboring cells do not overlap modulo 30. Group hopping, a feature of the LTE standard, can also be used to randomize the interference between the PUCCH transmissions from different UEs in different physical cells.

Orthogonal cyclic shifts of the base sequences (and possibly OCCs) are used in PUCCH transmissions to allow multiple UEs to transmit on the same time-frequency resources. In some implementations, it is possible to reuse the cyclic shifts (and OCCs when used) in different parts of the cell to increase the number of UEs that transmit at the same time. RF isolation can be used by the controller to determine which UEs may reuse the one or more base sequence cyclic shifts and orthogonal covers for the same time-frequency resource based on transmissions received from the UEs, for example, in PRACH (Physical Random Access CHannel) or PUCCH or PUSCH transmissions.

In some implementations, the interference between a cell (e.g., any single cell described previously) and any nearby macro cells (e.g., a mobile network providing coverage outside site 10 in FIG. 1) is randomized and kept small. In some implementations, the CU chooses base sequences for use in PUSCH or PUCCH transmissions that are different from the base sequences used in nearby macro cells. Furthermore, the CU can also implement group hopping.

Figure 5B:
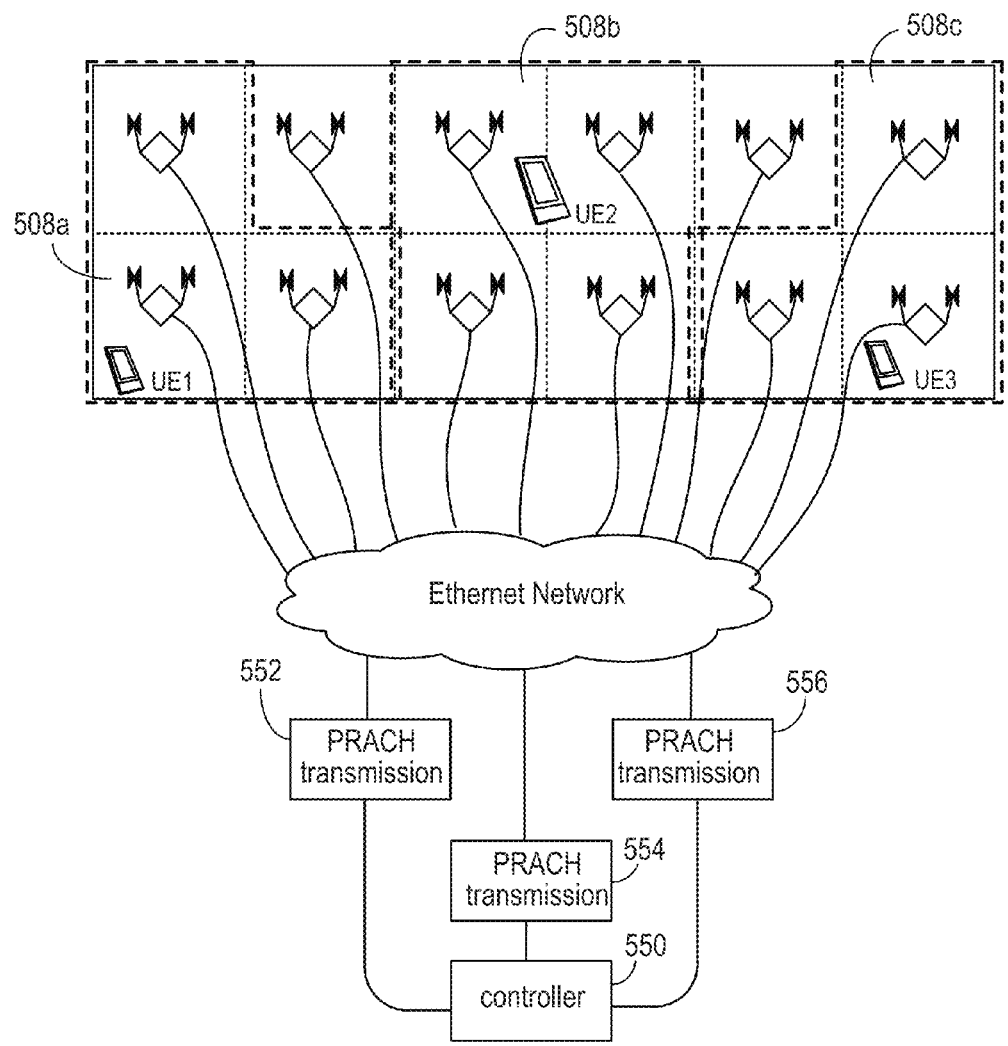
FIG. 5B is a block diagram showing an example of a controller detecting Physical Random Access Channel (PRACH) transmissions.

In some implementations, it is also possible for two or more UEs that transmit on the Random Access Channel (RACH) using the same preamble to be detected by the radio network of the present disclosure. Each cell will have 64 preambles available in every PRACH opportunity. By individually processing the received signals from each RU or group of RUs, the controller may, in some cases, reliably detect multiple PRACH transmissions that use the same preamble and that are free of significant interference among them. For example, referring to FIG. 5B, the controller 550 individually may process the signals from each RU or group of RUs (e.g., virtual cells 508a, 580b, 508c) to detect multiple PRACH transmissions 552, 554, 556 that use the same preamble.

PRACH Reuse

In a single-cell system, the PRACH opportunity is shared among all UE's in the cell. When two UEs in a single-cell system send the same preamble in the same PRACH opportunity, it is possible for the RUs to detect one, both or none of the transmissions, depending on the relative signal strength of the received signals in different RUs. The transmission of the same preamble appears to a PRACH detector as multipath. The CU can decide that the same PRACH preamble received by different RUs belong to two different UEs based on PRACH received signal quality metrics from all RUs.

When the CU determines that it has received the same preamble from two UEs via two different sets of RUs and that it can resolve the contention (described below) to allow both UEs to connect, the CU sends two separate RA (Random Access)-Response messages to the same RA-RNTI (Random Access Radio Network Temporary Identifier) via different RUs. PDCCH and/or PDSCH reuse may be used in sending these two messages, which carry two different temporary RNTI values and the associated uplink grants may allocate non-overlapping RBs. In transmitting the RA-Response in the above manner, both UEs look for a downlink transmission to RA-RNTI. In some implementations, the PDCCH transmissions associated with the RA-Response are sent at an aggregation level of eight, e.g., to provide reliability and different RA-Response DL-SCH messages are sent on the same RBs. This transmission strategy can allow correct reception by the UEs to be achieved with implementation of reuse. Provided that the UEs can correctly receive their respective RA-Response messages, the UEs can respond with different Message 3 transmissions and proceed to set up separate RRC connections. In some implementations, the CU may send a single RA-Response message and proceed with a standard contention resolution procedure where only one UE is able to connect to the controller and transition to the RRC-connected state.

In some implementations, at least some part of PRACH reuse is carried out by the RUs. For example, the preambles can be detected the RUs. In some implementations, the detections of the preambles are carried out without overloading the RUs.

PUCCH Processing in the RUs & PUCCH Reuse

As explained elsewhere herein, in some implementations, a communication cell includes a controller or controller unit (CU) and multiple RUs that are in communication with the CU. In some implementations, at least some baseband processing is performed in the RUs. This baseband processing may be distributed (e.g., spread) across the RUs, as described below. The baseband processing may include one or more types of processing involving the LTE PUCCH (Physical Uplink Control Channel). A description of the PUCCH for LTE Formats 1 and 2 is provided below, followed by a description of the processing that may be performed by the RU and the distribution of that processing across RUs.

Generally, Format 1 carries DL (DownLink) Scheduling Requests (SRs) and DL HARQ (Hybrid Automatic Repeat Request) ACK/NAK (Acknowledged/Not Acknowledged) signals. Generally, Format 2 is used for CSI (Channel State Information).

PUCCH transmissions by a UE occur in subframes known to the CU. This also applies to SR, although the absence of an SR is indicated by sending the "0" symbol, or by not transmitting at all. PUCCH is sent using time-frequency resources at the edges of the band. These resources are allocated in chunks of 1 Physical Resource Block (PRB) at a time over 2 slots, where the slots lie in diagonally opposite ends of the time-frequency grid.

Format 2 occupies the NPUCCH(2) outermost PUCCH regions of the PRBs, where NPUCCH(2) is a semi-static parameter broadcast in an SIB (System Information Block). All RRC-Connected (Radio Resource Controlled-Connected) UEs are assigned a Format 2 resource for periodic reporting of CSI. In some implementations, up to twelve UEs can simultaneously (in the same subframe) send CSI in the same PUCCH region using a unique set of phase rotations (or a unique cyclic shift in time domain) of a single cell-specific sequence.

In some cases, CSI user capacity can be increased in the communication cell by using a longer CSI period and assigning UEs to non-overlapping time offsets, or by increasing the number of PUCCH regions assigned to CSI. CSI period and offset are UE-specific parameters that are typically assigned at the time of connection set-up. For example, using a CSI period of 20 subframes, 240 (20×12), RRC-Connected UEs can send periodic CSI in one PUCCH region. In another example, in the shortest allowed CSI period of 2, only up to 24 (2×12) UEs can send periodic CSI on 1 PUCCH region. Increasing the CSI period is generally acceptable in indoor systems because of low mobility; however in the example processes described herein, a longer CSI period may also increase the frequency synchronization requirement between RUs (in simulcast and CoMP (Coordinated MultiPoint Transmission and Reception) joint transmission scenarios). As the network communication cell load changes, the CU may adjust the parameter NPUCCH(2) to reduce PUCCH overhead. When the CU determines that Format 2 resources utilize much less than NPUCCH(2) PUCCH regions over a period of time, the CU can change the PUCCH configuration in the System Information Block(s) (SIB) broadcast by the CU.

Format 1 occupies one or more PUCCH regions immediately following the PUCCH regions assigned to Format 2. The number of RBs (Resource Blocks) assigned to Format 1 can vary dynamically. However, when PUSCH frequency-hopping is used, there is a parameter (PUSCH Hopping Offset) which will limit the number of RBs used for PUCCH. In some cases, up to a total number of 1024 unique Format 1 resources can be assigned, and 12, 18 or 36 Format 1 resources can share the same PUCCH region of 1 RB. When the channel seen by the UE is flat across the 12 subcarriers of a PRB (Physical Resource Block), 36 orthogonal Format 1 resources can be supported, although this number may drop to 18 or 12 when the channel varies significantly within a PRB. The number of orthogonal resources that can be assigned to a PUCCH region is a cell-specific parameter broadcast as a SIB (Common PUCCH Configuration).

Format 1 cyclic shift resources are used for SR and HARQ ACK/NAK. SR resources are reserved and like Format 2 resources, they generally are assigned to every RRC-Connected UE. When an RRC-Connected UE does not have an assigned SR resource, it may use the PRACH (Physical Random Access Channel) to request uplink resources. This parameter is another cell-specific parameter advertised in a SIB that specifies the number of Format 1 resources that are reserved for SR. SR configuration also includes a period and an offset, which can be used to increase the SR capacity without increasing the number of PUCCH regions reserved for SR, although increasing the SR period also increases the average access time on the UL (UpLink).

Described below are example processes for performing PUCCH (Physical Uplink Control Channel) decoding in RUs. In the example systems described herein, the CU localizes the positions of RRC-connected UEs to a relatively small number of RUs. Localization determines which "local" RUs are to serve which UEs in the communication cell. Localization enables the decoding of PUCCH in the RUs. According to the example processes described herein, after the CU determines the "serving" RUs associated with each RRC-connected UE, the CU can send information (called "side information) for use in PUCCH decoding to the RUs prior to the beginning of each subframe of communication. The information may include the basic PUCCH configuration parameters such as NPUCCH(1) and NPUCCH(2) and the Format 1 and Format 2 cyclic shift resource indices for each resource to be decoded. The decoded information, including the resource index, is sent back to the CU. Since Format 1 does not use any channel coding, the RU may send a soft-decision metric to the CU, and allow the CU perform inter-RU combining to increase reliability. In some implementations, the RU performs the combining across its two local Rx antennas.

Format 2 uses a (20, A) block code in this example implementation, where A is the number of bits in the CSI (which varies based on CSI Format) and 20 represents the number of coded bits. In this example, the RU may demodulate up to the coded bits and send the coded bits to the CU along with a single quality metric. The RU does not need to know the number of bits in the CSI. In an example, assuming a 6-bit quality metric, at most 12×(20+6)=312 bits need to be sent per PUCCH region, or 312 kbps. Alternatively, each RU may decode the CSI completely, and send the decoded CSI to the CU along with a quality metric, which the CU may use to select one RU's data.

As explained above, SR and CSI are the main contributors to capacity constraint on PUCCH. One process for addressing this issue includes reusing cyclic-shift resources in different parts of the communication cell.

In this regard, when two UEs in the same cell use the same Format 1 resource to transmit SR, there is some possibility of a collision. For example, suppose two UEs (UE#1 and #2) share the same SR resource, and UE #1 transmits SR in some subframe and UE#2 does not. If the RUs that serve UE#2 can receive UE#1's transmission even at a very low signal level, the CU may declare a "received SR" for UE#2. This may cause the CU to unnecessarily allocate PUSCH resources for UE#2. To avoid this problem, the CU can compare the "quality" of the PUCCH received signal for UE#2 SR by comparing it with the signal level previously reported for UE#2 by its serving RUs.

Since HARQ resources grow with the number of users per TTI, the HARQ resources will grow linearly with the number of users co-scheduled on the DL. Since HARQ Format 1 resources are determined based on the CCE used for PDCCH, any reuse of PDCCH will automatically result in a corresponding reuse of the HARQ resource inside the same cell. For example, when two UE's (UE#1 and #2) are served on the DL using the same PDCCH CCE, they will automatically share the same HARQ resource to transmit ACK/NAK. In one scenario, UE#1 may transmit an ACK and UE#2 transmit a NAK in some subframe. Since both UEs will be transmitting the same Format 1 DM-RS in OFDM symbols 2, 3 and 4 of each slot, the PUCCH decoder in a given RU will estimate the channel to be the sum of the two channels (from the two UEs), e.g., H1(k)+H2(k). But in the other OFDM symbols that carry the ACK/NAK bit, when the two UEs are transmitting different HARQ bits (X1(k)=−X2(k)), the receiver will see the difference channel H1(k)−H2(k). This renders the equalizer suboptimum and results in a bias that reduces the SINR.

Enhanced Detector for PUCCH

As explained above, "reuse" includes, but is not limited to, two devices in a single cell utilizing the same resource (e.g., frequency) for communication within that cell. The "reusing" device may be the remote units (RUs), the user equipment (UEs) (e.g., a mobile device), or any other appropriate device. Reuse may occur on the downlink (DL) or on the uplink (UL), as described herein. On the UL, e.g., for reuse of the Physical Uplink Control Channel (PUCCH), two or more UEs may communicate on the same resource. In some implementations, that resource may be frequency; however, other resource(s) may be used. Because different UEs transmit on the same frequency, it may be necessary to separate signals from different UEs at a receiver (e.g., at a Base Station (BS)). In some implementations, detection of different signals on a same resource is performed based on the Radio Frequency (RF) distance between those transmissions. Described below are examples of a detector used to detect signals from different UEs on the same resource, and processes that may be implemented by the detector.

In some implementations, RUs may include a single antenna for communication with various UEs, whereas in other implementations, RUs may include two or more antennas for communication to various UEs. In this example, there are single-antenna RUs (RU1 and RU2), in communication with UEs (UE1 and UE2). In this example, PUCCH signals transmitted by UE1 and UE2 are denoted by s1 and s2 and can have values (−1, +1, 0) corresponding to (ACK, NACK, DTX) signals with given probabilities (Pr), where ACK refers to an acknowledged signal, NACK refers to a not acknowledged signal, and DTX refers to Discontinuous Transmission. In this example, it is assumed that Pr (ACK)=0.81, Pr(NACK)=0.09, and Pr(DTX)=0.1. Furthermore, in this example, UE1 and UE2 are either in the same cell, thus sharing the same PUCCH resources, cyclic shifts, and orthogonal cover codes, and transmitting the same reference signals; or UE1 and UE2 are in different cells, and thus are distinguished by different cyclic shifts, and orthogonal cover codes, and transmitting different reference signals.

Figure 27:
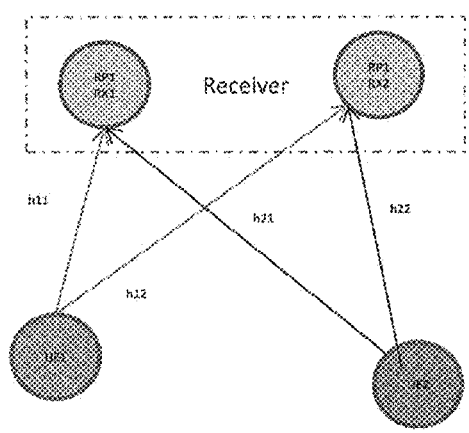
FIG. 27 shows an example implementation showing communication between RU1, RU2, UE1 and UE2.

FIG. 27 shows an example implementation showing communication between RU1, RU2, UE1 and UE2. The example processes described herein are usable with different types of receive (RX) antennas, including (1) uncorrelated RX antennas, and (2) correlated RX antennas.

Single-User Detector without Reuse

A single-user PUCCH detector declares DTX if the detected received power P<T_A times N, where T_A is a configurable threshold value, and N is the sum of the thermal noise and other-cell interference measured at the RP. In the absence of reuse, the probability of False Alarm Pr(FA) depends only on the threshold T_A, and is independent of the signal or noise levels. In some implementations, T_A is chosen such that Pr(FA)<0.01, where Pr(FA) stands for the probability of false alarm. Generally, a priori knowledge about the SNR does not always help in choosing the threshold T_A. For the chosen T_A, the probability of missed detection, Pr(Miss), increases with a decreasing SNR. In some implementations, there is a minimum SNR, $SNR_{min}$, Pr(Miss) remains below a target of 1%. The optimum value of T_A for single-user detection with no reuse is also referred to as T_A_NR.

Single-User Detector with Reuse

When there is reuse, assuming that UE2 is transmitting an ACK or a NAK, Pr(FA) for UE1 can be written as:

$Pr(FA)=1-Pr(Miss\text{-}Int)<1\%$; or equivalently:
$Pr(Miss\text{-}Int)=1-Pr(FA)>99\%$.

Here Pr(Miss-Int) represents the probability that the interfering signal is missed. Since a receiver of a detector cannot necessarily distinguish between the two UEs that broadcast the same reference signal, for the detector to not misfire on DTX of UE1, it has to not detect UE2. For a given threshold T_A, Pr(Miss-Int) depends on INR=SNR/SIR, which is the interference-to-noise power ratio at the receiver for UE1. Using available knowledge about INR from localization measurements, a threshold value T_A can be determined to satisfy the P_FA condition above (e.g., Pr(Miss-Int)>1−P_Pr (FA)>99%). For example, assuming SIR=20 dB and 30>SNR>−5 dB, it follows that 10>INR>−25 dB. The value of the threshold T_A thus increases with INR. At high values of INR, the threshold T_A can be increased significantly to keep Pr(FA)<1%.

It also may be desirable to satisfy the condition Pr(Miss) <1%. Once T_A is chosen according to INR to meet the Pr(FA) condition, there is a minimum SNR, $SNR_{min}$, above which Pr(Miss) condition can be satisfied. The value of $SNR_{min}$ can be determined via simulations. To satisfy both conditions Pr(FA)<1% and Pr(Miss)<1% at $SNR_{min}$=−5 dB, SIR is controlled to be within a desirable range.

When both UEs are in DTX, Pr(FA) for the single-user detector will decrease, because of the use of a higher threshold T_A. When only UE2 is in DTX, however, the probability of miss will increase, but generally would remain below the 1% target, provided SIR is large enough.

Multi-User Detection with Reuse

In some implementations, a joint detector can operate with two thresholds, T_A and T_B, where T_B>T_A, as follows:

Initially, in a first operation, if (P1+P2)<T_A (N1+N2), both UEs are declared to be in DTX. Otherwise, in a second step, based on the determination that at least one UE has signal (ACK/NAK), P1 and P2 are compared:

If P1>P2, UE1 is declared to have ACK/NAK; what is left to be determined is whether UE2 is DTX or not;

If P2>P1, UE2 is declared to have ACK/NAK; what is left to be determined is whether UE1 is DTX or not.

Sometimes an error will not occur in this operation, if the SIR>0 dB. Next, if in a second operation P1>P2, and P2>T_B times N2, no DTX is declared. Otherwise UE2 is declared to be in DTX. If in the second step, P1<P2, and P1>T_B times N1, no DTX is declared. Otherwise UE1 is declared to be in DTX.

Localization

When receiving the UE's uplink signal at one or more RUs, or in reuse scheduling, it may be desirable to determine the radio location of a UE with respect to the RUs. Localization includes techniques used to make this determination. In some implementations, localization can be based primarily on detection of the UE's uplink signal. In some implementations, UE measurement reports of the downlink signal can also be used to aid the process. Localization processes can be used in one or more of the following features associated with the cell(s).

Pruning for PUSCH: Generally, at any time point, a UE is in the radio vicinity of only a subset of RUs that belong to a cell. Hence, the CU decides on this subset of RUs from which to receive the UE's uplink transmissions. The CU then combines the received signals from these RUs. Generally, the larger the pathloss from a UE to an RU, the weaker the received signal, which may diminish returns from soft-combining the received signal from such RUs. The process of selecting a suitable subset of the RUs by a CU is called pruning. In some implementations, in each TTI, the CU provides each RU with the list of RB's to receive from with the RNTI to PRB assignments, thus providing the RU the information it needs to perform pruning. In some example applications, which are also described earlier, the RU may demodulate, and possibly decode, the received PUSCH signal. In this case, pruning determines the set of RUs that demodulate and possibly decode the received PUSCH signals on each RB. In this example, only RUs in the pruning set forward PUSCH data to the controller for further processing.

Location-aware PUCCH: In some implementations RUs may demodulate and decode the received PUCCH transmissions from the UEs. A similar function to pruning can be performed for the PUCCH, where the number of RUs that process a UE's PUCCH can be reduced using localization information.

Uplink load balancing across RUs: Each RU can handle a certain number of uplink PUCCH UCI such as SRs, HARQ ACK/NACKs, etc. per TTI based on the RU's processing limitations. A localization module can provide information that helps with load balancing across RUs in an equitable manner. Examples of load balancing tasks may include, but are not limited to: mapping of UEs to RUs, or limiting max number of scheduled UEs per RU in such a way as to balance the HARQ load per RU (if HARQ information can be decoded successfully from multiple RUs); and assignment of SR and CSI resources to a UE so that the per-TTI load on each RU is balanced across the cell.

Downlink and uplink reuse: As described previously, data may be transmitted to multiple UEs or received from multiple UEs in the same PRBs at the same time. A subset of RUs in the cell can be assigned to serve each UE.

Localization Metrics

The received energy at the RU, the SINR or path gain can be used as the metric for localization. In some implementations, the metrics for localization are determined using the received PRACH and SRS signals from a UE at each RU. In addition, the PUCCH and PUSCH DM-RS signals can also be used for localization.

PRACH-Based Localization

When a UE attempts a random access, it transmits a random access preamble using resources known as PRACH. These transmissions can be either contention-based or contention-free. The former occurs when the UE has not yet established a connection with the eNodeB, while the latter occurs when the eNodeB allocates a specific PRACH resource to the UE, for example during handover.

When a UE transmits a PRACH sequence with sufficient power, the eNodeB detects the sequence, and responds with a temporary RNTI (TC-RNTI, Radio Network Temporary Identifier) along with a resource allocation for the UE to transmit further information regarding this access attempt. At this stage, the eNodeB does not yet know the identity of the UE. Contention resolution takes place when the UE transmits its identity in its first message over the UL-SCH (uplink shared channel) using the allocated resources.

Assume that $UE_0$ transmitted a PRACH sequence $p_1$, and that a set of M RUs $[RU_{m1}, RU_{m2}, \ldots RU_{mM}]$ are able to detect the sequence transmitted by the UE, although all RUs in the cell will be attempting to detect PRACH sequences during the allotted PRACH opportunities. The detected sequence can be used to determine a metric that indicates the strength of the preamble signal as it is received by the RU. Such a metric can serve as a relative measure for localization purposes. The uplink pruning can be valid for the subsequent uplink transmissions by the UE, until further localization information is available from the UE.

PRACH Contention

In some implementations, contention can happen on a particular PRACH resource, e.g., more than one UE transmits the same PRACH sequence in the same opportunity. In this situation, the localization process can determine the pruning set from the superset of RUs receiving from the more than one UE. Subsequently, at the time of contention resolution, the localization process can determine whether a PRACH contention had taken place and thus remove the records stored for the UE for which contention resolution had failed.

SRS Based Localization

SRS (Sounding Reference Signals) are transmitted by UEs at specific time-frequency resources as configured by the controller. The SRS can be used for keeping track of the link quality from a UE to schedule resources for PUSCH efficiently when needed. A UE transmits SRS when it is active or in its DRX (discontinuous reception)-wake-up intervals. The SRS can also be used for localization purposes. For example, either all the RUs or a subset of the RUs can be configured to receive SRS from a UE in a given instance.

The transmit power for SRS is:

$$TxP = P_0 + \alpha PL + f(\Delta_{TCP}) + 10 \log_{10} M,$$

where $P_0$ is the open loop power, PL is the estimated pathloss and $\alpha$ is the fractional pathloss component, f(ATPC) provides the accumulation of closed loop power control commands, and M is the number of RBs over which the SRS is transmitted. The power control commands (TPCs) used for the SRS are the same as those used for the PUSCH.

Localization based on SRS for the purpose of uplink pruning can also be based on the relative energy received by each RU from the SRS of a UE. For the purposes of relative strength measurements and absolute measurement of path loss or channel gain, the localization module may also obtain information about the transmit power of the SRS transmission. In addition, since each UE transmits its SRS periodically, the SRS measurements can be accumulated at the localization module to provide a smoothed estimate of the received signal strength from a UE. The SRS might be in frequency hopping mode, in which case, the localization module can perform both time and frequency domain averaging.

The SRS signal from a UE can be periodic or aperiodic. In an example implementation of the periodic case, the SRS can be of periodicity between 2 and 320 ms. Generally, the shorter the periodicity, the more frequently the RUs will receive the SRS measurements and hence better the accuracy in tracking and localizing the UEs. If the configured periodicity for SRS transmission is 320 ms, the UE sends a periodic SRS every 320 ms. The SRS opportunities may also be staggered in time as evenly as possible among the connected mode UEs so that the RU and the CU SRS processing load is even. The same periodicity may be configured to the connected mode UE in the system but the SRS trigger opportunities in time may be as evenly spaced as possible. Taking the example of a 320 ms periodicity, there are 320 different SRS opportunities spaced equally in time within those 320 ms.

In some implementations, it may be beneficial to position and locate the UE as early as possible. Using a large SRS periodicity may mean less frequent SRS receptions and the RUs and CU and hence a lesser rate of tracking the UEs. At the very start of a UE's connection with the CU, the UE's location is not known with a lot of accuracy and hence coarse. The more SRS measurements the CU receives from a given UE, progressively the more accurate that UE's location is ascertained.

Using the example of a 320 ms periodicity, it was noted earlier that there are 320 different SRS opportunities. To enable a UE to trigger a SRS quickly or on demand, 20 equally spaced SRS indices are reserved. These 20 indices are spaced 16 ms apart. For convenience, these 20 SRS indices are termed Group-A SRS indices. The remaining 300 indices are for convenience termed Group-B SRS indices. A SRS index and a SRS opportunity are synonymous.

In some implementations, at the very start of a UE's connection, one free SRS opportunity from the Group-A SRS indices is assigned to the UE. In LTE, this configuration may happen via the RRC CONNECTION SETUP message. This Group-A SRS resource is configured to the UE and informed to be a single transmission opportunity. In other words, Group-A SRS opportunities are non-repeating. This enables the UE to transmit the SRS within approximately the subsequent 16 ms. The location of the UE is known at the CU with greater accuracy than before and helps with transmission pruning on the uplink.

Up to eight such newly arriving UE into the system can be configured to transmit on the same Group-A SRS index by configuring one of 8 different phase rotations to each UE. The phase rotation is also referred to as cyclic shifts in the LTE standards. To enable further tracking of the UEs that transmitted a non-repeating Group-A SRS, a periodic Group-B SRS index is configured immediately after the Group-A SRS was received. In LTE, this is done by signaling the Group-B SRS index to the UE via a RRC CONNECTION RECONFIGURATION message.

Where it is deemed that a UE needs to be tracked more frequently than the granularity provided by Group-B SRS, the CU can reconfigure the UE temporarily with a Group-A SRS index for a single shot aperiodic transmission before moving the UE back to its Group-B SRS configuration.

It is also possible to remember localization measurements between successive RRC connections of the same UE using the so-called S-TMSI identifier. S-TMSI is a UE identity (known to the Evolved Packet Core or EPC), which is unique within certain "duration". A UE's S-TMSI is (re-) assigned by the MME and becomes known to the CU when the UE sends an RRC Connection Request to enter the RRC-connected state. A baseband controller can keep a database of localization information (e.g., signature vectors, or information related to path gains to different RUs) indexed by S-TMSI for all recently RRC-connected UEs. At connection release, the database entry for the corresponding S-TMSI is updated. When a UE first connects, the CU retrieves the stored localization information for the corresponding S-TMSI and checks whether the localization information obtained from PRACH is consistent with the stored localization information. If it is, the CU proceeds to use the stored localization information to initialize the localization procedure. Otherwise, it initializes the localization procedure using the PRACH based measurement.

In addition to the above, the UEs are also requested to send periodic power head room (PHR) reports to the CU. The power head room reports allow the CU to estimate the pathloss. Controller may use pathloss measurements in the localization algorithm.

Localization and Pruning Processes

In an example, assume that the localization metric is maintained based only on the SRS, and PUSCH/PUCCH-based energy estimates are not used.

Figure 24:
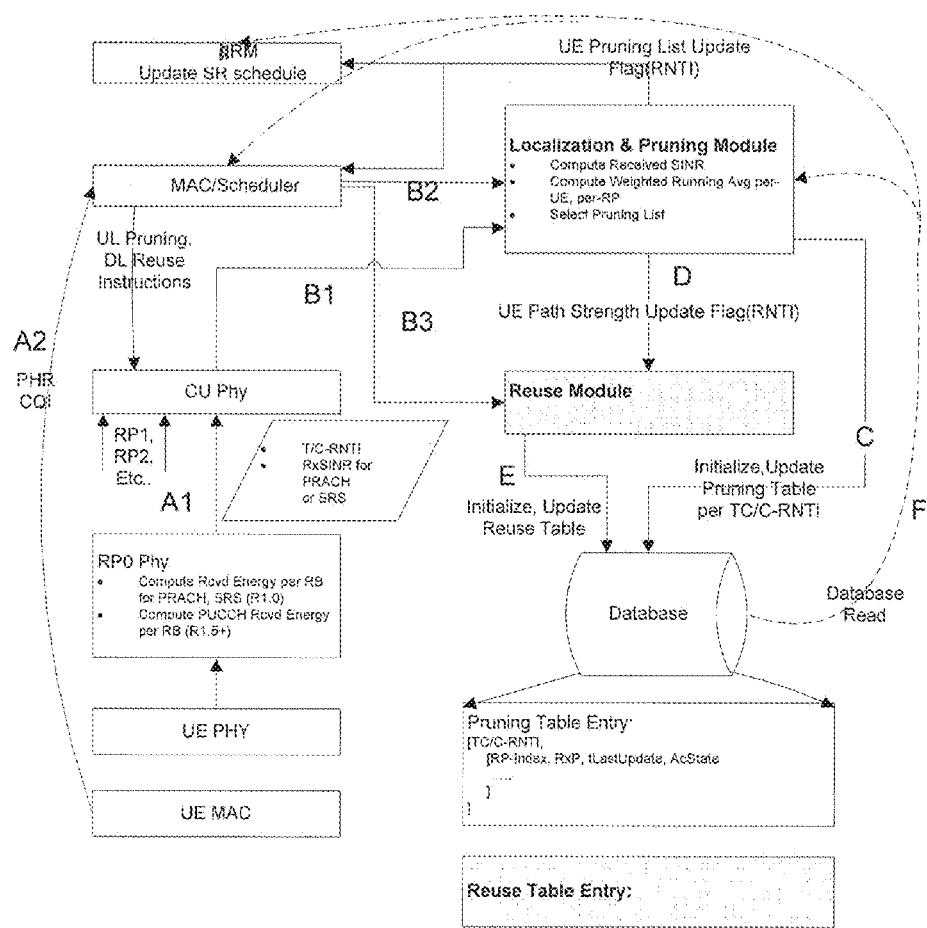
FIG. 24 shows a block diagram view of an example of a localization process for pruning.

FIG. 24 provides a block diagram view of an example localization process for pruning. The elements for reuse implementation are also identified. For each UE, an RU can belong in one of two sets from the pruning point of view: ActiveAndCandidatePruningRPSet, and OtherRPSet. The RUs in the UE's OtherRPSet can be tracked at a slower rate than those in the ActiveAndCandidatePruningRPSet. This can reduce the SRS measurement load on the system, thus allowing for a tradeoff that enables the SRS periodicity to be decreased, e.g., measure at a faster rate, if necessary. This can be disabled by setting the appropriate parameter(s) such that all RUs measure at the same rate. The details of the parameters are described further below. Moreover, in some implementations, a localization database keeps entries only for those RUs that are in the ActiveAndCandidatePruningRPSet, and does not maintain entries for RUs in the OtherRPSet. Using the OtherRPSet to prune SRS reception by RUs can be an optional implementation. For example, the SRS may be processed from all RUs at each opportunity, including the OtherRPSet, but only the ActiveAndCandidatePruningRPSet RUs' measurements will be maintained as a moving average. The OtherRPSet measurements can be discarded unless they meet the criteria to be included into the ActiveAndCandidatePruningRPSet.

Within the ActiveAndCandidatePruningRPSet, an RU can be in an Active or a Candidate state with respect to the PUCCH or PUSCH, creating, e.g., four possible combinations of sub-states that can be captured with two bits. One member of the ActiveAndCandidatePruningRPSet can be designated as the Primary RP. The other members can be assigned to ActivePucchPruningRPSet, CandidatePucchPruningRPSet, ActivePuschPruningRPSet and CandidatePuschRPPruningRPSet as applicable.

Figure 25:
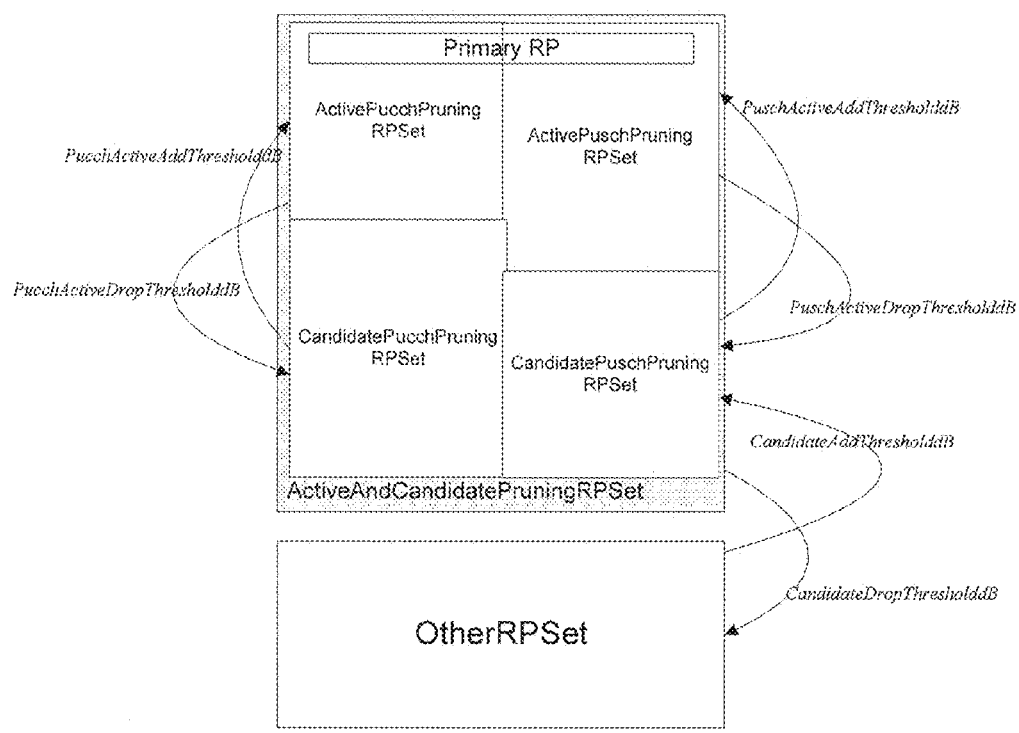
FIG. 25 is a block diagram showing the maintenance of a pruning set.

In a localization process, there may be two phases—initialization and maintenance, and a different set of parameters is used in each of these phases. This differentiation can allow for a greater tolerance in the measurements in the initial period when there has not yet been sufficient averaging over the unknown fast fading. FIG. 25 is a block diagram showing example maintenance of a pruning set. The figure shows interactions between various modules of the system and also provides an overview of the order of events in the execution of localization and pruning. For example, the UE transmits its PRACH or SRS as applicable. The relevant RUs measure the transmission, and provide the measurement to the localization module via the RU-CU interface.

The localization module can execute the pruning process, and create/update the corresponding table in the localization database. When updates are made to the any of the sets mentioned above, the RRM (radio resource management) and MAC/Scheduler modules are notified, so that they can retrieve the revised pruning table from the database.

Location-Aware PUCCH and Overload Control

Described below are examples of PUCCH (Physical Uplink Control Channel) processing performed in a remote unit (RU) taking advantage of localization. The example processes may be implemented to control the load across RU's, that is both to make sure that each RU stays within its processing limits, and that the load is balanced across RU's to maximize overall capacity. In this regard, as explained elsewhere herein, in some implementations, a communication cell includes a controller or control unit (CU) and multiple RUs that are in communication with the CU. In some implementations, at least some baseband processing is performed in the RUs. This baseband processing may be distributed across the RUs to reduce the chances that any single RU will become overloaded and thereby act as a bottleneck in the cell. This distribution is referred to herein as "load balancing". Examples of uplink (UL) data processing (e.g., baseband processing) that may be performed in the RUs is described below, along with example load-balancing processes.

In an example implementation, at the beginning of each subframe during communication between a CU and RUs, the CU sends information to all RUs identifying the uplink, e.g., PUCCH, resources that each RU is to process. In some implementations, this information is individualized (e.g., different) for each RU, but is sent in a single multicast message. In this example, the CU knows, beforehand, the available processing resources in each RU and makes overload control decisions for the various RUs prior to sending the information.

An example implementation of a cell includes J (J>1) RUs. Each RU is capable of processing K (K>1) PUCCH resources per TTI (Transmission Time Interval), where the PUCCH resources may include, e.g., SR (Scheduling Requests) or CSI (Channel State Information) or Hybrid Automatic Repeat Request Acknowledgements (HARQ ACK/NACK). In this example, J×K SR or CSI resources are processed per TTI across all RUs. In this example, if the SR or CSI periods are designated as P, the maximum number of RRC (Radio Resource Controlled) connected UEs (N_connected) that can be supported by all RUs in the communication cell, for a given PUCCH format, is as follows:

$$N\_Connected = J \times K \times P.$$

For J=20, K=4, and P=20, N_Connected=1600.

In the above example, we assumed that the 1600 connected UEs are relatively evenly split among the 20 RUs so that there are 80 connected UEs per RU.

In some implementations, UEs are randomly distributed across a communication cell and, as a result, the number of connected UEs in the coverage area of each RU will also vary randomly. For a given probability distribution for the UEs, it is possible to determine the probability of exceeding the nominal number K of PUCCH processing resources in an RU. For example, with a uniform probability distribution and 40 connected UEs per RU on average in a cell (50% of the example above), in a given RU, there is about a 4% chance of needing to process more than 4 (either SR or CSI) resources, assuming a period of P=20, and users evenly distributed among the SR and CSI phases across the entire cell.

In some cases, it may be possible to improve upon the performance shown in the above example by taking advantage of UE localization in assigning SR/CSI phases. In this regard, in some implementations, the CU can manage the PUCCH processing load (e.g., the amount of PUCCH information to process by the various RUs) dynamically to reduce the chances of overloading one or more of the RUs. Example processes for managing the PUCCH load dynamically are described herein. In some implementations, a single process may be used to manage the PUCCH processing load. In some implementations, two or more of the following processes may be used to manage the PUCCH processing load. In some implementations, the PUCCH processing load may be managed by the Localization and Pruning Module of FIG. 24

An example process for managing the PUCCH load dynamically is referred to as "Load-Dependent PUCCH Periods". According to this process, at RRC-Connection set-up, a CU can assign the CSI and SR periods according to the system (cell) load. For relatively light system loads, the CU keeps $P_{SR}$ and $P_{CSI}$ relatively small to enhance performance. As the system load increases, the CU increases $P_{SR}$ and $P_{CSI}$ for new UEs. As an alternative, the CU may also decide to reconfigure both old and new UEs with the most applicable $P_{SR}$ and $P_{CSI}$ based on current loading conditions.

Another example process for managing the PUCCH load dynamically is referred to as "Location-Dependent PUCCH Resource Assignment". According to this process, at RRC-Connection set-up, the CU will assign UEs in the same RU coverage area (or nearby RUs) to different CSI and SR phases, so that transmissions to/from those UEs are not processed in the same TTI. As a result, UEs that are in the coverage area of an RU may be evenly distributed between CSI/SR phases, at least when there is no mobility. Mobility may create uneven distributions, which may be addressed by reconfiguration.

Another example process for managing the PUCCH load dynamically is referred to as "Load-Dependent PUCCH Uplink Combining". According to this process, at each TTI, the CU instructs RUs to process specified PUCCH resources. During times when there is a relatively heavy-load load in the cell (e.g., over a predefined amount of communication traffic), the CU may limit the processing of each PUCCH resource to one RU. Otherwise, the CU may allow a PUCCH resource to be processed by multiple RUs and the results of the processing by the multiple RUs may be combined.

Another example process for managing the PUCCH load dynamically is referred to as "Dynamic Purging of PUCCH Resources". According to this process, when the CU determines that an RU does not have enough processing resources to handle its designated PUCCH processing, the CU selectively discards processing of some CSI and/or SR resources. In some implementations, a scheduler in the CU may implement a form of overload round-robin scheduling so that the CSI or SR misses are evenly distributed across all UEs. A single SR or CSI miss for a UE amounts to a temporary doubling of the corresponding period, as long as the same resource is processed in the next period, and can be viewed as a dynamic form of overload control. While deciding to miss SR or CSI processing for a UE due to an overload condition, in some examples, the CU may preferentially handle the SR or CSI processing on the subsequent opportunity for the same UE. This example process may be performed only on those RUs, leaving other RUs in the cell unaffected.

In some implementations, the CU will accord the highest PUCCH processing priority in the RUs to HARQ ACK/NAKs (Hybrid Automatic Repeat Request Acknowledged/Not Acknowledged). How many HARQ PUCCH processes are assigned to an RU in a given TTI ultimately determines the number of SR and CSI resources that can be processed by that RU. For example, if $K_{tot}$ is the total number of PUCCH resources (HARQ, CSI and CS) an RU can process, the CU will constrain the scheduler so as to not schedule more than $K_{tot}$ UEs in the same RU/TTI. If $K_{HARQ}$ is the number of PUCCH resources needed for HARQ in a given TTI, $K_{tot}-K_{HARQ}$ will be the number of SR and CSI resources that can be processed in the same TTI/RU.

If the transmission of an HARQ ACK/NAK by a UE falls on the same TTI as an SR or a CSI, there are mechanisms within the LTE specifications to allow the UE to send both on the same resource (simultaneous CSI+ACK/NAK transmission is a configurable option). In these cases, the CU may alert the RU to apply the simultaneous SR+ACK/NAK or CSI+ACK/NAK detection processes.

Another mechanism for managing the processing load on the RU is to have the Pruning and Localization module fine-tune the pruning list as necessary. For example, the pruning module first uses the ActivePuschPruningRPSet and ActivePucchPruningRPSet for each UE as the baseline in determining an RU pruning set. The pruning module also keeps account of the number of PUCCH format 1 and PUCCH format 2 receptions at each RU on a per subframe basis. Based on preconfigured rules regarding RU loading, the pruning module can then perform additional pruning, e.g., by deleting additional non-primary RUs from individual UE's pruning sets to stay within each RU's loading limits. Examples of different loading limits include:

Limit 1: Maximum number of PUCCH format 1 HARQ messages per RU

Limit 2: Maximum number of PUCCH format 2 messages per RU

Limit 3: Maximum (format 1 HARQ+format 1 SR+format 2) messages per RU

In some implementations, a limit on the number of format 1 messages is already placed by the MAC/Scheduler. If any of the loading limits is crossed by an RU, then the list of messages to be processed at the RU is further pruned. This further pruning can be performed based on one or more the following rules:

The Pruning and Overload Manager module may keep track of the RNTI's of the last (X) UE's, whose PUCCH messages were pruned at each RU, and attempt to select a UE that is not in that list. If there is a conflict between pruning out a CQI (format 2) message and an SR, the CQI message should be selected for pruning out. If a UE's CSI or HARQ feedback on the uplink were to align with a PUSCH transmission, the CSI or HARQ feedback is multiplexed with the PUSCH transmission and sent to the CU. In this instance there is no PUCCH transmitted by the UE. The CU notes this condition at the time of scheduling and notifies the RUs accordingly.

In summary, in LTE, there are three types of control information transmitted on the uplink control channel, PUCCH. The first type is HARQ ACK/NACK (hybrid automatic repeat request), which can require 1 or 2 bits. The second type is CSI (channel state information), which includes CQI, PMI, and RI. The CSI can be sent every 2 to 160 ms though smaller ranges such as 2 to 20 milliseconds are likely to improve downlink performance. The third type is SR (scheduling request). The SR from a UE informs a scheduler that there is data from the UE to be transmitted on the uplink.

The PUCCH processing is distributed between the CU and its RUs. Some parts of the baseband processing associated with PUCCH can take place at the RUs. For example, the CU can inform the RU to determine which ones of the UEs to watch for uplink transmission. Different control information can be sent on PUCCH at different frequencies or on different "cyclic shift" resources on the same frequency. In some implementations, the different frequencies or cyclic shifts are determined at least partially based on load balancing of the RUs. For example, it may be desirable not to overload the RUs, and also to distribute the baseband processing load evenly over all RUs. In some implementations, the periods and phases of the CSI and SR are assigned to evenly distribute the load over the RUs in each TTI. In some implementations, the locations of the UEs are taken into consideration to further even out the burden on the RUs. In some implementations, at the beginning of the PUCCH transmission, the periods for different signals are set to be relatively low, e.g., to provide good precision in the transmission.

As described previously, in some implementations, at least part of PRACH processing takes place at the RUs, instead of the CU. In addition, SRS (sounding reference signal), can also be at least partially processed at the RUs. The overall load control and load balancing at the RUs are also considered for processing the PRACH and the SRS.

Dynamic Coverage and Capacity Adjustment

Referring again to FIGS. 2A and 2B, the RF coverage and capacity provided in the radio network are decoupled. The RUs 66a-66e, 90a, 90b, 92a, 92b provide the coverage and the baseband modems 62, 82, 84, or the CUs 60, 80 provide the capacity. In some implementations, some RUs in a radio network are deployed more densely and with more transmitter power than other RUs in order to overcome possible interference from nearby eNodeBs, for example, macro cells. In some radio networks of this disclosure, RUs are deployed very closely to each other, with overlapping coverage, because they can belong to the same cell and therefore do not cause any inter-cell interference. Such very dense deployments are sometimes not possible with traditional base stations. The number of baseband modems (and cells) needed for a site depends on the number of users, the amount of data usage per user, and the distribution of users across the site as a function of time, etc. In general, a minimum number of baseband modems (and cells) is used to keep the cost low and to avoid unnecessary cell boundaries. When the demand for coverage and/or capacity changes, the radio network of this disclosure can dynamically adjust its coverage and capacity.

Dynamic Capacity Reallocation

In some implementations, when multiple RUs share the same cell/baseband modem, the capacity of the baseband modem is shared by all the UEs that fall within the coverage area of all the RUs that are assigned to the baseband modem. In an area of relatively high data usage, the RUs that form the cell may cover a smaller area than RUs in another cell that covers an area of relatively low data usage. For example, at a site using 4 modems (and 4 cells) and 24 RUs, the 4 cells can have 2, 4, 8 and 10 RUs, respectively, providing different cell sizes that match the coverage and capacity demand. The assignment of RUs to the cells can be dynamically changed based on changes in capacity demand. The changes can be made manually, e.g., by having a local person modify the RU to controller mapping, semi-automatically, e.g., based on Time-of-Day (ToD), or automatically, e.g., by the controller based on detecting a change in traffic distribution. The changes can reallocate the capacity at the site, without any substantial changes to the deployed equipment.

Figure 6A:
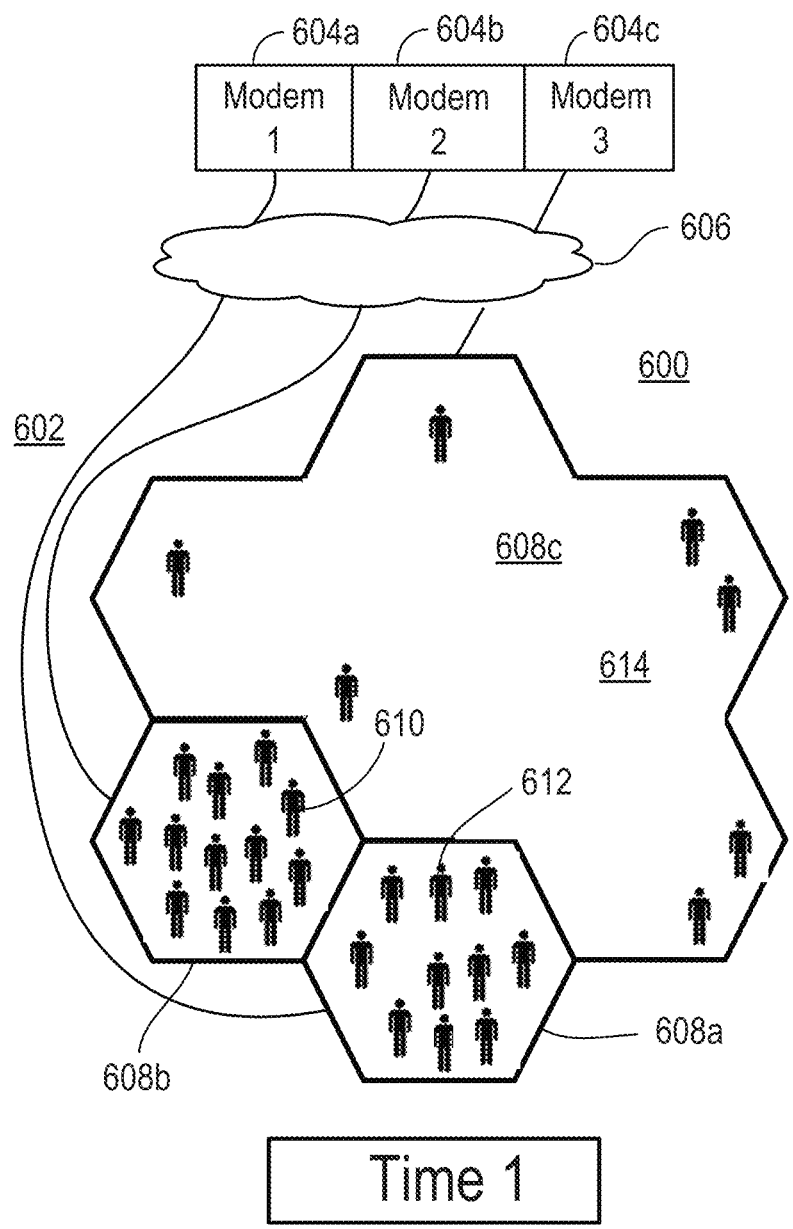
FIGS. 6A and 6B are block diagrams of an example of a radio network with different cell configurations at different times.
Figure 6B:
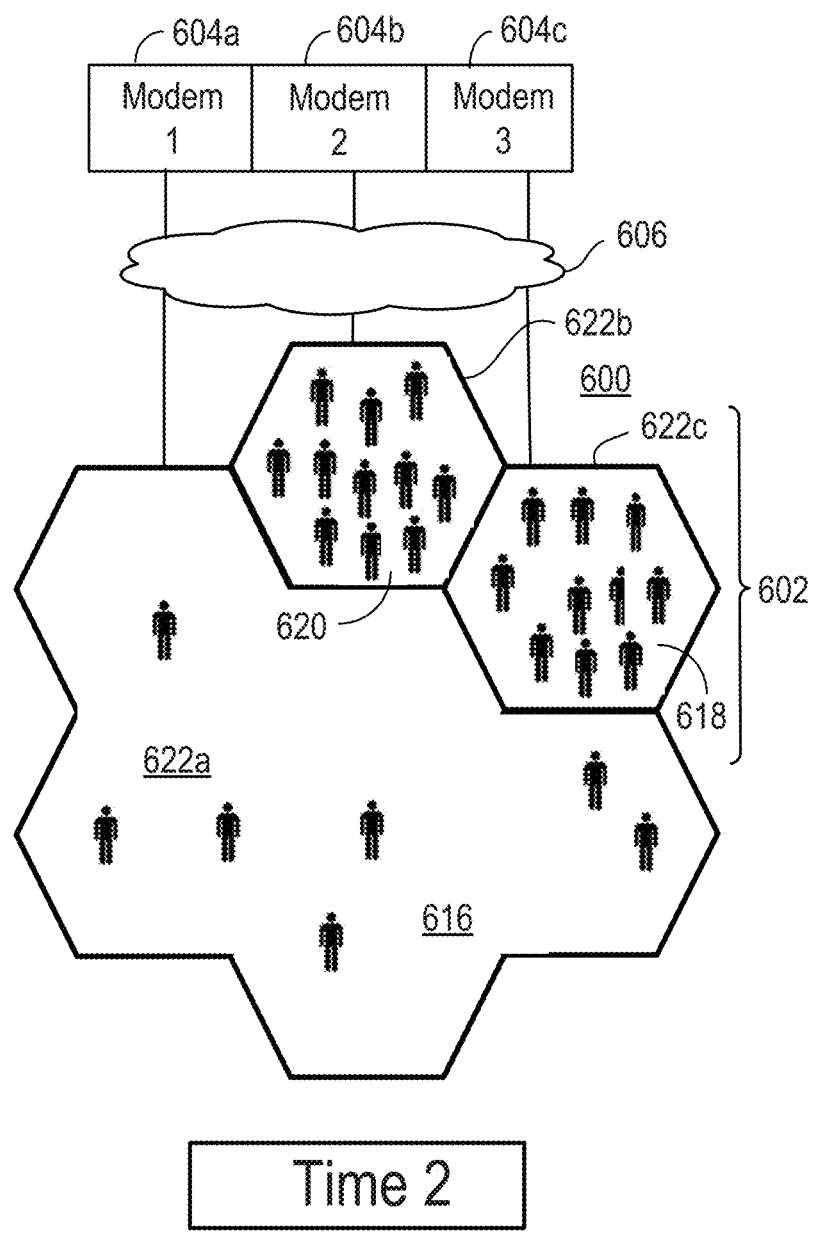

As an example, referring to FIGS. 6A and 6B, a radio network 602 including three modems 604a, 604b, 604c controlling three respective cells 608a, 608b, 608c through an off-the-shelf Ethernet network 606 is deployed at a site 600. The site 600 can be a commercial building that includes shopping areas and office space, which have different capacity demands (as schematically shown by different numbers of users in the figures) at different ToD. The cells may each include different numbers of RUs (not shown) to cover different-sized areas, while providing substantially the same traffic capacity. The shapes of the covered areas by the different cells can also be different.

Referring particularly to FIG. 6A, at a given time (time 1, e.g., work hours on a weekday), most users of the site 600 are concentrated in small areas 610, 612 (e.g., office spaces), while the user density is relatively low in the larger area 614 (e.g., the shopping areas). To meet the different capacity demands in the different areas of the site 600, the cells 608a, 608b having a relatively small number of RUs are formed to cover the areas 610, 612, and the cell 608c having a relatively large number of RUs is formed to cover the area 614. Each cell 608a, 608b, 608c has substantially the same capacity.

The capacity demands at the site 600 may dynamically change. Referring to FIG. 6B, at another given time (time 2, e.g., lunch hours on a weekday), there is a high density of users in areas 618, 620 (e.g., restaurant areas in the shopping area 614 of FIG. 6A) and there are relatively few users are in the area 616 (e.g., office areas 610, 612 and store areas in the shopping area 614 of FIG. 6A). In response, one or more RUs at the site 600 are reassigned to different modems, manually, semi-automatically, or automatically, to form new cells 622a, 622b, 622c that cover the respective areas 616, 620, 618. The cell 622a contains a relatively large number of RUs. The cells 622b, 622c contain a relatively small number of RUs. Each cell 622a, 622b, 622c has substantially the same capacity. Dynamic capacity reallocation is implemented over the Ethernet network.

Total Capacity Increase

In some implementations, instead of or in addition to redistribution of capacity demands on a site (e.g., the site 600 of FIGS. 6A and 6B), the site also experiences an increase in the demand for total capacity. For example, the number of mobile subscribers increases, and/or the amount of data demand per subscriber increases. In these implementations, additional modem(s) (and accordingly additional cell(s)) can be introduced. For example, an existing unused modem in a CU of the radio network can be enabled and some of the RUs already deployed at the site can be reassigned to the new modem. This is a form of real cell splitting, which can be implemented in a convenient manner, e.g., as a software upgrade, and, in some implementations, does not require any hardware changes to the installed RUs. Alternatively or in addition, one or more new modems can be added in a CU and/or one or more new CUs can be added to the radio network at the site. In some implementations, the total capacity of the site may be increased without affecting the previously deployed modems, cells, and RUs. In some implementations, the addition of more modems or CU hardware is significantly less expensive, both in terms of equipment and installation cost, as compared to adding many new access points across the site. The physical cell splitting method described above is implemented using the Ethernet network.

CU Stacking

Figure 26:
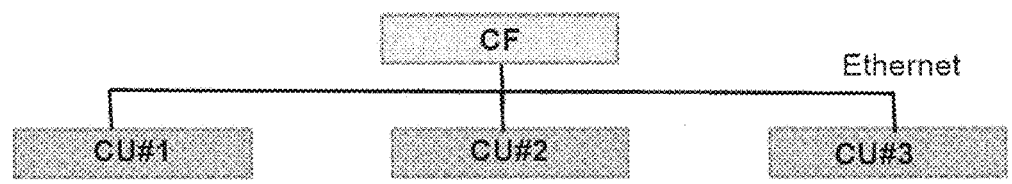
FIG. 26 is a block diagram showing an example of CU stacking in a cell.

In some implementations a CU controls 64 RUs. It may be desirable to serve larger spaces or deliver higher capacity per RU while preserving the coordination and/or no cell border properties of the system. FIG. 26 shows another example of a cell which expands the coverage by stacking multiple CUs (three shown in the example) within one single cell, where each CU uses a single baseband modem. The CUs (or baseband modems) are coordinated using a coordination function (CF) and are connected among themselves and with the CF through an Ethernet link, e.g., a 10G Ethernet.

Each CU is a physical controller that runs a complete controller application, except for certain inter-controller coordination functions can be offloaded to off-the-shelf server(s). Within the cell that contains the multiple CUs, there is no fixed association between CUs and RUs. Each CU application can handle a subset of the connected UEs in the cell. When an RU receives a PRACH from a UE, the RU assigns the UE to one of the available CU applications. When an MME (Mobility Management Entity) forwards a page to the backhaul CU, the backhaul CU assigns the page to a CU.

Certain inter-CU dependent functions are off-loaded to an off-the-shelf server, which can have external storage, running the coordination function (CF). Virtualization may be used on this server to allow other service applications to run on the same hardware, and for further scalability. In some implementations, one single CF is implemented for all CUs of a cell, although multiple CFs can also be used.

In some implementations, the server running the CF is an Off-the-Shelf (OTS) Server. The OTS can provide flexibility in terms of processing power, good scalability, and has no wasted physical resources. Additionally, the OTS can be used to run other applications, including location-based services, local break-out and other services, etc.

Within each cell, some CUs are selected to perform common functions for all RUs. For all CUs, the associated CF is the master. One selected CU is a Timing Master CU that acts as the 1588 master for all RUs. Another selected CU is a System Information CU. This CU is responsible for generating the system information and cell-specific reference signals, e.g., CS-RS and CSI-RS, for the entire cell. The System Information CU also schedules SI, CS-RS and CSI-RS and the scheduling can be exclusively handled by this CU. There is also a Backhaul CU that is responsible for maintaining a single IPSec (Internet Protocol Security) and S1 tunnel to the Evolved Packet Core (EPC). Backhaul CU acts as an eNodeB terminating the S1 tunnel towards the EPC. In some implementations, IPSec packets are tunneled through a single Backhaul CU. The Backhaul CU can also be responsible for CU selection upon receiving a Page from MME.

The CF and the CUs together perform inter-CU coordination functions. One of the coordination functions is localization. In some implementations, the CF maintains localization information for all connected UEs. Each time a CU updates a UE's uplink signature vector, the CU forwards the new signature vector along with a UE identifier to the CF.

Another inter-CU coordination function is downlink and uplink reuse scheduling. Every TTI, the CUs can forward to the CF a list of active UEs, separately for downlink and uplink, with the following scheduling information: 1) UE Identifier, 2) Queue Depth or equivalent, and 3) Scheduler Metric. The CF can perform processing using the information received from all CUs and return the following scheduled UE list, separately for downlink and uplink: 1) UE Identifier, and 2) DCI. The reuse scheduling may have low latency so that the scheduling can be completed within 1 millisecond. In some implementations, some scheduling tasks are shifted from the CF to the CUs, e.g., to prevent the CF from becoming the bottleneck in the scheduling process. The CF can also coordinate scheduling across multiple carriers as in carrier aggregation.

A third inter-CU coordination function relates to data transport. On the downlink, each CU can form a data frame for the UEs that it is serving. In some implementations, the CUs do not form any data frames for those UEs that they are not serving. The RUs receive the data frames from the multiple CUs and combine the frames as needed to form the transmitted downlink OFDM symbols. In some implementations, to reduce link rate, the CUs send unicast or narrowcast packets.

On the uplink, for each UE, its serving CU can determine the uplink combining set and inform the RUs accordingly. In some implementations, an RU only needs to send a UE's uplink data to the CU that is serving that UE.

Another inter-CU coordination function involves multi-user (MU) MIMO. On the downlink, inter-CU coordination is implemented when UEs in the MU-MIMO are being served by different CUs. The joint precoder in MU-MIMO can be determined by the CF. On the uplink, joint detection in a single CU using Successive Interference Cancellation (SIC) is implemented. MU-MIMO can be implemented across CUs by allowing a CU process a UE's signal for SIC even when the UE is normally assigned to another CU.

Furthermore, inter-CU coordination functions are also performed in association with the downlink control channels. For example, the CF can determine PDCCH reuse. The CF can form and send DCI to the CUs along with RU transmission strategy. The actual PDCCH packet can be formed by the CUs. The RNTI of the DCI can determine which CU is responsible for handling a PDCCH packet. All PDSCH and PUSCH DCIs can be handled by the CU serving the corresponding RNTI. All SI (system information)-RNTI DCIs can be handled by the SI CU. PCFICH can be sent by one CU of the cell that is either pre-determined or selected by the CF. It is possible to implement PHICH reuse.

A cell having multiple stacked CUs, such as the cell shown in FIG. 26 can handle SRS and PUCCH as follows. For the SRS, the RUs can be configured to forward SRS data of the UEs only to their respective serving CUs. The serving CUs upload the signature vectors of their respective UEs to the CF.

For the PUCCH, the RUs can forward PUCCH data to their respective serving CUs. In some implementations, UEs in PUCCH reuse belong to the same CU, and therefore, UEs in PDCCH reuse also belong to the same CU.

Other considerations associated with a cell having multiple stacked CUs include CF scalability, CF redundancy, and CF and CU stack management. In some implementations, the CF application is parallelized to increase scalability and to take the advantage of multi-core processors of the server on which the CF is run.

A cell having multiple stacked CUs can provide all advantages of a cell having one CU. In addition, the cell with the multiple stacked CUs can have a high scalability. The impact on existing CU applications is small. The implementations may be virtualized through the server running the CF. The cell may be used in outdoor applications.

It is also possible to implement controller stacking without adding another centralized node. In this case, multiple CU instances, representing same or different cells, may run on one or more hardware platforms, with high-speed connectivity between them (e.g., 10G Ethernet) and every TTI CUs exchange information to perform scheduler coordination, for example, to serve a single cell or multiple cells across multiple controller instances. When coordinating across cells, such coordination may be used to support carrier aggregation or to control interference at border areas between adjacent cells. Such information exchange can be implemented in a one-way transmission from each CU instances to all other CU instances participating in coordination.

Multi-Operator Small Cell

In many enterprises and public spaces there is a need to support multiple operators. The example systems described herein enables such multi-operator deployments.

The multi-operator system uses a multi-RU mini-enclosure with a unique RF combining capability to allow multiple RU modules for different operators to plug into a single enclosure. The enclosure would be installed outside of view, for example above the ceiling tile, and can connect to one or more shared external antennas via one or more antenna cables. In some implementations there will be one antenna cable that feeds a single wideband shared external antenna. In some other implementations, there may be two antenna cables that feed into one external wideband antenna with two antenna ports to support MIMO. More generally, M cables could be feeding M SISO antennas or M/2 MIMO antennas, where M is the number of antennas utilized in the multi-RU enclosure, and each antenna has the combined signal of N RUs, and can be of any type of antenna such as omni-directional or directional. In some implementations, the RU modules will have identical hardware. This allows a neutral host company that may deploy and manage the multi-operator site to reuse the same module for different operators. An RU module can be reassigned from one operator to another operator. An RU can also be reassigned from one frequency to another frequency, even if some are FDD and others are TDD.

The Multi-RU chassis can also be used for Wi-Fi by adding a Wi-Fi module, and could also combine the Wi-Fi signal with the LTE signals onto the external antennas. It can also be used for LTE-Advanced Carrier Aggregation (CA) for a single operator. In CA, multiple carriers can be used to serve one or more UEs. In an existing deployment, additional RU modules can be added in the form of additional carriers for the same operator, and the aggregation of the carriers is achieved in the controller.

Downlink Inter-Cell Interference Control

In some implementations, inter-cell interference on PDSCH is reduced using hard frequency reuse (HFR). HFR can be implemented as a static or semi-static scheme, where the available resource blocks are divided between groups of cells according to K-way frequency reuse, where K is typically 3 or 7, so that each cell uses one-third (or one-seventh) of the available resource blocks. When only one cell transmits in each resource block, cells in the same frequency reuse group will not see any PDSCH interference from the others. Implementing HFR may cost(K−1)/K× 100% of the available bandwidth.

Figure 17A:
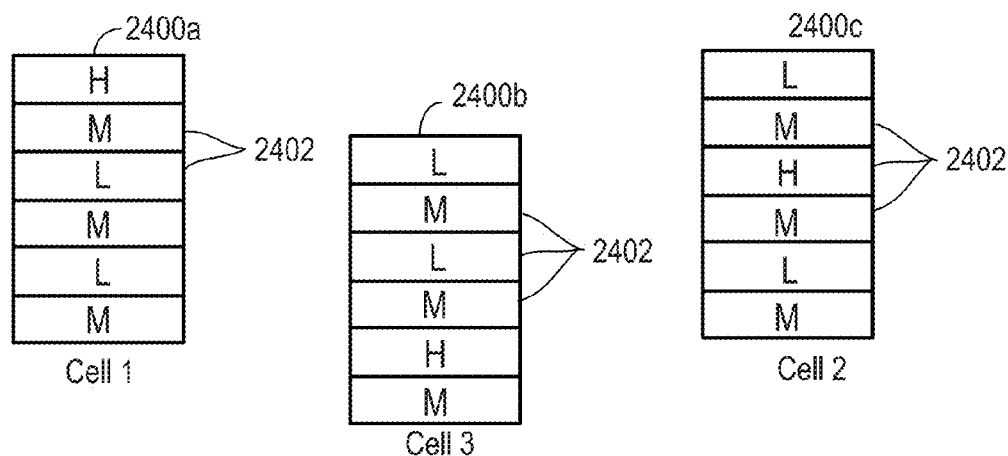
FIG. 17A is a block diagram showing an example of Soft Frequency Reuse (SFR) in LTE.

Alternatively, inter-cell interference on PDSCH can be reduced using Soft Frequency Reuse (SFR). In SFR, available resources are partitioned between neighboring cells in the same frequency reuse group. Different from HFR where each resource block is assigned a binary state (on/off), e.g., full power or no power at all, in SFR, each resource block can be assigned any transmit power level. For example, consider the following example with 3 different power levels (high (H), medium (M), low (L)). Referring to FIG. 17A, in every cell 2400a, 2400b, 2400c, each resource block 2402 is assigned to one of these power levels (H, L, or M), such that in resource blocks where a cell is assigned a high power, its two neighboring cells are assigned a low power. As a result, each cell will have two times as many low-power resource blocks as high-power ones. Each eNodeB will assign the UEs that it is serving to one of the power levels, typically during connection set up, based on the average SNR the UE is experiencing and possibly other factors such as the amount of data the UE has for transmission. The UEs that are in good conditions, e.g., located near the center of a given cell, or that have little data to send are assigned a low PDSCH power level, whereas UEs in poor conditions, e.g., located near the cell edge or having a lot of data for transmission are assigned a high PDSCH power. Accordingly, when the controller is serving a cell edge user, the UE will experience both a higher received signal power and a lower interference power level, boosting its average received SNR. When the UEs move and their channel conditions change, the controller can change the transmit power level for the UE by sending a higher layer reconfiguration message. When scheduling UEs for transmission on resource blocks, the controller may effectively need to run parallel schedulers, one per power level. In some implementations, the strict partitioning of the resources may lead to scheduling efficiency loss, for example, due to loss of some multi-user diversity. Such inefficiencies can become visible when the PDSCH power distribution of active UEs is mismatched relative to the power distribution of the resource blocks. Fixed power allocation can also be inefficient because it sometimes unnecessarily forces a low power transmission for a UE, even though a transmission at a higher power level may not cause any interference to a cell edge UE served by a neighboring cell in the same frequency reuse group when the UE is on the opposite side of the neighboring cell.

Coordinated Scheduling

The efficiencies of SFR can be improved by implementing the resource/power partitioning dynamically as part of a centralized multi-cell scheduler in the controller. The controller can dynamically allocate resource blocks and transmission power based on Radio Resource Management (RRM) reports received from the UEs. The implementation can avoid the need to assign transmit power levels to resource blocks semi-statically as in HFR or SFR.

In LTE, each cell will periodically broadcast its NeighborList in a System Information Block (SIB) Type 4 (SIB4). A connected UE will monitor the cells in the NeighborList and send Measurement Reports to the serving cell. These reports can be sent periodically or based on certain triggers. The reporting period and the triggers are configured by the serving cell using an RRC-Reconfiguration message. Each UE's Measurement Report includes two measurements per cell: i) Reference Signal Received Power (RSRP) and ii) Reference Signal Received Quality (RSRQ). RSRP is the average received power of a CS-RS RE and is indicative of the received signal strength, and RSRQ is an additional signal quality indicator, which also provides a crude measure of interference. In some implementations, coordinated scheduling in the controller will work as described below.

Each baseband modem will send, to the central coordinator, the Neighbor List RSRP reports received from each of the connected UEs it is serving, as well as the amount of data each UE has waiting for transmission. Baseband modems may send these reports upon certain event triggers, for example when a UE is newly connected or disconnected, or when there is a significant change in the UEs RSRP reports. It is also possible for the central coordinator to poll the baseband modems to get these RSRP reports.

The central coordinator will use the received information to construct a bandwidth and PDSCH power allocation map for each UE and will periodically send this information to their serving baseband modems. An example of the basic logic for creating this bandwidth allocation map is discussed below.

Individual cell modems communicate the PDSCH power allocation to the UEs, e.g., shortly after setting up the connection. For every subframe, individual baseband modems schedule UE data for transmission on PDSCH. Baseband modems schedule transmissions in a manner that is consistent with the power levels and the bandwidth resources allocated to each UE by the central coordinator.

Figure 17B:
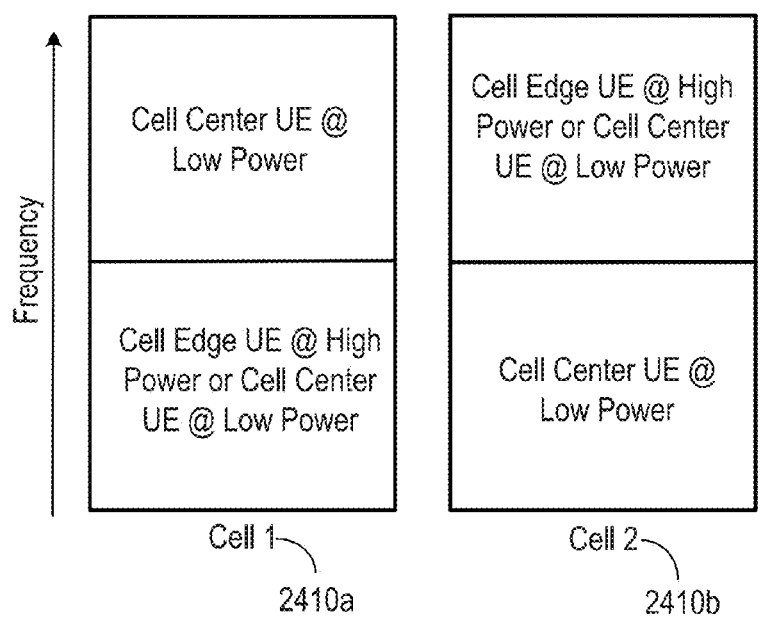
FIG. 17B is a block diagram showing an example of two cells implementing coordinated scheduling.

Next, examples using two adjacent cells are described with reference to FIG. 17B. In an example, suppose each cell 2410a, 2410b has one connected UE, and each UE has similar amounts of data waiting for transmission. If both UEs are away from the cell boundary, the central coordinator would allocate the full transmission band to both UEs since neither would experience significant inter-cell interference. If both UEs are near the cell boundary, then the cell coordinator would allocate 50% of the transmission bandwidth to each UE at full power. If one UE is near the cell boundary but the other is away from the cell boundary, then the cell coordinator could allocate the full transmission band to both UEs, but assign a lower power level to the UE away from the cell boundary to reduce interference with the UE near the cell boundary in the other cell. When the UEs have significantly different amounts of data waiting for transmission, the cell coordinator may give more bandwidth to the UE with more data.

In a more complex case where each cell has 10 connected UEs with 50% near the cell boundary and 50% away from the cell boundary and UEs near the cell boundary have similar amounts of data as the UEs away from the cell boundary, central coordinator could allocate resources as follows: UEs that are away from the cell boundary are allocated the full transmission bandwidth, but at a reduced power level and UEs near the cell boundary are allocated 50% of the transmission band in a non-overlapping manner, but at full power.

If the ratio of the number of UEs at the cell edge to the number of UEs at the cell center is different from 1:1 or the amount of data the UEs have for transmission near the cell edge is different from the amount of data the UEs have for transmission at the cell center, the central coordinator can adjust the bandwidth and power allocation process(es) to match the data needs of the UEs. In some implementations, the adaptability of the allocation can make the system significantly more bandwidth-efficient, while improving the cell-edge performance for disadvantaged UEs.

In some implementations, there may be interference between the radio network and other networks, such as the macro network, and such interference may also be considered and reduced. Release 8 supports messages in the X2 interface to allow eNodeBs to exchange information on power levels that are used in each of the resource blocks of the eNodeBs. In some implementations, the X2 interface is used between the controller of the disclosure and eNodeBs of the other radio networks (e.g., macrocells). The user can facilitate exchange of information between the controller and the eNodeBs to support coordinated scheduling. As an example, each eNodeB can indicate to the controller for each resource block whether the power level in that resource block will remain below a certain threshold, which is also separately signaled. This will allow the controller to schedule those UEs located at cell edges in resource blocks where the neighboring cells are transmitting below a certain power level. Similar techniques can be used to coordinate transmissions by different controllers in the same radio network, in which each controller can be informed about the SFR (Soft Frequency Reuse) power assignments via a management system or using a variant of the X2 interface.

Interference Control Techniques for Release 10 UEs

In some implementations, inter-cell control channel interference for hierarchical networks with closed access or range extension can be reduced by having the cells turn off (blank) power in all resource blocks in certain subframes. When no PDSCH data is transmitted in a subframe, there is also no control messages sent on the downlink control channel, which significantly reduces PDCCH interference. In some implementations, by configuring these blank frames as so-called MBSFN (Multicast/Broadcast Subframes), one can also reduce (e.g., eliminate) interference from CS-RS REs in the PDSCH region.

In an MBSFN subframe, CS-RS is only transmitted in the control region of the subframe. This reduces (e.g., eliminates) the CS-RS interference into PDSCH (although not necessarily to PDCCH) transmissions in neighboring cells. MBSFN subframes in LTE were developed in Release 8 to carry broadcast/multicast signals, but they can also be used to send no data at all. A cell can be configured to send MBSFN subframes according to a certain pattern, and the pattern can be communicated to UEs via the System Information Block (SIB). In some implementations, only 6 out of 10 subframes (e.g., #1, 2, 3 and 6, 7, 8) in a radio frame can be used for MBSFN. MBSFN frames have a control region of up to 1 OFDM symbol for 1 or 2 TX antennas and 2 OFDM symbols for 4 TX antennas.

Using blank MBSFN subframes alone may not eliminate inter-cell interference between PBCH, system information (SIB) and PSS/SSS transmissions. In some implementations, the inter-cell interference is between a small cell and a single macro cell, and the interference can be reduced or eliminated by offsetting the subframe numbering in the small cell relative to the macro cell. For example, if the relative subframe number of the small cell network has an offset of 2 relative to the macrocell network (e.g., subframe #0 in small cell network coincides with subframe #2 in the macrocell network), and macrocell subframes 2 and 7 are ABS/MBFSN subframes, small cell UEs can receive PSS/SSS and PBCH without any interference from the macrocell.

In some implementations, the macro cell coordinates its transmissions only with the controller and it is not necessary for the macro cell eNodeB to coordinate its transmissions with multiple base stations or RUs.

Coordinated MultiPoint (CoMP)

CoMP refers to techniques that involve coordination between neighboring cells to reduce the effects of inter-cell interference. Full-blown coordination is referred to as Joint Transmission (JT). In JT, two or more baseband modems cooperate to serve their UEs via all RUs that they jointly control. All available antennas can be used to serve one UE with Single-User MIMO or multiple UEs simultaneously using Multi-User MIMO. In some cases where JT is implemented, UEs send CSI feedback not only for the antenna ports of their serving cell, but also for antenna ports of neighboring cells.

Figure 20A:
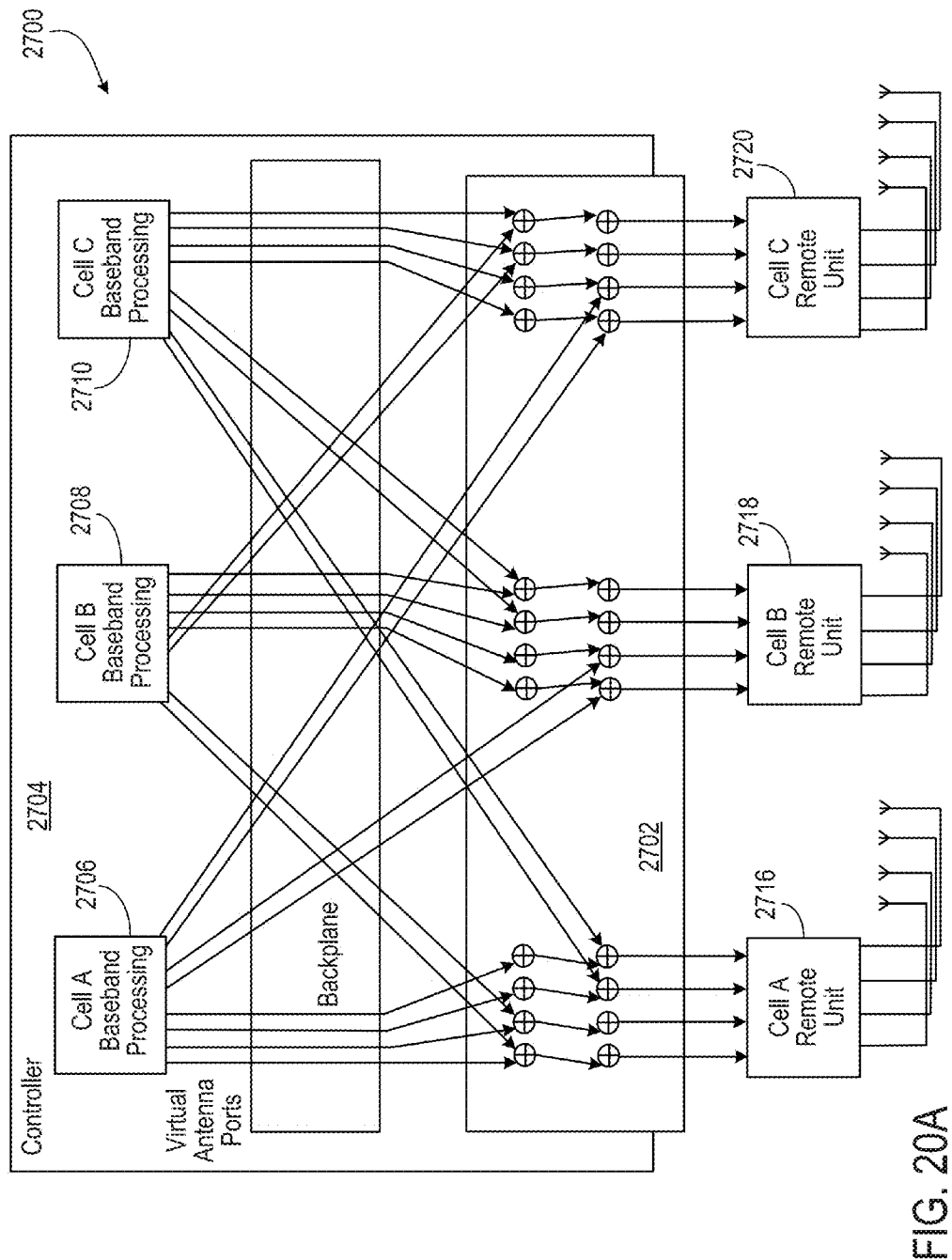
FIG. 20A to 20C are schematic diagrams showing examples of combining signals from different baseband modems at a controller and at the remote units, respectively.

In JT, similar to the single-cell multi-user MIMO, transport blocks for different UEs may be processed in parallel and then combined before the IFFT. However, different baseband modems handle the processing of transport blocks of UEs in different cells. In some implementations, the controller may include a coordination unit for coordinating scheduling indifferent baseband modems. The coordination unit may also serve as an aggregation point for combining processed transport blocks originating in different baseband modems. As an example, a radio network 2700 shown in FIG. 20A includes three cells formed by baseband modem 2706 and remote unit(s) 2716, baseband modem 2708 and remote unit(s) 2718, and baseband modem 2710 and remote unit(s) 2720. The controller 2704 controlling the three cells includes a coordination unit 2702, that serves as an aggregation point for combining (represented by the symbol "⊕") transport blocks originating from different modems 2706, 2708, 2710.

Figure 20B:
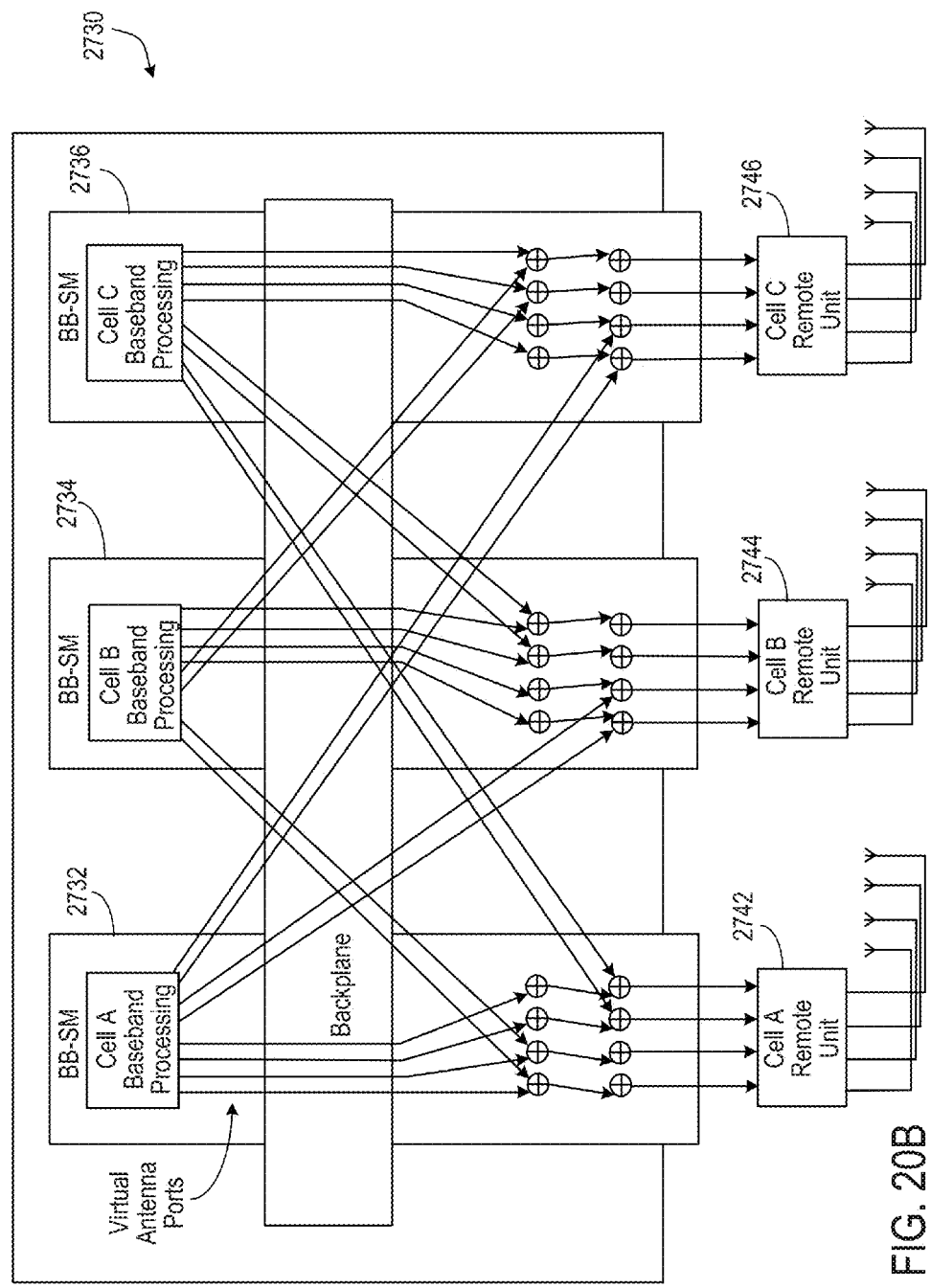

Alternatively, as shown in FIG. 20B, in a radio network 2730, baseband modems 2732, 2734, 2736 controlling cells that including remote unit(s) 2742, remote unit(s) 2744, remote unit(s) 2746, respectively, may directly exchange data among themselves so that each baseband modem can combine all signals destined to the UEs (not shown) they serve.

Figure 20C:
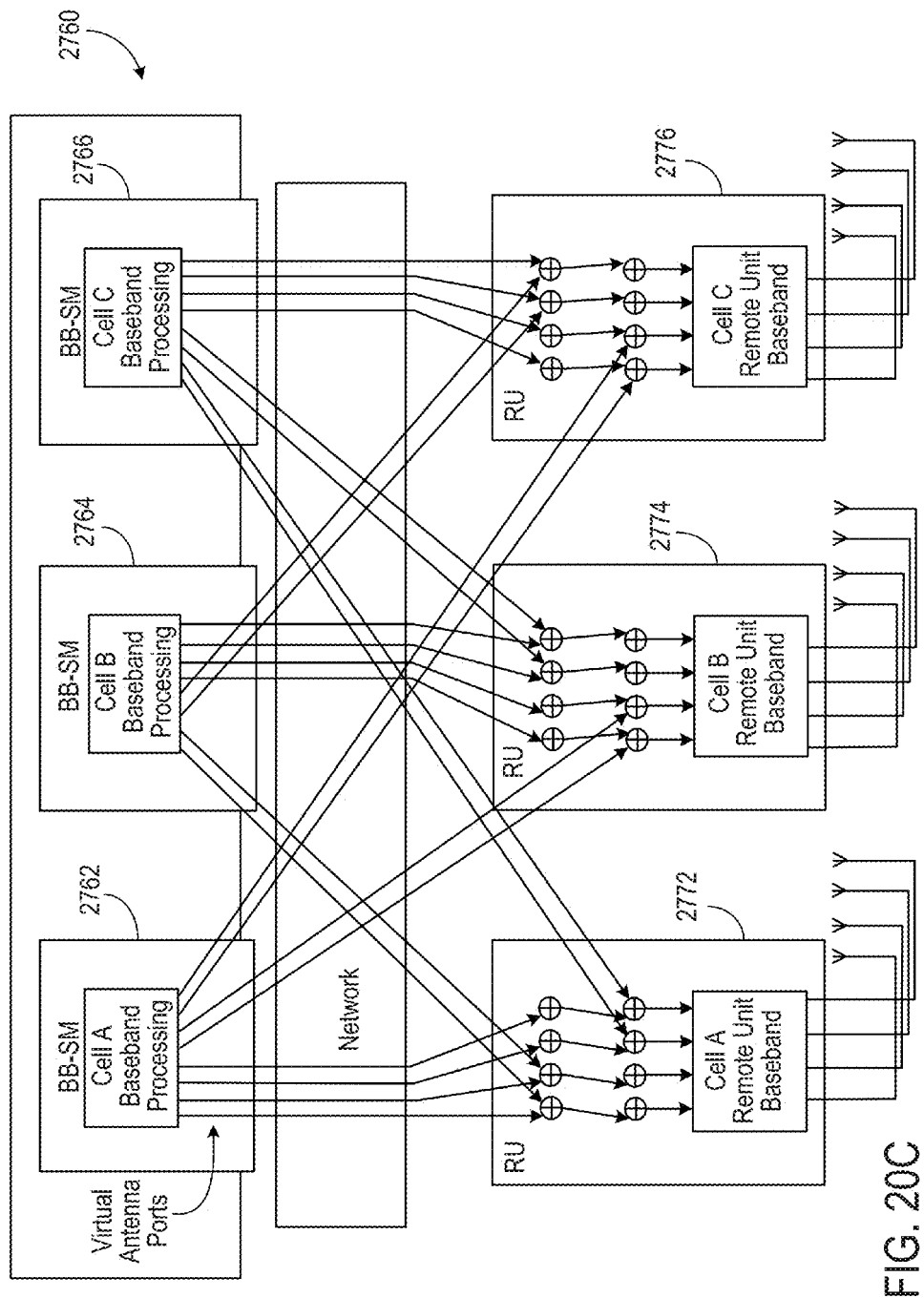

In some implementations, referring to FIG. 20C, in a radio network 2760, each baseband modem 2762, 2764, 2766 sends processed transport blocks to the RUs 2772, 2774, 2776 and the RUs perform the combining before applying the IFFT.

A somewhat reduced CoMP capability is called Dynamic Point Selection (DPS). In DPS, the serving cell sends PDSCH transmission on a time-frequency resource via only one cell TX antennas based on feedback cell selection received from the UE. The selected cell can be varied dynamically from one subframe to the next, and even between resource blocks within the same subframe. The selected cell may be different from the serving cell of the UE.

Another form of CoMP is Coordinated Beamforming (CB). In CB, when a serving cell is transmitting to a UE from its RUs, it also accounts for interference it will be creating for another UE in a neighboring cell. By choosing the precoding vector(s) to null the interference to the neighbor cell UE, the controller allows the baseband modem of a neighboring cell to serve the other UE at a higher data rate.

Release 11 has new capabilities to support coordinated transmission. For example, Release 11 allows UEs to report CSI for multiple CSI-RS, which may belong to different cells.

Communications Between the Controllers and the Remote Units

As explained previously, the CUs and the RUs of a radio network are connected through a switched Ethernet network (see, e.g., FIG. 3). In some implementations, the interface between the CUs and the RUs will carry time-domain IQ symbols (sometimes also referred to as signals) in Ethernet frames. However, the bit rate of the time-domain IQ symbols may be too high for an Ethernet network. In some implementations, instead of sending the time-domain IQ symbols a compressed representation of the time-domain IQ symbols is sent to reduce the bit rate and to provide a data rate between the CUs and the RUs that is compatible with the low-cost switched Ethernet network. In some implementations, on the downlink, the CUs of the radio network send the IQ symbols when they are in the frequency-domain and prior to performing the IFFT (inverse fast Fourier transform)

on the frequency-domain IQ symbols. A CU sends the frequency-domain IQ data representing each OFDM symbol to an RU, for example, by quantizing the real and imaginary components of the frequency-domain symbols. The quantizer output bits are then packetized in Ethernet frames and transmitted to the RUs over the Ethernet network. The RU reconstructs the quantized frequency-domain IQ symbols before applying the IFFT, inserting a cyclic prefix and performing the filtering, modulation and RF processing.

For the purpose of discussion, a radio network for a 10 MHz FDD LTE system is used as an example. For each TX antenna port, each OFDM symbol has 600 subcarriers and there are 14 OFDM symbols in every 1 ms subframe. Each subframe has 8,400 Resource Elements (REs) in total. Each RE corresponds to one subcarrier in one OFDM symbol. On the downlink, the first 1-3 OFDM symbols in a subframe are primarily used for control signaling (e.g., PDCCH, PHICH, and PCFICH) and the remaining OFDM symbols carry primarily user data on the shared data channel (PDSCH). Reference signals and other common channels are spread across the time-frequency axis.

Compressing the IQ symbols in the frequency domain can reduce the bit rate of the traffic sent over the Ethernet network. The compressed frequency-domain IQ symbols are transmitted over the Ethernet network without guard band zeros or any cyclic prefix. When the CU uses a 12-bit quantizer to compress the frequency-domain IQ symbols, the nominal bit rate of the frequency-domain IQ stream is about 403 Mb/s for 2 TX antennas and 806 Mb/s for 4 TX antennas. This represents a 45% reduction in bit rate compared to quantizing the time-domain IQ stream using the same quantizer (735 Mb/s for 2 TX antennas and 1471 Mb/s for 4 TX antennas). The rate between the CU and the RUs is reduced and the CU and the RUs are allowed to communicate through Ethernet links operating at a speed in the order of Gb/s with less latency.

On the uplink, in addition to RF processing and demodulation, the RUs remove the cyclic prefix from the time-domain IQ samples for each received OFDM symbol and apply the FFT to produce the frequency-domain IQ symbols. The information carried by the symbols is then quantized, packetized in Ethernet frames, and transmitted to the CU over the Ethernet network. When the 12-bit quantizer is used, the resulting bit rate of the frequency-domain IQ symbols on the uplink is substantially the same as that discussed for the downlink.

Described below are example techniques that may be used to reduce the data rate between the CU and the RUs.

Downlink Compression within a Cell

In some implementations, all antennas of the RUs that belong to the same antenna port in the same cell (unless explicitly specified as a virtual cell, the cells are physical) transmit the same LTE signal. Accordingly, on the downlink, for each antenna port the CU sends the same frequency-domain IQ symbol to each RU in the cell. The frequency-domain IQ symbols that the CU needs to send to the RUs include the CS-RS and CSI-RS reference signals, the control channels PDCCH, PCIFCH and PHICH, the shared data channel PDSCH, and the common channels PBCH and PSS/SSS.

In some implementations, the CU performs a simple form of compression by broadcasting the frequency-domain IQ symbols to all RUs in the cell using broadcast Ethernet frames. To implement the broadcast, all RUs in the same cell are configured to belong to the same VLAN (virtual local area network). The CU sends to its nearest Ethernet switch an Ethernet broadcast frame that carries an ID of the VLAN. The Ethernet switch in turn sends the Ethernet broadcast frame to all the RUs on the VLAN that are directly attached to the Ethernet switch and to other Ethernet switches that provide paths to other RUs on the same VLAN. In such implementations, traffic load on the Ethernet switches on the downlink does not grow with the number of RUs that belong to the same cell.

The broadcast on the Ethernet network and the implementation of the VLANs can simplify processing complexity and reduce the data rate between the CU and the Ethernet network. The reduction in the data rate is desirable to reduce the Ethernet frame size and latencies at the switches.

For the purpose of discussion, the previously introduced example of a radio network implementing the 10 MHz FDD LTE with 2 TX antennas is also used as an example in the discussion below. The 8,400 frequency-domain IQ symbols in each 1 ms subframe are organized in the form of a resource grid that has 600 OFDM subcarriers in 14 OFDM symbols. The 14 OFDM symbols are split into two time slots each having a length of 0.5 ms. Each time slot is further split into 50 PRBs (physical resource blocks), each containing 84 frequency-domain IQ symbols arranged in the form of a 7×12 grid. In some implementations, each PRB carries at most one PDSCH mixed with reference signals, such as the CS-RS and the CSI-RS. The PRBs can also carry one or more LTE downlink control channels PDCCH, PHICH or PCFICH, or the common channels PSS/SSS and PBCH, mixed with the CS-RS and the CSI-RS.

The downlink frequency-domain IQ symbols are discrete-amplitude symbols chosen from a signal constellation. The PSS/SSS is carried on frequency-domain IQ symbols that lie on a circle. The PDCCH, PCFICH, PBCH, CS-RS, CSI-RS and DM-RS are carried on frequency-domain IQ symbols chosen from a QPSK/BPSK signal constellation. Without precoding, the frequency-domain IQ symbols that carry the PDSCH are chosen from a QPSK (quadrature phase-shift-keying), 16-QAM (quadrature amplitude modulation), or 64-QAM signal constellation. The PDSCH modulation order is chosen based on the signal quality reported by a UE. In the presence of precoding, the frequency-domain IQ symbols that carry PDSCH are based on the product of a precoding matrix with an input vector, whose components are symbols chosen from a QPSK, 16-QAM, or 64-QAM constellation.

The CU can choose downlink frequency-domain IQ symbols directly from a discrete-amplitude QAM constellation or by applying a matrix operation to symbols chosen from a discrete-amplitude QAM constellation. The average energy of the frequency-domain IQ symbols can vary between different downlink channels, but is fixed for a given channel within a Resource Element Group, or REG (for control channels) or a PRB (for PDSCH). A REG is a group of 4 consecutive REs in an OFDM symbol. In some implementations, the PDSCH on the $4^{th}$ OFDM symbol of the slot can have a different average energy level from those fixed average energy levels.

Methods of Compressing the Frequency-Domain IQ Symbols

The symbols transmitted between the CU and the RUs can be compressed in various ways. In the discussion below, the first three methods, Methods I, II, and III, are based on quantization, and the fourth method, Method IV, is based on modulation-level compression.

Fixed Quantization

In this method, the frequency-domain IQ symbols are quantized using a fixed uniform scalar quantizer having a fixed rate R and a fixed step size $\Delta$. The step size is selected by the CU based on the expected probability distribution of the frequency-domain IQ symbols. In implementations, the CU quantizes the real and imaginary components of the frequency-domain IQ symbols serially and transmits the binary data representing the quantized IQ symbols for each TX antenna to the RUs. The values of R and Δ are sent to the RUs when the RUs initially connect to the CU. The RUs use the information about the rate R and the step size Δ to reconstruct the frequency-domain IQ symbols based on the data received from the Ethernet network. In some implementations, when there is a major change in configuration of the radio network that changes R and/or Δ, the CU sends the modified R and/or Δ to the RUs. In the example with the 10 MHz FDD LTE having 2 TX antennas per RU and a fixed 12-bit quantizer, the quantized frequency-domain IQ stream has a data rate of 403 Mb/s between the CU and the RUs.

Adaptive Step-Size Quantization

Instead of applying a fixed quantizer step size Δ, in this example method, the step size is dynamically varied based on the average energy levels of the downlink channels, which can be different for different channels. Dynamically adjusting the quantizer step size can reduce the average mean-squared quantization errors for a given bit rate R of the quantizer. In some implementations, the dynamically adjusted step size can also be used to reduce the quantizer rate R without increasing the quantization error.

Information about the dynamically adjusted quantizer step sizes is contained in side information that a CU sends to the RUs. The RUs can reconstruct the quantized frequency-domain IQ symbols based on the step size information. In some implementations, the CU sends some side information to the RUs once per subframe, and the other side information once per-REG or once per-PRB. At the beginning of each subframe, the CU sends side information that contains information about the position of the CS-RS and the CSI-RS, the step size associated with the CS-RS and the CSI-RS, and the length of the control region. In some implementations, the information about the actual step size of the quantizer is sent before each REG (in the control region) or before sending any PDSCH data in each PRB (in the PDSCH region). The PDSCH energy levels can be different in the $4^{th}$ OFDM symbol of a time slot. Accordingly, two step sizes can be sent per PRB. The transmission of side information can be distributed across the subframe evenly to reduce the peak data rate. When each step size is represented by a 12-bit index, the side information takes less than 5 Mb/s of link capacity.

In some implementations, the same step size is used for both TX antennas of a RU to limit the amount of side information. In other implementations, the step sizes for the two TX antennas can be different.

The rate R of the quantizer is chosen so that the quantization noise does not impact the UE's receiver performance, including when the most demanding (e.g., most noise-sensitive) MCS (modulation and coding scheme) is used in PDSCH. In some implementations, a 9-bit or 10-bit quantizer delivers an SQNR (signal-to-quantization noise ratio) in the range of 50-60 dB, which is more than 20 dB higher than the target SINR (signal-to-interference-plus-noise ratio) required for uncoded 64-QAM. A quantizer rate of 9-10 bits can produce a maximum data rate of 302-336 Mb/s, which represents a 17-25% compression relative to the maximum data rate in Method I.

Adaptive Rate and Step Size Quantization

In a third compression method, both the rate R and the step size Δ of the quantizer are dynamically adjusted based on the quantization noise tolerance of each downlink channel. Dynamically varying the quantizer rate R can reduce the average data rate but does not reduce the peak data rate, and the reduced average data rate can reduce the average packet length and the latencies at the Ethernet switches.

The relationship between the quantizer rate R and the performance of the downlink channel is explained below using an example scenario where each UE has one RX antenna and each RU has one TX antenna. The discussions and the calculations can be readily extended to UEs and RUs that have more than one antenna. In the example, the frequency-domain IQ symbol r received by the UE can be written as:

$$r=(s+q)\times h+i+w,$$

where s represents a complex-valued frequency-domain IQ symbol having an average energy $E_s$, h is the corresponding complex-valued frequency-domain channel gain, q is the quantization noise, and i and w represent the received interference and thermal noise, respectively. The signal-to-quantization noise ratio of the quantizer, SQNR, is defined to be $E_s/E_q$, where $E_q$ is the average energy of the quantization noise.

The signal to interference plus noise (SINR) ratio received at the UE is denoted as SINR' and can be written as:

$$SINR' = E_s \times |h|^2 / (E_i + E_w + E_q|h|^2)$$
$$= SINR/(1 + SINR/SQNR),$$

where $SINR=E_s\times|h|^2/(E_i+E_w)$ is the SINR received at the UE in the absence of any quantization noise, $E_i$ is the energy of the interference noise, and $E_w$ is the energy of the thermal noise. Based on the equation for SINR', when SQNR>>SINR, SINR'≈SINR. In other words, in this example, the quantization noise does not have a substantial or noticeable impact on the performance of the signal received at the UE when SQNR>>SINR.

In this example, the SQNR increases with the quantizer rate R, e.g., by about 6 dB for every increment of R by 1 when R is large. If $SINR_{target}$ represents the desired SINR required at the UE for a given MCS (modulation and coding scheme) for reliable reception, implementing the quantization does not cause SINR' to drop noticeably below the $SINR_{target}$ when the quantizer rate R is chosen such that SQNR>>$SINR_{target}$. Accordingly, when the target SINR for a modulation format is low, the rate R (e.g., the accuracy) of the quantizer can be reduced.

In some implementations, the quantizer rate R for PDSCH transmission will be the highest for PDSCH MCS of 28 and will be the lowest for PDSCH MCS of 0, which respectively correspond to the most and least demanding (in terms of noise sensitivity) modulation and coding schemes currently supported in the LTE standard. In the control channels, the underlying modulation format is QPSK/BPSK and a relatively low quantizer rate R can be used. In some implementations, when a relatively low quantizer rate is used, the SINR received at UEs having good channel conditions can be reduced by the quantization noise. However, the reduced SINR does not substantially affect the performance of the UE when the reduced SINR is above the target SINR.

Similar to Method II, the CU sends side information that contains information about the step size of the quantizer to the RUs to help the RUs reconstruct the frequency-domain IQ symbols from the received data bits. In addition, the CU also dynamically sends the quantizer rate R to the RUs for each REG and PRB and for the reference signals CS-RS and CSI-RS. Dynamically varying the quantizer rate and step size can reduce the quantization noise caused by a fixed average quantizer rate. Alternatively, when a certain average amount of quantization noise is permissible for the signal transmissions, the average quantizer rate can be reduced when the quantizer rate is dynamically adjusted instead of being fixed.

In addition to compressing the symbols being sent to the RUs, the CU can further reduce the average data rate between the CU and the RUs by not sending any data for unused REGs or PRBs. For example, when only 50% of the REGs and PRBs in a time slot are in use, e.g., carrying data, the average data rate is further reduced by 50%.

When multiple TX antennas are used, the same quantizer rate and step size can be used for all antennas of each RU so that the amount of side information does not grow with the number of TX antennas. In some implementations, the quantizer rate and the step size can be different for each antenna and the average quantizer rate is then further reduced.

In the examples of the quantizers in Methods I-III, a scalar uniform quantizer is used because of its ease of implementation. However, these methods are equally applicable to other types of quantizers, such as non-uniform scalar quantizers, vector quantizers, etc. The step size and the rate of the quantizer are varied to adapt the quantizer to the characteristics of the quantized symbols. It is also possible to vary other parameters of the quantization process, such as the gain of the quantizer input.

Modulation-Level Compression

In this fourth example compression method, the CU sends the frequency-domain IQ symbols in the form of binary data based on the structure of the frequency-domain IQ symbols known to the CU and without implementing any quantization. As discussed previously, the frequency-domain IQ symbols belong to a discrete-amplitude signal constellation, or they can be derived by transforming modulation symbols chosen from a discrete-amplitude signal constellation. By sending binary data representing the discrete-amplitude signals along with side information required to apply any required transformations, the controller can avoid quantization noise.

In use, the CU sends the binary data representing the modulation symbols to the RUs one OFDM symbol at a time in the same order as the symbols are to be transmitted by the RUs over the air. In particular, the binary data that represents the control channels is sent in groups of REGs, and the binary data that represents the shared data channels is sent in groups of 12-symbol blocks that belong to the same PRB. Furthermore, at the beginning of each time slot, the CU sends some portions of side information to the RUs. Other portions of the side information are sent at the beginning of each REG in the control region and before sending the data in the first PDSCH OFDM symbol of that time slot. The RUs parse the received data and reconstruct the frequency-domain IQ symbols based on the side information.

In this method, some of the baseband modem transmitter functions are implemented in the CU and some other baseband modem transmitter functions are implemented in the RUs. For example, the forward-error correction function is implemented in the CU, whereas the precoding and the IFFT functions are implemented in the RUs. The downlink processing can be partitioned between the CU and the RU in many other ways. In some implementations, it is even possible to move the entire downlink modem processing to the RU. In this case the controller sends all necessary data, including the transport block data, to the RU along with all necessary side information. In some implementations, this will reduce, e.g., minimize, the data rate between the controller and the RUs, but may increase the amount of processing in the RUs. In some cases, the interface between the controller and the RUs is implemented using a so-called FAPI (Femto Application Platform Interface) developed by the Small Cell Forum, except that the FAPI will be implemented over an Ethernet network.

In some implementations that use downlink carrier aggregation, for example, by aggregating licensed carriers or a combination of licensed and unlicensed carriers, the RUs may implement the downlink Layer 1 functions for multiple carriers. In such examples, interface between the controller and the remote unit may support the transmission of PDSCH transport block data and control information for multiple carriers.

Described below is the representation of frequency-domain IQ symbols by binary data for each type of downlink channel.

CS-RS Reference Symbols

Figure 7:
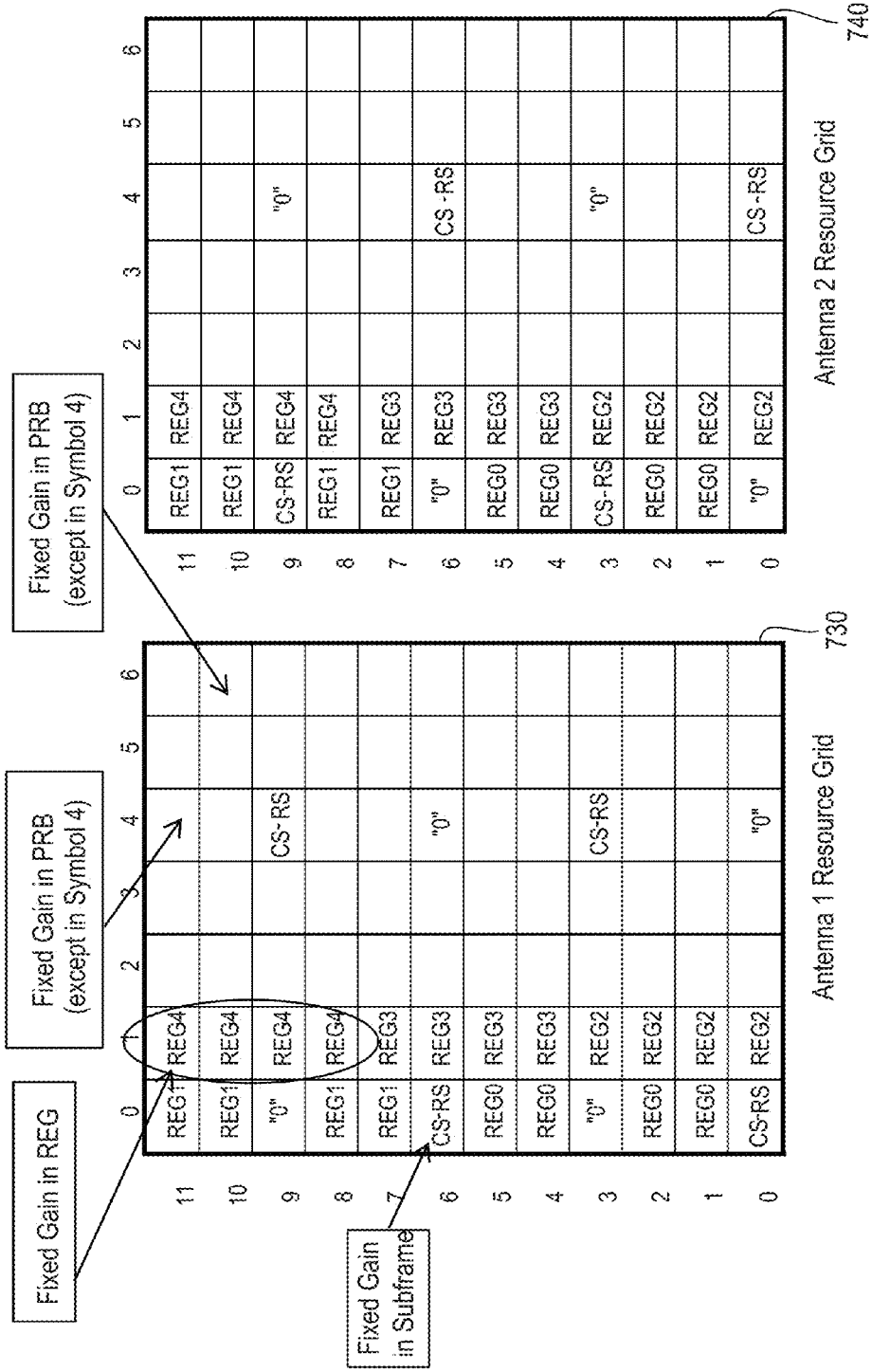
FIG. 7 is a block diagram showing examples of two resources grids for two corresponding antennas of a remote unit (RU).

The CS-RS reference symbols are complex-valued binary symbols chosen from a QPSK constellation, whose gain may remain constant during the subframe. When each RU has multiple TX antennas, the CS-RS reference symbols also include "zero" symbols to avoid interference between the antennas. The CS-RS reference symbols on different antennas differ only in their relative positions on the resource grid (see, e.g., grids 730, 740 of FIG. 7). The CU includes in the side information a 3-bit index to represent the CS-RS frequency shift and a 12-bit number to represent the gain. The side information is sent to the RUs at the beginning of each subframe, through which the RUs learn about the positions of all CS-RS reference symbols in the resource grid for all TX antennas, except for a fixed frequency index offset between 0 and 5. The frequency index offset depends on the Cell-ID. Based on the frequency index offset, the RUs can determine the position of the zero REs, for which no data bits need to be sent. For the nonzero CS-RS REs, two bits are sufficient to represent each CS-RS symbol. The RUs receiving the binary data, two bits for each RE, can reconstruct the IQ symbol by inserting the correct complex-valued CS-RS symbols and the "zero" REs into the resource grid for each TX antenna based on the side information.

CSI-RS Reference Symbols

The CU can handle the CSI-RS symbols used in Transmission Mode 9 of Release 10 similarly to the CS-RS reference symbols discussed in section (i). At the beginning of each subframe, the CU sends to the RUs side information to indicate the position of the CSI-RS symbols in the resource grid. The side information can be based on parameters such as CSI configuration, ZeroPower CSI-RS Index, scale factor, etc. Using the side information and the data received from the CU, which is two bits for each RE, the RUs can insert the correct complex-valued CSI-RS symbols and the "zero" REs into the resource grid for each TX antenna.

Control Symbols

The frequency-domain IQ symbols in the control region (e.g., the designated first 1-3 OFDM symbols) that are not used by CS-RS belong to PCIFCH, PHICH or PDCCH. In some implementations, the control symbols are represented by binary data on a per REG basis. Each REG has 4 REs that are contiguous, except for the CS-RS reference symbols inserted in between. Each control channel is carried in multiple REGs that are spread in frequency (e.g., the REGs are located in different parts of the transmission frequency band). For each REG, the CU sends side information to the RU for the RU to parse the received binary data. The side information is sent per REG and may include 2-bit data to represent the channel type (e.g., PDCCH, PCFICH, PHICH, or unused) and 12-bit data to represent channel gain. At the beginning of each subframe, the CU sends to the RU 2-bit side information to indicate a length of the control region. In some implementations, to process the received signals, the RUs do not need to know in advance the location of the different control channels in the control region.

When each RU has multiple TX antennas (e.g., N TX antennas, where N is an integer larger than 1), the radio network transmits the control symbols using Alamouti TX diversity. In implementations, the CU sends the 16-bit binary data that represents the 4 QPSK (quadrature phase shift keying) symbols in each REG to the RU. The RU implements sign change and conjugation operations for TX diversity to generate the 4×N QPSK symbols that represent the frequency-domain IQ symbols in the REG for all N TX antennas.

The PHICH can be represented by binary data based on the fact that the transmitted frequency-domain symbols for PHICH are also chosen from a discrete signal constellation. Each PHICH represents 1-bit of ACK/NAK (acknowledgement/negative acknowledgement) information for uplink HARQ (hybrid automatic repeat request). The PHICH bit is encoded into a complex-valued 12-symbol sequence chosen from a binary BPSK signal constellation with a 45 degree rotation. The CU can transmit binary data representing up to 8 PHICH bits together in a PHICH group. For the transmission, the complex-valued symbols representing all PHICH bits in the PHICH group are summed together to obtain 12 complex-valued PHICH group symbols. As can be seen these symbols are chosen from a discrete-amplitude constellation. The real and imaginary components of the 12 complex-valued PHICH group symbols can each be represented by an integer in the interval [−6, 6], together with a gain that may remain constant during the subframe. The 12 complex-valued PHICH group symbols are mapped to 3 REGs, e.g., in the first OFDM symbol of the control region after applying the TX diversity on a per REG basis. The CU sends to the RUs a gain value represented by a 12-bit index, followed by 8-bit data that represents the real and imaginary components of each complex-valued PHICH group symbol before applying the TX diversity. The RUs can use the received information to apply the TX diversity and reconstruct the frequency-domain IQ symbols for all TX antennas.

In some implementations, the PHICH symbols can also be transmitted using a 16-bit representation of the real and imaginary components of the frequency-domain IQ symbols for each antenna. Compared to the 8-bit representation, the data rate between the CU and the RUs for the 16-bit representation is higher; however, the RUs can reconstruct the frequency-domain IQ symbols in a simpler way.

PCFICH and PDCCH can also be readily represented by binary data and transmitted from the CU to the RUs. In particular, each REG for PCFICH or PDCCH carries 4 QPSK symbols, which are sent on multiple TX antennas using Alamouti TX diversity. The CU sends 2 bits of data per RE, or 8 bits of data per REG to the RUs, which represent the modulated symbols before TX diversity.

PDSCH Symbols

Most of the REs in the OFDM symbols that are outside the control region are used by PDSCH, except that the PBCH uses the middle 72 subcarriers in the first 4 OFDM symbols in the first time slot of every 10 ms radio frame, and that the PSS/SSS uses the middle 72 subcarriers in the last 2 OFDM symbols in time slots 0 and 10 of every 10 ms radio frame. The PDSCH symbols for single-antenna transmission are complex-valued and are chosen from a QPSK, 16-QAM or 64-QAM constellation, which can be represented by 2, 4 or 6 bits of data, respectively. The gain of a given PDSCH symbol may remain constant during the subframe (except possibly in the 4$^{th}$ OFDM symbol of each time slot), and the gain for different PDSCH channels can be different. Resources assigned to each PDSCH are in one or more consecutive VRBs (virtual resource blocks) and can be mapped to PRBs in a localized (consecutive) or distributed (non-consecutive) manner. In some implementations, the CU assumes that the PDSCH changes at every PRB boundary, and sends side information to the RUs on a per PRB basis. The update of side information on a per PRB basis can simplify the operation of the RUs in reconstructing the PDSCH symbols. In other implementations, localized resource allocation is used and the CU sends side information on a per channel basis, which is less frequent than sending the side information on a per PRB basis.

For the purpose of discussion, it is assumed that the CU sends the per-PRB side information before sending the first OFDM symbol of the time slot outside the control region. The side information includes a 1-bit index that indicates whether or not PDSCH symbols are present for transmission and another 1-bit index that indicates the presence of PSS/SSS in even-numbered time slots or the presence of PBCH in odd-numbered time slots. The side information also includes a 2-bit index that represents the modulation order (BPSK for DM-RS, QPSK, 16-QAM or 64-QAM), a 4-bit index that represents the PDSCH transmission mode (e.g., FIG. 8, TM#1-9), and an index representing the precoding coefficients or a 16-bit representation of each complex-valued precoding coefficient (TM#9). The side information is followed by binary data representing the PDSCH modulation symbols.

The RUs use the side information to complete the baseband modem operations and to generate the frequency-domain IQ symbols. In the implementations where the PDSCH uses Transmission Mode 9, the demodulation reference symbols (DM-RS) can also be viewed as QPSK symbols using the same gain as the PDSCH symbols. Accordingly, no special treatment may be required for the REs of DM-RS.

In the previously discussed example in which a radio network implements the 10 MHz FDD LTE, there are 50 PRBs in each 0.5 ms time slot. Each OFDM symbol that carries no CS-RS has 12 PDSCH REs in each PRB, whereas the OFDM symbols that carry CS-RS have 8 PDSCH REs per PRB (assuming that there are 2 TX antennas). A PRB that carries PBCH has 32 REs for the PDSCH.

When multiple antennas are in use for a PDSCH, the CU can reduce the amount of data that needs to be sent to the RUs based on the knowledge of the underlying structure of the multiple-antenna transmitter. The frequency-domain IQ symbols in TX diversity are chosen from a QAM constellation, and at least some of these IQ symbols are dependent on each other. For example, a group of $N^2$ frequency-domain IQ symbols transmitted on N TX antennas can be derived from N input modulation symbols, which are chosen from a discrete-amplitude complex-valued constellation, using operations such as sign changes or complex conjugations. Accordingly, instead of sending information for $N \times N = N^2$ frequency-domain IQ symbols, the CU can send information for the N input modulation symbols and indicate that TX diversity is used. The RUs can implement the TX diversity operations to produce the $N^2$ symbols for transmission in N subcarriers on N TX antennas. As a result, the data rate between the CU and the RUs does not increase when the number of TX antennas is increased.

In general, the frequency-domain IQ symbols for an N-antenna MIMO transmitter can be written as:

$$Y = P\, X,$$

where X is a K-dimensional PDSCH input vector whose components are chosen from the underlying QAM signal constellation, P is an N×K precoding matrix, and K is the number of layers being transmitted. Instead of quantizing Y as if it were some continuous random vector, the CU sends data bits that represent the K modulation symbols in the vector X along with the precoding matrix. The precoding matrix does not vary within a subframe, and, in some implementations, the CU only sends the precoding matrix once per PRB instead of once every OFDM symbol.

For Release 8 closed-loop MIMO, the precoding matrix is chosen from a fixed set and the precoding matrix can be represented by a short precoding index of a few bits. In the transmission Mode 9 of Release 10, less than 64 bits are needed to represent the precoder coefficients (16 bits per complex coefficient) (assuming that there are 2 TX antennas).

The data rate for the frequency-domain IQ symbols can be significantly reduced when the number of layers K is less than the number of the TX antennas N. The data rate increases with the number of layers. However, even when K=N (e.g., full-rank spatial multiplexing), sending binary data representing the QAM modulation symbols instead of sending the precoded frequency-domain IQ symbols can reduce the data rate and avoid quantization noise. To transmit K layers, the data rate for the PDSCH input data is K times the data rate for a single-layer.

Other Symbols

The CU can readily handle the binary representation of symbols on the other downlink common channels. For example, PBCH REs can be treated similarly to PDSCH using QPSK modulation and TX diversity. The CU can use 1 bit of side information to indicate the presence or the absence of the PBCH in odd time slots. In some implementations, the REs that carry the synchronization symbols PSS/SSS are sent without any compression as 16-bit integers to represent the real and imaginary components of the frequency-domain IQ symbols. Similarly, 1 bit of side information can be used to indicate the presence or the absence of PSS/SSS in even time slots.

Summary

In the methods described above, the downlink baseband modem functions are split between the CU and RUs in such a way that reduces the data rate on the Ethernet network, while keeping the processing complexity very low at the RUs. For example, using the specific partitioning described above, the bit rate on the Ethernet network can be reduced to around 100 Mb/s for two transmit antennas and two layer PDSCH transmission. Actual data rate will be even lower when the airlink resources are not 100% utilized. In addition to a lower bit rate, the method also eliminates quantization noise altogether. Other ways of partitioning the data between the CU and the RUs are possible. For example, it is possible for the RUs to perform all the physical layer functions, while the scheduling and higher-layer processing is performed in the CU.

Uplink Compression within a Cell

In some implementations, the LTE uplink in the example radio networks described herein is different from the downlink in many ways. For example, the uplink signals received by different RUs in the same cell are not identical. The different uplink signals can have different channel gains, noise and interference levels which can be exploited by the controller for power and diversity gains. However, when a cell contains multiple RUs and all RUs send their received signals to the CU, the CU receives a larger amount data on the uplink than it broadcasts to the RUs on the downlink.

Similar to the techniques used in downlink compression, the techniques for uplink compression also take into account one or more of the following additional differences between uplink and downlink. First, on the uplink, without full-blown demodulation and decoding, the RUs cannot know precisely the discrete-amplitude modulation symbols transmitted by the UEs.

Second, the modulation format on the LTE uplink, SC-FDMA (single carrier frequency division multiple access), is different from the OFDMA scheme used on the downlink. Instead of using the modulated symbols or their precoded versions as frequency-domain IQ symbols, the modulation symbols in SC-FDMA are time-domain signals. These time-domain signals are transformed by the UE into frequency-domain IQ symbols using a DFT (Discrete Fourier Transform). Compared to the symbols on the downlink, the frequency-domain IQ symbols obtained from the DFT transformation can exhibit a less uniform and more like a truncated Gaussian statistics, especially when the UE is assigned many RBs.

On the uplink, resources in a PRB are allocated on a contiguous manner, and frequency hopping may be utilized between two time slots of a subframe. As an example, the PUSCH PRBs (with DM-RS in the middle) assigned to a UE are consecutive and can hop between slots 0 and 1 with a known gap between them. The $4^{th}$ OFDM symbol of each assigned PUSCH PRB is DM-RS. The SRS, if present, is transmitted in the last symbol of the subframe, e.g., at every other subcarrier. The PUCCH transmissions include QPSK symbols modulating a complex-phase sequence and an orthogonal cover transmitted over two PRBs at the opposite edges of a band. In some implementations, multiple UEs can transmit PUCCH signals on the same PRBs in the same subframe. The first L (which is an integer) PRB pairs carry CQI/PMI/RI transmissions, possibly together with HARQ ACK/NAKs, using Format 2. Additional PRB pairs are available for HARQ ACK/NAKs and scheduling requests.

Figure 8:
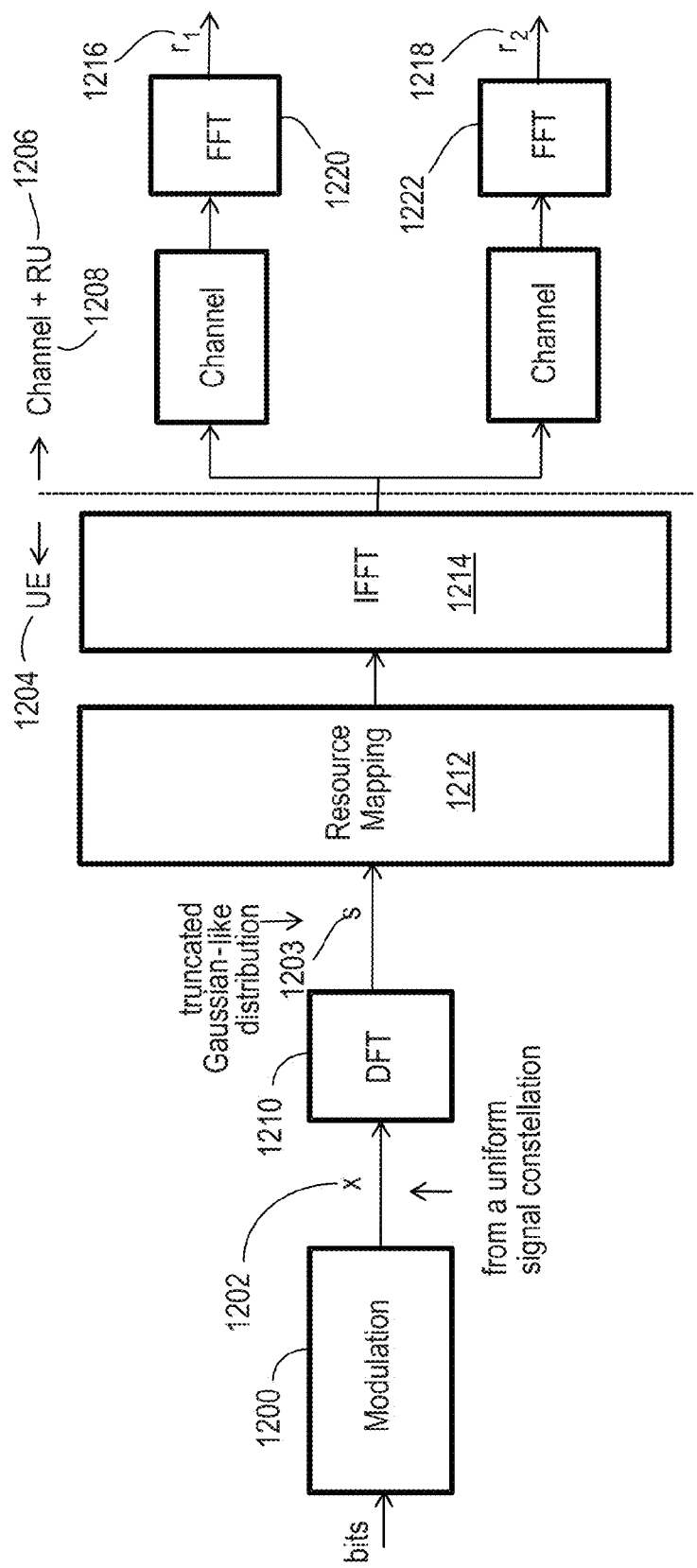
FIG. 8 is a block diagram showing an example of signal transmissions between user equipment (UE) and a remote unit (RU).

Referring to FIG. 8, for PUSCH transmission, a UE 1204 modulates 1200 and transforms 1210 time-domain symbols x 1202 into frequency-domain symbols s 1203, performs a resource mapping 1212, and then performs a full IFFT 1214 to generate the time-domain signals for transmission over the air to the RUs. One or more RUs 1206 in a cell receive the transmitted signals through one or more channels 1208 via its antennas, apply RF processing to generate the received time-domain IQ signals, and apply an FFT 1220, 1222 to produce the received frequency-domain IQ signals $r_1$ 1216, $r_2$ 1218.

Assuming that a cell includes K RUs, where K is a positive integer, and that the $k^{th}$ RU has two antennas for receiving signals (RX antennas) from a UE that has one TX antenna for transmitting the signals, the frequency-domain IQ symbol, $r_{kl}$, received at the $l^{th}$ RX antenna (l=1 or 2) of $k^{th}$ RU in some fixed frequency position in an OFDM symbol can be expressed in the following forms:

$$r_{k1} = S \times h_{k1} + i_{k1} + w_{k1},$$

$$r_{k2} = s \times h_{k2} + i_{k2} + w_{k2},$$

where s is the frequency-domain IQ symbol transmitted by the UE (see, e.g., FIG. 8), $h_{k1}$ and $h_{k2}$ are the channel coefficients, $i_{k1}$ and $i_{k2}$ represent interference from UEs in other cells, $w_{k1}$ and $w_{k2}$ are thermal noise, respectively for the two RX antennas.

The total energy levels of the received symbols $r_{k1}$ and $r_{k2}$ at the $k^{th}$ RU are:

$$E_{t,k1} = E_s \times |h_{k1}|^2 + E_{i,k1} + E_{w,k1},$$

where l=1, 2, $E_s \times |h_{k1}|^2$, $E_{i,k1}$ and $E_{w,k1}$ represent the average energy of the received symbols and the average energy of the interference and noise received via the $l^{th}$ receive antenna of the $k^{th}$ RU, respectively. Generally, the average energies of the received symbols, $E_s|h_{k1}|^2$, are different on different uplink channels because the required SINR at these channels changes based on the PUCCH Format (Format 1, 1a, 1b, 2, 2a, 2b) and the PUSCH MCS (e.g., QPSK or 64-QAM). The interference energy, which is caused by other UE transmissions in nearby cells, can also vary among different PRBs, which can cause additional variations in the energy levels of the received symbols at the RUs.

The RUs implement the uplink compression using a quantizer to reduce the data rate of transmissions from the RUs to the CUs. For the purpose of discussion, we assume that the quantizer is a uniform scalar quantizer having a rate $R_{k1}$ and a step size $\Delta_{k1}$ and quantizes the real and imaginary components of the received frequency-domain IQ symbols independently at the lth antenna of the $k^{th}$ RU. Other quantization techniques, such as non-uniform scalar quantization or vector quantization, can also be used with the techniques described herein.

Figure 9:
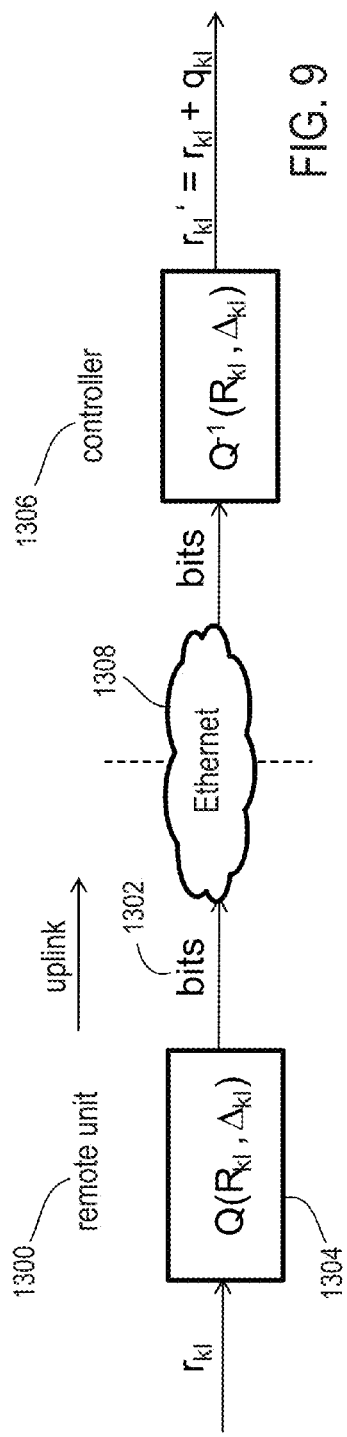
FIG. 9 is a block diagram showing an example of uplink compression.

Referring to FIG. 9, the RU 1300 sends the bits 1302 that represent an output of the quantizer 1304 to the CU 1306 in Ethernet frames through an Ethernet network 1308. The CU 1306 reconstructs a quantized version $r_{k1}'$ of each received symbol rid:

$$r_{k1}' = S \times h_{k1} + i_{k1} + w_{k1} + q_{k1},$$

where $q_{k1}$ is the complex-valued quantization noise having an average energy $E_{q,k1}$. The performance of the quantizer 1304 can be measured by its signal-to-quantization noise ratio (SQNR), which is defined as:

$$SQNR_{k1} = E_{t,k1}/E_{q,k1},$$

where $E_{q,k1} = 2 \times MSE$ and MSE is the mean-squared error of the uniform scalar quantizer.

The quantized symbols are sent to the CU through the Ethernet network. In some implementations, the rate $R_{k1}$ of the quantizer is chosen so that the quantization noise does not substantially affect the performance of the receivers at the CU. In the absence of quantization noise and assuming that the noise and interference received on all the antennas are uncorrelated, the performance of a receiver at the CU for MRC (a maximum-ratio combiner) can be represented by the effective SINR:

$$SINR = \Sigma_k(SINR_{k1} + SINR_{k2}),$$

where $SINR_{k1} = E_s \times |h_{k1}|^2/(E_{i,k1} + E_{w,k1})$ is the SINR on the lth RX antenna of the $k^{th}$ RU.

When the interference $i_{k1}$ on different RX antennas is correlated, the CU receiving the compressed symbols from the RUs can apply IRC (interference rejection combining) The performance of the IRC is determined based on the sum of the SINRs on all RX antennas as shown by the above equation, except that each SINR for a given RX antenna includes the effect of the spatial whitening filter.

Next, the effect of non-zero quantization noise on the performance of the receivers at the CU is considered. The signal-to-interference-plus-noise-plus-quantization noise-ratio at the output of the MRC receiver in the CU, SINR', is:

$$SINR' = \Sigma_k(SINR_{k1}' + SINR_{k2}'),$$

where $SINR_{k1}' = E_s \times |h_{k1}|^2/(E_{i,k1} + E_{w,k1} + E_{q,k1}) = SINR_{k1}/(1 + (1 + SINR_{k1}/SQNR_{k1}))$.

In other words, the SINR' is the sum of the signal-to-interference-plus-noise-plus-quantization noise ratios at each branch of the MRC that receives quantized symbols from respective antennas in the cell. If the quantizer rates $R_{k1}$ are chosen for all antennas (for all k and l) such that:

$$SQNR_{k1} \gg 1 + SINR_{k1},$$

then $SINR_{k1}' \approx SINR_{k1}$, and SINR' approximately equals the ideal SINR with no quantization noise, e.g., $SINR' \approx SINR = \Sigma_k(SINR_{k1} + SINR_{k2})$.

The amount of degradation caused by the non-zero quantization noise in the effective $SINR_{k1}$ for each antenna of the RU can also be determined using the above formula. The amount can be calculated as $SINR_{k1}/SINR_{k1}'$, which can be written as a function of $SQNR_{k1}/(1+SINR_{k1})$.

Table 1 shows example amounts of degradation in $SINR_{k1}$ per RX antenna due to quantization noise as a function of the ratio $SQNR_{k1}/(1+SINR_{k1})$. The data in this example illustrates that when the $SQNR_{k1}$ is at least 20 dB above $1+SINR_{k1}$, the reduction in $SINR_{k1}$ due to the quantization noise is less than 0.05 dB.

TABLE 1

Reduction in $SINR_{kl}$ due to Quantization Noise.

| SQNR/(1 + SINR) (dB) | SINR/ SINR' (dB) |
|---|---|
| 0 | 3.01 |
| 5 | 1.19 |
| 10 | 0.41 |
| 15 | 0.14 |
| 20 | 0.04 |
| 25 | 0.01 |

Quantization Methods

Below, four different example quantization methods for uplink compression are described, with an increasing compression ratio from Method I to Method IV.

Fixed Quantization

In this example method, a fixed uniform scalar quantizer having a fixed rate $R_{k1} = R_0$ and a fixed step size $\Delta_{k1} = \Delta_0$ is used. As an example, $R_0 = 12$ and the quantized IQ stream is sent from a RU to the CU at a total bit rate of about 403 Mb/s for two RX antennas of the RU. Accordingly, the fixed quantizer having a step size of 12 bits can be implemented without a high level of complication and without substantially affecting the performance of the signal transmission. The data rate of 403 Mb/s between the CU and the RUs is relatively high. When K RUs are sending quantized frequency-domain IQ symbols at a data rate of 403 Mbps towards the CU for the same OFDM symbol, the aggregate bit rate between the nearest Ethernet switch and the CU is K×403 Mb/s, which can be relatively high for large K.

Adaptive Step-Size Quantization

In this example method, the quantization is implemented using a uniform scalar quantizer that has a fixed rate $R_{k1} = R_0$, and a step size $\Delta_{k1}$ that is adjusted dynamically. In some implementations, the step size may be updated on a per-PRB basis and independently for each antenna. For each OFDM symbol, the step sizes $\Delta_{k1}$ are individually varied for each uplink channel that uses resources on that OFDM symbol. For example, $\Delta_{k1}$ can be selected based on the average energy of the frequency-domain IQ symbols received in each uplink channel. In some implementations, the average energy of the IQ symbols on a given channel is estimated using the symbols to be quantized at the RUs. The step size of the quantizer can then be adjusted based on an assumed distribution of those symbols to be quantized. In some implementations, the distribution is determined based on the size of the DFT used by the UE. In some implementations, optimizing the step size dynamically and independently for each channel can allow signals to be transmitted from the RUs to the CU at a higher SQNR at the same data rate. In addition, optimizing the step size dynamically and independently for each channel can be used to lower the data rate without reducing the SQNR.

In some implementations, it may not be necessary to vary the quantizer step size $\Delta_{k1}$ in every OFDM symbol, e.g., when the average energy of a symbol received by the RU from a UE does not vary significantly within a subframe. In such implementations, the step size for the first OFDM symbol is determined using the received IQ symbols in the first OFDM symbol, e.g., to avoid delay. When the number of symbols available is insufficient to accurately estimate the average energy in the first OFDM symbol, the average energy estimate and the step size can be refined in subsequent OFDM symbols.

The quantizer rate $R_0$ is chosen to be high enough so that the performance of the receiver at the CU does not degrade for the highest MCS. For example, when $R_0=10$, the SQNR of the quantizer is about 52 dB (assuming a Gaussian input), which is more than 20 dB higher than the minimum SINR required for reliable communications at the highest uplink MCS.

As shown in Method I, an SQNR that is 20 dB above the minimum required SINR allows the receiver at the CU to operate with a performance degradation due to quantization of no more than 0.05 dB. A quantizer rate $R_0$ of 10 can produce an IQ data rate of about 336 Mb/s for two RX antennas of a RU. This represents a compression ratio of 10/12, or is 17% higher compared to the compression rate of Method I. Because the quantizer rate $R_0$ is fixed, all frequency-domain IQ symbols received by the RUs, including IQ symbols that carry no information, are quantized and sent to the CU. When an optimized step size is used, the value of the quantizer rate required to achieve a desired SQNR is lower than when the step size is not optimized.

Figure 10:
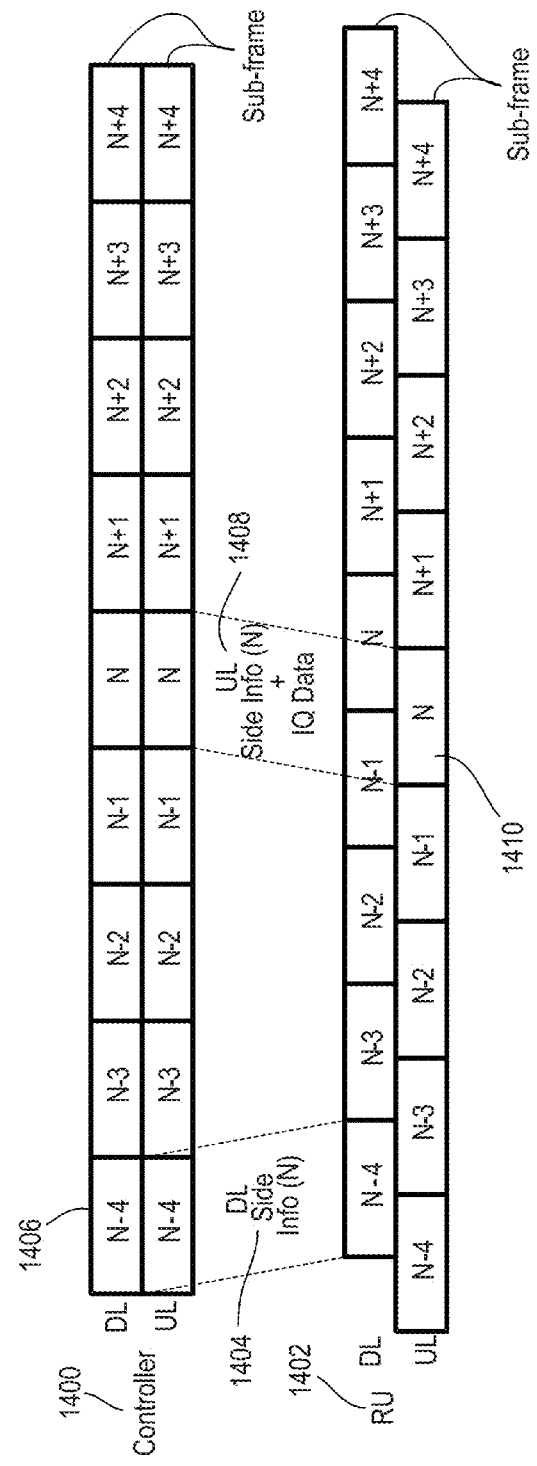
FIG. 10 is a block diagram showing an example of side information on the uplink and the downlink between a controller (CU) and a remote unit (RU).

The RUs use different step sizes for different PUSCH/PUCCH/SRS/PRACH channels based on information about the uplink channel boundaries received from the CU. In some implementations, the uplink channel boundaries for each PRB are indicated by downlink side information sent by the CU to the RUs. Referring to FIG. 10, the side information 1404 for use in an uplink (UL) subframe N is sent by the CU 1400 in the downlink (DL) subframe N−4 (1406) to the RUs 1402.

Examples of the downlink side information 1404, e.g., the contents and sizes, are as follows. The PUSCH or PUCCH PRBs assigned to the same channel are consecutive, and the channel boundaries for PUSCH and PUCCH can be indicated by a 6-bit position index and a 6-bit length field. The CU can also send indications of the channel type (e.g., PUSCH, PUCCH, SRS, PRACH, etc.) to the RUs using a 2-bit index to facilitate the RUs to model the statistical distribution of the received symbols. Furthermore, one bit of the side information can be used to indicate the presence of the SRS (sounding reference signal), which can occupy the last OFDM symbol of the subframe. Also, the position of the PRACH, when present, can be indicated by a 6-bit index.

Based on the knowledge of the PUSCH/PUCCH channel boundaries, the RUs determine for each OFDM symbol the average energy of the received frequency-domain IQ symbols that belong to the same channel (or from the same UE). The RUs then choose the step size $\Delta_{k1}$ of the quantizer based on the determined average energy. In some implementations, a RU determines the optimum step size without distinguishing the different channel types (e.g., PUSCH or PUCCH). In some implementations, a RU uses the downlink side information about the channel type to facilitate choosing the optimum step size without any measurement related to the received frequency-domain IQ symbols (e.g., average energy). For the SRS, the RUs can estimate the average energy across the entire OFDM symbol and determine the optimum step size. Alternatively, the RUs can split the subcarriers in an OFDM symbol that carries SRS into subbands and optimize the step size for each subband. In some implementations, a fixed pre-determined step size may be used to quantize the SRS signal. For the PRACH, the step size can be determined based on the peak power value of the received signal, or it may be fixed.

The RU may implement the uniform scalar quantization with variable step sizes by applying a gain $\gamma_{k1}$ to normalize the energy of the IQ symbols to be quantized. The RUs then quantize the real and imaginary components of the IQ symbols using a uniform scalar quantizer having a fixed step size $\Delta_{k1}=\Delta_1$. In some implementations, the real and imaginary components are symmetric, and the same gain and scalar quantizer can be used for both the real and the imaginary components.

The RUs send uplink side information about the selected step sizes to the CU, along with the data bits representing the quantized frequency-domain IQ symbols, based on which the CU reconstructs the received IQ symbols.

In some implementations, each step size of the quantizer is represented by a 12-bit index in the side information. In some implementations, the RUs update the step size in every OFDM symbol, which can increase the amount of side information transmitted in one time slot by up to a factor of 7. For the SRS, the RUs send to the CU the uplink side information about the step size for each subband before sending the data. For the PRACH, the information about the step size can be sent before the quantized PRACH data is sent.

Adaptive Rate and Step Size Quantization

In this method, in addition to dynamically adjusting the step size $\Delta_{k1}$ of the quantizer, the rate $R_{k1}$ of the quantizer is also dynamically adjusted for compressing (or quantizing) the IQ stream. In an example, PUSCH symbols that carry user data and PUSCH symbols that carry UCI (uplink control information) are not distinguished. Also, the same quantizer rate is applied to all symbols sent by the same UE.

The quantizer rate can be dynamically adjusted, for example on a per PRB basis. As discussed previously, for PRBs that carry PUSCH IQ symbols from a relatively low MCS, a lower quantizer rate can be used than the rate for the PRBs carrying PUSCH IQ symbols from a relatively high MCS. Similarly, some PRBs carrying PUCCH symbols can be quantized at a relatively low rate. The SINR required for these PRBs (for PUSCH or PUCCH) to provide a reliable reception at the CU can be relatively low. Accordingly, these PRBs can tolerate a relatively high level of quantization noise. Furthermore, those PRBs not carrying any data do not need to be quantized. The high tolerance of quantization noise and the reduced number of PRBs to be quantized on the uplink can save transmission bandwidth between the RUs and the CU. Adjusting the quantizer rate based on these considerations can reduce the average data rate on the uplink.

As discussed previously, the quantizer rate for each antenna of the RU is chosen to be relatively high such that $SQNR_{k1} \gg 1+SINR_{k1}$, where $SQNR_{k1}$ is the quantizer SQNR and $SINR_{k1}$ is the receiver SINR for the $l^{th}$ antenna of the $k^{th}$ RU of a cell. When such a relationship between the $SQNR_{k1}$ and the $SINR_{k1}$ is satisfied, the quantization noise is much lower than the interference plus noise seen on the antenna ($l^{th}$ antenna of the $k^{th}$ RU), and the effect of the quantization on $SINR_{k1}$ is small.

In some implementations, a RU does not determine the $SINR_{k1}$ on its own. Instead, the RU learns from the CU the target SINR, $SINR_{target}$, across all antennas of the cell. The $SINR_{target}$ is a function of the MCS used in each PRB. The CU uses the power control loop to drive the transmit powers of a UE to a baseline level, and the UE adjusts the baseline transmit power according to the MCS used in a given PRB so that the SINR in the eNodeB is approximately equal to the $SINR_{target}$.

In some implementations, the RUs choose the quantizer rate such that the quantization noise does not substantially reduce the SINR at the receiver of the CU to below the target SINR. When the CU controls the transmission power of the UE by accurately tracking channel changes, the SINR at the receiver of the CU approximately equals $SINR_{target}$. Furthermore, when $SQNR_{k1} \gg SINR_{target} > SINR_{k1}$, $SINR' = \Sigma_k (SINR_{k1}' + SINR_{k2}') \approx SINR_{target}$. In other words, in some implementations, the quantization noise does not substantially reduce the SINR at the receiver of the CU when the quantizer rate is chosen such that $SQNR \gg SINR_{target}$.

In summary, in some implementations, by selecting the quantizer rate such that $SQNR_{k1} \gg SINR_{target}$, a RU can quantize the IQ symbols without producing quantization noise that substantially affects the performance of the CU receiver or prevents reliable communication between the CU and the RU.

In the example techniques describe above, for a given PRB, the RUs in the same cell use the same quantizer rate for all antennas. In some implementations, the SINRs of different antennas ($SINR_{k1}$) can be significantly different. In such implementations, different quantizer rates can be chosen for antennas having different $SINR_{k1}$ in the same cell. For example, the quantizer rates can be chosen so that SQNR is proportional to $1+SINR_{k1}$. In particular, the quantizer rate for the antenna with a lower $SINR_{k1}$ may be chosen to be lower than the quantizer rate for an antenna with a higher $SINR_{k1}$. In some implementations, when the $SINR_{k1}$ of some antennas is too low relative to the total SINR, it is wasteful for the RUs to which those antennas belong to transmit the received IQ symbols to the CU. Significant IQ stream compression can be achieved when those RUs can determine that the signals received on their antennas do not contribute significantly to the overall SINR in the CU and purge or prune the signals (which is equivalent to using a quantizer rate of "0" for these signals).

An RU can adjust the quantizer rate based on the $SINR_{k1}$ seen on each antenna and additionally, the difference between the $SINR_{k1}$ on its different antennas and the $SINR_{k1}$ on other antennas in the same cell. In some implementations, the CU selects RUs from which to receive symbols. The CU can also determine the quantizer rate for each RU based on past UE transmissions. For example, the CU sets the quantizer rate to be zero for an antenna when it determines that the $SINR_{k1}$ of that antenna contributes to less than 5% of the total SINR.

In some implementations, the CU determines the quantizer rate for each antenna on a per UE basis at the time when the UE transmits a PRACH preamble. All RUs can be required to forward all PRACH preamble signals to the CU so that the CU can make an initial determination of the $SINR_{k1}$ for each antenna. The CU can then select the quantizer rate for each antenna and include this information in the downlink side information it sends to the RUs. The CU is capable of determining the quantizer rate for those RUs from which the CU receives PUSCH or PUCCH signals transmitted by a UE in a recent subframe. For RUs whose transmissions for a UE are purged, the CU can determine a quantizer rate based on the SRS sent by the UE at regular intervals. All RUs can be required to relay the SRS.

Based on the SRS and the PRACH preamble signals, the CU can determine the quantizer rate for all RUs in a cell. In addition, the CU can periodically request the RUs that previously have purged transmissions from the UE to send IQ symbols and use the IQ symbols to update the quantizer rate for those RUs. By adjusting the quantizer rate for different antennas, the average rate of the data sent from the RUs to the CU can be significantly reduced, especially when there are many RUs in a cell.

In some implementations, purging signals on the PUCCH may be difficult when multiple UEs share the same PUCCH resources. In such implementations, symbols on the PUCCH are transmitted without purging. The uplink transmission rate is not substantially affected because the PUCCH occupies a variable but relatively small percentage of the uplink resources. In some implementations, a fixed quantizer rate can be used for all antennas on the PRBs assigned to the PUCCH, even when PUCCH transmissions implement transmit diversity in which the same control information can be sent using different resources. In some implementations, other, e.g., more sophisticated, quantization and purging schemes can be used for the PUCCH when the radio network has a very large number (e.g., 16 or lager) of RUs in the cell.

The CU incorporates the quantizer rate for each PRB determined for each antenna in the downlink side information, which is used by the RUs. For those unallocated PRBs that carry no data or for antennas that do not significantly contribute to total SINR, the CU sets the quantizer rate to be zero. The side information sent by the CU to the RUs can also include other information, such as PUSCH MCS and PUCCH Format, and an index that represents the expected probability distribution of the frequency-domain IQ symbols in the PRB.

Similar to Method II, the CU sends the side information associated with uplink subframe N in downlink subframe N−4 (see, e.g., FIG. 10). The RUs use the side information received in downlink subframe N−4 to select the quantizer step size for each PRB in uplink subframe N. The step sizes are optimized similar to Method II, e.g., based on the measured average energy and the estimated probability distribution of the received IQ symbols. The RUs send the selected step size for each quantizer to the CU at the beginning of each OFDM symbol before transmitting the quantized IQ symbols. Generally, little uplink capacity is used to send the side information for the step sizes.

Quantization based on Method III may not reduce the peak rate of the uplink IQ data compared to Method II. However, the method can significantly lower the average bit rate. As an example, the average bit rate can be reduced by more than 50%, when only 50% of the uplink resources are in use. Adapting the quantizer rate using the techniques of this method can help reduce the average uplink data rate and the load on the Ethernet switches.

Predictive Quantization

In the previously example described Methods I, II, and III, the signals received on different antennas of the same RU are treated as uncorrelated. In this fourth example method, when the number of receive antennas is greater than the number of layers sent by a UE in spatial multiplexing, the correlation between signals received on different antennas of the same RU is used to further reduce the quantizer rate for PUSCH transmissions. In the Release 10 version of the LTE standard, the UE may transmit on multiple antenna ports. For the purpose of discussion, it is assumed that the UE transmits on the PUSCH using a single transmit antenna port.

As shown previously, signals received by the two antennas of the $k^{th}$ RU in a cell can be represented as:

$$r_{k1}=s \times h_{k1}+i_{k1}+w_{k1},$$

$$r_{k2}=s \times h_{k2}+i_{k2}+w_{k2}.$$

Furthermore, $r_{k2}$ can be expressed according to the following predictor equation:

$$r_{k2}=a_{k2} \times r_{k1}+z_{k2},$$

where the prediction coefficient $a_{k2}$ is given by:

$$a_{k2}=E\{r_{k2}r_{k1}*\}/E\{|r_{k1}|^2\},$$

and $z_{k2}$ is the prediction error and can be written as:

$$z_{k2}=r_{k2}-a_{k2}r_{k1}.$$

An RU can estimate the prediction coefficient $a_{k2}$ by calculating the average correlation between the signals received at the two antennas, and then dividing the result by the average energy of the signals received on the second antenna. The RU performs the estimation on a per UE basis based on information received from the CU.

Figure 11:
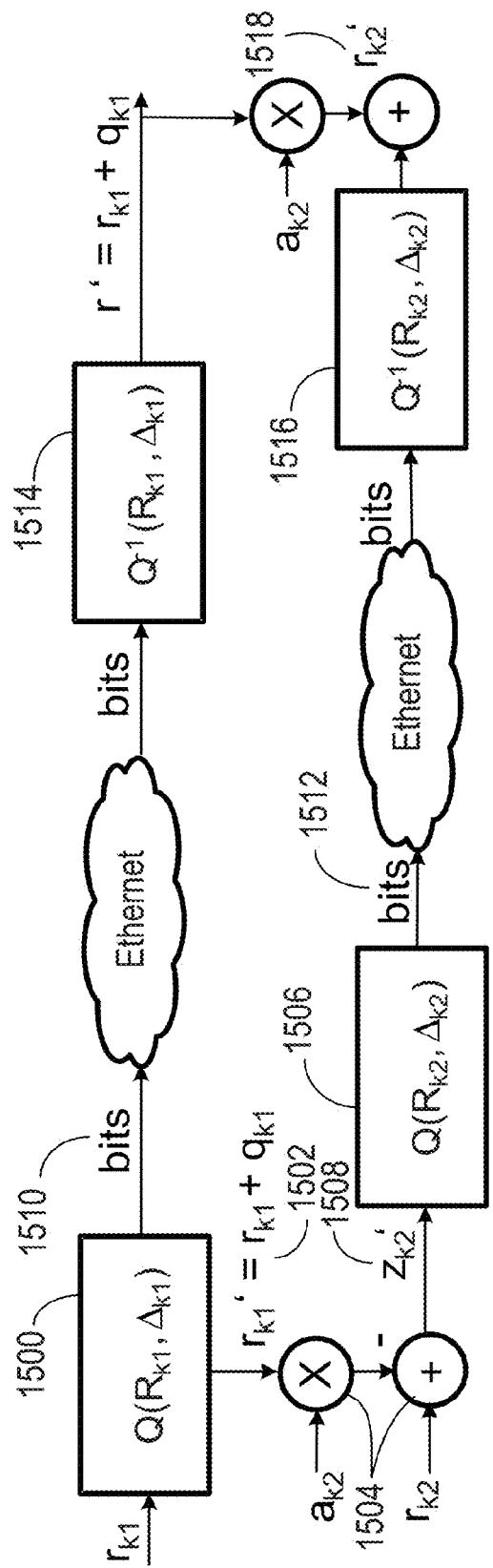
FIG. 11 is a block diagram showing an example of predictive quantization for the LTE Physical Uplink Shared Channel (PUSCH).

Referring to FIG. 11, the RU first quantizes $r_{k1}$ with a uniform scalar quantizer having a rate $R_{k1}$ and a step size $\Delta_{k1}$ to obtain the first quantized signal $r_{k1}'$ 1502, where $$r_{k1}'=r_{k1}+q_{k1}.$$

Here $q_{k1}$ is the quantization noise for the symbol received at the first antenna. The RU then uses $r_{k1}'$ to produce 1504 the prediction error $z_{k2}'=r_{k2}-a_{k2}r_{k1}'$, which is then quantized with another uniform scalar quantizer 1506 having a rate $R_{k2}$ and a step size $\Delta_{k2}$ to generate the second quantized signal.

$$z_{k2}''=r_{k2}-a_{k2}r_{k1}'+q_{k2}.$$

Here $q_{k2}$ is the quantization noise for the symbol received at the second antenna. Bits 1510, 1512 representing the quantized symbols $r_{k1}'$ and $z_{k2}''$ are sent to the CU, along with the prediction coefficient $a_{k2}$ and the quantizer information $R_{k1}$, $R_{k2}$, $\Delta_{k1}$ and $\Delta_{k2}$. The CU first reconstructs 1514, 1516 the quantized symbols $r_{k1}'$ and $z_{k2}'$ and then generates the quantized symbol $r_{k2}'$ 1518 according to $$r_{k2}'=z_{k2}''+a_{k2} \times r_{k1}=r_{k2}+q_{k2}.$$

The average energy of the symbol $z_{k2}''$ is lower than that of $r_{k2}$, and the quantizer rate $R_{k2}$ is generally lower than the quantizer rate used when the RU quantizes $r_{k2}$ directly without prediction. The lower quantizer rate can reduce the IQ rate.

Again, the SINR in the CU can be written as:

$$SINR'=\Sigma_k(SINR_{k1}'+SINR_{k2}'),$$

where $SINR_{k1}'=E_s \times |h_{k1}|^2/(E_{i,k1}'+E_{w,k1}+E_{q,k1}).$

For the first antenna, $SINR_{k1}'$ can be written as:

$$SINR_{k1}'=SINR_{k1}/(1+(1+SINR_{k1}/SQNR_{k1}).$$

Accordingly, in this example, when the quantizer rate for the first antenna is chosen such that $SQNR_{k1} \gg 1+SINR_{k1}$, the quantization noise does not substantially affect $SINR_{k1}'$.

Similarly, for the second antenna, $SINR_{k2}'$ can be written as:

$$SINR_{k2}'=SINR_{k2}/(1+[(1+SINR_k)/(1+SINR_{k1})/ \\ SQNR_{k2}])).$$

Here $SINR_k=SINR_{k1}'+SINR_{k2}'$ and is the total SINR in the CU for the $k^{th}$ RU. Accordingly, in this example, when $SQNR_{k2} \gg (1+SINR_k)/(1+SINR_{k1})$, the quantization noise introduced by the second quantizer does not substantially affect $SINR_{k2}'$.

In some implementations, the two antennas of a RU have the same SINR, e.g., $SINR_{k1}=SINR_{k2}$, and the condition for the quantization noise to not substantially affect the SINR at the CU can be simplified to:

$$SQNR_{k2} \gg (1+SINR_k)/(1+0.5 \times SINR_k).$$

When $SINR_k \gg 1$, $SQNR_{k2} \gg 2$. A uniform scalar quantizer having a rate of about 5-6 can readily satisfy this condition. The resulting IQ rate for the $2^{nd}$ antenna is reduced to about 84-101 Mb/s, representing a compression of more than 50%.

To implement the predictive quantization, in some implementations, the CU estimates the prediction coefficients, in addition to determining the quantization rate based on the predictive quantization. The estimated coefficients can be sent to the RUs in the downlink side information. Alternatively, the CU can determine the quantizer rate as discussed in Method III and without relying on predictive quantization. The RUs apply the prediction and send the prediction coefficient as part of the uplink side information to the CU. In some implementations, the CU determines the quantizer rate based on the predictive quantization, and the RUs determine the prediction coefficients and send the coefficients to the CU as part of the uplink side information.

Uplink Compression of the PRACH Preamble

When an idling UE has data to send or to receive, the UE establishes a connection with the eNodeB by sending a PRACH preamble to the eNodeB in some designated PRBs that are shared by all the UEs in a cell. In some implementations, each cell has 64 shared PRACH preamble sequences, some of which are designated for use in contention-free access and the others are divided into two subsets. In contention-free access, the eNodeB assigns a preamble to the UE. In other situations, the UE selects one of the two subsets based on the amount of data to be transmitted. The UE then randomly picks one of the preamble sequences in the selected subset.

A PRACH preamble uses 6 RBs at 1.08 MHz, and the positions of the 6 RBs are determined and signaled to the UEs by the CU. The PRACH preamble can last 1, 2 or 3 subframes, depending on the length of the cyclic prefix and the guard time. The PRACH opportunities can occur as frequently as once every 1 ms subframe or as infrequently as once every 20 ms.

In general, the UEs are not scheduled to transmit PUSCH on the PRBs assigned to PRACH. The CU can use non-adaptive HARQ on the uplink to prevent collisions between PRACH and HARQ retransmissions. The non-adaptive HARQ changes the RBs used in the transmission for collision avoidance. The PRACH opportunities can also be chosen to not overlap with the SRS or the PUCCH transmissions. The UE selects the transmit power for the PRACH preamble based on open-loop power control where the UE estimates the uplink signal loss based on a measurement of the downlink signal loss and gradually increases the transmit power after unsuccessful attempts.

The detection of the PRACH preamble can be implemented partially in the RU and partially in the CU. In some implementations, the RUs know the exact position of the PRACH opportunities and convert the received time-domain IQ symbols (at 15.36 MHz for the 10 MHz FDD LTE standards) into a lower-rate time-domain sequence (e.g., a rate of 1.28 MHz) using a time-domain frequency shift followed by decimation. The resulting sequence is then converted to frequency domain using an FFT (e.g., a 1024-point FFT for the 10 MHz FDD LTE standards). A frequency-domain correlation is performed between the FFT output and the frequency-domain representation of the root Zadoff-Chu sequence. The 64 PRACH preamble sequences are derived using a cyclic shift. The complex-valued output of the frequency-domain correlator is then converted back to a complex-valued time domain sequence using an IFFT (e.g., a 1024-point IFFT).

The RUs and the CU perform the next steps of detecting the PRACH collaboratively. For example, the RUs can compute a real-valued time-domain sequence of 1024 samples by summing the squares of the real and the imaginary components. The RUs can send this information to the CU for further processing. The CU, upon receiving the time-domain power sequence, performs a peak detection to determine the preamble cyclic shift. Such uplink PRACH transmissions are compressed in the time-domain such that data compressed in the time-domain is transmitted between the RUs and the CU.

Alternatively, the RUs can send the complex-valued output symbols of the IFFT to the CU and let the CU perform the remainder of the PRACH preamble detection. In some implementations, the RUs implement the peak detection, determine the preamble cyclic shift, and send the CU the cyclic shift information. The amount of data transmitted from the RUs to the CU for PRACH preamble detection is small. In the example of the 10 MHz FDD LTE, the amount of data ranges from a few bits to 12-20 Mb/s, depending on whether the real-valued power or the complex-valued IFFT outputs are sent.

In some implementations, when there is no substantial overlap between the PRACH transmissions and other uplink transmissions, no other transmissions are performed for the RBs that are transmitted on the PRACH.

For the RUs to correctly implement the PRACH preamble detection, the CU can provide the RUs with configuration information, such as the PRACH configuration index, PRACH frequency offset, PRACH Zadoff-Chu root sequence, etc. The CU can send this information to the RUs when the RUs are initially assigned to the CU or when the PRACH is modified.

The PRACH data may be quantized with a fixed rate quantizer, whose rate is pre-determined by the CU and sent to the RUs when the RUs initially connect to the CU. The quantizer step size may also be fixed, or it may be dynamically selected by the RUs based on the average energy of the received PRACH signal.

Synchronization

With the example systems described herein, there may be synchronization requirements that may not be applicable to classic base stations.

As explained above, in some example systems described herein, some parts of the baseband processing (e.g., modem functionality) and FFT/RF processing (e.g., radio functionality) are split between a central CU and multiple RUs (RUs) that are connected via a switched Ethernet network (as shown in the figures). In classic base stations, a GPS receiver is typically used to acquire time and frequency synchronization and since the modem and RF functions are co-located, they can be synchronized to the GPS receiver. In the example systems described herein, in some implementations, a GPS receiver is only available in the CU, and is not available in the RUs to keep the system cost low and to avoid the installation complexity. The CU can also acquire timing and frequency synchronization in other ways, for example from a network server or by listening to signals transmitted by a macro cell base station nearby. In some implementations, a timing transport protocol is used to carry a stable absolute timing phase and frequency reference that is traceable to coordinated universal time (UTC/GPS) from the CU to the RUs. The timing transport protocol can be based on the IEEE1588 protocol. In some implementations, clock frequency and the absolute timing phase derived by the RUs should be accurate enough to meet all 3GPP synchronization requirements and to ensure that UEs performance is not noticeably impacted by any frequency or timing phase error between the RUs and the CU and between the RUs themselves.

To deal with the variable packet delays in an Ethernet network, downlink air interface framing in the CU and uplink air interface framing in the RUs may be advanced by $T_{DL}$ and $T_{UL}$ seconds relative to each other. In some implementations, these framing advances $T_{DL}$ and $T_{UL}$ have to be greater than a sum of the respective Ethernet network delay between the CU and the RU and the timing phase error between the clocks in the CU and the RU. Since the worst-case clock error is small compared to the worst-case Ethernet delay, it has a lesser effect on the selection of the framing advances $T_{DL}$ and $T_{UL}$. When the actual network delay that a packet experiences exceeds the framing advance, buffer underflow will occur and physical layer transport packets will be lost. Such a loss can be recovered using retransmissions in HARQ, RLP or TCP layers, but at the expense of reduced transmission efficiency. Therefore, in some implementations, it is important that such underflow occurs rarely, and does not impact the user experience.

One of the features of the example systems described herein is their ability to serve UEs via multiple RUs that share the same cell. For example, as described above, multiple RUs may be controlled by a CU to define a cell, in which multiple UEs may be served. Assigning multiple RUs to the same cell may reduce the number of baseband modems used in the CU, avoid inter-cell interference and improve signal strength through macro-diversity. Sharing the same cell across multiple RUs may reduce the LTE system capacity available to individual users. In some implementations, as long as cell loading remains below 50% of cell capacity, no appreciable performance degradation will occur.

In order to implement cell sharing in the example systems described herein, in some implementations, the relative carrier frequencies of RUs in the same cell should be frequency synchronized in a way that is tighter than the frequency accuracy required from individual RUs. In some implementations, without such tight differential synchronization, the effective downlink channel seen by the UE may become time-varying in a manner similar to what happens when there is mobility and as a result the performance may degrade. Channel variations caused by mobility or by differential carrier frequency offset between RUs result in a mismatch between the channel measured using the reference signals and the channel actually experienced when demodulating the LTE Orthogonal Frequency-Division Multiplexing (OFDM) symbol.

The tight differential carrier frequency synchronization of RUs as described above may also be required between RUs that belong to different cells but use Rel. 11 downlink Coordinated Multipoint (Rel. 11 CoMP or simply "CoMP"). In CoMP, at a cell-edge, typically, downlink signals from two or more RUs that may belong to different cells could be received at a UE while the UE's uplink transmissions could also be received by these various RUs. If the downlink transmissions to a given UE can be coordinated, downlink performance can be enhanced. Likewise, if uplink transmissions can be scheduled in a coordinated manner, uplink performance can be enhanced. CoMP addresses issues such as interference mitigation and coordinated bit transmissions over the air interface.

When such tight synchronization cannot be maintained, downlink physical layer CoMP performance may degrade, potential CoMP gains may be reduced or lost or could even turn negative. Downlink CoMP is a part of the present disclosure, but tight differential synchronization requirements for some implementations of CoMP are not unique to the present disclosure and also apply to other LTE systems that use downlink CoMP.

When multiple RUs share the same cell, the timing phase of their transmissions also needs to be synchronized. This synchronization can also facilitate the radio network of this disclosure to combine uplink signals received by different RUs in the CU. In some implementations, such combinations require that all significant multipath signals received by different antennas fall within a time interval called cyclic prefix. The cyclic prefix corresponds to the first $N_{CP}$ samples in an OFDM symbol that are a replica of the last $N_{CP}$ samples in the same symbol. The cyclic prefix ensures that the transmitted subcarrier will remain orthogonal in the receiver, as long as the delay spread of the channel is less than the $N_{CP}$. When multiple RUs share the same cell and there is a timing phase offset between the RUs, the sum of this offset and the delay spread of the wireless channel can be controlled so as to not exceed the cyclic prefix length. In the LTE standard, the cyclic prefix is around 5 milliseconds. Therefore, it is desirable to keep the timing phase error between RUs much smaller than 5 milliseconds.

Following an explanation of example synchronization requirements for some implementations, there is also a description of how these requirements are addressed.

In this regard, synchronization, and the features described herein relating thereto, are example implementations. Different implementations of the example systems described herein may employ different synchronization methods and variations on any and all of the methods described herein. Any requirements specified in this disclosure relate to the specific example implementations described herein only, and are not requirements of any more general methods, apparatus, systems, and computer program products that may be claimed.

In an example implementation of the present disclosure, baseband operations up to the FFT input are performed in the CU and the remaining baseband operations (FFT, cyclic prefix, etc.) and the radios are implemented in the RUs. In another example implementation, on the downlink, baseband operations up to the modulation or layer mapping are implemented in the controller and the remaining baseband operations are implemented in the RUs. As previously explained, the CU and the RUs are separated by a switched Ethernet network that carries data between the CU and the RUs in packets or frames.

Synchronization Between the CU and the RUs

In some implementations, there is a VCTCXO crystal oscillator in the CU and VCTCXO crystal oscillators in all of the RUs. The VCTCXO in the CU is used to generate clocks required for the baseband processing in the CU and the VCTCXOs in the RUs are used to generate clocks for analog-digital-analog converters (A/D/As), RF synthesizers, and baseband processing performed in the RUs. In some implementations, only the CU has a GPS receiver or another timing synchronization mechanism that can generate a stable frequency-stable and phase-accurate clock reference and, therefore, there is a need to provide a frequency-stable and phase-accurate clock reference to the VCTCXOs in the RUs using IEEE1588 based timing synchronization. As described by the National Institute of Standards and Technology (NIST), the IEEE 1588 standard "defines a protocol enabling precise synchronization of clocks in measurement and control systems implemented with technologies such as network communication, local computing and distributed objects. The protocol . . . [is] . . . applicable to systems communicating by local area networks supporting multicast messaging including but not limited to Ethernet". The contents of the IEEE 1588-2002 as published in 2002 and as revised in 2008 are hereby incorporated by reference into this disclosure.

IEEE1588 is a time-stamping protocol, implemented over the UDP/IP protocol, between a master clock in the CU and slave clocks in the RU. The protocol involves repeated round-trip exchanges between the master and slave clocks, where each exchange produces a timing update signal that can be used to construct a timing reference signal in the RU. The master clock starts the exchange by sending a time stamp to the slave in the RU. This time stamp carries the time T1 as measured by the master clock at the time the time stamp leaves the Ethernet interface on the CU. The slave receives this time stamp when its local clock is at time T1'. The difference T1'−T1=$D_{DL}$+Δ is the sum of the unknown one-way travel delay $D_{DL}$ of the time stamp from the CU to the RU and the unknown clock phase errorΔ between the reference clock in the RU and the reference clock in the CU. In order to estimate (and cancel) the one-way downlink delay, the slave sends to the CU a second time stamp. This time stamp carries the time T2 as measured by the slave clock at the time the time stamp leaves the Ethernet interface on the RU. The master marks the time T2' on its local clock when it receives the time stamp on the Ethernet interface on the CU, and sends value T2' in a response message back to the slave. The difference T2'−T2=$D_{UL}$−Δ is the sum of the unknown one-way travel delay of the time stamp from the RU to the CU and the unknown clock phase error (−Δ) between the reference clock in the CU and the reference clock in the RU. If the one-way delay in the two directions were the same (e.g., $D_{DL}=D_{UL}$) and the phase of the reference clock in the CU does not drift relative to the reference clock in the RU during the exchange, the slave can estimate the clock error Δ by removing the effect of the one-way delays by computing:

$$\Delta'=[(T1'-T1)-(T2'-T2)]/2.$$

This clock phase error estimate Δ' can be used in the RU to produce a reference signal that closely tracks the timing reference signal (e.g., a GPS-derived, 1 Pulse Per Second (1PPS) signal) in the CU.

In some implementations, the one-way delays in the two directions are generally not equal, primarily due to asymmetric load-dependent delays in the switches (propagation and transmission delays are typically symmetric). To reduce the effect of such errors, IEEE 1588v2 introduced the ability for intermediate nodes, such as Ethernet switches, to measure the delays that the packets incur inside the node and insert this part of the delay into the time stamp packets as they traverse the node. Such 1588v2 support by Ethernet switches will allow the slave to estimate the round-trip delay without the asymmetric load-dependent network delays and produce a much more accurate estimate of the clock offset to drive the Phase Locked Loop (PLL). However, switches that support IEEE1588 tend to be more expensive and therefore there is a need to develop methods that can reduce or eliminate the effects of asymmetric network delays.

To the extent the IEEE1588v2 processes can be used to drive the timing phase error to zero, the reference clock in the RU can be perfectly aligned in phase and frequency with the reference clock in the CU, for example a GPS 1PPS signal.

In some implementations of the example systems described herein, the VCTCXO in the CU is used as the master clock to generate the timestamps for the IEEE1588 protocol. The RU's VCTCXO is disciplined using the time stamps received by the IEEE1588 slave. Intelligent time stamp transmission and processing may be used in the CU and the RUs to reduce or eliminate jitter introduced by random asymmetric Ethernet network delays between the CU and the RU. The timing of timestamp generation in the CU and in the RUs is orchestrated to reduce asymmetric delays. Timestamp generation and processing may be implemented on a System-on-Chip (SoC) in both the CU and the RU. Hardware-assist is used in this process to reduce the possibility that random asymmetric delays are introduced into the IEEE1588 processing.

If the time stamps are sent by the CUs and RUs in an uncoordinated manner, they may experience different delays on the uplink and downlink because of different levels of contention they encounter in the two directions. For example, if multiple RUs respond to a time stamp sent by the CU at about the same time, the uplink time stamps may experience significantly longer delays than the time stamps sent on the downlink. Contention between time stamps and IQ data may also contribute to increased latency and such latency may be different in the two directions.

Two metrics that can be used to assess the accuracy of the IEEE1588 timing synchronization method are the mean value and the variance of the clock error estimate $\Delta'$:

$$E\{\Delta'\} = E\{(T1'-T1)\} - E\{(T2'-T2)\}]/2$$
$$= [E\{D_{DL}+\Delta\} - E\{D_{UL}-\Delta\}]/2$$
$$= \Delta + E\{D_{DL}-D_{UL}\}/2,$$

where $E\{\ \}$ refers to statistical expectation or mean value of its argument. In other words, the mean of the timing estimate $\Delta'$ has a fixed bias which corresponds to the average delay difference between the uplink and the downlink, divided by 2. When the average delays on the DL and UL differ significantly, there could be a significant phase error in the average timing estimate. The variance of the timing estimate is proportional to the variance of ½ the difference between DL and UL delays.

$$E\{(\Delta'-E\{\Delta'\})^2\}=\text{variance}\{(D_{DL}-D_{UL})/2\}.$$

The mean-squared estimation error $E\{(\Delta'-\Delta)^2\}$ between the estimated clock phase error and the actual clock phase error will be higher than the variance of $\Delta'$ by the square of the bias:

$$E\{(\Delta'-\Delta)^2\}=\text{variance}\{D_{DL}-D_{UL}/2\}+[E\{D_{DL}-D_{UL}\}/2]^2$$

In some implementations, it is possible for the RU to accurately determine the ratio between the UL and DL delays; e.g., $D_{UL}/D_{DL}$=a. The RU can then modify the formula for the clock error estimate according to:

$$\Delta'=[a(T1'-T1)-(T2'-T2)]/(1+a).$$

To the extent the parameter "a" can be determined exactly, a perfect estimate of the clock error can be obtained with no bias; e.g., $E\{\Delta'\}=\Delta$ and variance $\{\Delta'\}=0$. In some implementations, it is difficult to know the uplink and downlink delays exactly in a consistent manner. Sometimes it may be possible to determine a functional relationship between the uplink and downlink delays on average. For example, if there is a known functional relationship between the average delays $D_1=E\{D_{DL}\}$ and $D_2=E\{D_{UL}\}$, then it is possible to reduce or even remove the bias term $E\{D_{DL}-D_{UL}\}/2$. For example, if $D_2=a\ D_1+b$, in other words the average delay in the UL is a known linear function of the average delay on the DL, then we can reduce or remove the bias by using a modified timing estimate given by the following:

$$\Delta'=[a(T1'-T1)+b-(T2'-T2)]/(1+a).$$

In this case, it can be shown that $E\{\Delta'\}=\Delta$, which is the correct estimate with no bias. It can be observed that in the special case where a=1 and b=0, this reduces to the case where the average delays on the UL and DL are the same and the timing estimate reduces to the standard 1588 timing estimation formula.

The variance of the timing phase estimate is now reduced to:

$$E\{(\Delta'-E\{\Delta'\})^2\}=E\{(\Delta'-\Delta)^2\}=\text{variance}\{a\ D_{DL}+b-D_{UL}/(1+a)\}.$$

Another method for reducing the mean-squared timing phase error is to reduce (e.g., minimize) both the mean and the variance of the average delay differential between the uplink and the downlink by controlling the transmission of the time stamps relative to each other and relative to the IQ data transmissions between the CU and the RU so as to avoid contention in the switches. Described below is an example method that may reduce the downlink and uplink delays.

Figure 18:
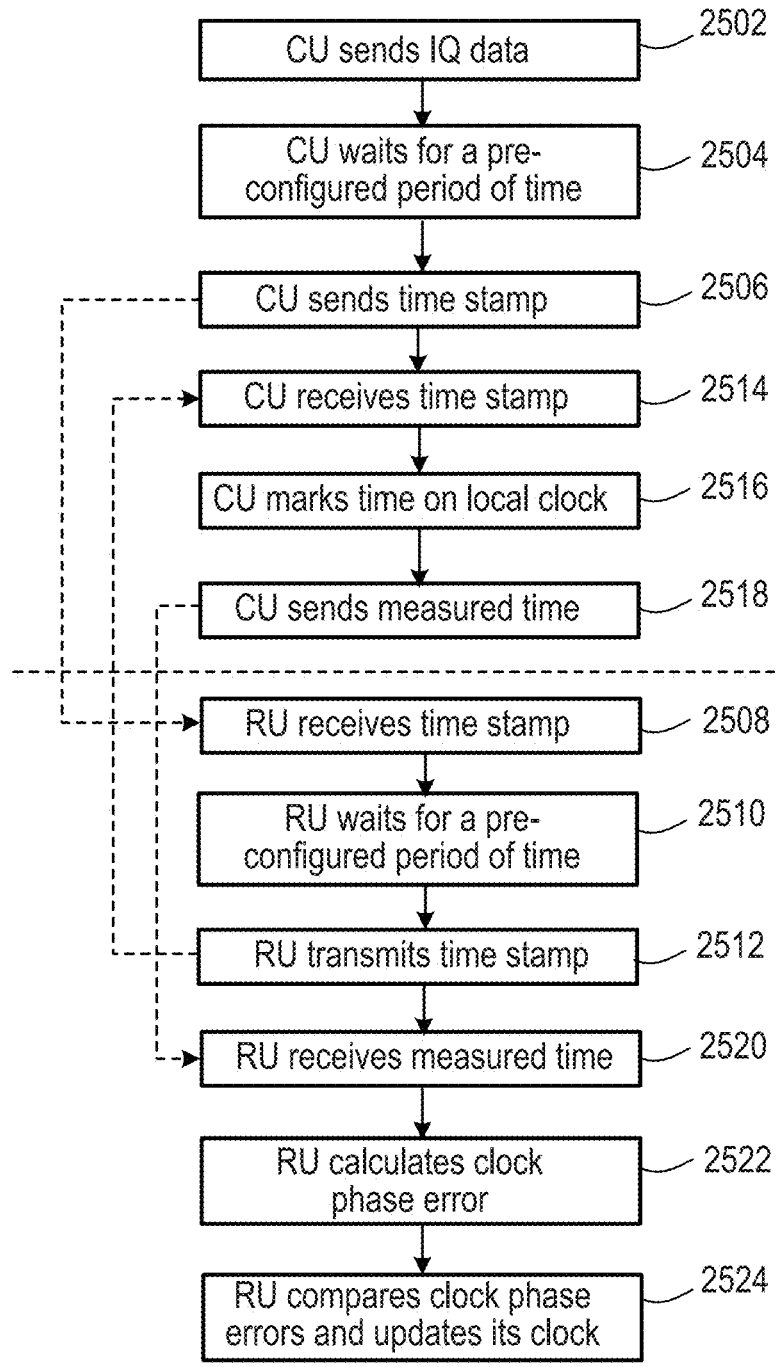
FIG. 18 is a flow diagram showing an example of synchronization between a controller and a remote unit.

In this method, the CU and each RU executes multiple time stamp exchanges during a given time interval A, e.g., 1 second. For example, the CU and the RU may execute 10 time stamp exchanges during a 1 second interval, where each time stamp exchange uses 3 IEEE1588 message transmissions as described earlier. In some implementations, referring to FIG. 18, the CU sends 2502 its time stamp in the beginning of the OFDM symbol interval. The CU then waits 2504 for some pre-configured period of time before transmitting 2506 its IQ data to allow time for the time stamp to travel through the switches. The time stamp transmissions are associated with of the highest priority. If a time stamp encounters contention from IQ data in the switches, it will at most wait for the transmission of the IQ data whose transmission has already started. Upon receiving 2508 the time stamp, the RU initiates the transmission of its own time stamp at randomly chosen intervals later. In some implementations, upon receiving the time stamp from the CU, the RU may wait 2510 a pre-configured time interval before transmitting 2512 the time stamp. The pre-configured time interval may also depend on the time when the RUs own uplink IQ data transmission is completed. The CU, upon receiving 2514 the RU's time stamp, marks 2516 the time on its local clock and sends this measured time to the RU in another IEEE1588 message. The RU upon receiving 2520 this message calculates 2522 an estimate of the clock phase error (or equivalently, a clock offset), but does not make any adjustment to its clock. In some implementations, the CU and the RU repeat the above exchange multiple times during the time interval A. At the end of the time interval, the RU compares 2524 the clock offsets and updates 2524 its clock based on the measurement that corresponds to the lowest clock offset.

In some implementations, the RU may compare the clock offset to a threshold value. If the clock offset exceeds the threshold value in magnitude, the RU does not update its clock during an interval A. In addition to computing the estimates for the clock offset, the RU can determine the round trip delay as $$D_{DL}+D_{UL}=[(T1'-T1)+(T2'-T2)].$$

A round trip delay may indicate that the IEEE1588 exchange has contention, and that the associated clock offset is inaccurate, and therefore, should not be used.

The CU also implements similar IEEE1588 exchanges with other RUs. In some implementations the CU may implement the IEEE1588 exchanges with different RUs in a non-overlapping fashion, so as to minimize contention in uplink time stamp transmissions. In some implementations, only one IEEE1588 exchange may be used for each RU during the time interval A.

If there are multiple controllers at the site sending traffic to the same output port of a switch, these transmissions may also create contention and increase latency. One way such contention may be avoided is to use a single controller to act as the master for all DL transmissions. In other words, all traffic may be routed through the master controller. Alternatively, a single controller may assume the master role only for the IEEE1588 operation. In this case, only the master controller will send time stamps to the RUs.

If the RUs and the controller support other traffic, such as Wi-Fi traffic, the transmission of the other traffic may also be timed to avoid contention in the switches. For example, additional Ethernet links may be used to avoid direct contention between such other traffic and the latency-sensitive IQ data and IEEE1588 time stamp traffic.

In some implementations, traffic associated with different controllers and other traffic, such as WiFi, can be segregated, e.g., strictly segregated, by assigning them to different VLANs and using dedicated Ethernet links and ports for the radio network to avoid contention. Ethernet QoS capabilities can be implemented to improve the performance of the above methods. Using priority levels defined in the 802.1p standard, time stamp transmissions can be given higher priority to minimize delays in switches that may be caused by IQ data transmissions.

Next, a description is provided of how uplink and downlink subframes transmitted across the switched Ethernet network should be aligned.

Frame Advance

Aligning the downlink and uplink transmissions at the antennas in a standalone eNodeB can create a slight misalignment in the eNodeB baseband processor. But, since the delay between the antennas and the baseband processor is relatively small, this has little, if any, impact on the system performance. However, in some implementations, a delay between baseband processing in the CU and the antennas near the RUs can be significantly higher than in a standalone eNodeB because of the delays introduced by the Ethernet network between the CU and the RUs. In some cases, the fixed delay between the CU and the RU can be in the order of 200-300 µs, or 3-4 OFDM symbol intervals. To compensate for this delay, one may advance the downlink subframe timing in the CU by a pre-determined amount of $T_{DL}$ seconds, where $T_{DL}$ is on the order of 200-300 µs in some implementations. If the uplink (UL) and downlink (DL) frames are aligned at the RU antenna then, as described below, an offset will occur between the UL and DL subframes in the baseband modem of the CU. One timing synchronization requirement in LTE is related to the relative timing phase of uplink transmissions from different UEs. This requirement, called the Uplink Timing Advance, is also implemented in the present disclosure. In Uplink Timing Advance, the UEs advance the timing phase of their uplink transmissions relative to received downlink transmissions based on commands received from the eNodeB. A standard eNodeB determines the timing advance commands to align the start of the received $n^{th}$ uplink subframe with the start of its own downlink transmission of the $n^{th}$ subframe at the antennas. If the UE's timing advance is set equal to the round-trip delay between the UE and the eNodeB antennas, the uplink signals from different UEs will be phase-aligned at the eNodeB antennas.

Figure 12:
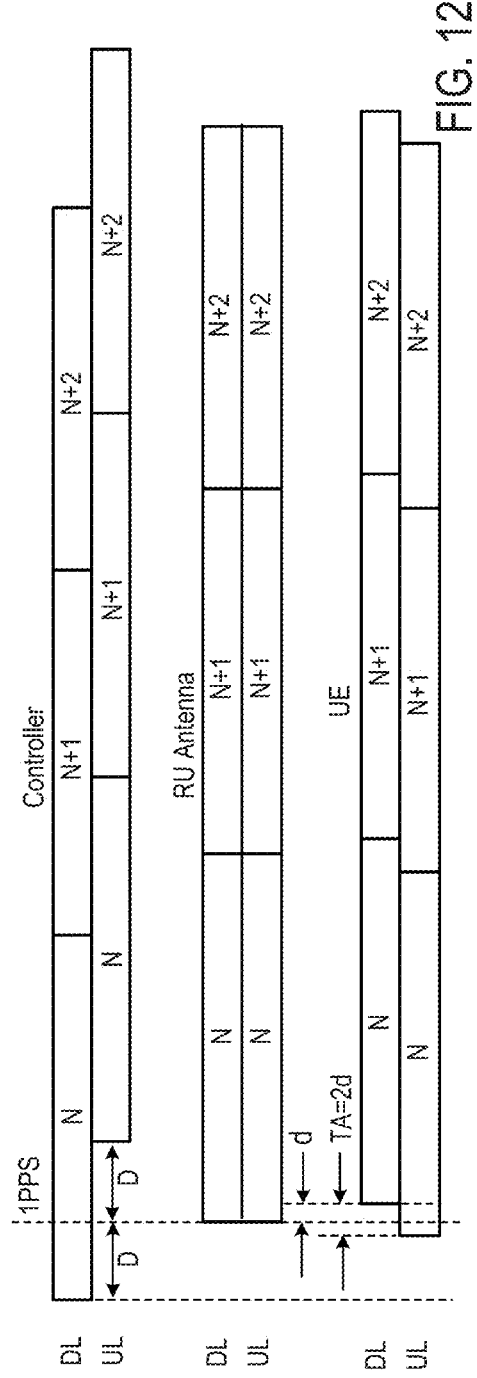
FIG. 12 is a diagram showing an example of subframe boundaries.

Accordingly, in the example systems described herein, uplink signals from different UEs are timing-phase aligned at the receive antennas of the RU such that these transmissions are all received within the cyclic prefix as explained earlier. One can then choose the timing advance (TA) according to TA=$t_{RT}$, where $t_{RT}$ is the mean round-trip delay between the UE and the nearby RU antennas. This would automatically align the DL subframe boundaries, which are phase-aligned with GPS 1PPS, with UL subframe boundaries at the RU antenna as shown in FIG. 12. However, the DL and UL subframe boundaries at the CU are now offset with respect to each other by $T_{RT}=T_{DL}+T_{UL}$, where $T_{DL}$ and $T_{UL}$ are the assumed fixed downlink and uplink frame timing advance between the CU and the RU, respectively. In summary, in the RU TX (transmit) antenna, the transmission of the n'th DL subframe starts at the same time as the reception of the n'th UL subframe, but in the CU the reception of the n'th UL frame occurs $T_{RT}$ seconds later than the start of the transmission of the n'th DL subframe. A drawback of this approach is that the HARQ processing time in the CU may be reduced by $T_{RT}$ seconds, which can be as high as 500 µs. In implementations where there is no delay between the RU and the CU, the controller has 3 ms available to process the signals received on the uplink and start the corresponding transmission on the downlink. Therefore, this could represent a reduction of 17% in processing time available in the CU.

Figure 13:
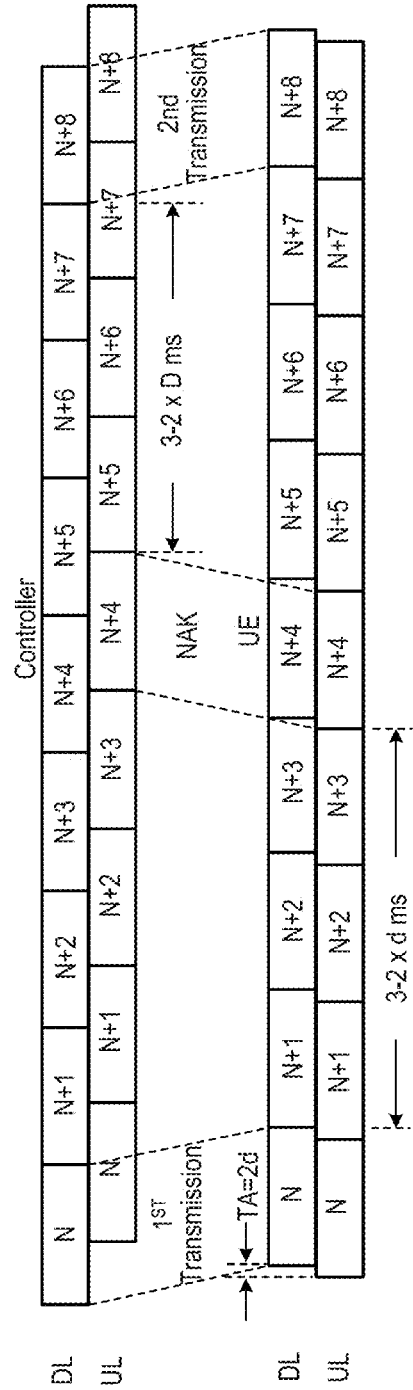
FIG. 13 is a diagram showing an example of downlink hybrid automatic repeat request (HARQ) operation.

Consider the downlink HARQ operation of FIG. 13, where the CU sends PDSCH data in DL subframe N, which is received by the UE after $T_{DL}+t_{DL}$ seconds. The UE sends an ACK/NAK message in uplink subframe N+4. If the timing advance TA=$t_{RT}$, as would be the case in a classic eNodeB, then from the end of DL subframe N to the beginning of UL subframe N+4, the UE has 3−TA=3−$t_{RT}$ ms to demodulate the DL subframe N, determine the ACK/NAK and construct the ACK/NAK message. From the time it receives the UL subframe N+4 carrying the ACK/NAK, the CU can have until the beginning of DL subframe N+8 to schedule a retransmission. When TA=$t_{RT}$, then from the end of the N+4'th UL subframe to the beginning of the N+8'th DL subframe, the CU will have only $3-T_{RT}$ ms available to start a retransmission. In other words, the available processing time in the CU is reduced by the round-trip delay between the CU and the antenna. In some implementations, the CU may delay the retransmission by taking advantage of so-called adaptive feature of the DL HARQ, though in some circumstances this may reduce the overall throughput. A similar reduction in available processing time also occurs in uplink HARQ, where the CU has $3-(T_{DL}+T_{UL})$ processing time between receiving an uplink transmission and sending an ACK/NAK on the downlink.

A method that can address the above issue is to increase the uplink timing advance TA by $T_{RT}$ for all the UEs. In some implementations, this does not affect the uplink timing phase alignment among UEs at the RU, since the timing advance is increased by the same amount for all the UEs. As explained above, increasing the timing advance reduces the HARQ processing time in the UE, but since all the UEs are designed to handle a maximum timing advance of 667 μs in some implementations, there should not be any problems as long as the timing advance is kept below this limit. The subframe alignment in this case is illustrated in FIG. 14.

As required, the DL subframes are phase aligned with GPS 1PPS at the TX antennas, but the UL subframes at the RX antennas are now offset by $T_{RT}$ seconds relative to GPS 1PPS. In other words, the RU will start processing UL subframe N $T_{RT}$ seconds before it starts processing DL subframe N.

Figure 16:
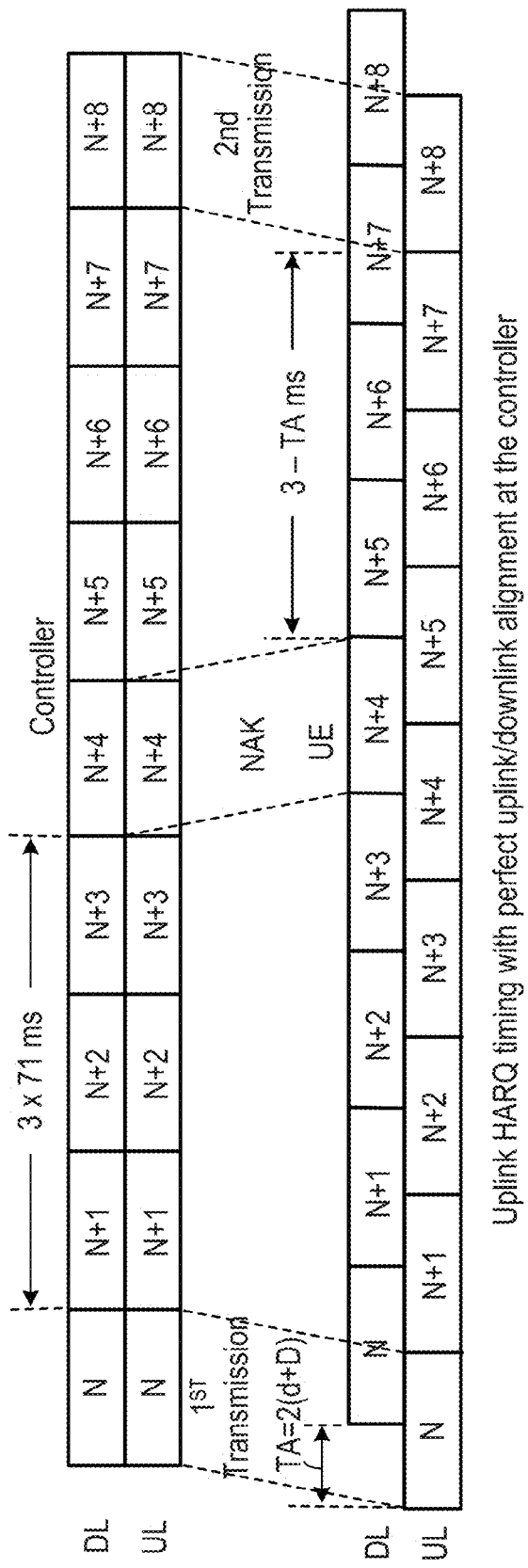

The revised HARQ timing for both downlink and the uplink are illustrated in FIGS. 15 and 16. In the examples shown in both figures, the processing time in the CU remains constant at 3 ms, whereas the processing time in the UE is reduced to $3-t_{RT}-T_{RT}$ ms, but is still within the bounds of UE's capabilities. It is possible to choose the timing advance to be anywhere between $t_{RT}$ and $t_{RT}+T_{RT}$.

Other enhancements also support excess timing advance to compensate for extra delay between the CU and the RUs. For example, the CU may send a Layer 2 or Layer 3 timing advance message to the UE to separately signal the component of timing advance that relates to over-the-air delay and the component that relates to delay between the CU and the RU. The fixed part of the timing advance may be included in a cell-specific broadcast message, such as a SIB message in LTE.

It is also possible to make the excess timing advance UE-specific.

When the UE applies a large timing advance TA, the preamble configuration for the Physical Random Access Channel (PRACH) needs to be selected accordingly to prevent the PRACH preamble transmission in subframe N from interfering with Physical Uplink Shared Channel (PUSCH)/Physical Uplink Control CHannel (PUCCH) transmissions in the next subframe N+1. The guard interval GI of the preamble should be greater than the timing advance TA or alternatively, the eNodeB should not schedule any PUSCH transmissions in subframe N+1 in the resource blocks assigned to PRACH in subframe N. PRACH preamble formats 1 and 3 support a TA of up to 0.52 and 0.72 ms, but use 2 and 3 subframes, respectively. PRACH preamble formats 0 and 2 only support a TA of up to 0.1 and 0.2 ms, using 1 and 2 subframes, respectively. PRACH preamble format 1 is suitable for the present disclosure if TA can be kept below 0.5 ms. Alternatively it is possible to use a format 0 and not to schedule any PUSCH transmission in the PRACH RBs in the uplink subframe immediately following the PRACH transmission.

In the CU the PRACH packets sent by the RU are stored in a PRACH buffer, separate from the UL buffer, and are processed as quickly as possible. The CU examines the 839-point energy sequence, determines whether a preamble is present and, if so, estimates the cyclic shift that was transmitted by the UE, and prepares the PRACH response message. While there is no strict timing requirement for the CU to send a PRACH response, in some implementations, this should be done as quickly as possible in order to improve the PRACH response time. FIG. 15 shows DL HARQ timing with UL/DL alignment at the controller. FIG. 16 shows UL HARQ timing with UL/DL alignment at the controller. Based on FIG. 16, the CU can send the PRACH response in subframe N+3.

In some implementations, the TA in the UE may be kept low, for example as low as the round-trip airlink delay, and one may accept the resulting reduced processing time in the controller. This may allow the radio network to use the Format 0 PRACH preamble, which uses less airlink resources for PRACH, or not have any restrictions in scheduling due to potential collisions with PRACH, as described earlier.

Frame Alignment for TD-LTE

Figure 19:
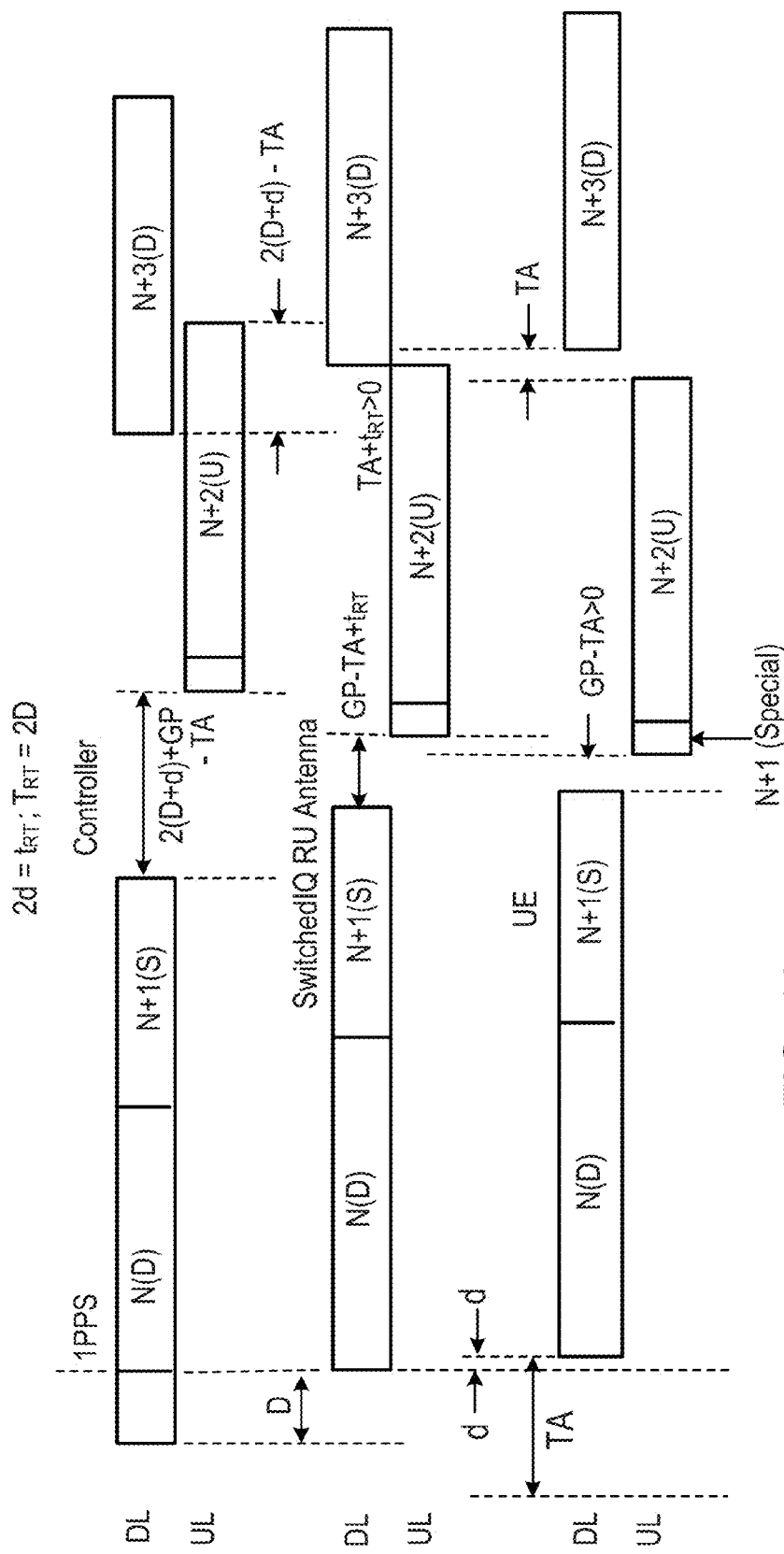
FIG. 19 is a schematic diagram showing an example of a special subframe used in transitioning from DL (downlink) transmission to UL (uplink) transmission.

In frame advance in FDD-LTE. In TD-LTE, the frame structure is designed such that uplink and downlink transmissions do not overlap at the RU and UE receive antennas. A special subframe can be used to transition from DL to UL transmission, as shown in FIG. 19. The special subframe starts with a few OFDM symbols of DL transmission, followed a silence gap interval GP that lasts a few OFDM symbols and ends with 1 or 2 OFDM symbols of UL transmission. The UL transmission in the special subframe can only carry SRS or PRACH (which needs two OFDM symbols). LTE standard supports 9 different configurations for the special subframe as shown in the Table 2.

TABLE 2

Subframe Configurations Supported by LTE.

| Special Subframe Configuration | DL | P | L | Total |
|---|---|---|---|---|
| 0 | 3 | 0 | | 14 |
| 1 | 9 | | | 14 |
| 2 | 11 | | | 14 |
| 3 | 11 | | | 14 |
| 4 | 12 | | | 14 |
| 5 | 3 | | | 14 |
| 6 | 9 | | | 14 |
| 7 | 10 | | | 14 |
| 8 | 11 | | | 14 |

As in FDD, the UE advances the UL frame timing relative to the received DL timing by TA seconds. This aligns transmissions by different UEs at the RU antennas. In TD-LTE, the maximum expected value of TA determines the gap interval GP. In order to avoid simultaneous DL and UL transmissions at the UE or RU receive antennas, GP is selected such that $GP \geq TA \geq t_{RT}$, where $t_{RT}$ represents the round-trip airlink propagation delay between the UE and RU antennas.

As shown in FIG. 19, if GP<TA, the UE's UL transmission at the end of the special subframe will interfere with the reception of the DL transmission in the beginning of the same special subframe. If GP<TA$-t_{RT}$, then the RUs DL transmission in the beginning of the special subframe will cause interference into the RUs reception of the UL transmission at the end of the special subframe. If TA<$t_{RT}$, then the RUs DL transmission immediately following an UL-to-DL transition will interfere with the RUs reception of the UE's last UL subframe transmission before the UL-to-DL transition.

In some implementations, it is possible for the controller to choose TA to align DL and UL transmissions at the controller as in FDD in order to preserve the 3 ms processing time. The special subframe configurations 0 or 5 can be used, which support a GP value (9 or 10 OFDM symbols) that is large enough to avoid the UL-DL interference described above. Sometimes, the large value of GP can cause inefficiency on DL transmissions.

In some implementations, a shorter TA value may be used for TD-LTE. In TD-LTE, the HARQ timing is different from that in FDD and depends on the specific TDD frame configuration. Table 3 shows the minimum HARQ timing requirements for the 9 different frame configurations that are supported in the standard. The frame configuration is sent by the controller in a SIB message.

are higher than that on the UL, configurations 2-5 can be used for in-building systems. In these configurations, the ACK/NAK time is fixed at 6 subframes, 2 subframes longer than in FDD. This gives the controller $5-T_{RL}+t_{RT}$ seconds of processing time. If TA is minimized by setting it equal to the round-trip airlink delay, e.g., $TA=t_{RT}$, then the available processing time is $5-T_{RT}$. If TA is chosen to also compensate for the controller-RU round-trip delay $T_{RT}$, e.g., $TA=T_{RT}+t_{RT}$, then the available time is 5 subframes, which is 2 subframes longer than in FDD.

Table 3 also shows example retransmission times. It can be seen that the DL retransmission time varies between 4 and 8 subframes, but for configurations 3-5 it is always equal to 4, the same as in FDD. The available processing time in the controller increases from $3-T_R$ to 3 ms as TA is increased from $t_{RT}$ to $t_{RT}+T_{RT}$. This is the same trade-off as in FDD. In the UL the retransmission time varies between 4 and 7 subframes. In the worst-case of 4 subframes, the available processing time in the UE is the same as in FDD.

TABLE 3

Minimum HARQ Timing Requirements for 9 Different Frame Configurations

| Subframe # | 0 | 1 | 2 | 3 | 4 | 5 | 6 | 7 | 8 | 9 |
|---|---|---|---|---|---|---|---|---|---|---|
| 0 | D | S | U | U | U | D | S | U | U | U |
| ACK/NAK | 4 | 6 | 4 | 7 | 6 | 4 | 6 | 4 | 7 | 6 |
| Re-Transmission | 6 | 4 | 6 | 4 | 4 | 6 | 4 | 6 | 4 | 4 |
| Total Time | 10 | 10 | 10 | 11 | 10 | 10 | 10 | 10 | 11 | 10 |
| 1 | D | S | U | U | D | D | S | U | U | D |
| ACK/NAK | 7 | 6 | 4 | 6 | 4 | 7 | 6 | 4 | 6 | 4 |
| Re-Transmission | 4 | 4 | 6 | 4 | 6 | 4 | 4 | 6 | 4 | 6 |
| Total Time | 11 | 10 | 10 | 10 | 10 | 11 | 10 | 10 | 10 | 10 |
| 2 | D | S | U | D | D | D | S | U | D | D |
| ACK/NAK | 7 | 6 | 6 | 4 | 8 | 7 | 6 | 6 | 4 | 8 |
| Re-Transmission | 4 | 4 | 4 | 4 | 4 | 4 | 4 | 4 | 4 | 4 |
| Total Time | 11 | 10 | 10 | 8 | 12 | 11 | 10 | 10 | 8 | 12 |
| 3 | D | S | U | U | U | D | D | D | D | D |
| ACK/NAK | 4 | 11 | 6 | 6 | 6 | 7 | 6 | 6 | 5 | 5 |
| Re-Transmission | 4 | 4 | 4 | 4 | 4 | 4 | 4 | 4 | 4 | 4 |
| Total Time | 8 | 15 | 10 | 10 | 10 | 11 | 10 | 10 | 9 | 9 |
| 4 | D | S | U | U | D | D | D | D | D | D |
| ACK/NAK | 12 | 11 | 6 | 6 | 8 | 7 | 7 | 6 | 5 | 4 |
| Re-Transmission | 4 | 4 | 4 | 4 | 4 | 4 | 4 | 4 | 4 | 4 |
| Total Time | 16 | 15 | 10 | 10 | 12 | 11 | 11 | 10 | 9 | 8 |
| 5 | D | S | U | D | D | D | D | D | D | D |
| ACK/NAK | 12 | 11 | 6 | 9 | 8 | 7 | 6 | 5 | 4 | 13 |
| Re-Transmission | 4 | 4 | 4 | 4 | 4 | 4 | 4 | 4 | 4 | 4 |
| Total Time | 16 | 15 | 10 | 13 | 12 | 11 | 10 | 9 | 8 | 17 |
| 6 | D | S | U | U | U | D | S | U | U | D |
| ACK/NAK | 7 | 7 | 4 | 6 | 6 | 7 | 7 | 4 | 7 | 5 |
| Re-Transmission | 8 | 7 | 6 | 4 | 4 | 7 | 6 | 6 | 7 | 5 |
| Total Time | 15 | 14 | 10 | 10 | 10 | 14 | 13 | 10 | 14 | 10 |

For each frame configuration, Table 3 shows example DL (D), UL (U) and Special (S) subframes in a radio frame. Configurations 3-5 support a single DL-UL transition and the other configurations support two DL-UL transitions within a 10 ms radio frame. For each frame configuration, Table 3 also shows the number of subframes between the transmission of the shared channel data and the transmission of ACK/NAK by the receiving node. In DL HARQ, the ACK/NAK time varies between 4 and 13 subframes. Sometimes the UE will have 3-TA ms processing time available, same as in FDD. In UL HARQ the ACK/NAK time varies between 4 and 7 subframes. When DL capacity requirements In TD-LTE PRACH opportunities are allowed in UL subframes. PRACH opportunities may also be created in special subframes when at least 2 OFDM symbols are assigned to PRACH (special subframe configurations 5-8). But in this case, the available silence interval is 288 samples (at 20 MHz), or 9.375 ns, which limits the round-trip airlink propagation delay to 9.375 ns, or about 1.4 km. This shows that in in-building networks, special subframes can be used for PRACH when UL/DL frames are aligned at the RUs and reduced processing time that may be available in the controller in certain configurations is accepted. The use of PRACH in normal UL subframes is the same as in FDD, except in TD-LTE multiple PRACH opportunities can be supported in a single subframe.

Implementations

Although various assumptions are made for the purpose of explanation, the example implementations of the systems and methods described in this disclosure are not limited by these assumptions. Instead, the explanation based on these assumptions can be readily generalized to other situations. For example, the numbers of RUs in each cell, the numbers of antennas for each RU, and the numbers of cells in a network can vary, e.g., based on the network demands.

In an aspect, this disclosure features a communication system comprising remote units and a controller. Each of the remote units may comprise one or more radio frequency (RF) units to exchange RF signals with mobile devices. At least some of the RF signals comprise information destined for, or originating from, a mobile device. The controller comprises one or more modems and is connected to an external network. At least one of the modems is a baseband modem and is configured to pass first data corresponding to the information. The at least one of the modems is configured to perform real-time scheduling of the first data corresponding to the information. The controller is separated from the remote units by an intermediate network. The intermediate network comprises a switched Ethernet network over which second data corresponding to the information is carried in frames between the controller and the remote units.

In another aspect, this disclosure features a communication system comprising remote units, a reference timing source, a controller, a controller clock, and a remote unit clock. The remote units exchange radio frequency (RF) signals with mobile devices. At least some of the RF signals comprise information destined for, or originating from, a mobile device. The reference timing source is synchronized with a coordinated universal time (UTC) or a Global Positioning System (GPS). The controller comprises one or more modems and is connected to an external network. At least one of the modems is a baseband modem and is configured to pass first data corresponding to the information. The controller is separated from the remote units by an intermediate network over which second data corresponding to the information is transmitted in frames between the controller and the remote units. The second data comprises baseband data. The controller clock is synchronized with the reference timing source. The controller clock provides timing information to the controller. The remote unit clock is synchronized with the controller clock. The remote unit clock provides timing information to a remote unit. The controller and the remote unit are configured to transmit time stamp messages to synchronize the controller clock and the remote unit clock. The controller and the remote units are configured to transmit the time stamp messages by avoiding contention between time stamp transmissions and baseband data transmissions or between time stamp transmissions of different remote units to the controller.

In another aspect, the disclosure features a communication system comprising remote units and a controller. The remote units exchange radio frequency (RF) signals with mobile devices. At least some of the RF signals comprise information destined for, or originating from, a mobile device. The controller comprises one or more modems and is connected to an external network. At least one of the modems is a baseband modem and is configured to pass first data corresponding to the information. The controller is separated from the remote units by an intermediate network over which second data corresponding to the information is carried in frames between the controller and the remote units. The second data comprises baseband data and the intermediate network is configured to transport in frames baseband data. At least some of the baseband data is compressed in a frequency domain. The remote units and the controller are configured to compress the baseband data for transmission over the intermediate network.

The aspects of the disclosure may also include one or more of the following features. The intermediate network comprises multiple switches. The external network comprises the Internet. The mobile devices are cellular communication devices that communicate using the long term evolution (LTE) standard. The remote units are configured to perform some modem functionality. The controller is devoid of RF radio functionality. The switched Ethernet network comprises multiple switches. At least one of the multiple switches is connected to at least one remote unit over a 1 gigabit/second Ethernet link. Each remote unit comprises multiple RF antennas and is configured to transmit and/or receive RF signals from one or more mobile devices simultaneously over one or more radio channels. The controller comprises one or more processing devices, the one or more processing devices being programmed to associate one or more of the modems with one or more of the remote units to thereby configure communication cells that comprise one or more remote units. The one or more processing devices are programmed to associate one or more of the modems with one or more of the remote units to thereby configure the communication cells dynamically. The one or more modems control a set of the remote units through the switched Ethernet network to form a cell, each remote unit in the cell comprising one or more antennas, the one or more antennas being associated with a common cell identifier. The common cell identifier comprises the long term evolution (LTE) Cell-ID. All remote units associated with the cell may be configured to communicate over a single long term evolution (LTE) channel. Each remote unit associated with the cell comprises a pair of antennas, and at least two pairs of antennas of remote units associated with the cell are controllable to communicate with a single pair of antennas on a single mobile device. Each remote unit associated with the cell comprises one or more antennas. Each antenna corresponds to a virtual antenna port. All antennas assigned to a same virtual antenna port simulcast a common signal. The remote units assigned to the same virtual antenna port carry the same LTE downlink reference signals associated with the same virtual antenna port. The virtual antenna port includes a Channel State Information Reference Signal (CSI-RS) scrambling ID. The mobile device sends more than one Channel State Information (CSI) feedback. Each of the antennas of the remote units is assigned to a different virtual antenna port. The remote units in the cell are synchronized to communicate using a same frequency. The remote units in the cell are configured to implement a network-based synchronization protocol to effect synchronization. The controller comprises one or more processing devices, the one or more processing devices being programmed to modify an association of one or more of the modems with one or more of the remote units to thereby re-configure existing communication cells defined by one or more remote units. Re-configuring existing communication cells comprises splitting at least one existing communication cell into two or more new communication cells. Re-configuring existing communication cells comprises combining at least two existing communication cells into a single new communication cell. The controller is configured to modify the association based on commands received from a management system. The controller is configured to modify the association based on time-of-day. The controller is configured to modify the association based on changes in a distribution of demand for communication capacity. The cell is configured to virtually split to send data to two or more mobile devices on the same resources without substantial interference based on radio frequency isolation between the two or more mobile devices. The resources are time-frequency resources of long term evolution (LTE). The controller is configured to determine which mobile devices to send data on the same resource based on signals received from the mobile devices. The mobile devices comprise receivers and the data sent to the receivers by the remote units in the cell is not on the time-frequency resource. The cell is configured to virtually split to receive information from two or more mobile devices on the same resources without substantial interference based on radio frequency isolation between the two or more mobile devices. Two or more mobile devices use the same demodulation reference sequence. The two or more mobile devices use the same PUCCH resource comprised of a cyclic shift and orthogonal cover code. The controller is configured to detect RACH preamble transmissions from the two or more mobile devices sent in the same PRACH opportunity. The controller comprises one or more processing devices, the one or more processing devices being programmed to associate one or more additional modems with one or more of the remote units in response to a change in demand for communication capacity. In response to a decrease in demand for network capacity, the one or more processing devices are programmed to consolidate the one or more remote units among a decreased number of the one or more modems. The cell is a first cell and the modem is a first modem; and the one or more modems comprise a second modem programmed to control a second set of the remote units through the switched Ethernet network to form a second cell, each RF unit in the second cell comprising one or more second antennas, the one or more second antennas being associated with a second common cell identifier. The first cell and the second cell comprise different numbers of remote units, different shapes, and/or transmit radio signals covering different sized areas. The controller comprises one or more processing devices, the one or more processing devices being programmed to associate the first and second modems with different remote units in order to dynamically change shape and/or an area covered by each of the first cell or the second cell. The first and second modems are co-located with the controller, and the controller coordinates the transmissions of the first and second modems to reduce interference between the first and second cells. At least one remote unit is configured to exchange Wi-Fi signals with a corresponding device. The controller comprises one or more processing devices, the one or more processing devices being programmed to receive second data from the switched Ethernet network and to process the second data to generate first data. At least some of the remote units are configured to receive power through the switched Ethernet network. The controller and the remote units are configured to communicate using the IEEE1588 protocol. The communication system also includes a network manager in communication with the controller that directs operation of the controller. The external network comprises an operator's core network and the network manager is located in the operator's core network. The network manager is located locally with respect to the controller. Two or more remote units are configured to send the second data to a mobile device on two or more RF channels so that the mobile receives the second data simultaneously from the two or more remote units. The controller is configured to aggregate communication from different channels between the controller and the remote units and the controller and the external network to process the first data and to send the second data to the remote units.

The aspects of the disclosure may also include one or more of the following features. The first data comprises Internet Protocol (IP) data and the controller is configured to perform real-time media access control of the IP data corresponding to the information. The reference timing source comprises a GPS receiver. The GPS receiver is located in the controller. The controller and the remote units are configured to exchange time stamps using the IEEE 1588 protocol. The controller and the remote units comprise a system-on-chip to generate and process the time stamp messages. The intermediate network is a switched Ethernet network. The remote unit uses the time stamp messages to estimate and correct an error of the remote unit clock. The estimation is based on a priori knowledge about downlink and uplink time stamp delays. The a priori knowledge about the downlink and uplink time stamp delays comprises a ratio of the downlink time stamp delay to the uplink time stamp delay. The a priori knowledge about the downlink and uplink time stamp delays comprises a ratio of an average downlink time stamp delay to an average uplink time stamp delay. The error comprises a timing phase error and the remote unit is configured to estimate the timing phase error by weighting and/or offsetting measured time stamps in the uplink and the downlink according to the a priori knowledge. The time stamp messages are transmitted with high priority according to the IEEE 802.1q protocol. The time stamp messages and the baseband data are transmitted on different virtual local area networks (VLANs). The time stamp messages and the baseband data are transmitted on the same virtual local area network (VLAN) using different priority markings of the IEEE 802.1q protocol. The baseband data and the time stamp messages are transmitted using dedicated Ethernet ports and dedicated Ethernet links of the switched Ethernet network. The communication system comprises a plurality of controllers and one of the controllers is a master controller and is configured to transmit the time stamp messages with remote units associated with the master controller and with remote units associated with the other controllers of the plurality of controllers. The controller is configured to advance in time a subframe of baseband data to be delivered to a remote unit to compensate a time delay between the remote unit clock and the controller clock. The controller is configured to advance in time the subframe of baseband data for a pre-determined amount. The pre-determined amount is determined based on a time delay for transmitting the baseband data over the intermediate network. The controller is configured to send information to the mobile devices for the mobile devices to advance a timing phase of the RF signals to be transmitted to the remote units relative to the RF signals received by the mobile devices from the remote units. The controller is configured to increase processing time available to the controller for the controller to process the baseband data transmissions by choosing an amount of the timing phase to be advanced to be greater than a time delay for transmitting RF signals in a round trip between a remote unit and a mobile device. A remote unit is configured to advance in time subframes of the baseband data to be transmitted to the controller. The remote units are configured to communicate with the controller on a communication channel, and a frequency of the communication channel is derived from the controller clock. The controller clock comprises a crystal oscillator configured to generate clocks for baseband processing in the controller. The remote unit clock comprises a crystal oscillator configured to generate clocks for analog-digital-analog converters (A/D/As), RF synthesizers, and/or baseband processing in each remote unit. The controller and the remote unit are configured to transmit time stamp messages in multiple round-trips between the controller and the remote unit. The remote unit is configured to adjust the remote unit clock based on one of the transmissions in multiple round-trips that is deemed to be most reliable to correct an offset between the controller clock and the remote unit clock. The one of the transmissions in multiple round-trips that is deemed to be most reliable comprises a transmission that predicts a smallest offset between the controller clock and the remote unit clock. The remote unit is configured to not to make any correction to the remote unit clock when an estimate of an offset between the controller clock and the remote unit clock based on the transmissions of the time stamp messages is deemed to be unreliable. The estimate of the offset is deemed to be unreliable when the estimate exceeds a pre-configured threshold. The controller clock is in direct coupling with the reference timing source and the remote unit clock is not in direct coupling with the reference timing source.

The aspects of the disclosure may also include one or more of the following features. A rate of transmission of the baseband data over the intermediate network is at most 1 Gb/s. The baseband data is represented by complex-valued signals having real and imaginary components, and the controller is configured to compress the baseband data by quantizing the complex-valued signals in the frequency domain to produce quantized baseband data, and to transmit binary data representative of the quantized baseband data to the remote units. The remote units are configured to reconstruct the quantized baseband data upon receipt of the compressed baseband data. The remote units are configured to apply an inverse fast Fourier transform on the reconstructed baseband data. The controller is configured to quantize the baseband data in the frequency domain using a quantizer having a fixed rate and a fixed step size. The controller is configured to quantize independently the real and imaginary components of the baseband data in the frequency domain. The controller is configured to send information about the fixed rate and the fixed step size to the remote units when the remote units and the controller are connected. The controller is configured to quantize the baseband data in the frequency domain using a quantizer having a fixed rate and an adjustable step size. The controller is configured to send side information about the fixed rate and a step size to a remote unit once per subframe. The controller is configured to quantize the baseband data in the frequency domain using a quantizer having a rate and a step size. The rate and the step size both are adjustable. The controller adjusts the step size according to energy of the quantized baseband data. The controller adjusts the rate according to a modulation and coding scheme of the baseband data. The RF signals are compatible with the long term evolution (LTE) standard. The controller is configured to send side information about the rate of the quantizer to a remote unit for each of plural resource element groups (REG) and physical resource blocks (PRB) in each orthogonal frequency-division multiplexing (OFDM) symbol of a subframe. The controller is configured to compress the baseband data by not sending to the remote units any data for unused resource element groups (REGs) or physical resource blocks (PRBs) in each orthogonal frequency-division multiplexing (OFDM) symbol of the baseband data. The baseband data in the frequency domain belongs to, or is derived from, a discrete-amplitude signal constellation, and the controller is configured to compress the baseband data without quantization by sending binary data representing the discrete-amplitude signals to the remote units. The discrete-amplitude signal constellation comprises a quadrature amplitude modulation (QAM) signal constellation. The RF signals carry orthogonal frequency-division multiplexing (OFDM) symbols, and the controller is configured to send the binary data to the remote units in the same order as the corresponding OFDM symbols are to be transmitted by the remote units over the air to the mobile devices. The remote units are configured to compress the baseband data by quantizing the baseband data in the frequency domain to produce quantized baseband data, and to transmit binary data representative of the quantized baseband data to the controller. A remote unit is configured to receive data in time domain from the mobile device and to apply a fast Fourier transform to the data in the time domain to produce the baseband data in the frequency domain. A remote unit is configured to quantize the baseband data in the frequency domain using a quantizer having a fixed rate and a fixed step size. A remote unit is configured to quantize the baseband data in the frequency domain using a quantizer having a fixed rate and an adjustable step size. The frames of the baseband data comprise orthogonal frequency-division multiplexing (OFDM) symbols and the remote unit is configured to select a step size based on an average energy of the quantized baseband data. The average energy is an average of energies of baseband data that belong to a long term evolution (LTE) channel. The remote unit is configured to select a step size based on a distribution of the baseband data in the frequency domain. The remote unit is configured to send side information about the quantizer to the controller for the controller to reconstruct the received quantized baseband data. A remote unit is configured to quantize the baseband data in the frequency domain using a quantizer having a rate and a step size, the rate and the step size both being adjustable. The frames of the baseband data comprise subframes comprising LTE physical resource blocks (PRBs), and the remote unit is configured to adjust the rate of the quantizer on a per PRB basis. The remote unit is configured to select a quantizer rate based on a modulation and coding scheme of the baseband data determined by the controller. The remote units are configured to quantize the baseband data using quantizers having adjustable rates. The quantizer rates for the baseband data are adjusted according to the LTE resource blocks. The quantizer rates are chosen to be zero to purge transmissions of the baseband data for some of the resource blocks. The controller is configured to send side information to the remote units and the information is used by the remote units to determine the quantizer rates. The controller is configured to determine the side information to be sent to the remote units based on information received from the mobile devices. The controller is configured to determine the side information based on a target signal-to-noise plus interference ratio (SINR) at the controller. The information received from the mobile devices corresponds to LTE Sounding Reference Signal (SRS) transmissions by the mobile devices. The information received from the mobile devices corresponds to LTE Physical Random Access Channel (PRACH) transmissions by the mobile devices. The information received from the mobile devices corresponds to uplink transmission on the Physical Uplink Shared Channel (PUSCH) by the mobile devices. A remote unit comprises two or more receiver antennas for receiving the RF signals from the mobile devices, and the remote unit is configured to quantize the baseband data corresponding to the different antennas using different quantizers. The quantizers for different antennas have different step sizes. The quantizers for different antennas have different step sizes and different rates. The different rates are determined by the controller. The controller is configured to send side information to the remote unit to indicate the determined quantizer rate for each receive antenna. A remote unit comprises two or more receiver antennas for receiving the RF signals from the mobile devices. The remote unit is configured to quantize the baseband data using a quantizer having a rate selected based on correlation of the RF signals received at different receivers of the remote unit. The controller is configured to determine a coefficient based on the correlation of the RF signals and to determine the rate of the quantizer using the coefficient. The remote unit is configured to determine the rate of the quantizer using a coefficient determined by the controller based on the correlation of the RF signals. The remote unit is configured to determine a coefficient based on the correlation of the RF signals and to determine the rate of the quantizer using the coefficient. All baseband data except for those corresponding to Physical Random Access Channel (PRACH) transmissions from a mobile device is compressed in the frequency domain. A remote unit is configured to compress the baseband data by quantizing the received PRACH transmissions after performing a correlation in the frequency domain. The remote unit is configured to compress the baseband data by quantizing the received PRACH transmissions in a time-domain after converting an output of the correlation back into the time domain. At least one modem of the controller is configured to execute real-time media access control (MAC) functions for the IP data corresponding to the information.

Any two or more of the features described in this patent application may be combined to form implementations not specifically described in this patent application.

All or part of the foregoing may be implemented as a computer program product comprised of instructions that are stored on one or more non-transitory machine-readable storage media, and that are executable on one or more processing devices. All or part of the foregoing may be implemented as an apparatus, method, or system that may include one or more processing devices and memory to store executable instructions to implement functionality.

All or part of the processes described herein and their various modifications (hereinafter referred to as "the processes") can be implemented, at least in part, via a computer program product, e.g., a computer program tangibly embodied in one or more information carriers, e.g., in one or more tangible, non-transitory machine-readable storage media, for execution by, or to control the operation of, data processing apparatus, e.g., a programmable processor, a computer, or multiple computers A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing the processes can be performed by one or more programmable processors executing one or more computer programs to perform the functions of the calibration process. All or part of the processes can be implemented as, special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer (including a server) include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, e.g., magnetic, magneto-optical disks, or optical disks. Machine-readable storage media suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

Elements of different implementations described herein may be combined to form other implementations not specifically set forth above. Elements may be left out of the processes, computer programs, Web pages, etc. described herein without adversely affecting their operation. Furthermore, various separate elements may be combined into one or more individual elements to perform the functions described herein.

Any of the features described herein may be combined, as appropriate, with any of the features described in U.S. Provisional Application No. 62/009,653, which is incorporated herein by reference. Any of the features described herein may be combined, as appropriate, with any of the features described in U.S. Provisional Application No. 62/051,212, which is incorporated herein by reference.

What is claimed is:

1. A communication system in a cellular network, comprising:
 a processing system comprising a controller and remote units, the remote units being configured to communicate with the controller, and wherein the remote units comprise radio frequency transceivers to communicate with mobile devices within a communication cell of the cellular network;
 wherein at least part of the processing system is configured to perform operations comprising:
  estimating signal strength experienced by at least some of the mobile devices;
  identifying, based at least on the signal strength, at least two of the mobile devices that are suitable for scheduling for simultaneous communication in the same communication cell on a same airlink resource; and
  scheduling said at least two of the mobile devices for the simultaneous communication in the same communication cell on the same airlink resource, wherein each of said at least two mobile devices use at least one of the remote units for the simultaneous communication.

2. The communication system of claim 1, wherein:
 the airlink resource comprises a frequency band;
 the remote units are configured to communicate with the mobile devices using RF signals;
 the controller is configured to estimate the signal strength experienced by a mobile device, and to represent the estimate numerically, the estimate corresponding to at least one of transmission and reception needs of the mobile device for which the estimate was made; and the controller comprises a real-time scheduler configured to perform the scheduling for the mobile device based on the estimate.

3. The communication system of claim 2, wherein said at least one of the transmission and reception needs of the mobile device correspond to estimated signal loss between the mobile device and at least one of the remote units.

4. The communication system of claim 3, wherein the estimated signal loss is based on an uplink transmission from the mobile device to at least one of the remote units.

5. The communication system of claim 4, wherein the uplink transmission is based on an LTE Sounding Reference Signal (SRS) transmission.

6. The communication system of claim 4, wherein the uplink transmission is based on an LTE Physical Random Access Channel (PRACH) transmission.

7. The communication system of claim 4, wherein the uplink transmission is based on an LTE Physical Uplink Control Channel (PUCCH) transmission.

8. The communication system of claim 4, wherein the uplink transmission is based on an LTE Physical Uplink Shared Channel (PUSCH) transmission.

9. The communication system of claim 2, wherein said at least one of the transmission and reception needs of the mobile device is based on traffic load experienced by at least one of the remote units.

10. The communication system of claim 2, wherein the estimate is represented using numerical values that are based on at least one measurement on an uplink from a mobile device to a remote unit.

11. The communication system of claim 2, wherein the estimate is represented using numerical values that are one of 0 and 1.

12. The communication system of claim 2, wherein the estimate is represented using numerical values that are values selected from a finite number of levels greater than two.

13. The communication system of claim 1, wherein an estimate of signal strength for a mobile device is represented using numerical values;

wherein, for the mobile device, the numerical values form a quantized signature vector; and wherein the controller is configured to perform operations comprising:

determining, based on quantized signature vectors for the mobile device and at least one other mobile device that the mobile device and the at least one other mobile device are suitable for scheduling for simultaneous communication using the same airlink resource.

14. The communication system of claim 1, wherein an estimate of signal strength for a mobile device is represented using numerical values;

wherein, for the mobile device, the numerical values form a quantized signature vector; and wherein the quantized signature vector is based on a threshold signal-to-interference-plus noise ratio (SINR).

15. The communication cell of claim 1, wherein an estimate of signal strength for a mobile device is represented using numerical values;

wherein, for the mobile device, the numerical values form a quantized signature vector; and wherein two mobile devices are suitable for scheduling for simultaneous communication using a same frequency band in response to a sum of quantized signature vectors for the two mobile devices having no component that exceeds a preset threshold.

16. The communication system of claim 1, wherein an estimate of signal strength for a mobile device is represented using numerical values; and wherein the numerical values are based, at least in part, on a location of the mobile device within the communication cell.

17. The communication system of claim 1, wherein at least two of the remote units are configured so that, when said at least two mobile devices are scheduled for simultaneous communication using the same airlink resource, different ones of the remote units communicate with different ones of said at least two mobile devices on the same airlink resource.

18. The communication system of claim 1, wherein at least one of the remote units is configured so that, when said at least two mobile devices are scheduled for simultaneous communication using the same airlink resource, said at least one of the remote units does not communicate with any mobile device.

19. The communication system of claim 1, wherein at least one of the remote units is configured so that, when at least two mobile devices are scheduled for simultaneous communication using the same airlink resource, said at least one of the remote units configured to communicate with multiple mobile devices simultaneously.

20. The communication link of claim 19, wherein the at least one remote unit is configured to communicate using a reduced transmit power.

21. The communication system of claim 1, wherein the controller is configured to cause communication with a mobile device to occur at a transmission power that is below a standard transmission power in a case where the mobile device is within a specified distance of at least one of the remote units.

22. The communication system of claim 21, wherein the controller is configured to determine if the mobile device is within the specified distance based on at least one measurement of uplink transmissions of the mobile device at at least of the one remote units.

23. The communication system of claim 22, wherein the uplink transmissions comprise at least one of: LTE Sounding Reference Signal (SRS), Physical Uplink Control Channel (PUCCH), Physical Random Access Channel (PRACH) or Physical Uplink Shared Channel (PUSCH) transmissions.

24. The communication system of claim 1, wherein the operations comprise determining a bit rate at which data is to be transmitted to and from a mobile device.

25. The communication system of claim 1, wherein the operations comprise determining a bit rate for communication between a mobile device and at least one of the remote units, and wherein determining the bit rate comprises:

receiving, from said at least one of the remote units, information about at least one measurement on an uplink control channel between the mobile device and the remote units; and using said at least one measurement to determine the bit rate.

26. The communication system of claim 24, wherein the bit rate is based on uncertainty due to small-scale fading.

27. The communication system of claim 1, wherein the operations comprise determining a bit rate for communication between a mobile device and at least one of the remote units, and
   wherein determining the bit rate comprises:
      receiving, from the mobile device, feedback information about at least one success and failure of past data transmissions; and
      using the feedback information to determine the bit rate.

28. The communication system of claim 27, wherein the feedback information comprises hybrid automatic repeat request (HARQ) feedback.

29. The communication system of claim 28, wherein, in a case that a dominant interferer of the mobile device has changed, past HARQ feedback is not used when determining the bit rate.

30. The communication system of claim 1, wherein the operations comprise determining a bit rate for communication between a mobile device and a remote unit, and
   wherein determining the bit rate comprises:
      receiving, from mobile devices, channel state information (CSI) feedback; and
      using the CSI feedback to determine the bit rate.

31. The communication system of claim 1, wherein the operations comprise determining a bit rate for communication between a mobile device and a remote unit, and
   wherein determining the bit rate comprises:
      receiving, from mobile devices, channel state feedback including an interference measurement; and
      using channel state feedback including the interference measurement to determine the bit rate.

32. The communication system of claim 31, wherein the interference measurement is based on an LTE Channel State Information Reference Signal (CSI-RS).

33. The communication system of claim 31, wherein the interference measurement is reported by a mobile device that is configured to report interference measurements for different interference scenarios.

34. The communication system of claim 1, wherein the same airlink resource is for downlink transmission from at least one of the remote units to a mobile device.

35. The communication system of claim 1, wherein the same airlink resource is for uplink transmission from a mobile device to at least one of the remote units.

36. The communication system of claim 1, wherein the same airlink resource is for uplink transmission from a mobile device and at least one other mobile device to at least one of the remote units for which signals are jointly processed.

37. The communication system of claim 1, wherein an estimate of signal strength is represented using numerical values;
   wherein, for a mobile device, the numerical values form a quantized signature vector; and
   wherein the controller is configured to perform operations comprising:
      determining that the quantized signature vector is orthogonal to another quantized signature vector by performing a logical operation using the quantized signature vector and the other quantized signature vector.

38. The communication system of claim 1, wherein the operations comprise:
   determining which remote units are to communicate with which mobile devices based, at least in part, on locations of mobile devices within the communication cell.

39. The method of claim 1, wherein the operations comprise:
   dividing the communication cell into virtual cells such that different mobile devices in at least two different virtual cells are configured for communication on the same frequency; and
   for a mobile device at a border of first and second virtual cells, controlling a first remote unit in the first virtual cell to transmit to the mobile device at a non-maximum power level and controlling a second remote unit in the second virtual cell to transmit to the mobile device at a non-maximum power level.

40. The communication system of claim 1, wherein the operations comprise determining bit rates at which the simultaneous communication are to occur.

41. The communication system of claim 40, wherein determining bit rates at which the simultaneous communication are to occur comprises:
   receiving, from all remote units in the communication cell, information on an uplink control channel, the information corresponding to a predicted signal strength for each of said at least two mobile devices in the communication cell, the predicted strength deviating from an actual signal strength for each of said at least two mobile devices in the communication cell, the predicted signal strength being associated with a first bit rate; and
   reducing the first bit rate based on the actual signal strength to produce a second bit rate for the simultaneous communication of each of said at least two mobile devices.

42. The communication system of claim 1, wherein the remote units are configured to perform at least some baseband processing, the at least some baseband processing including receiving and extracting the information on an uplink control channel; and
   wherein the operations further comprise load-balancing communications to remote units on the uplink control channel, where load-balancing comprises setting periods and phases for transmissions from some mobile devices so as not to overlap with transmissions of other mobile devices.

43. The communication system of claim 1, wherein the operations further comprise load-balancing communications to remote units on an uplink control channel, where load-balancing comprises setting periods for transmissions from some mobile devices based on a communication traffic load in the communication cell.

44. The communication system of claim 1, wherein said at least two mobile devices are scheduled for the simultaneous communication on a downlink to each of said at least two mobile devices.

45. The communication system of claim 1, wherein said at least two mobile devices are scheduled for the simultaneous communication on an uplink from each of said at least two mobile devices.

46. The communication system of claim 1, wherein said at least two mobile devices comprise a first mobile device and a second mobile device; and
   wherein identifying comprises identifying that the first and second mobile devices are suitable for scheduling for simultaneous communication on a same frequency on an uplink.

47. The communication system of claim 46, wherein the uplink comprises at least one of LTE Physical Uplink Control Channel (PUCCH) or Physical Uplink Shared Channel (PUSCH) channels.

48. The communication system of claim 1, wherein the operations comprise dividing the communication cell into virtual cells such that different mobile devices in at least two different virtual cells are configured to communicate on a same frequency; and
    wherein the same frequency comprises a part of a larger frequency band, the different mobile devices being configured also to communicate over different frequencies within the larger frequency band.

49. The communication system of claim 1, wherein the controller comprises a first controller and the processing system comprises at least one second controller, the first controller coordinating operation of the at least one second controller, each of the remote units being configured to communicate with a corresponding second controller and to communicate wirelessly with mobile devices.

50. The communication system of claim 49, wherein the first controller implements a central coordination function to control operations of the at least one second controller.

51. The communication system of claim 1, wherein the operations comprise:
    determining locations of the mobile devices within the communication cell; and
    scheduling communication between the mobile devices and the remote units so as to selectively allocate resources in the remote units.

52. The communication system of claim 1, wherein the operations further comprise load management of an uplink control channel processing load on the remote units, where load management comprises adjusting periods for transmissions from some mobile devices based on a communication traffic load in the communication cell.

53. The communication system of claim 52, wherein the communication traffic load is based on the number of connected users.

54. The communication system of claim 1, wherein said at least two mobile devices use different subsets of the remote units for the simultaneous communication.

55. The communication system of claim 1, wherein each of said at least two mobile devices uses a respective subset of the remote units for the simultaneous communication, wherein at least two of the respective subsets of the remote units include at least one common remote unit.

56. In a communication system in a cellular network, where the communication system comprises a processing system comprising a controller and remote units, where the remote units are configured to communicate with the controller and wherein the remote units comprise radio frequency transceivers to communicate with mobile devices within a communication cell of the cellular network, at least one non-transitory machine-readable storage medium storing instructions that are executable by the processing system to perform operations comprising:
    estimating signal strength experienced by at least some of the mobile devices;
    identifying, based at least on the signal strength, at least two of the mobile devices that are suitable for scheduling for simultaneous communication in the same communication cell on a same airlink resource; and
    scheduling said at least two mobile device for the simultaneous communication in the same communication cell on the same airlink resource, wherein each of said at least two mobile devices uses at least one of the remote units for the simultaneous communication.

57. The at least one non-transitory machine-readable storage medium of claim 56, wherein said at least two mobile devices use different subsets of the remote units for the simultaneous communication.

58. The at least one non-transitory machine-readable storage medium of claim 56, wherein each of said at least two mobile devices uses a respective subset of the remote units for the simultaneous communication, wherein at least two of the respective subsets of the remote units include at least one common remote unit.

\* \* \* \* \*